United States Patent
Atashband

(10) Patent No.: US 9,111,078 B2
(45) Date of Patent: Aug. 18, 2015

(54) PACKAGE MANAGER SERVICE IN GAMING SYSTEM

(75) Inventor: Farshid Atashband, Carson City, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1936 days.

(21) Appl. No.: 11/938,225

(22) Filed: Nov. 9, 2007

(65) Prior Publication Data

US 2008/0154916 A1    Jun. 26, 2008

Related U.S. Application Data

(60) Provisional application No. 60/865,345, filed on Nov. 10, 2006, provisional application No. 60/865,575, filed on Nov. 13, 2006, provisional application No. 60/865,332, filed on Nov. 10, 2006, provisional application No. 60/865,550, filed on Nov. 13, 2006.

(51) Int. Cl.
*G06F 15/16* (2006.01)
*G06F 21/33* (2013.01)

(52) U.S. Cl.
CPC ........ *G06F 21/33* (2013.01); *G06F 2221/2109* (2013.01); *G06F 2221/2119* (2013.01); *G06F 2221/2129* (2013.01)

(58) Field of Classification Search
CPC ..... G07F 17/32; G07F 17/3241; G06F 21/33; G06F 2221/2109; H04L 63/0428
USPC .......................................................... 709/217
See application file for complete search history.

(56) References Cited

U.S. PATENT DOCUMENTS

| | | | |
|---|---|---|---|
| 4,339,798 A | 7/1982 | Hedges et al. | |
| 4,373,726 A | 2/1983 | Churchill et al. | 273/138 A |
| 4,592,377 A | 6/1986 | Paulsen et al. | 133/5 R |
| 4,725,079 A | 2/1988 | Koza et al. | 283/73 |
| 4,832,341 A | 5/1989 | Muller et al. | 273/139 |
| 4,948,138 A | 8/1990 | Pease et al. | 273/138 A |
| 5,007,649 A | 4/1991 | Richardson | |
| 5,083,800 A | 1/1992 | Lockton | 273/439 |
| 5,179,517 A | 1/1993 | Sarbin et al. | 364/410 |
| 5,199,710 A | 4/1993 | Lamle | 273/149 R |
| 5,258,837 A | 11/1993 | Gormley | 358/140 |
| 5,275,400 A | 1/1994 | Weingardt et al. | 273/85 CP |

(Continued)

FOREIGN PATENT DOCUMENTS

| | | |
|---|---|---|
| EP | 1 074 955 A2 | 2/2001 |
| EP | 1 463 008 A2 | 9/2004 |

(Continued)

OTHER PUBLICATIONS

Standards document "Technical Standards for Gaming Devices and On-Line Slot Systems" (Aug. 17, 2005) to Nevada Gaming Commission and State Gaming Control Board. ("Nevada").*

(Continued)

*Primary Examiner* — June Sison
(74) *Attorney, Agent, or Firm* — Frank Abramonte; Marvin A. Hein; Philip J. Anderson

(57) ABSTRACT

A slot management system includes a download and configuration server-based sub-system and method for use with game devices, systems, and methods. The slot machine management system is provided to enable users to monitor, control, and modify game devices and other related activities.

25 Claims, 114 Drawing Sheets

(56) References Cited

U.S. PATENT DOCUMENTS

| | | | |
|---|---|---|---|
| 5,321,241 A | 6/1994 | Craine | |
| 5,324,035 A | 6/1994 | Morris et al. | 273/138 A |
| 5,326,104 A | 7/1994 | Pease et al. | 273/138 A |
| 5,386,103 A | 1/1995 | DeBan et al. | 235/379 |
| 5,398,932 A | 3/1995 | Eberhardt et al. | 273/138 A |
| 5,472,194 A | 12/1995 | Breeding et al. | 273/138 A |
| 5,493,613 A | 2/1996 | Denno et al. | |
| 5,505,449 A | 4/1996 | Eberhardt et al. | 273/138 A |
| 5,507,489 A | 4/1996 | Reibel et al. | 273/138 A |
| 5,562,284 A | 10/1996 | Stevens | 273/139 |
| 5,580,311 A | 12/1996 | Haste, III | 463/29 |
| 5,605,334 A | 2/1997 | McCrea, Jr. | 273/309 |
| 5,605,506 A | 2/1997 | Hoorn et al. | 463/47 |
| 5,613,680 A | 3/1997 | Groves et al. | 273/138.2 |
| 5,613,912 A | 3/1997 | Slater | 463/25 |
| 5,643,086 A | 7/1997 | Alcorn et al. | 463/29 |
| 5,655,961 A | 8/1997 | Acres et al. | 463/27 |
| 5,707,287 A | 1/1998 | McCrea, Jr. | 463/27 |
| 5,737,418 A | 4/1998 | Saffari et al. | 380/9 |
| 5,741,183 A | 4/1998 | Acres et al. | 463/42 |
| 5,745,110 A | 4/1998 | Ertemalp | |
| 5,759,102 A | 6/1998 | Pease et al. | 463/42 |
| 5,770,533 A | 6/1998 | Franchi | 463/42 |
| 5,779,545 A | 7/1998 | Berg et al. | 463/22 |
| 5,800,268 A | 9/1998 | Molnick | |
| 5,813,912 A | 9/1998 | Shultz | 463/25 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,850,447 A | 12/1998 | Peyret | 380/25 |
| 5,851,149 A | 12/1998 | Xidos et al. | |
| 5,890,963 A | 4/1999 | Yen | 463/42 |
| 5,895,451 A | 4/1999 | Yamade et al. | |
| 5,905,847 A | 5/1999 | Kobayashi et al. | |
| 5,911,626 A | 6/1999 | McCrea, Jr. | 463/27 |
| 5,957,776 A | 9/1999 | Hoehne | 463/25 |
| 5,971,851 A | 10/1999 | Pascal et al. | 463/24 |
| 5,974,135 A | 10/1999 | Breneman et al. | |
| 5,999,808 A | 12/1999 | LaDue | 455/412 |
| 6,001,016 A | 12/1999 | Walker et al. | 463/42 |
| 6,042,150 A | 3/2000 | Daley | 283/86 |
| 6,047,322 A | 4/2000 | Vaid et al. | |
| 6,068,553 A | 5/2000 | Parker | 463/27 |
| 6,077,161 A | 6/2000 | Wisler | 463/11 |
| 6,080,063 A | 6/2000 | Khosla | 463/42 |
| 6,089,980 A | 7/2000 | Gauselmann | 463/27 |
| 6,093,103 A | 7/2000 | McCrea, Jr. | 463/27 |
| 6,102,799 A | 8/2000 | Stupak | 463/27 |
| 6,104,815 A | 8/2000 | Alcorn et al. | 380/251 |
| 6,106,396 A | 8/2000 | Alcorn et al. | 463/29 |
| 6,110,041 A | 8/2000 | Walker et al. | 463/20 |
| 6,110,043 A | 8/2000 | Olsen | 463/27 |
| 6,117,012 A | 9/2000 | McCrea, Jr. | 463/27 |
| 6,135,887 A | 10/2000 | Pease et al. | 463/42 |
| 6,146,273 A | 11/2000 | Olsen | 463/27 |
| 6,149,522 A | 11/2000 | Alcorn et al. | 463/29 |
| 6,152,824 A | 11/2000 | Rothschild et al. | 463/42 |
| 6,165,069 A | 12/2000 | Sines et al. | 463/12 |
| 6,166,763 A | 12/2000 | Rhodes et al. | 348/143 |
| 6,168,523 B1 | 1/2001 | Piechowiak et al. | 463/26 |
| 6,183,366 B1 | 2/2001 | Goldberg et al. | 463/42 |
| 6,185,184 B1 | 2/2001 | Mattaway et al. | |
| 6,186,892 B1 | 2/2001 | Frank et al. | 463/19 |
| 6,210,277 B1 | 4/2001 | Stefan | 463/27 |
| 6,217,447 B1 | 4/2001 | Lofink et al. | 463/12 |
| 6,219,836 B1 | 4/2001 | Wells et al. | 717/11 |
| 6,234,898 B1 | 5/2001 | Belamant et al. | 463/25 |
| 6,244,958 B1 | 6/2001 | Acres | 463/26 |
| 6,251,014 B1 | 6/2001 | Stockdale et al. | 463/16 |
| 6,254,483 B1 | 7/2001 | Acres | |
| 6,254,484 B1 | 7/2001 | McCrea, Jr. | 463/27 |
| 6,256,651 B1 | 7/2001 | Tuli | |
| 6,264,561 B1 | 7/2001 | Saffari et al. | 463/42 |
| 6,275,586 B1 | 8/2001 | Kelly | 380/46 |
| 6,287,202 B1 | 9/2001 | Pascal et al. | 463/42 |
| 6,302,793 B1 | 10/2001 | Fertitta, III et al. | |
| 6,312,332 B1 | 11/2001 | Walker et al. | |
| 6,346,044 B1 | 2/2002 | McCrea, Jr. | 463/27 |
| 6,362,836 B1 | 3/2002 | Shaw et al. | |
| 6,380,953 B1 | 4/2002 | Mizuno | |
| 6,383,076 B1 | 5/2002 | Tiedeken | 463/40 |
| 6,389,126 B1 | 5/2002 | Bjornberg et al. | |
| 6,394,900 B1 | 5/2002 | McGlone et al. | 463/20 |
| 6,400,272 B1 | 6/2002 | Holtzman et al. | 340/572.1 |
| 6,401,099 B1 | 6/2002 | Koppolu et al. | |
| 6,409,602 B1 | 6/2002 | Wiltshire et al. | 463/42 |
| 6,439,996 B2 | 8/2002 | LeMay et al. | 463/29 |
| 6,443,839 B2 | 9/2002 | Stockdale et al. | 463/16 |
| 6,459,882 B1 | 10/2002 | Palermo et al. | |
| 6,460,848 B1 | 10/2002 | Soltys et al. | 273/149 R |
| 6,464,584 B2 | 10/2002 | Oliver | 463/25 |
| 6,488,581 B1 | 12/2002 | Stockdale | 463/29 |
| 6,488,585 B1 | 12/2002 | Wells et al. | 463/43 |
| 6,490,285 B2 | 12/2002 | Lee et al. | |
| 6,503,147 B1 | 1/2003 | Stockdale et al. | 463/29 |
| 6,505,772 B1 | 1/2003 | Mollett et al. | 235/379 |
| 6,508,709 B1 | 1/2003 | Karmarkar | 463/42 |
| 6,508,710 B1 | 1/2003 | Paravia et al. | 463/42 |
| 6,516,350 B1 | 2/2003 | Lumelsky et al. | |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,527,638 B1 | 3/2003 | Walker et al. | |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,575,833 B1 | 6/2003 | Stockdale | 463/29 |
| 6,578,847 B1 | 6/2003 | Hedrick et al. | 273/138.2 |
| 6,579,180 B2 | 6/2003 | Soltys et al. | 463/25 |
| 6,579,181 B2 | 6/2003 | Soltys et al. | 463/25 |
| 6,581,747 B1 | 6/2003 | Charlier et al. | 194/214 |
| 6,595,857 B2 | 7/2003 | Soltys et al. | 463/29 |
| 6,607,441 B1 | 8/2003 | Acres | 463/25 |
| 6,609,978 B1 | 8/2003 | Paulsen | 463/42 |
| 6,612,928 B1 | 9/2003 | Bradford et al. | |
| 6,629,184 B1 | 9/2003 | Berg et al. | 710/306 |
| 6,638,170 B1 | 10/2003 | Crumby | 463/42 |
| 6,641,484 B2 | 11/2003 | Oles et al. | 463/47 |
| 6,645,077 B2 | 11/2003 | Rowe | 463/42 |
| 6,652,378 B2 | 11/2003 | Cannon et al. | 463/20 |
| 6,656,048 B2 | 12/2003 | Olsen | |
| 6,663,490 B2 | 12/2003 | Soltys et al. | 463/25 |
| 6,675,152 B1 | 1/2004 | Prasad et al. | 705/64 |
| 6,676,522 B2 | 1/2004 | Rowe et al. | 463/42 |
| 6,682,421 B1 | 1/2004 | Rowe et al. | 463/25 |
| 6,682,423 B2 | 1/2004 | Brosnan et al. | 463/29 |
| 6,685,564 B2 | 2/2004 | Oliver | |
| 6,685,567 B2 | 2/2004 | Cockerille et al. | 463/43 |
| 6,688,979 B2 | 2/2004 | Soltys et al. | 463/25 |
| 6,699,128 B1 | 3/2004 | Beadell et al. | 463/46 |
| 6,702,291 B2 | 3/2004 | Grebler et al. | |
| 6,712,695 B2 | 3/2004 | Mothwurf et al. | |
| 6,712,696 B2 | 3/2004 | Soltys et al. | 463/25 |
| 6,718,361 B1 | 4/2004 | Basani et al. | |
| 6,722,985 B2 | 4/2004 | Criss-Puszkiewicz et al. | |
| 6,728,740 B2 | 4/2004 | Kelly et al. | 708/250 |
| 6,743,102 B1 | 6/2004 | Fiechter et al. | |
| 6,745,330 B1 | 6/2004 | Maillot | |
| 6,746,330 B2 | 6/2004 | Cannon | 463/25 |
| 6,752,312 B1 | 6/2004 | Chamberlain et al. | 235/375 |
| 6,755,741 B1 | 6/2004 | Rafaeli | 463/42 |
| 6,758,751 B2 | 7/2004 | Soltys et al. | 463/29 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,823,419 B2 | 11/2004 | Berg et al. | 710/306 |
| 6,837,789 B2 | 1/2005 | Garahi et al. | 463/29 |
| 6,846,238 B2 | 1/2005 | Wells | 463/39 |
| 6,848,994 B1 | 2/2005 | Knust et al. | 463/25 |
| 6,854,085 B1 | 2/2005 | Morse | |
| 6,866,581 B2 | 3/2005 | Martinek et al. | 463/16 |
| 6,866,586 B2 | 3/2005 | Oberberger et al. | 463/42 |

(56) References Cited

U.S. PATENT DOCUMENTS

| | | | |
|---|---|---|---|
| 6,884,170 B2 | 4/2005 | Rowe | |
| 6,884,173 B2 | 4/2005 | Gauselmann | |
| 6,884,174 B2 | 4/2005 | Lundy et al. | 463/42 |
| 6,896,618 B2 | 5/2005 | Benoy et al. | 463/42 |
| 6,899,627 B2 | 5/2005 | Lam et al. | 463/40 |
| 6,901,440 B1 | 5/2005 | Bimm et al. | |
| 6,905,411 B2 | 6/2005 | Nguyen et al. | 463/25 |
| 6,908,387 B2 | 6/2005 | Hedrick et al. | |
| 6,962,530 B2 | 11/2005 | Jackson | 463/29 |
| 6,971,956 B2 | 12/2005 | Rowe et al. | 463/25 |
| 6,993,587 B1 | 1/2006 | Basani et al. | |
| 6,997,803 B2 | 2/2006 | LeMay et al. | 463/20 |
| 7,013,469 B2 | 3/2006 | Smith et al. | |
| 7,025,674 B2 | 4/2006 | Adams et al. | |
| 7,027,996 B2 | 4/2006 | Levinson | |
| 7,035,626 B1 | 4/2006 | Luciano, Jr. | |
| 7,050,056 B2 | 5/2006 | Meyringer | |
| 7,051,101 B1 | 5/2006 | Dubrovsky et al. | |
| 7,062,470 B2 | 6/2006 | Prasad et al. | 705/64 |
| 7,086,947 B2 | 8/2006 | Walker et al. | |
| 7,099,035 B2 | 8/2006 | Brooks et al. | |
| 7,100,184 B1 | 8/2006 | Kahn | |
| 7,112,138 B2 | 9/2006 | Hedrick et al. | 463/29 |
| 7,114,718 B2 | 10/2006 | Grauzer et al. | 273/149 R |
| 7,116,782 B2 | 10/2006 | Jackson et al. | |
| 7,120,879 B2 | 10/2006 | Gutberlet et al. | |
| 7,168,089 B2 | 1/2007 | Nguyen et al. | 726/4 |
| 7,179,170 B2 | 2/2007 | Martinek et al. | 463/29 |
| 7,186,181 B2 | 3/2007 | Rowe | 463/42 |
| 7,197,765 B2 | 3/2007 | Chan et al. | |
| 7,198,571 B2 | 4/2007 | LeMay et al. | 463/25 |
| RE39,644 E | 5/2007 | Alcorn et al. | |
| 7,260,834 B1 | 8/2007 | Carlson | |
| 7,291,068 B2 | 11/2007 | Bryant et al. | 463/25 |
| 7,293,282 B2 * | 11/2007 | Danforth et al. | 726/4 |
| 7,300,352 B2 | 11/2007 | Rowe | |
| 7,309,065 B2 | 12/2007 | Yoseloff et al. | |
| 7,311,605 B2 | 12/2007 | Moser | 463/25 |
| 7,329,185 B2 | 2/2008 | Conover et al. | |
| 7,330,822 B1 | 2/2008 | Robson et al. | |
| 7,331,520 B2 | 2/2008 | Silva et al. | |
| 7,337,330 B2 | 2/2008 | Gatto et al. | |
| 7,346,682 B2 | 3/2008 | Basani et al. | |
| 7,349,920 B1 | 3/2008 | Feinberg et al. | |
| 7,351,147 B2 | 4/2008 | Stockdale et al. | 463/29 |
| 7,353,183 B1 | 4/2008 | Musso | |
| 7,356,770 B1 | 4/2008 | Jackson | |
| 7,363,342 B1 | 4/2008 | Wang et al. | |
| 7,364,510 B2 | 4/2008 | Walker et al. | |
| 7,370,282 B2 | 5/2008 | Cary | |
| 7,384,339 B2 | 6/2008 | LeMay et al. | 463/30 |
| 7,398,327 B2 | 7/2008 | Lee | |
| 7,419,428 B2 | 9/2008 | Rowe | |
| 7,427,236 B2 | 9/2008 | Kaminkow et al. | |
| 7,434,805 B2 | 10/2008 | Grauzer et al. | 273/149 R |
| 7,435,179 B1 | 10/2008 | Ford | |
| 7,438,221 B2 | 10/2008 | Washington et al. | |
| 7,438,643 B2 | 10/2008 | Brosnan et al. | 463/42 |
| 7,455,591 B2 | 11/2008 | Nguyen | 463/42 |
| 7,460,863 B2 | 12/2008 | Steelberg et al. | |
| 7,465,231 B2 | 12/2008 | Lewin et al. | |
| 7,473,178 B2 | 1/2009 | Boyd et al. | |
| 7,483,394 B2 | 1/2009 | Chang et al. | |
| 7,500,915 B2 | 3/2009 | Wolf et al. | 463/27 |
| 7,510,474 B2 | 3/2009 | Carter, Sr. | |
| 7,515,718 B2 | 4/2009 | Nguyen et al. | |
| 7,534,169 B2 | 5/2009 | Amaitis et al. | |
| 7,549,576 B2 | 6/2009 | Alderucci et al. | |
| 7,559,080 B2 | 7/2009 | Bhargavan et al. | |
| 7,566,274 B2 | 7/2009 | Johnson et al. | |
| 7,575,234 B2 | 8/2009 | Soltys | 273/149 R |
| 7,577,847 B2 | 8/2009 | Nguyen et al. | |
| 7,585,217 B2 | 9/2009 | Lutnick et al. | |
| 7,594,030 B2 | 9/2009 | Teodosiu et al. | |
| 7,607,976 B2 | 10/2009 | Baerlocher et al. | |
| 7,607,977 B2 | 10/2009 | Baerlocher et al. | |
| 7,610,549 B2 | 10/2009 | Vignet | |
| 7,611,407 B1 | 11/2009 | Itkis et al. | |
| 7,611,409 B2 | 11/2009 | Muir et al. | |
| 7,618,317 B2 | 11/2009 | Jackson | |
| 7,621,809 B2 | 11/2009 | Baerlocher et al. | |
| 7,629,886 B2 | 12/2009 | Steeves | |
| 7,634,550 B2 | 12/2009 | Wolber et al. | |
| 7,637,810 B2 | 12/2009 | Amaitis et al. | |
| 7,644,861 B2 | 1/2010 | Alderucci et al. | |
| 7,648,414 B2 | 1/2010 | McNutt et al. | |
| 7,666,081 B2 | 2/2010 | Baerlocher et al. | |
| 7,674,179 B2 | 3/2010 | Baerlocher et al. | |
| 7,684,882 B2 | 3/2010 | Baerlocher et al. | |
| 7,685,516 B2 | 3/2010 | Fischer | |
| 7,688,322 B2 | 3/2010 | Kapler et al. | |
| 7,689,302 B2 | 3/2010 | Schlottmann et al. | |
| 7,690,995 B2 | 4/2010 | Frankulin et al. | |
| 7,699,697 B2 | 4/2010 | Darrah et al. | |
| 7,699,703 B2 | 4/2010 | Muir et al. | |
| 7,702,719 B1 | 4/2010 | Betz et al. | |
| 7,706,895 B2 | 4/2010 | Callaghan | |
| 7,712,050 B2 | 5/2010 | Gutberlet et al. | |
| 7,730,198 B2 | 6/2010 | Ruppert et al. | |
| 7,747,741 B2 | 6/2010 | Basani et al. | |
| 7,769,877 B2 | 8/2010 | McBride et al. | |
| 7,778,635 B2 | 8/2010 | Crookham et al. | |
| 7,780,526 B2 | 8/2010 | Nguyen et al. | |
| 7,780,529 B2 | 8/2010 | Rowe et al. | |
| 7,785,204 B2 | 8/2010 | Wells et al. | |
| 7,787,972 B2 | 8/2010 | Schlottmann et al. | |
| 7,788,503 B2 | 8/2010 | Gatto et al. | |
| 7,841,946 B2 | 11/2010 | Walker et al. | |
| 7,844,944 B2 | 11/2010 | Gutberlet et al. | |
| 7,846,020 B2 | 12/2010 | Walker et al. | |
| 7,850,528 B2 | 12/2010 | Wells | |
| 7,857,702 B2 | 12/2010 | Hilbert | |
| 7,862,425 B2 | 1/2011 | Cavagna | |
| 7,867,081 B2 | 1/2011 | Schneider et al. | |
| 7,874,920 B2 | 1/2011 | Hornik et al. | |
| 7,874,921 B2 | 1/2011 | Baszucki et al. | |
| 7,892,093 B2 | 2/2011 | Kniestedt et al. | |
| 7,898,679 B2 | 3/2011 | Brack et al. | |
| 7,901,294 B2 | 3/2011 | Walker et al. | |
| 7,905,780 B2 | 3/2011 | Morrow et al. | |
| 7,908,486 B2 | 3/2011 | Gatto et al. | |
| 7,918,735 B2 | 4/2011 | Inamura | |
| 7,921,026 B2 | 4/2011 | O'Cull et al. | |
| 7,921,405 B2 | 4/2011 | Gupta et al. | |
| 7,937,464 B2 | 5/2011 | Ruppert et al. | |
| 7,963,847 B2 | 6/2011 | Baerlocher | |
| 8,028,046 B2 | 9/2011 | Elliott et al. | |
| 8,037,313 B2 | 10/2011 | Hämäläinen et al. | |
| 8,051,180 B2 | 11/2011 | Mazzaferri et al. | |
| 8,070,583 B2 | 12/2011 | Baerlocher et al. | |
| 8,073,657 B2 | 12/2011 | Moore, III et al. | |
| 8,117,461 B2 | 2/2012 | Bigelow, Jr. et al. | |
| 8,177,634 B2 | 5/2012 | Herrmann et al. | |
| 8,182,346 B2 | 5/2012 | Herrmann et al. | |
| 8,187,101 B2 | 5/2012 | Herrmann et al. | |
| 8,192,289 B2 | 6/2012 | Herrmann et al. | |
| 8,197,344 B2 | 6/2012 | Rathsack et al. | |
| 8,201,229 B2 | 6/2012 | Ruppert et al. | |
| 8,246,466 B2 | 8/2012 | Herrmann et al. | |
| 8,277,324 B2 | 10/2012 | Herrmann et al. | |
| 8,280,777 B2 | 10/2012 | Mengerink et al. | |
| 8,360,870 B2 | 1/2013 | Herrmann et al. | |
| 8,366,550 B2 | 2/2013 | Herrmann et al. | |
| 8,512,150 B2 | 8/2013 | Herrmann et al. | |
| 2001/0019966 A1 | 9/2001 | Idaka | 463/40 |
| 2002/0004824 A1 | 1/2002 | Cuan et al. | |
| 2002/0111213 A1 | 8/2002 | McEntee et al. | |
| 2002/0113371 A1 | 8/2002 | Snow | 273/292 |
| 2002/0115487 A1 | 8/2002 | Wells | 463/42 |
| 2002/0119824 A1 | 8/2002 | Allen | |
| 2002/0142825 A1 | 10/2002 | Lark et al. | 463/16 |
| 2002/0142844 A1 | 10/2002 | Kerr | |
| 2002/0144115 A1 | 10/2002 | Lemay et al. | |
| 2002/0147047 A1 | 10/2002 | Letovsky et al. | |

(56) References Cited

U.S. PATENT DOCUMENTS

| | | | |
|---|---|---|---|
| 2002/0151363 A1 | 10/2002 | Letovsky et al. | |
| 2002/0152120 A1 | 10/2002 | Howington | |
| 2002/0173354 A1 | 11/2002 | Winans et al. | 463/20 |
| 2003/0004871 A1 | 1/2003 | Rowe | |
| 2003/0006554 A1 | 1/2003 | Grebler et al. | 273/290 |
| 2003/0022714 A1 | 1/2003 | Oliver | 463/25 |
| 2003/0028480 A1 | 2/2003 | Rowe | 705/39 |
| 2003/0032474 A1 | 2/2003 | Kaminkow | |
| 2003/0042679 A1 | 3/2003 | Snow | 273/292 |
| 2003/0045354 A1 | 3/2003 | Giobbi | 463/40 |
| 2003/0064798 A1 | 4/2003 | Grauzer et al. | 463/29 |
| 2003/0075869 A1 | 4/2003 | Breeding et al. | 273/292 |
| 2003/0078103 A1 | 4/2003 | LeMay et al. | 463/43 |
| 2003/0090064 A1 | 5/2003 | Hoyt et al. | 273/292 |
| 2003/0100369 A1 | 5/2003 | Gatto et al. | |
| 2003/0104865 A1 | 6/2003 | Itkis et al. | |
| 2003/0130024 A1 | 7/2003 | Darby | 463/13 |
| 2003/0134675 A1* | 7/2003 | Oberberger | 463/29 |
| 2003/0137968 A1 | 7/2003 | Lareau et al. | 370/349 |
| 2003/0182414 A1 | 9/2003 | O'Neill | |
| 2003/0185229 A1 | 10/2003 | Shachar et al. | |
| 2003/0203755 A1 | 10/2003 | Jackson | 463/42 |
| 2003/0206548 A1 | 11/2003 | Bannai et al. | |
| 2003/0224858 A1 | 12/2003 | Yoseloff et al. | 463/43 |
| 2003/0228912 A1* | 12/2003 | Wells et al. | 463/43 |
| 2003/0232651 A1 | 12/2003 | Huard | 463/42 |
| 2004/0002386 A1 | 1/2004 | Wolfe et al. | |
| 2004/0002388 A1 | 1/2004 | Larsen et al. | |
| 2004/0029635 A1 | 2/2004 | Giobbi | 463/30 |
| 2004/0043815 A1 | 3/2004 | Kaminkow | 463/25 |
| 2004/0043820 A1 | 3/2004 | Schlottmann | 463/43 |
| 2004/0048671 A1 | 3/2004 | Rowe | 463/42 |
| 2004/0064817 A1 | 4/2004 | Shibayama et al. | |
| 2004/0068654 A1 | 4/2004 | Cockerille et al. | 713/168 |
| 2004/0082385 A1 | 4/2004 | Silva et al. | 463/40 |
| 2004/0092310 A1 | 5/2004 | Brosnan et al. | 463/42 |
| 2004/0106452 A1 | 6/2004 | Nguyen et al. | 463/42 |
| 2004/0110119 A1 | 6/2004 | Riconda et al. | |
| 2004/0127291 A1 | 7/2004 | George et al. | |
| 2004/0133485 A1 | 7/2004 | Schoonmaker et al. | 705/30 |
| 2004/0142744 A1 | 7/2004 | Atkinson et al. | |
| 2004/0166918 A1 | 8/2004 | Walker et al. | 463/16 |
| 2004/0166940 A1 | 8/2004 | Rothschild | |
| 2004/0185936 A1 | 9/2004 | Block et al. | |
| 2004/0229684 A1 | 11/2004 | Blackburn et al. | |
| 2004/0254010 A1 | 12/2004 | Fine | 463/25 |
| 2004/0254993 A1 | 12/2004 | Mamas | |
| 2005/0043094 A1 | 2/2005 | Nguyen et al. | 463/42 |
| 2005/0054438 A1 | 3/2005 | Rothschild et al. | 463/29 |
| 2005/0054445 A1 | 3/2005 | Gatto et al. | |
| 2005/0055113 A1 | 3/2005 | Gauselmann | 700/91 |
| 2005/0070358 A1 | 3/2005 | Angell et al. | 463/39 |
| 2005/0080898 A1 | 4/2005 | Block | |
| 2005/0119052 A1 | 6/2005 | Russell et al. | |
| 2005/0143166 A1 | 6/2005 | Walker et al. | 463/25 |
| 2005/0153778 A1 | 7/2005 | Nelson et al. | |
| 2005/0171808 A1 | 8/2005 | Saenz et al. | |
| 2005/0181856 A1 | 8/2005 | Cannon et al. | 463/16 |
| 2005/0181864 A1 | 8/2005 | Britt et al. | 463/25 |
| 2005/0192099 A1* | 9/2005 | Nguyen et al. | 463/42 |
| 2005/0221882 A1 | 10/2005 | Nguyen et al. | 463/16 |
| 2005/0222891 A1 | 10/2005 | Chan et al. | |
| 2005/0239542 A1 | 10/2005 | Olsen | 463/27 |
| 2005/0282626 A1 | 12/2005 | Manfredi et al. | |
| 2006/0003828 A1 | 1/2006 | Abecassis | |
| 2006/0004618 A1 | 1/2006 | Brixius | 705/8 |
| 2006/0009282 A1 | 1/2006 | George et al. | 463/29 |
| 2006/0015716 A1 | 1/2006 | Thornton et al. | |
| 2006/0026499 A1 | 2/2006 | Weddle | |
| 2006/0031763 A1 | 2/2006 | Yeung | |
| 2006/0035707 A1 | 2/2006 | Nguyen et al. | |
| 2006/0035713 A1* | 2/2006 | Cockerille et al. | 463/42 |
| 2006/0046849 A1 | 3/2006 | Kovacs | 463/39 |
| 2006/0066444 A1 | 3/2006 | Steeves | 340/10.5 |
| 2006/0079310 A1 | 4/2006 | Friedman et al. | 463/16 |
| 2006/0116208 A1 | 6/2006 | Chen et al. | 463/43 |
| 2006/0117314 A1 | 6/2006 | Sato | |
| 2006/0121970 A1 | 6/2006 | Khal | 463/16 |
| 2006/0130046 A1 | 6/2006 | O'Neill | |
| 2006/0183541 A1 | 8/2006 | Okada et al. | 463/29 |
| 2006/0195847 A1 | 8/2006 | Amano et al. | |
| 2006/0205508 A1 | 9/2006 | Green | |
| 2006/0217202 A1 | 9/2006 | Burke et al. | |
| 2006/0247013 A1 | 11/2006 | Walker et al. | 463/20 |
| 2006/0247057 A1 | 11/2006 | Green et al. | |
| 2006/0248161 A1 | 11/2006 | O'Brien et al. | |
| 2006/0252530 A1 | 11/2006 | Oberberger et al. | |
| 2006/0253702 A1 | 11/2006 | Lowell et al. | |
| 2006/0259604 A1 | 11/2006 | Kotchavi et al. | |
| 2006/0277487 A1 | 12/2006 | Poulsen et al. | 715/772 |
| 2006/0281556 A1 | 12/2006 | Solomon et al. | 463/43 |
| 2006/0287077 A1 | 12/2006 | Grav et al. | 463/27 |
| 2006/0287098 A1 | 12/2006 | Morrow et al. | |
| 2007/0004501 A1 | 1/2007 | Brewer et al. | |
| 2007/0006329 A1 | 1/2007 | Morrow et al. | 726/34 |
| 2007/0015583 A1 | 1/2007 | Tran | 463/40 |
| 2007/0026935 A1* | 2/2007 | Wolf et al. | 463/25 |
| 2007/0026942 A1* | 2/2007 | Kinsley et al. | 463/29 |
| 2007/0032288 A1 | 2/2007 | Nelson et al. | |
| 2007/0033247 A1 | 2/2007 | Martin | |
| 2007/0054740 A1 | 3/2007 | Salls et al. | 463/42 |
| 2007/0057453 A1 | 3/2007 | Soltys et al. | 273/149 P |
| 2007/0057454 A1 | 3/2007 | Fleckenstein | 273/149 R |
| 2007/0057469 A1 | 3/2007 | Grauzer et al. | 273/309 |
| 2007/0060259 A1 | 3/2007 | Pececnik | |
| 2007/0060307 A1 | 3/2007 | Mathis et al. | |
| 2007/0060320 A1 | 3/2007 | Kelly et al. | |
| 2007/0060365 A1 | 3/2007 | Tien et al. | 463/42 |
| 2007/0067768 A1 | 3/2007 | Breckner et al. | |
| 2007/0077990 A1 | 4/2007 | Cuddy et al. | 463/25 |
| 2007/0077995 A1 | 4/2007 | Oak et al. | |
| 2007/0082737 A1 | 4/2007 | Morrow et al. | 463/42 |
| 2007/0093298 A1 | 4/2007 | Brunet | 463/42 |
| 2007/0105628 A1 | 5/2007 | Arbogast et al. | |
| 2007/0111775 A1 | 5/2007 | Yoseloff | 463/16 |
| 2007/0111791 A1 | 5/2007 | Arbogast et al. | 463/40 |
| 2007/0111794 A1 | 5/2007 | Hogan et al. | |
| 2007/0117608 A1 | 5/2007 | Roper et al. | 463/16 |
| 2007/0118844 A1 | 5/2007 | Huang et al. | |
| 2007/0124483 A1 | 5/2007 | Marples et al. | |
| 2007/0129145 A1 | 6/2007 | Blackburn et al. | |
| 2007/0150329 A1 | 6/2007 | Brook et al. | |
| 2007/0155490 A1 | 7/2007 | Phillips et al. | |
| 2007/0167235 A1 | 7/2007 | Naicker | 463/42 |
| 2007/0191102 A1 | 8/2007 | Coliz et al. | 463/42 |
| 2007/0192748 A1 | 8/2007 | Martin et al. | 715/856 |
| 2007/0198418 A1 | 8/2007 | MacDonald | 705/52 |
| 2007/0208816 A1 | 9/2007 | Baldwin et al. | |
| 2007/0214030 A1* | 9/2007 | Shear et al. | 705/8 |
| 2007/0218998 A1 | 9/2007 | Arbogast et al. | |
| 2007/0235521 A1 | 10/2007 | Mateen et al. | 235/379 |
| 2007/0241497 A1 | 10/2007 | Soltys et al. | 273/149 R |
| 2007/0241498 A1 | 10/2007 | Soltys | 273/149 R |
| 2007/0243925 A1 | 10/2007 | LeMay et al. | 463/20 |
| 2007/0243927 A1 | 10/2007 | Soltys | 463/25 |
| 2007/0243935 A1 | 10/2007 | Huizinga | 463/42 |
| 2007/0259709 A1 | 11/2007 | Kelly et al. | |
| 2007/0259711 A1 | 11/2007 | Thomas | 463/22 |
| 2007/0287535 A1 | 12/2007 | Soltys | 463/29 |
| 2007/0298868 A1 | 12/2007 | Soltys | 463/25 |
| 2008/0004108 A1 | 1/2008 | Klinkhammer | |
| 2008/0009344 A1 | 1/2008 | Graham et al. | |
| 2008/0026832 A1 | 1/2008 | Stevens et al. | |
| 2008/0026848 A1 | 1/2008 | Byng | |
| 2008/0038035 A1 | 2/2008 | Shuldman et al. | |
| 2008/0045341 A1 | 2/2008 | Englman | |
| 2008/0045342 A1 | 2/2008 | Crowder, Jr. et al. | |
| 2008/0045344 A1 | 2/2008 | Schlottmann et al. | 463/25 |
| 2008/0058105 A1 | 3/2008 | Combs et al. | |
| 2008/0064501 A1 | 3/2008 | Patel | |
| 2008/0065590 A1 | 3/2008 | Castro et al. | |
| 2008/0076572 A1 | 3/2008 | Nguyen et al. | |
| 2008/0085772 A1 | 4/2008 | Iddings et al. | |
| 2008/0090651 A1 | 4/2008 | Baerlocher | 463/27 |

(56) References Cited

U.S. PATENT DOCUMENTS

| | | |
|---|---|---|
| 2008/0096659 A1 | 4/2008 | Kreloff et al. |
| 2008/0102919 A1 | 5/2008 | Rowe et al. |
| 2008/0102932 A1 | 5/2008 | Anderson et al. |
| 2008/0108405 A1 | 5/2008 | Brosnan et al. |
| 2008/0108433 A1 | 5/2008 | DiMichele et al. |
| 2008/0113764 A1 | 5/2008 | Soltys ............... 463/22 |
| 2008/0113773 A1 | 5/2008 | Johnson et al. |
| 2008/0119284 A1 | 5/2008 | Luciano, Jr. et al. |
| 2008/0126803 A1 | 5/2008 | Ginter et al. |
| 2008/0127174 A1 | 5/2008 | Johnson |
| 2008/0138773 A1 | 6/2008 | Lathrop |
| 2008/0146337 A1 | 6/2008 | Halonen et al. ............. 463/42 |
| 2008/0153599 A1 | 6/2008 | Atashband et al. ........... 463/42 |
| 2008/0153600 A1 | 6/2008 | Swarna ............ 463/43 |
| 2008/0154916 A1 | 6/2008 | Atashband |
| 2008/0155665 A1 | 6/2008 | Ruppert et al. ............ 726/5 |
| 2008/0162729 A1 | 7/2008 | Ruppert ............ 709/249 |
| 2008/0165771 A1 | 7/2008 | Gainey et al. |
| 2008/0171588 A1 | 7/2008 | Atashband ............ 463/20 |
| 2008/0171598 A1 | 7/2008 | Deng ............ 463/40 |
| 2008/0200255 A1 | 8/2008 | Eisele ............ 463/42 |
| 2008/0243697 A1 | 10/2008 | Irving et al. |
| 2008/0244565 A1 | 10/2008 | Levidow et al. |
| 2008/0261699 A1 | 10/2008 | Topham et al. |
| 2008/0261701 A1 | 10/2008 | Lewin et al. |
| 2008/0287197 A1 | 11/2008 | Ruppert et al. |
| 2008/0293494 A1 | 11/2008 | Adiraju et al. |
| 2008/0300046 A1 | 12/2008 | Gagner et al. |
| 2008/0305854 A1 | 12/2008 | Graham et al. |
| 2008/0311971 A1 | 12/2008 | Dean |
| 2008/0313282 A1 | 12/2008 | Warila et al. |
| 2008/0318655 A1 | 12/2008 | Davies |
| 2008/0318671 A1 | 12/2008 | Rowe et al. |
| 2008/0318685 A9 | 12/2008 | Oak et al. |
| 2009/0005176 A1 | 1/2009 | Morrow et al. ............ 463/43 |
| 2009/0005177 A1 | 1/2009 | Kishi et al. |
| 2009/0011833 A1 | 1/2009 | Seelig et al. |
| 2009/0029775 A1 | 1/2009 | Ruppert et al. |
| 2009/0054139 A1 | 2/2009 | Anderson |
| 2009/0063309 A1 | 3/2009 | Stephens |
| 2009/0069076 A1 | 3/2009 | Silvestro |
| 2009/0115133 A1 | 5/2009 | Kelly et al. ............ 273/274 |
| 2009/0117994 A1 | 5/2009 | Kelly et al. ............ 463/25 |
| 2009/0118001 A1 | 5/2009 | Kelly et al. ............ 463/29 |
| 2009/0118005 A1 | 5/2009 | Kelly et al. ............ 463/31 |
| 2009/0118006 A1 | 5/2009 | Kelly et al. ............ 463/31 |
| 2009/0124329 A1 | 5/2009 | Palmisano |
| 2009/0124392 A1 | 5/2009 | Ruppert et al. ............ 463/42 |
| 2009/0124394 A1 | 5/2009 | Swarna ............ 463/43 |
| 2009/0125603 A1 | 5/2009 | Atashband et al. ............ 709/207 |
| 2009/0131144 A1 | 5/2009 | Allen ............ 463/20 |
| 2009/0131163 A1 | 5/2009 | Arbogast et al. ............ 463/29 |
| 2009/0132720 A1 | 5/2009 | Ruppert et al. ............ 709/231 |
| 2009/0170594 A1 | 7/2009 | Delaney et al. ............ 463/25 |
| 2009/0176556 A1 | 7/2009 | Gagner et al. |
| 2009/0176578 A1 | 7/2009 | Herrmann et al. |
| 2009/0176580 A1 | 7/2009 | Herrmann et al. |
| 2009/0181776 A1 | 7/2009 | Deng ............ 463/42 |
| 2009/0239667 A1 | 9/2009 | Rowe et al. |
| 2009/0253483 A1 | 10/2009 | Pacey et al. |
| 2009/0270170 A1 | 10/2009 | Patton ............ 463/36 |
| 2009/0275394 A1 | 11/2009 | Young et al. ............ 463/25 |
| 2009/0275400 A1 | 11/2009 | Rehm et al. ............ 463/27 |
| 2009/0275401 A1 | 11/2009 | Allen et al. ............ 463/29 |
| 2009/0275402 A1 | 11/2009 | Backover et al. ............ 463/29 |
| 2009/0276341 A1 | 11/2009 | McMahan et al. ............ 705/30 |
| 2009/0298583 A1 | 12/2009 | Jones ............ 463/29 |
| 2009/0307069 A1 | 12/2009 | Meyerhofer |
| 2009/0325708 A9 | 12/2009 | Kerr |
| 2010/0016067 A1 | 1/2010 | White et al. ............ 463/25 |
| 2010/0016068 A1 | 1/2010 | White et al. ............ 463/25 |
| 2010/0029385 A1 | 2/2010 | Garvey et al. |
| 2010/0048291 A1 | 2/2010 | Warkentin |
| 2010/0058320 A1 | 3/2010 | Milligan et al. |
| 2010/0062838 A1 | 3/2010 | Nguyen et al. |
| 2010/0093440 A1 | 4/2010 | Burke |
| 2010/0093441 A1 | 4/2010 | Rajaraman et al. |
| 2010/0124990 A1 | 5/2010 | Crowder |
| 2010/0125851 A1 | 5/2010 | Singh et al. |
| 2010/0130280 A1 | 5/2010 | Arezina et al. |
| 2010/0131772 A1 | 5/2010 | Atashband et al. |
| 2010/0151926 A1 | 6/2010 | Ruppert et al. |
| 2010/0161798 A1 | 6/2010 | Ruppert et al. |
| 2010/0210353 A1 | 8/2010 | Gagner et al. |
| 2010/0234104 A1 | 9/2010 | Ruppert et al. |
| 2010/0248842 A1 | 9/2010 | Ruppert |
| 2011/0009184 A1 | 1/2011 | Byng |
| 2011/0111826 A1 | 5/2011 | Baerlocher et al. |
| 2011/0124417 A1 | 5/2011 | Baynes et al. |
| 2011/0161948 A1 | 6/2011 | Hilbert |
| 2011/0179409 A1 | 7/2011 | Yoseloff et al. |
| 2011/0269534 A1 | 11/2011 | Kelly et al. |
| 2012/0110649 A1 | 5/2012 | Murphy |
| 2012/0203692 A1 | 8/2012 | Olliphant et al. |

FOREIGN PATENT DOCUMENTS

| | | |
|---|---|---|
| GB | 2 380 143 A | 4/2003 |
| JP | 8255059 | 10/1996 |
| KR | 2001-0084838 | 9/2001 |
| KR | 2002-0061793 | 7/2002 |
| KR | 2003-0091635 | 12/2003 |
| WO | 02/05914 A1 | 1/2002 |
| WO | 03/060846 A2 | 7/2003 |
| WO | 2007/033207 A2 | 3/2007 |
| WO | 2005/035084 A1 | 4/2012 |

OTHER PUBLICATIONS

Requirements document "Game Authentication Terminal Program (GAT3)" (Aug. 2005) to Gaming Standards Association ("GSA").*

Bally Technologies, Inc., iVIEW, http://ballytech.com/systems/product.cfm?id=9, download date Nov. 6, 2007, 2 pages.

Bally TMS, "MP21—Automated Table Tracking/Features," 2 pages, Nov. 2005.

Bally TMS, "MPBacc—Specifications/Specifications," 2 pages, Nov. 2005.

Bally TMS, "MPLite—Table Management System/Features," 2 pages, Nov. 2005.

Bulaysky, J., "Tracking the Tables," *Casino Journal*, May 2004, pp. 44-47, accessed Dec. 21, 2005, URL=http ://www.ascendgaming.com/cj/vendors_manufacturers_table/Trackin916200411141AM.htm, 5 pages.

Burke, A., "Tracking the Tables," reprinted from *International Gaming & Wagering Business*, Aug. 2003, 4 pages.

Gros, R., "All You Ever Wanted to Know About Table Games," reprinted from *Global Gaming Business*, Aug. 1, 2003, 2 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Terdiman, D., "Who's Holding the Aces Now?", reprinted from *Wired News*, Aug. 18, 2003, 2 pages.

Singh et al., U.S. Appl. No. 12/271,337, filed Nov. 14, 2008, 35 pages.

Crowder, U.S. Appl. No. 12/271,736, filed Nov. 14, 2008, 35 pages.

Rajaraman et al., U.S. Appl. No. 12/500,298, filed Jul. 9, 2009, 50 pages.

Atashband et al., U.S. Appl. No. 12/620,402, filed Nov. 16, 2009, 46 pages.

Ruppert et al., U.S. Appl. No. 12/620,404, filed Nov. 16, 2009, 70 pages.

Winkler, "Product Spotlight: MindPlay," reprinted from *Gaming & Leisure Technology*, 2003, 2 pages.

"BOB and LDAP," Gaming Standards Association, Fremont, California, 7 pages, Oct. 26, 2003.

(56) References Cited

OTHER PUBLICATIONS

"GSA Point-to-Point SOAP/HTTPS Transport and Security Specification v1.0.3," Gaming Standards Association Transport Technical Committee, 16 pages, Jun. 5, 2007.

Hung et al., "Performance Evaluation of the Least Conflict Sharable Spreading Code Assignment Algorithm," IEEE, 1996, 5 pages.

Olesiejuk, "Discovery Services for Gaming Devices on a Casino Floor," Gaming Standards Association, 3 pages, Mar. 12, 2007.

Gwyddion User Guide, "False Color Mapping: Chapter 3. Getting Started," retrieved from URL=http://sourceforge.net/projects/gwyddion/files/user-guide/2007-06-28/gwyddion-user-guide-xhtml-2007-06-28.tar.gz/download, retrieved on Nov. 21, 2012, 2 pages.

* cited by examiner

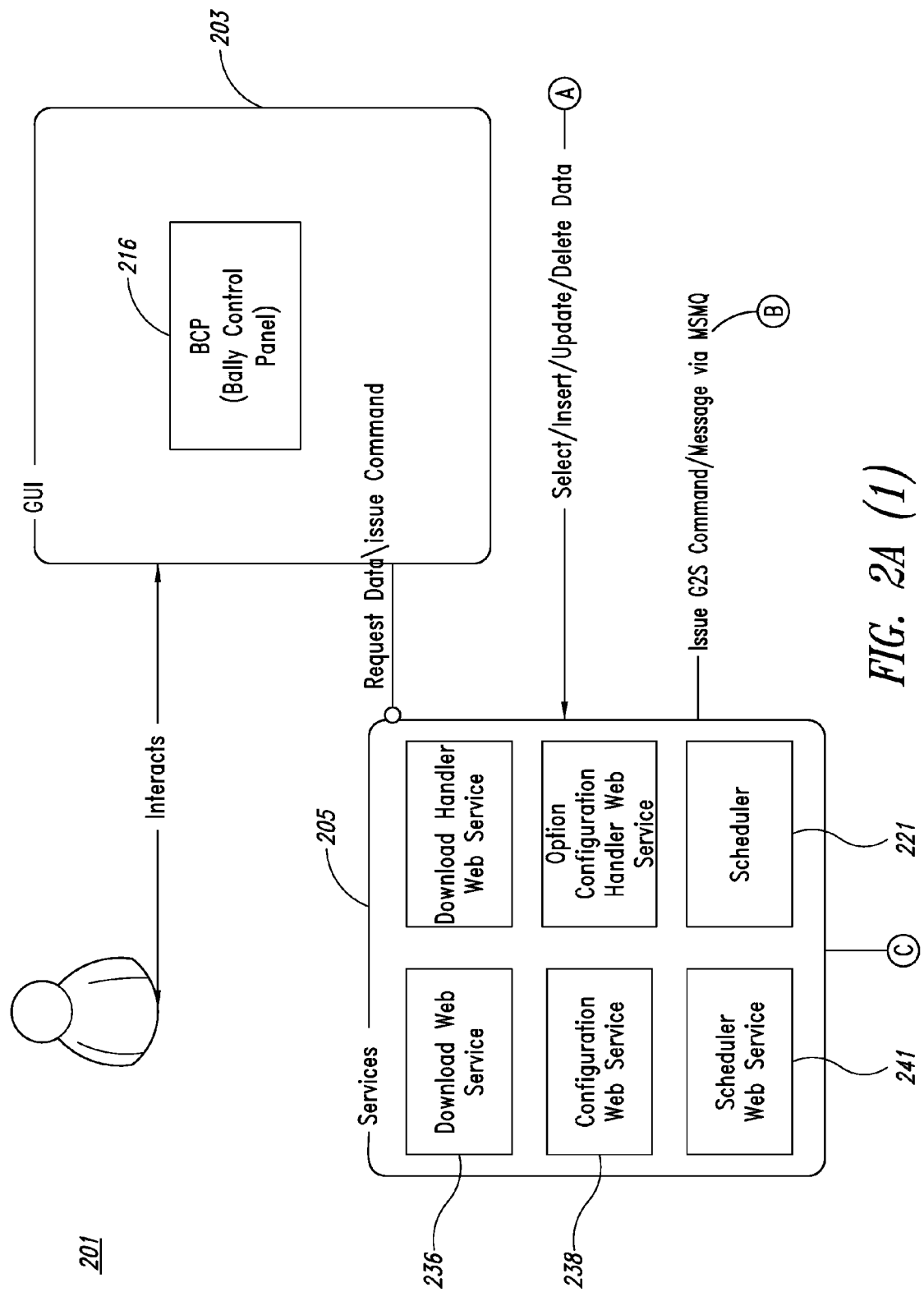
FIG. 2A (1)

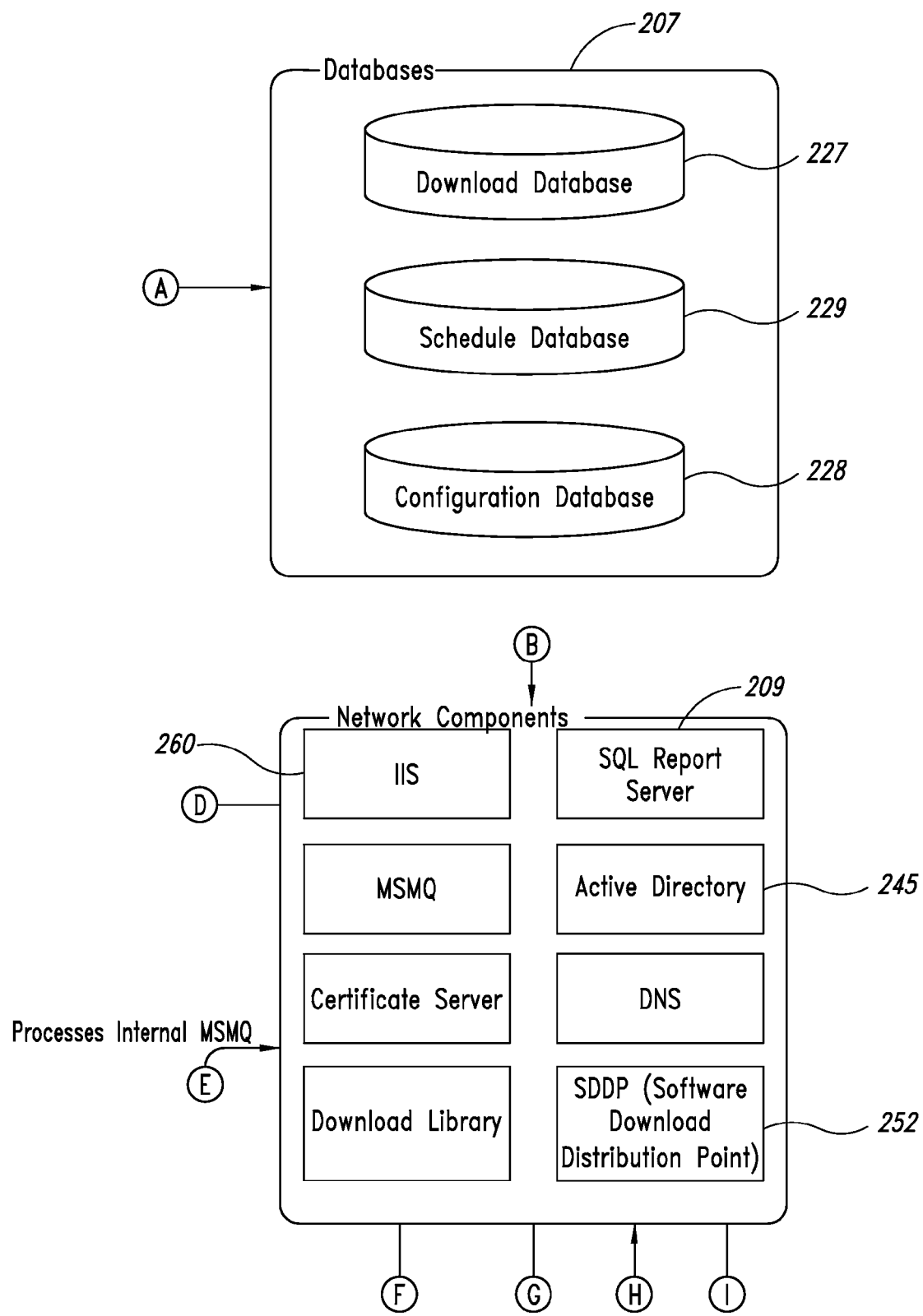
FIG. 2A (2)

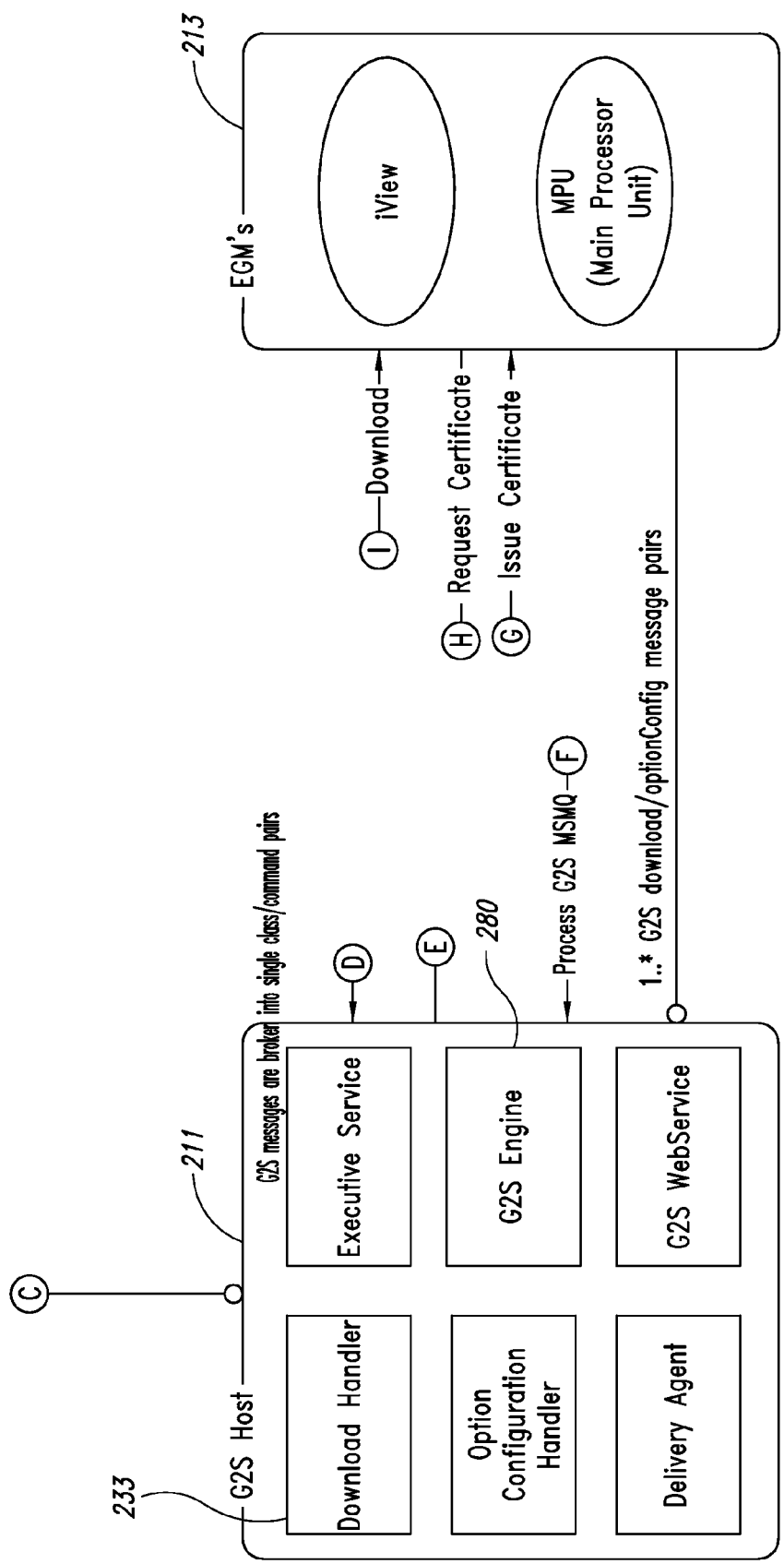
FIG. 2A (3)

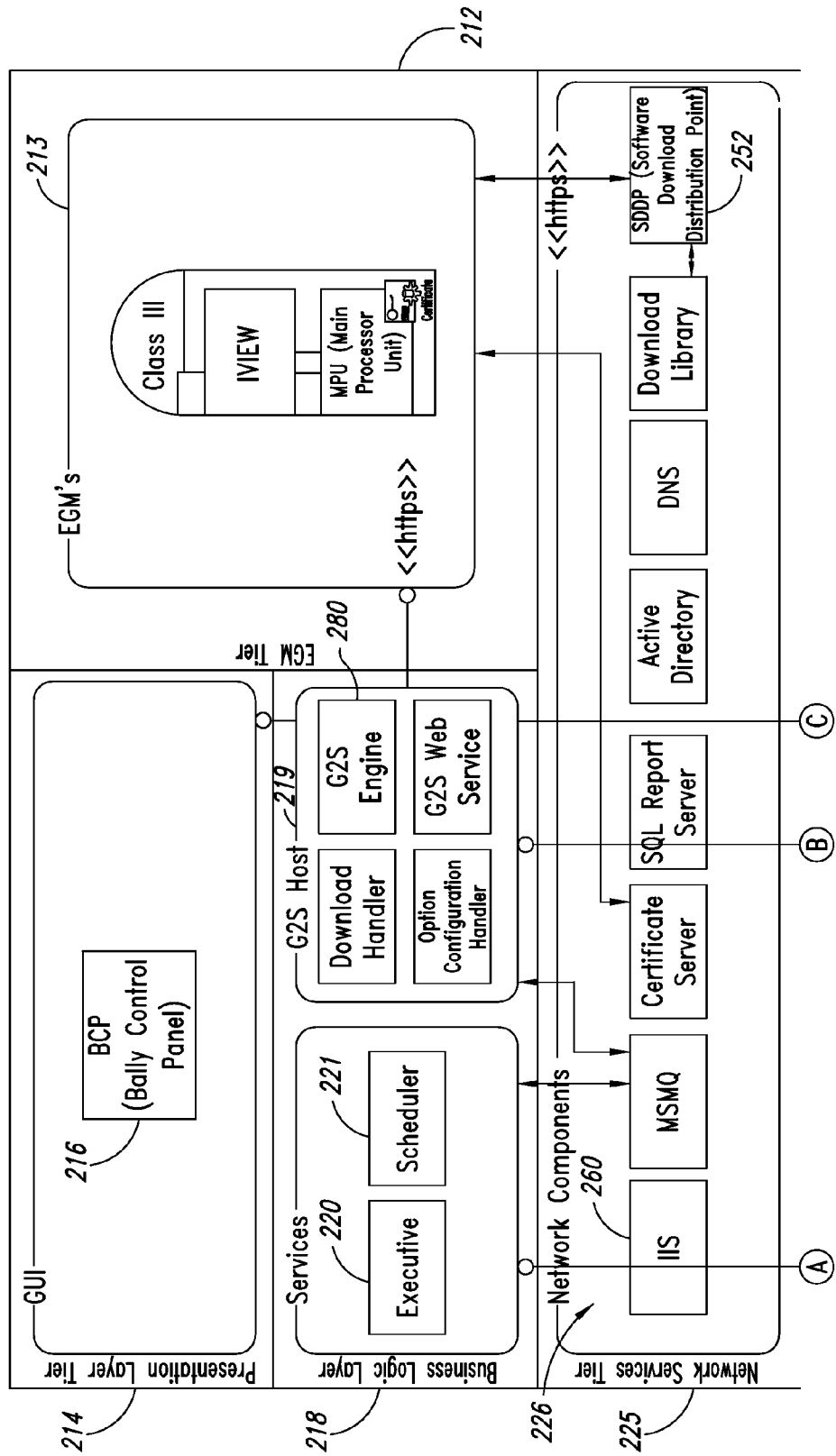
FIG. 2B (1)

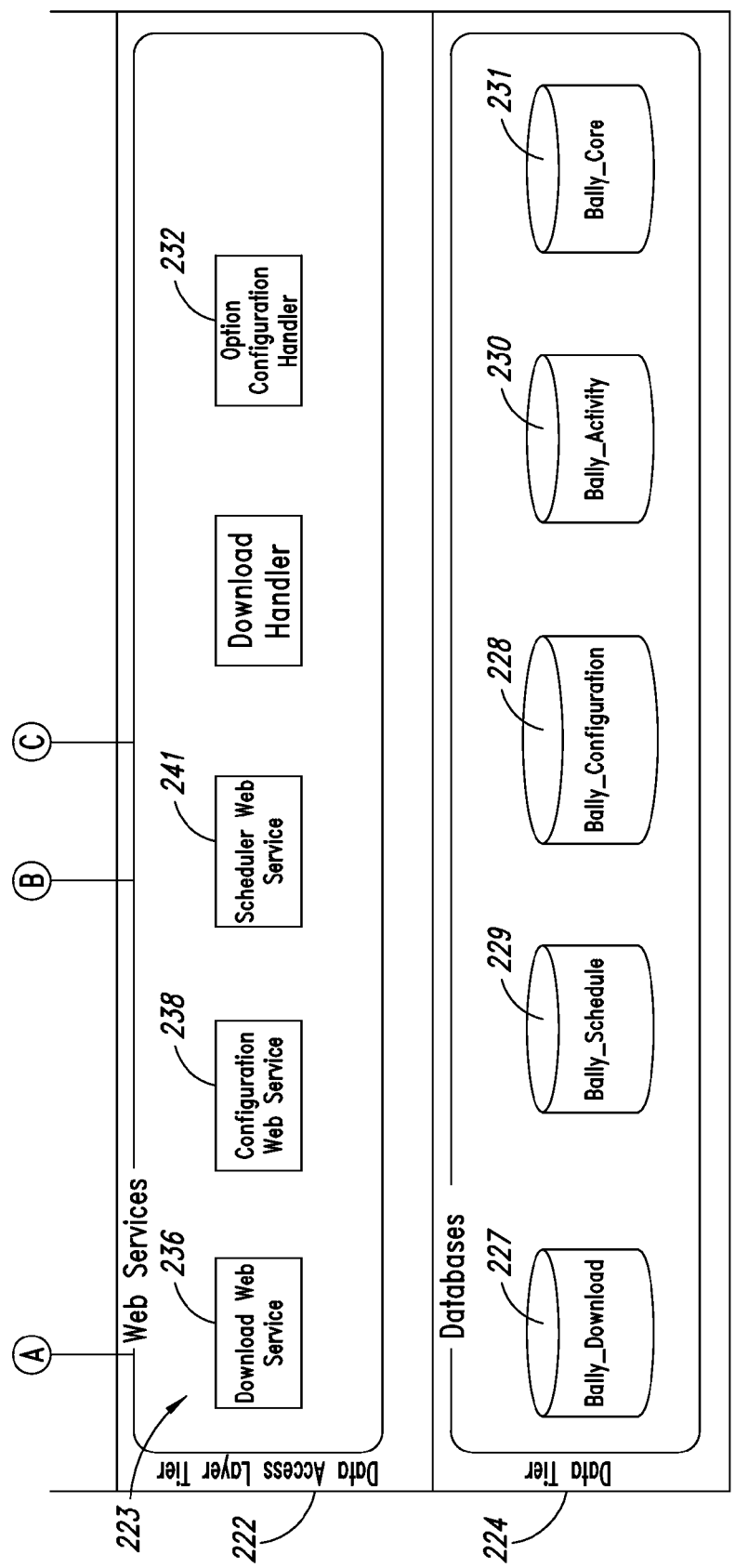
FIG. 2B (2)

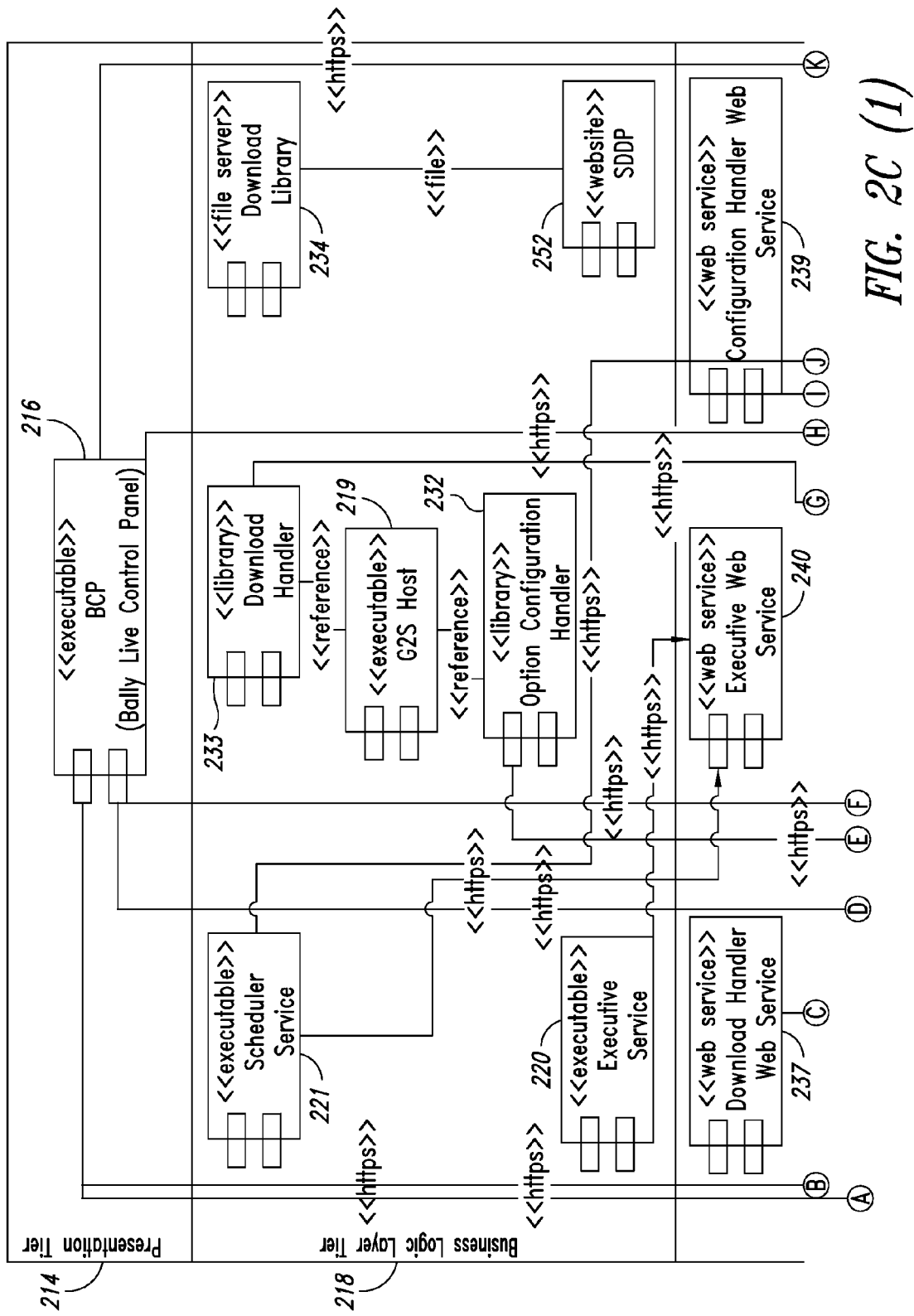
FIG. 2C (1)

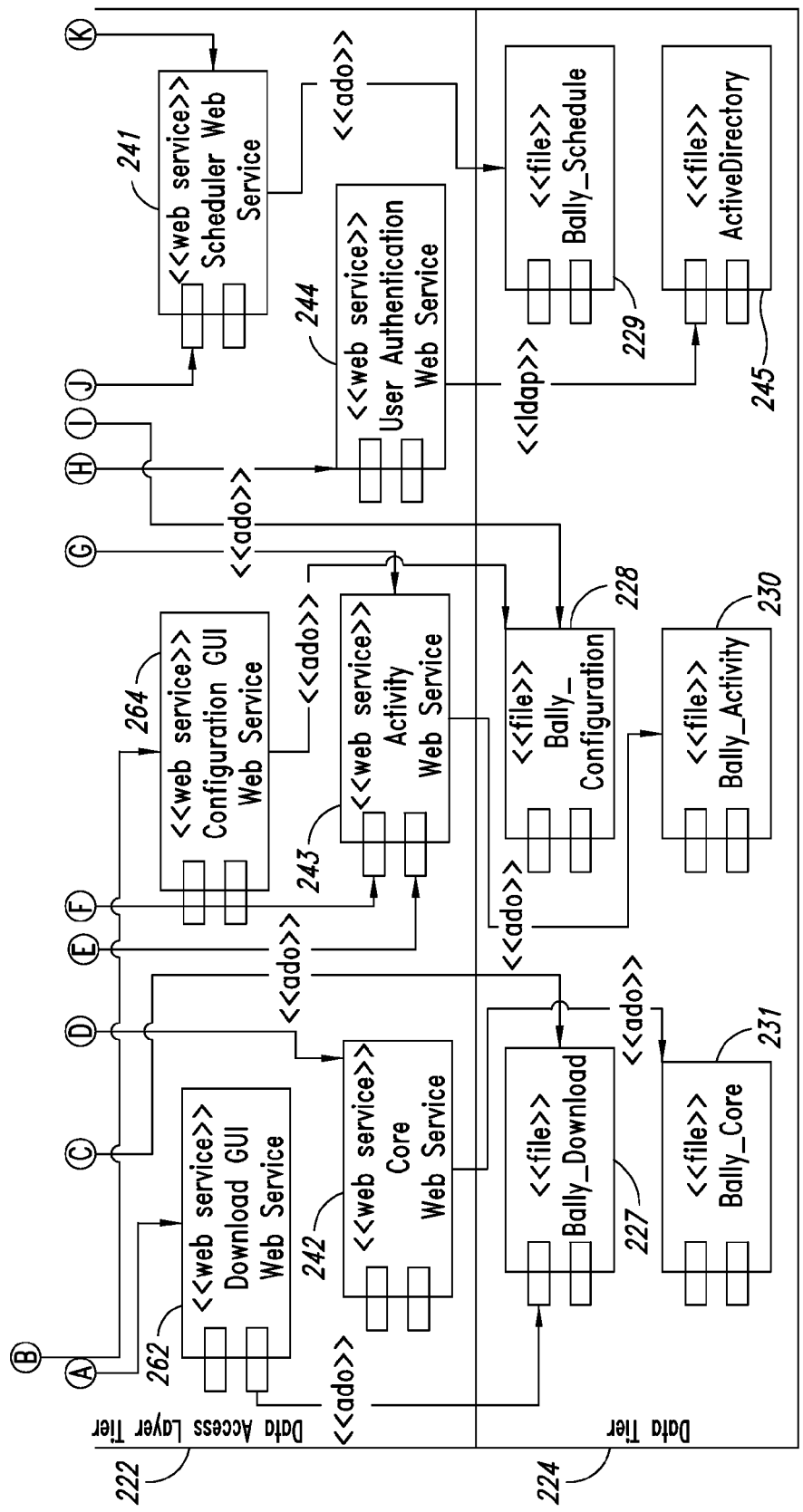
FIG. 2C (2)

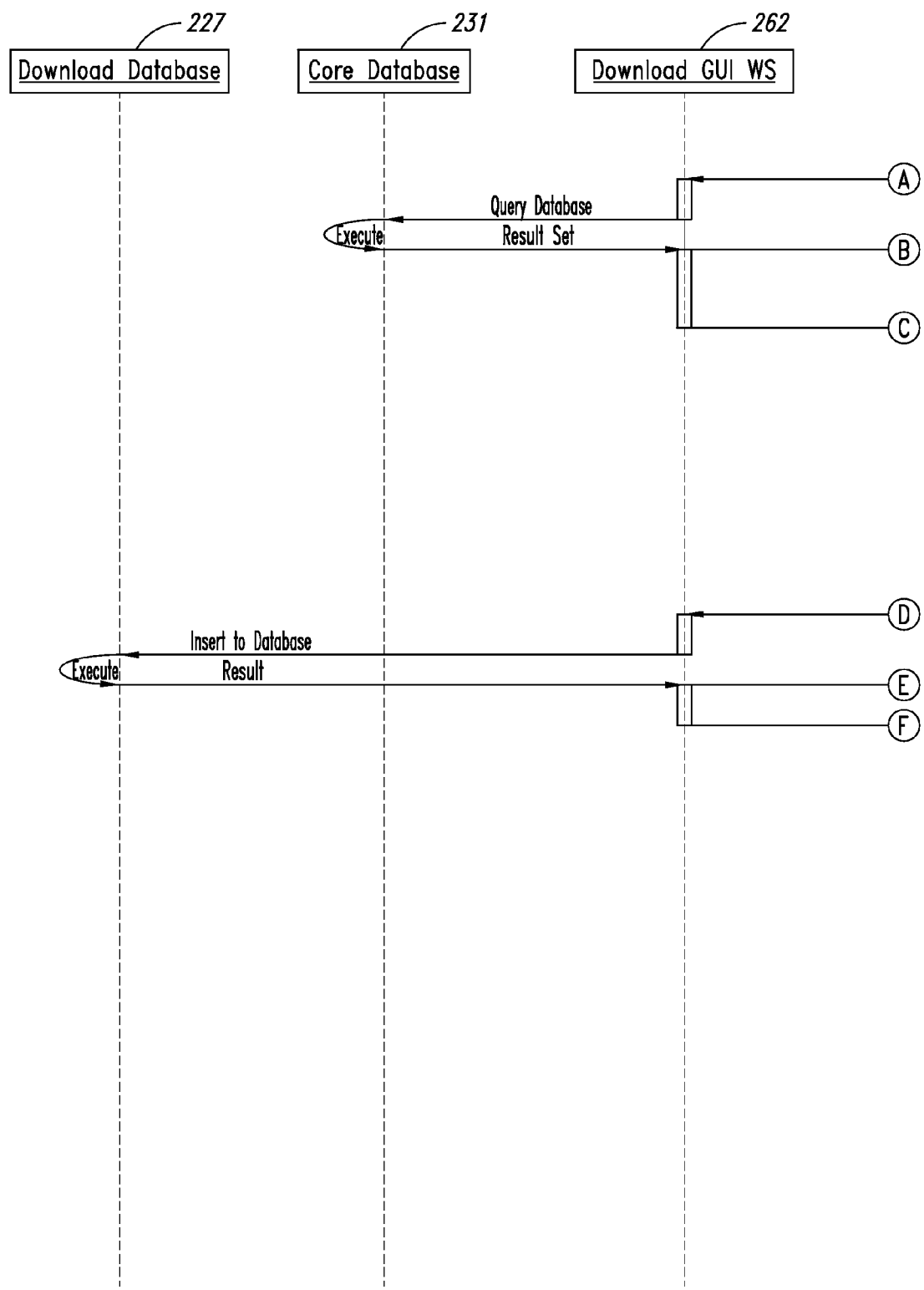
FIG. 47A (1)

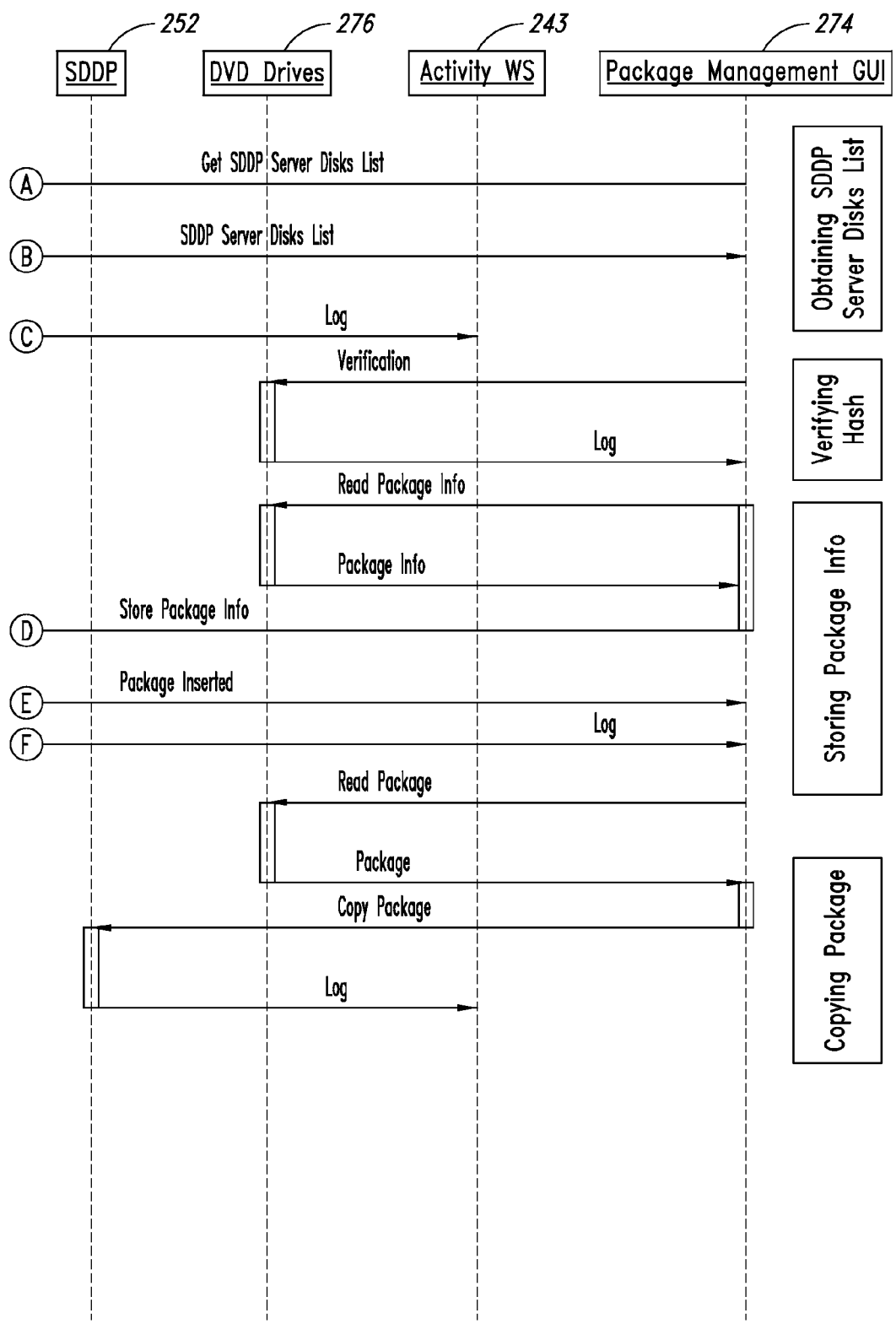
FIG. 47A (2)

FIG. 47B (1)

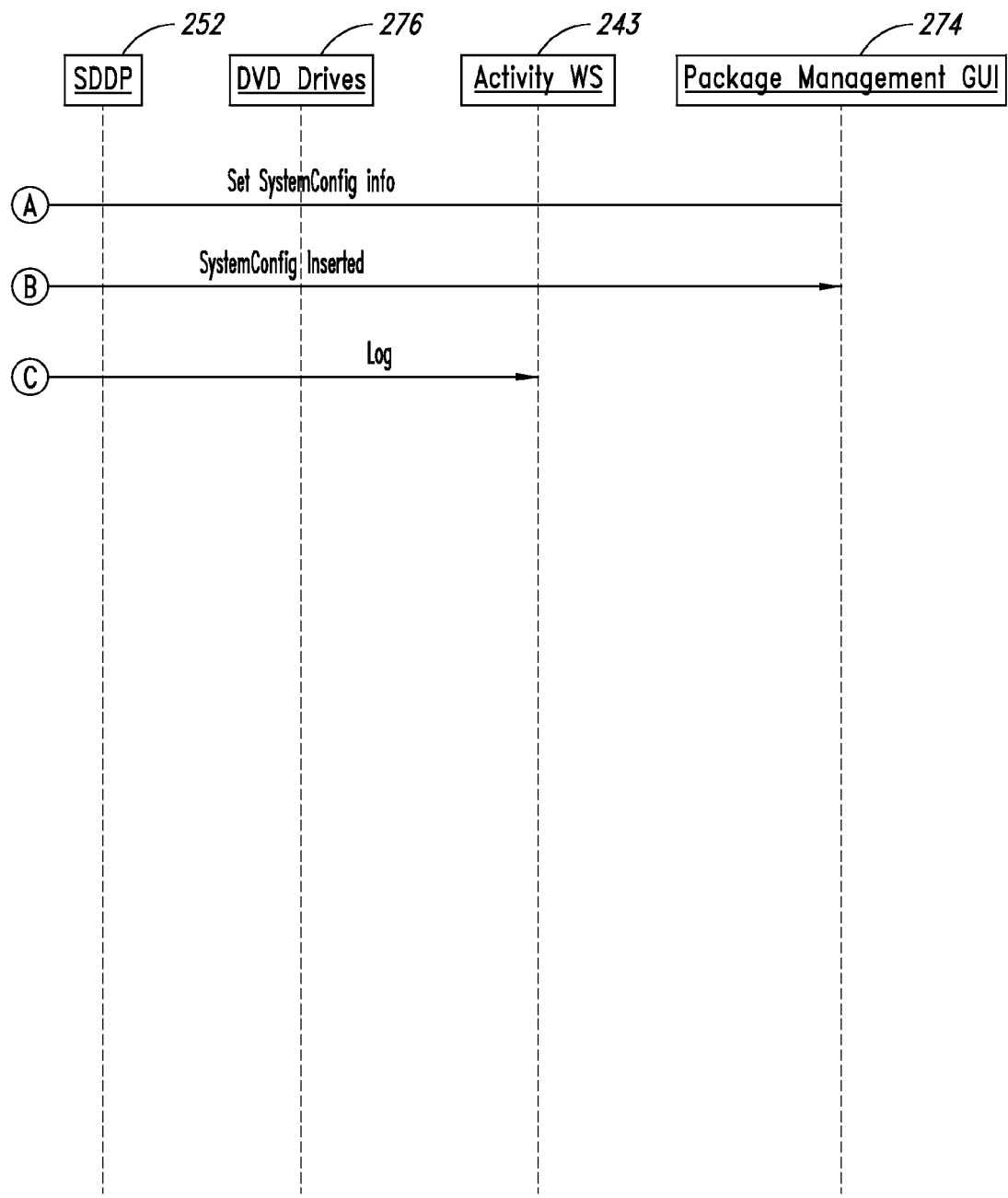
FIG. 47B (2)

Ⓓ Ⓔ

SystemCommandStatus

| Column Name | Condensed Type | Nullable |
|---|---|---|
| SystemCommandStatusID | int | No |
| ScriptStatusID | int | No |
| Operation | varchar(64) | No |
| Status | varchar(64) | No |
| Exception | int | Yes |

AuthorizeStatus

| Column Name | Condensed Type | Nullable |
|---|---|---|
| AuthorizeStatusID | int | No |
| ScriptStatusID | int | No |
| HostID | int | No |
| Authorized | tinyint | No |

DatabaseVersion

| Column Name | Condensed Type | Nullable |
|---|---|---|
| DatabaseVersionID | int | No |
| Major | char(2) | No |
| Minor | char(3) | No |
| Revision | char(3) | No |
| Build | varchar(10) | Yes |
| InstallerName | varchar(255) | No |
| Note | varchar(255) | No |
| DateTmInserted | datetime | No |

*FIG. 48G*

| SystemCommand | | |
|---|---|---|
| Column Name | Condensed Type | Nullable |
| SystemCommandID | int | No |
| ScriptID | int | No |
| Operation | varchar(64) | No |

| AuthorizeItem | | |
|---|---|---|
| Column Name | Condensed Type | Nullable |
| AuthorizeItemID | int | No |
| ScriptID | int | No |
| HostID | int | No |

*FIG. 48L*

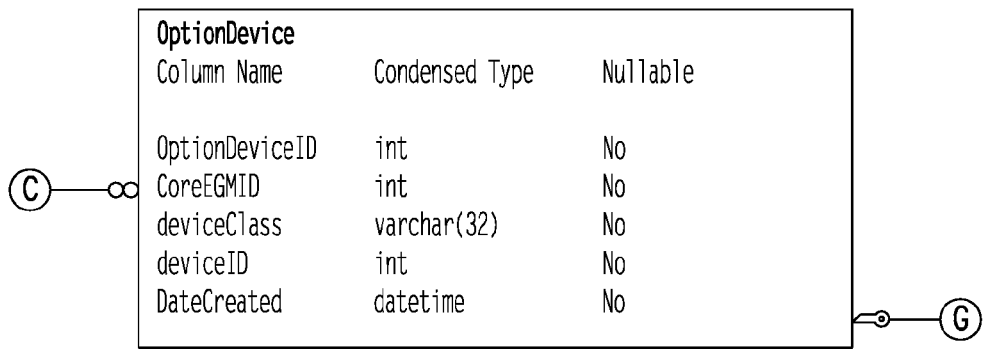
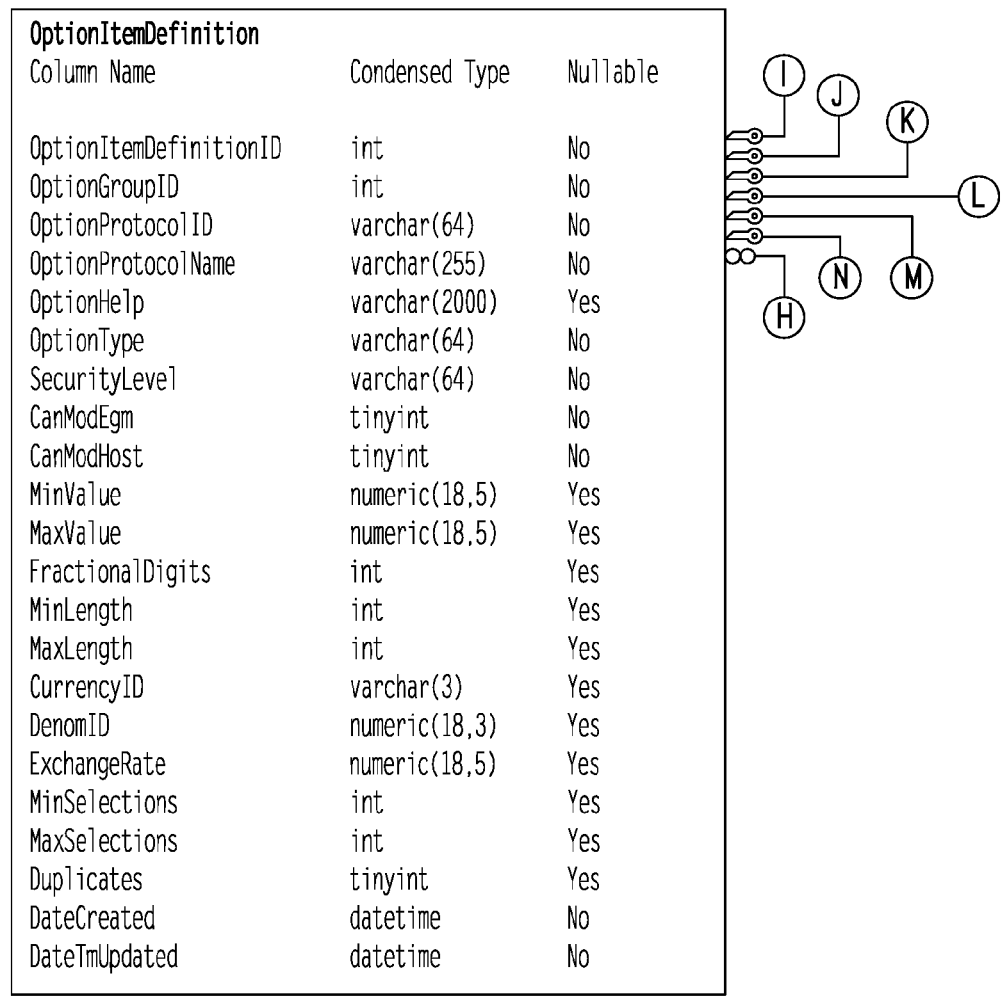
FIG. 49B

| OptionGroup | | |
|---|---|---|
| Column Name | Condensed Type | Nullable |
| OptionGroupID | int | No |
| OptionDeviceID | int | No |
| GroupProtocolID | varchar(64) | No |
| GroupProtocolName | varchar(64) | No |
| DateCreated | datetime | No |
| DateTmUpdated | datetime | No |

(H) ──∞
(G) ──o

| OptionItemCurrentValue | | |
|---|---|---|
| Column Name | Condensed Type | Nullable |
| OptionItemCurrentValueID | int | No |
| OptionItemDefinitionID | int | No |
| CurrentValue | varchar(255) | No |
| DateTmUpdated | datetime | No |

(J) ──∞

| OptionItemDefaultValue | | |
|---|---|---|
| Column Name | Condensed Type | Nullable |
| OptionItemDefaultValueID | int | No |
| OptionItemDefinitionID | int | No |
| DefaultValue | varchar(255) | No |
| DateTmUpdated | datetime | No |

(R)──∞| AssignmentGamePlayDeviceDenom | | |
|---|---|---|
| Column Name | Condensed Type | Nullable |
| AssignmentGamePlayDeviceDenomID | int | No |
| AssignmentAvailableGamePlayDeviceID | int | No |
| Denom | int | No |

(S)──o<| CoreCollection | | |
|---|---|---|
| Column Name | Condensed Type | Nullable |
| CoreCollectionID | int | No |

(T)──o<| ScheduleSchedule | | |
|---|---|---|
| Column Name | Condensed Type | Nullable |
| ScheduleScheduleID | int | No |

(U)──∞| AssignmentOptionItemValue | | |
|---|---|---|
| Column Name | Condensed Type | Nullable |
| AssignmentOptionItemValueID | int | No |
| AssignmentOptionItemID | int | No |
| AssignedValue | varchar(255) | No |

*FIG. 49E*

| OptionItemEnum | | |
|---|---|---|
| Column Name | Condensed Type | Nullable |
| OptionItemEnumID | int | No |
| OptionItemDefinitionID | int | No |
| EnumValue | varchar(255) | No |

| DatabaseVersion | | |
|---|---|---|
| Column Name | Condensed Type | Nullable |
| DatabaseVersionID | int | No |
| Major | char(2) | No |
| Minor | char(3) | No |
| Revision | char(3) | No |
| Build | varchar(10) | Yes |
| InstallerName | varchar(255) | No |
| Note | varchar(255) | No |
| DateTmInserted | datetime | No |

*FIG. 49G*

| JobQueue | | |
|---|---|---|
| Column Name | Condensed Type | Nullable |
| JobQueueID | int | No |
| ScheduleID | int | No |
| QueuedDateTm | datetime | No |
| NextCallDateTm | datetime | Yes |
| PrevCalledDateTm | datetime | Yes |
| MaxRetries | int | No |
| RetryIntervalSeconds | int | No |
| Retries | int | No |
| LastCallError | varchar(2000) | Yes |
| WebServiceURI | varchar(255) | No |
| WebMethod | varchar(255) | No |
| ParamData | xml | Yes |

∞ — 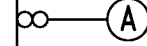

| JobQueueHistory | | |
|---|---|---|
| Column Name | Condensed Type | Nullable |
| JobQueueHistoryID | int | No |
| OriginalJobQueueID | int | No |
| OriginalScheduleID | int | No |
| QueuedDateTm | datetime | No |
| NextCallDateTm | datetime | Yes |
| PrevCalledDateTm | datetime | Yes |
| MaxRetries | int | No |
| RetryIntervalSeconds | int | No |
| Retries | int | No |
| LastCallError | varchar(2000) | Yes |
| WebServiceURI | varchar(255) | No |
| WebMethod | varchar(255) | No |
| ParamData | xml | Yes |

*FIG. 50A*

Schedule

| Column Name | Condensed Type | Nullable |
|---|---|---|
| ScheduleID | int | No |
| StateDateTm | datetime | No |
| EndDateTm | datetime | Yes |
| ScheduleTypeID | int | No |
| DateCreated | datetime | No |

(A)

ScheduleType

| Column Name | Condensed Type | Nullable |
|---|---|---|
| ScheduleTypeID | int | No |
| ScheduleType | varchar(50) | No |
| Description | varchar(255) | Yes |

DatabaseVersion

| Column Name | Condensed Type | Nullable |
|---|---|---|
| DatabaseVersionID | int | No |
| Major | char(2) | No |
| Minor | char(3) | No |
| Revision | char(3) | No |
| Build | varchar(10) | Yes |
| InstallerName | varchar(255) | No |
| Note | varchar(255) | No |
| DateTmInserted | datetime | No |

*FIG. 50B*

| Collection Navigator | | | |
|---|---|---|---|
| Name | Dynamic | Description | |
| Collection 1 | ☐ | Description of Collection 1 | |
| Collection 10 | ☐ | Description of Collection 10 | |
| Collection 2 | ☐ | Description of Collection 2 | |
| Collection 3 | ☑ | Description of Collection 3 | |
| Collection 4 | ☐ | Description of Collection 4 | |
| Collection 5 | ☐ | Description of Collection 5 | |
| Collection 6 | ☑ | Description of Collection 6 | |
| Collection 7 | ☐ | Description of Collection 7 | |
| Collection 8 | ☐ | Description of Collection 8 | |
| Collection 9 | ☑ | Description of Collection 9 | |

EGMs | Collections | Assignments | Overrides

*Fig. 51E*

| Assignment Navigator | | |
|---|---|---|
| Name | Active | Type |
| DL Assign 0 | ☑ | Download |
| DL Assign 1 | ☐ | Download |
| DL Assign 2 | ☑ | Download |
| DL Assign 3 | ☐ | Download |
| DL Assign 4 | ☑ | Download |
| Config Assign 0 | ☑ | Configuration |
| Config Assign 1 | ☐ | Configuration |
| Config Assign 2 | ☑ | Configuration |
| Config Assign 3 | ☐ | Configuration |
| Config Assign 4 | ☑ | Configuration |

EGMs | Collections | Assignments | Overrides

*Fig. 51F*

| PackageStateID | State |
| --- | --- |
| 1 | Created |
| 2 | Copy in Progress |
| 3 | Completed |
| 4 | Copy Failed |
| 5 | Verified |
| 6 | Verifying Failed |
| 7 | Other |
| ⋮ | ⋮ |

Fig. 59

PACKAGE MANAGER SERVICE IN GAMING SYSTEM

CROSS-REFERENCE TO RELATED APPLICATIONS

This application claims benefit under 35 U.S.C. 119(e) to U.S. provisional patent application Ser. No. 60/865,345, filed Nov. 10, 2006; U.S. provisional patent application Ser. No. 60/865,575, filed Nov. 13, 2006; U.S. provisional patent application Ser. No. 60/865,332, filed Nov. 10, 2006; U.S. provisional patent application Ser. No. 60/865,550, filed Nov. 13, 2006.

TECHNICAL FIELD

This disclosure pertains generally to management systems and methods. More particularly but not exclusively, the present disclosure relates to a computerized method and system for downloading gaming software and configuring gaming machines.

BACKGROUND INFORMATION

Various networked gaming systems have been developed over the years beginning at least in the 1980s. With acceptance and utilization, users such as casino operators have found it desirable to increase the computer management of their facilities and expand features available on networked gaming systems. For instance, there are various areas in the management of casinos that is very labor intensive, such as reconfiguring gaming machines, changing games on the gaming machines, and performing cash transactions for customers.

BRIEF SUMMARY

In one aspect of the invention, a computerized download and configuration server-based system and method for use with game devices, systems, and methods is provided to enable users to monitor, control, and modify game devices and other related activities.

At least one embodiment may be summarized as a gaming system including distribution point means for storing a package of gaming machine instructions to be distributed; storage means for storing state information pertaining to the package of gaming machine instructions; package manager means for maintaining the state information stored in the storage means and for managing operation pertaining to storing the package in the distribution point means; and means for updating the package manager means by replacing at least a current authentication portion of the package manager means with a new copy of the authentication portion according to a download interval. The distribution point means may include at least one server. The storage means may include at least one database means for storing the state information in fields respectively corresponding to each package. The package manager means may include: for the maintaining the state information: package monitor means for monitoring and updating the state information in the storage means; and for the managing operation pertaining to storing the package: copy manager means adapted to be called by the package monitor means for controlling copy of the package to or removal of the package from the distribution point means, and verify package means adapted to be called by the package monitor means for verifying authenticity of the package. The package manager means may be a service, and at least one of the package monitor means, copy manager means, or verify package means may be a class of the service. The means for updating may include the copy manager means. The package manager means may query the storage means for the state information according to a query interval, and the package manager means may update the state information before, during, and after performing at least one of a copying, removing, or verifying the package. The gaming system may further include user interface means for presenting the state information stored in the storage means.

At least one embodiment may be summarized as an apparatus for a gaming environment, the apparatus including a package manager unit having: a first element to monitor and update state information pertaining to a package of gaming machine instructions to be distributed; a second element operatively coupled to the first element and responsive to the first element to control storage of the package in a distribution point; and a third element operatively coupled to the first element and responsive to the first element to verify authenticity of the package, wherein at least a current portion of the third element is adapted to be updated with a new copy of the portion according to a download interval. The apparatus may further include a host device in which the package manager unit is installed. The host device may be a control station computer adapted to operate in a network, the control station computer having a user interface adapted to present at least some of the state information. The package manager unit may be a service, and at least one of the first, second, and third elements may be a class of the service. The first element may be adapted to monitor the state information by generation of a query for the state information according to a query interval, and the first element may be adapted to update the state information before, during, and after copy/removal of the package by the second element or verification of the package by the third element. The package monitor unit may be a single software module encoded on a computer-readable medium and executable by a processor.

At least one embodiment may be summarized as a method for a gaming environment, the method including: providing a distribution point of a package of gaming machine instructions to be distributed; storing state information pertaining to the package of gaming machine instructions; and querying and updating the stored state information, and managing operation pertaining to storing the package in the distribution point. The method may further include replacing at least a current portion of an element performing authentication of the package with a new copy of the portion according to a download interval. Querying the stored state information may include issuing a query for the stored state information according to a query interval, and updating the stored state information may include updating the stored state information before, during, and after copy of the package to or removal from the package from the distribution point. Managing operation pertaining to storing the package may include verifying authenticity of the package stored in the distribution point. The querying and the updating may be performed by a service, and the managing operation may include the service calling at least one class to perform an operation. The method may further include presenting at least some of the state information on a user interface of a control station computer.

At least one embodiment may be summarized as an article of manufacture including a computer-readable medium encoded with instructions that are executable by a processor to manage a package of gaming machine instructions in a gaming environment, by: querying stored state information pertaining to the package according to a query interval; controlling operations pertaining to storing of the package at a distribution point, including controlling verification of authenticity of the stored package; updating the stored state information in response to performing the operations; and replacing, a current version of at least some authentication instructions for the verification, with a copy of the authentication instructions according to a download interval. The instructions to update the stored state information may include instructions to update the stored state information before, during, and after copy, removal, and verification operations for the package. The instructions to control operations may include instructions to have a service class adapted to monitor the state information call at least one other service class adapted to perform storage-related operations. The computer-readable medium may further be encoded with instructions that are executable by the processor to manage the package, by: controlling presentation of at least some of the state information on a user interface of a control station computer. The computer-readable medium may further be encoded with instructions that are executable by the processor to manage the package, by: controlling removal of the package from the distribution point if the package fails the verification, so as to prevent distribution of the package to at least one gaming machine from the distribution point.

Further features of various embodiments of the invention will be apparent from the following detailed disclosure, taken in conjunction with the accompanying sheets of drawings.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIGS. 2A(1)-2A(3) are a context diagram of operation of a download configuration server system according to one illustrated embodiment.

FIGS. 2B(1) and 2B(2) are tiered layer diagram of a download and configuration system architecture, according to one illustrated embodiment.

FIGS. 2C(1) and 2C(2) are a block diagram showing various components of a download and configuration system architecture, according to one illustrated embodiment.

FIGS. 47A(1) and 47A(2) are a flow diagram illustrating a method of managing packages, according to one illustrated embodiment.

FIGS. 47B(1) and 47B(2) are a flow diagram illustrating a method of performing a package management system configuration, according to one illustrated embodiment.

FIGS. 48A-48L are a block diagram of a download ERD, according to one illustrated embodiment.

FIGS. 49A-49I are a block diagram of a configuration ERD, according to one illustrated embodiment.

FIGS. 50A and 50B are a block diagram of a schedule ERD, according to one illustrated embodiment.

FIG. 51E is a screen print of a collection navigator control panel, according to one illustrated embodiment.

FIG. 51F is a screen print of an assignment navigator control panel, according to one illustrated embodiment.

FIG. 59 shows example states of packages that can be checked and maintained by one embodiment of the package manager service.

DETAILED DESCRIPTION

In the following description, certain specific details are set forth in order to provide a thorough understanding of various disclosed embodiments. The embodiments may be practiced without one or more of these specific details, or with other methods, components, materials, etc. In other instances, well-known structures associated with computing systems, networks including servers, routers, bridges, firewalls, etc., and gaming device including electronic gaming machines have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
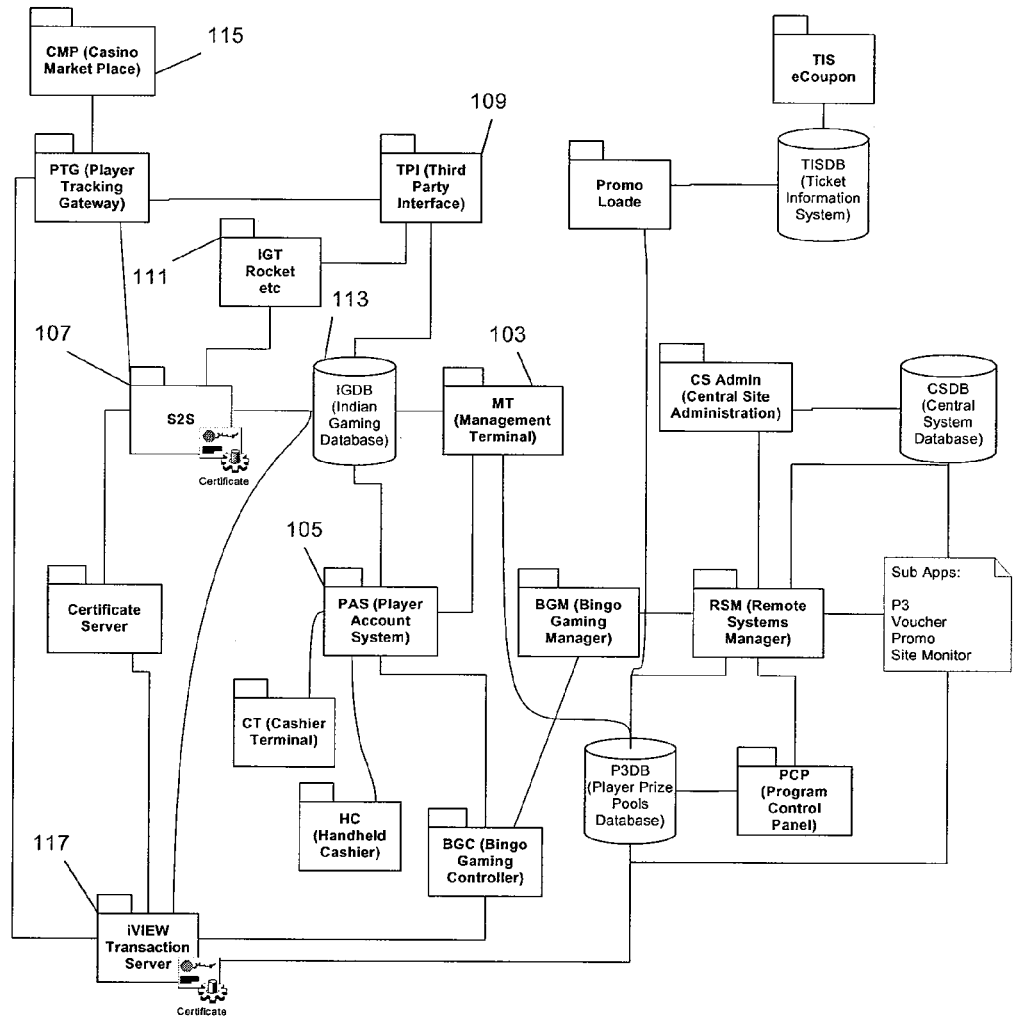
FIG. 1 is a block diagram of a slot management system, according to one illustrated embodiment.

FIG. 1 shows slot management system 101, according to one illustrated embodiment.

One conventional gaming machine management system is the Bally One System, which is designed to provide essential functionality for gaming facilities. The present example embodiment provides for a unified gaming machine management system that offers the full feature sets which are desirable for a Class III casino floor with a rich gaming environment and providing the flexibility to mix Class II and Class III machines on the same gaming floor. To accommodate this unification, many features and functions are needed to provide a robust functional capability. In the example embodiment, an architectural framework is provided that enables the addition of modules and functionality. Slot management system 101 may use standards based communications protocols, such as HTTP, XML, SOAP, SSL. Slot management system 101 may be a scaleable system, which may advantageously employ off-the-shelf components, such as conventional servers and storage devices. Slot management system 101 may utilize standard user interfaces for all system front ends, such as a display, keyboard, mouse, and conventional windows software. An example front-end may be a management terminal (server) 103 from which an operator can utilize a user interface to communicate with player account system server 105 and review and/or modify player information contained in a player database managed by player account system server 105. Slot management system 101 may use standardized authentication, authorization and/or verification protocols, which may be implemented and/or controlled by a server-to-server (S2S) server 107 which enables the secure communication of data and information between the respective servers within the slot management system 101. Third party interface 109 may further provide for the incorporation of third party servers and storage devices, such as IGT/Rocket server 111 and Gaming Database 113, using the standardized authentication, authorization and verification protocols. Slot management system 101 may support a wide range of promotional tools to enable various promotional and marketing programs which may be used in conjunction with casino market place server 115, such as Bally Gaming's CMP, or another system gaming subsystem. Slot management system 101 includes transaction server 117, for example a Bally iView transaction server which communicates with Bally iView apparatuses which are incorporated with gaming machines connected to the network, where iView apparatuses include a secondary display connected to a motherboard including a microprocessor or controller, memory, and selected communication, player, and/or gaming software, such as a conventional video wagering game or multi-media presentations which may be enabled by a player, the gaming machine, or the slot management system. The transaction server 117 can be designed to drive and communicate with other network connected apparatuses having a display and user interface. In the contemplated embodiments, the networked apparatuses, such as the iView apparatuses, are incorporated with slot management system 101 to multi-task as both a presentation engine and a game management unit (GMU). To provide flexibility, slot management system 101 utilizes open standard GSA (Gaming Standards Association) protocols for ease of integrating various manufacturers' devices and a windows-based system for ease of operators (users) in programming and obtaining data from, and adding data to the system.

FIGS. 2A(1)-2A(3) show operation of a download and configuration server system 201, according to one illustrated embodiment.

The download and configuration server system 201 includes control station 203, which may include a display and a user interface. The download and configuration server system 201 may also include a download and configuration services block 205 (including for example a download server or Web accessible service, a download handler server or Web accessible service, a configuration server or Web accessible service, an option configuration server or Web accessible service, a scheduler server or Web accessible service and a scheduler server or Web accessible service). The download and configuration server system 201 may further include a download and configuration database block 207, which may include, for example, conventional storage depositories such as a download database 227, a schedule database 229, and a configuration database 228. The download and configuration server system 201 may additionally include a network components block 209, for example, conventional hardware and software to support IIS 260, MSMQ, and DNS, a SQL report server, an active directory 245, a certificate server, a download library 234, and an SDDP (Software Download Distribution Point) 252. The download and configuration server system 201 may further include a Game-to-Server (G2S) host block 211, that may, for example, include a download handler 233, an executive service 220, an option configuration handler 232, a G2S engine 280, a delivery agent, and a G2S Web accessible service. The download and configuration server system 201 may even further include an electronic game machine (EGM) block 213, that may, for example, include a facility floor of network connected gaming machines and tables which may each include an iView or similar product features and/or a gaming management processor unit which are individually identifiable and addressable over the network. The referenced Web services may utilize a secure HTTPs transmission protocol used to communicate with the slot management service and vice-versa. The system 201 may operate using Web protocol and Web services to serve information and process transactions, in contrast to serving Web pages in the traditional sense.

Download and configuration server system 201 enables the transmission of software files, packages or modules to one or more clients, such as gaming machines or gaming tables, via, for example, a casino network using the Gaming Standard Association's (GSA's) Game to System (G2S) message protocols. The configuration portion of server system 201 enables the selecting of specific settings and options on one or more clients using GSA's G2S message protocols, such as to modify the Alpha operating system on conventionally available gaming machines or third party gaming machine or table operating systems. The respective subsystems of server system 201 communicatively couple to control station 203. The control station 203 includes a common user interface application, such as a control panel (e.g., Bally Control Panel 216 or BCP 216) software application, so that a user can request data and issue commands for the processing of download and configuration operations throughout the network.

Download and configuration server system 201 provides for the following G2S download class features: 1) the G2S download class provides a standardized protocol to manage the downloaded content on all G2S compliant gaming machines or tables (i.e., EGMs 213) from all G2S compliant host systems; 2) the G2S download class enables installation of downloaded packages; 3) the G2S download class enables the removal of software (uninstall); 4) the G2S download class enables scheduling of installation and/or removal of software including enabling scheduling options that relate to a specific time, EGM state, or interaction with a host server or technician; 5) the G2S message class supports reading an inventory of downloaded packages and installed modules, which provides the capability to effectively manage the content on the EGM 213; and 6) the G2S message class enables recording transaction logs for packages and scripts on a transaction database accessible through control station 203. This feature provides an audit capability or transaction tracer for determining how content came to be on an EGM 213.

Download and configuration server system also provides the following G2S option configuration (optionConfig) class features that allow for the selection of various configuration options: a) the optionConfig class provides a convenient and efficient mechanism to remotely configure EGMs 213 and b) the G2S optionConfig class provides for downloading options available from within an EGM 213.

Download and Configuration server system 201 implemented G2S classes (optionConfig, download, and scheduler) are also integratable through secondary displays, such as the Bally iView, by incorporating, for example an iView transaction server. Thus, download, configuration, and configuration options may be implemented at selected EGMs 213 through their respective Main Processor Unit (MPU) or through iViews. In the case of using the iViews for network communications, a separate processor board is provided along with a display and user interfaces. Communication channels are connectable between the iViews and the MPU to enable the download, configuration, and configuration option processes. Some definitions of terms and components follow:

Databases—The databases return information based on the results of a stored procedure call. For example, the following databases, which are descriptively named, may be utilized: Core; Configuration; Download; Activity; and Schedule.

Bally Control panel 216 (BCP)—As an example, the control panel application, such as a BCP 216, can be a smart client implemented on control station 203 encapsulating all the functionality to support the command and control portions of the download and configuration features of a facility or facilities. Downloads and configuration options can be remotely scheduled or deployed immediately by a user through control station 203. Notifications, approvals, searches, and reports produced through server system 201 can be viewed by a user through a display or by hardcopy provided by a printer connected to control station 203.

Control station 203 can be utilized for remote downloading and configuration of games and game operating systems of connected EGMs 213. Also, control station 203 can be utilized to download content to or to configure the iView (or similar components) and second game displays or monitors (for instance, in cases in which an EGM 213 has two or more major displays) (which may also include an additional processor unit such as for example in the case of multiple games operable on a single EGM 213 on separate displays), as well as peripheral software for components in the games like bill validators and ticket printers.

Control station 203 can be utilized for the throttling of system resources based on the requested changes. For example if the user requests several high bandwidth consuming jobs be initiated concurrently, the control station 203 would advise the user that this would utilize more than allocated bandwidth and require changes to the proposed schedule. It is also contemplated that the control station 203 could recommend changes to the schedule to ease the work requirement for the user.

Control station 203 can be utilized for the broad based change to gaming floors to support special events. For example on Halloween a specialized background or theme could be downloaded or configured on all capable games and devices for the duration of the event. This concept can be further extended to enabling specialized bonus games on other player centric activities relating to the special event or holiday. This allows a user of control station 203 to fully customize the property without the manual effort required with current systems and technologies.

Control station 203 can be utilized to fully view in a graphical fashion gaming floor configurations that have occurred in the past or are proposed for the future. This allows the user of control station 203 to easily and quickly compare past gaming floor configurations to configurations proposed for the future in an easy to understand graphical manner. It is contemplated that these configurations be animated in a manner that realistically depicts the activity on the gaming floor over a period of time allowing the user of control station 203 to visually assess the impact of the proposed changes.

Control station 203 can be utilized to view machine utilization information over time to determine where certain groups of players spend their time while at a property. For example if certain demographic groups are inclined to utilize gaming machines configured at $0.25 per play and this control station 203 capability can illustrate the fact that during certain times of the day this gaming machine configuration is completely utilized and that a large group of this demographic is scheduled to visit the property, the casino manager could opt to enable more of this type of game so players are not waiting for an opportunity to play. It is contemplated that this feature is presented in an animated fashion such that the user of control station 203 may select a date range and analyze in real time game usage by time of day and by player demographic. This feature also requires control station 203 have access to, and the capability of processing, information from the player marketing system or have access to a data stream feeding the player marketing system.

Control station 203 has the capability to allow groups of gaming machines to be identified and operated upon via a number of query options. This aids the user in quickly and effectively finding the gaming machines to apply changes. It is contemplated that advanced selection criteria such as performance over the last 30 days be considered as a query parameter. The control station 203 can provide the capability to utilize a graphical representation of the gaming floor. This allows selected groups of games to be graphically represented on a floor map as well as in a list form.

Control station 203 can utilize historical slot game performance data to provide guidance for new floor configuration options. The historical data may be accessed in the download system data stores or from an external business intelligence system. It is contemplated that the control station 203 may be programmed to allow for automated floor configuration changes based on the historical performance data. This capability may be applied automatically or via an interface requiring only approval from the user prior to applying the changes.

Database Web Services—These are World-Wide Web (Web) services that are conventionally available to be re-used by other user interfaces and service applications connected to slot management system 101. In other words, this is a secure closed system network using Web services connected on demand with the slot management system 101 (FIG. 1).

Handlers—These are the logic libraries that are responsible for executing the business logic of the system.

Network Components—The following list of network components, or portions thereof, may be implemented and/or required by the download and configuration server system 201: Certificate Server; DNS; DHCP, Application Firewalls, Hardware Firewalls, Network Load Balancers.

Third Party Software Applications—the following list of $3^{rd}$ party applications my be utilized or required by the server system 201: IIS 260, MSMQ, SQL Server, SQL Server Reporting Services, Active Directory 245, Microsoft Windows 2003 Server.

G2S Engine 280—This service will receive G2S messages directly from EGMs 213 and dispatch them to the respective subsystem of server system 201 based on the message component type.

EGMs 213—Electronic Gaming Machines, which may include gaming tables with processor and/or display components.

iView—For example, a conventional apparatus providing a player or employee user interface and display at EGMs 213 connected to the network including the player tracking server and enabling a player or employee to request and receive information, to receive award notifications, to transfer credits, and to conduct such activities through the apparatus as is enabled on slot management system 101. One usage of an iView-type apparatus may be to display marketing and player tracking information and various shows on the occurrence of an award or win by a player. Such apparatuses may also allow gaming, such as with server-based games or even independent games stored on their respective processor boards. Thus, separate games may be implemented through the iView-type device, apart from the main game of EGM 213 controlled by the MPU. In turn, the content of the iView may be separately modified as through downloads or configurations or configuration options.

Control station 203 is able to retrieve from the database and view all login attempts to the server both successful and failed. A user may be locked out of access to the control panel application at control station 203 after too many failed login attempts. The recorded transaction log may include the login ID, data, time of login and duration.

The Web services may support functionality between control station 203 and database block 207. The Web services may also support unsolicited messages between the G2S handlers and control station 203.

Server system 201 may maintain a record or transaction log of login attempts to the server both successful and failed. The log may include the login ID, data, time of login and duration. Server system 201 may also maintain a transaction record or log of all events and activity occurring on server system 201. The log may include a record of which login session in which the event occurred.

Server system 201 may also maintain a log of communication events with any EGM 213. Server system 201 may also maintain the status of each EGM 213 including: game history data; download status (available, requested, downloading, applied, rejected); package information (available for install, requested, being downloaded, downloaded, installed); hardware information; software module information; and/or error conditions.

The configuration and download server system 201 may dynamically build packages to be downloaded based on EGM 213 inventory and available updates, fixes and new data for EGMs 213. The configuration and download server system 201 may verify requests from EGM 213 including whether or not the EGM 213 is valid and is in a functional or operational state to make the request. All requests may be logged and contain the requesting EGM 213 identifier, time and date, specific request, and EGM 213 operational status. The configuration and download server system 201 may communicate with Software Distribution Point servers (SDDP) 252 to maintain a list of packages that are available for supported EGMs 213. The configuration and download server system 201 may supply the location of the SDDP 252 when instructing an EGM 213 to add a package. The configuration and download server system 201 may verify that all required hardware and software for a package to be sent to an EGM 213 exists before instructing EGM 213 to retrieve the package. The configuration and download server system 201 may support multiple EGMs 213 in multiple sites and/or facilities and EGMs 213 produced by multiple manufacturers. The configuration and download server system 201 may verify that a software package can be installed on a selected EGM 213 before instructing EGM 213 to add a package. Such verification may, for example, use information in the package header and information stored about selected of EGM 213. The configuration and download server system 201 may be able to track which packages are installed on any given EGM 213 and verify the data by requesting a selected EGM 213 to send package install information. The configuration and download server system 201 may report bad images and errors and log them when failed package installation information is received from an EGM 213. The configuration and download server system 201 and SDDP 252 may be used to control all network pacing, bandwidth, error recovery, and monitoring. The configuration and download server system 201 may be used to maintain the location of all SDDP 252 and the packages available on each.

Software Download Distribution Point (SDDP 252) server may be utilized to maintain all downloaded software packages in a secure library with the required number of secure backups defined by a jurisdiction. The SDDP server 252 may be used to restrict access to the library that stores all software download packages to only authorized personnel. The access may limit access, such as to only allow write access to those authorized to add, delete, and update packages and read access for all others authorized to access the library. The SDDP server 252 may provide secure software level firewalls to restrict access to everything saved on the server. The SDDP server 252 may maintain a log of login attempts to the server both successful and failed. The log may include the login ID of a user, data, time of login and duration. The SDDP server 252 may maintain a log of all events and activity occurring on server system 201. The log may include which login session in which an event occurred.

Software packages added to the software library may be verified from the package data using an MD5 or SHA1 hashing algorithm to validate the data or some other verification tool. The verification string may be added to a package header and used to re-verify the package when it is downloaded to the EGM 213.

All verification failures and related errors may be logged and the log entry may contain the date and time, the ID of the person running the process at the time, and the specific type of error that occurred. They may also be displayed on the correct display area.

The SDDP server 252 may be utilized to provide selected EGMs 213 with the communications port location and IP address used for sending software package data to the EGM 213. All data within a download package may be compressed using conventional compression techniques and transmitted in compressed format. On receipt, EGM 213 may decompress the downloaded software package.

FIGS. 2B(1) and 2B(2) show a tiered layer architecture of a download and configuration system according to one illustrated embodiment.

A presentation layer 214 may include the control panel application 216. The control panel application 216 is loaded on control station 203 (FIGS. 2A(1)-2A(3)) which provides a user interface and display through which the download and configuration portion of the slot management system 101 (FIG. 1) is managed.

A business logic layer 218 may include G2S Host 219, which may include G2S engine 280 components. G2S Host 219 may be used to send and receive G2S protocol messages to and from EGMs 213 and other configurable devices. G2S Host 219 may also be used for the packaging and unpackaging of the internal system messages and G2S protocol messages. The business logic layer 218 may also comprise of Download and Configuration logic libraries, Executive Service 220, and the Scheduler Service 221 which are responsible for implementing the Business Logic of the system.

A data access layer 222 may be comprised of Web Services 223, which may be used to enable methods and/or processes for interacting with a data layer 224. A network services layer 225 provides network services 226.

The data layer 224 may comprise various databases, for example a download database 227, configuration database 228, schedule database 229, activity database 230, and core database 231, as may be useful for storing download and configuration system data.

EGM layer 212 may comprise the EGMs 213 and other configurable components like iViews and game controllers.

FIGS. 2C(1) and 2C(2) show a componentization of a download and configuration system, according to one illustrated embodiment.

The presentation layer includes the control panel application 216. The control panel application 216 may be loaded on control station 203 which may include a user interface and display for user to manage the download and configuration server system 201.

The business logic layer includes Download Service and Logging. The Logging library may be used to store job logs and may include storing error and debug logs.

The scheduler 221 may implement the shared base classes for assignments and jobs, maintain the job queues, and/or provide execution contexts for host-originated activities. The scheduler 221 may also include upkeep (e.g., flush) of outdated job and job log entries.

G2S Host core 219 may provide the mechanisms to separate protocol specifics from application logic. G2S Host core may receive information from the application libraries (e.g., Configuration), and may be utilized to implement the interfaces that application and protocol components require to fulfill their needs.

An option configuration handler 232 may be utilized to implement the G2S class's specific to the Option Configuration context.

A download handler 233 may be utilized to implement the G2S class's specific to the download context.

A download library 234 may be part of the library of software packages available for download to EGM's 213.

The SDDP 252 may be comprised of a Website responsible for downloading software packages to EGMs 213.

The data access layer 222 may connect Web-based structure and services with the download database 227. The data access logic required for the download and configuration system 201 to interact with the download database 227 may be contained within the download Web service 236 (FIGS. 2B(1) and 2B(2)). The download Web service 236 may also provide structure and services for communicating download commands, such as between the BCP 216 and a download handler 237 via the executive component 220 (e.g., via an executive Web service 240).

A configuration Web service 238 (FIGS. 2B(1) and 2B(2)) may provide Web-based structure and services allowing the interaction with the configuration database 228. The data access logic required for the download and configuration system 201 to interact with the configuration database 228 may be contained within the configuration Web service 238. The configuration Web service 238 may also provide Web-based structure and service for communicating configuration commands, such as between the BCP 216 and a configuration handler 239 via the executive component 220 (e.g., via the executive Web service 240).

A scheduler Web service 241 (FIGS. 2B(1) and 2B(2)) may provide Web-based structure and services to consuming components to allow the interaction with the schedule database 229. The data access logic required for the configuration and download system 201 to interact with the schedule database 229 may be contained within the scheduler Web service 241.

A core Web service 242 may provide Web-based structure and services to consuming components to allow the interaction with the core database 231. The data access logic required for the system to interact with the core database 231 may be contained within the core Web service 242.

An activity Web service 243 may provide Web-based structure and services to consuming components to allow the interaction with the activity database 230. The data access logic required for the system to interact with the activity database 230 may be contained within the activity Web service 243.

A security Web service 244 may provide Web-based structure and services to consuming components to allow the interaction with active directory 245 for security purposes (e.g., authentication, verification, encryption, etc.). The security Web service 244 may be used as a Web based interface for retrieving and storing security data in the active directory 245 or other directories, databases or other security repositories.

At the Data layer 224, the configuration schema may implement the configuration database 228; download schema may implement the download database 227; activity schema may implement the logging database 230; core schema may implement the translator or core 231 database; and schedule schema may implement the schedule database 229.

Figure 2D:
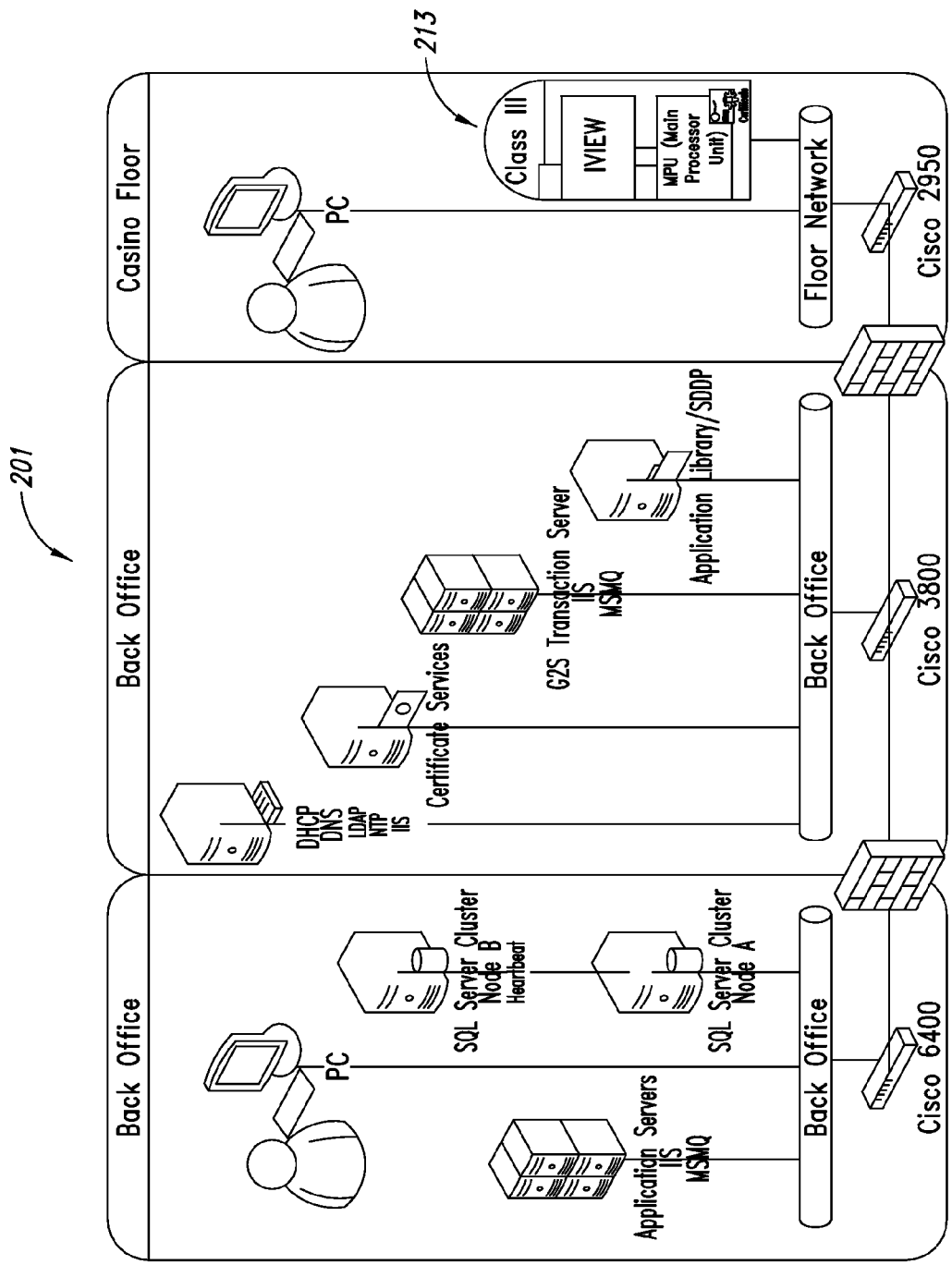
FIG. 2D is a schematic diagram of a download and configuration network, according to one illustrated embodiment.
Figure 2E:
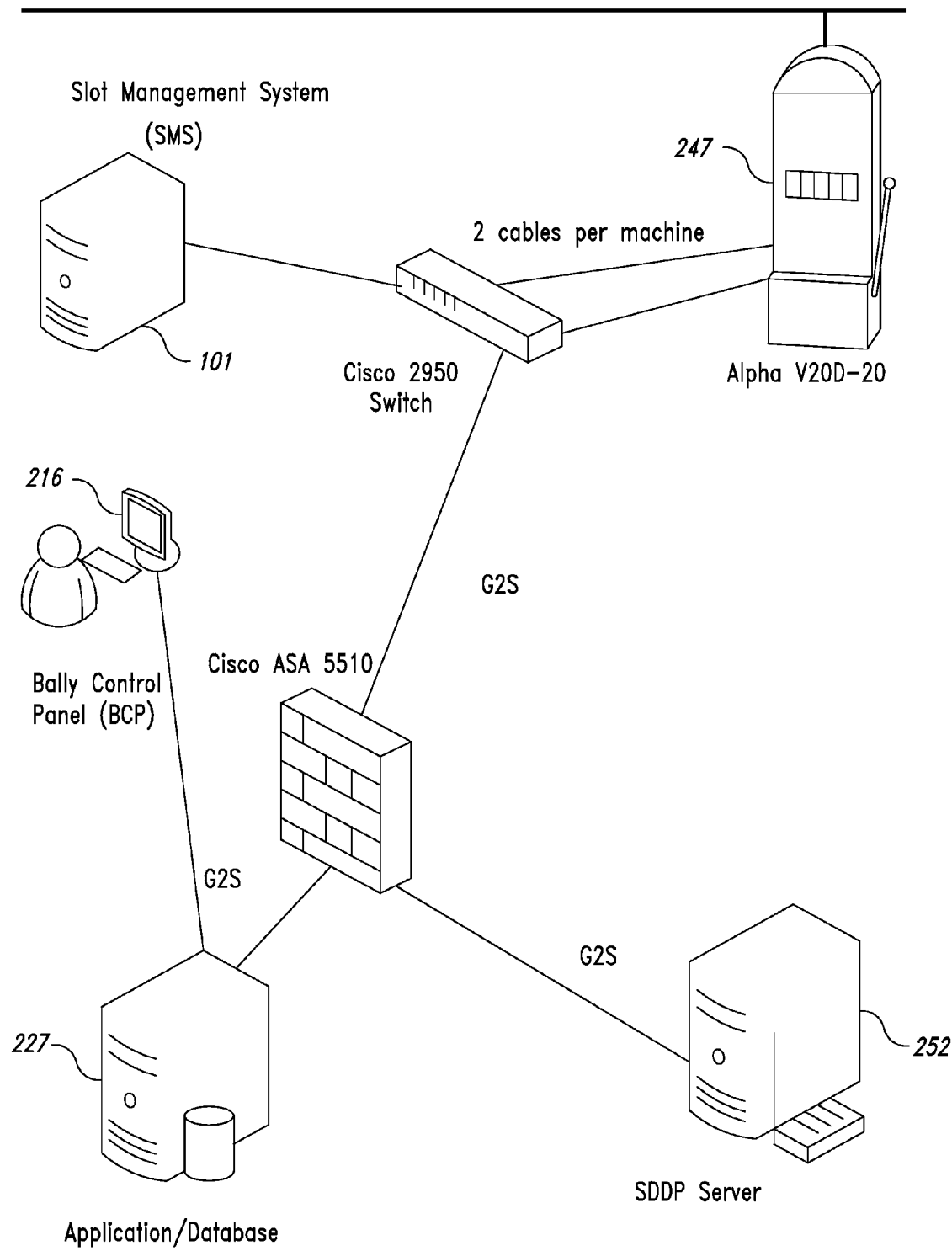
FIG. 2E is a schematic diagram showing a download and configuration network, according to one illustrated embodiment.

FIGS. 2D and 2E show a download and configuration server system network according to one illustrated embodiment.

Download and configuration server network 201 is a portion of slot management system 101 which provides a suite of subsystems designed to provide customizable solutions by allowing users to select products within the suite to meet their needs for particular facilities, such as a casino manager seeking to manage a single or multiple properties. Download and Configuration (Download and Config) are two of the subsystems offered in the suite that provides a user, such as the Slot Operations staff, an efficient mechanism to remotely configure electronic gaming machine (EGM) 213.

The Download and Config Software utilized together with the apparatuses as shown in the figures may be used to enable a casino Slot Operations staff to schedule and change a game(s) on the casino floor from a keyboard.

Using the Control Panel (BCP) interface 203, the staff may be able to schedule, configure, download and activate changes to games on the floor, without touching an EGM 213 on the floor. Download and Config software application may be loaded on control station 203 to enable the sending of information over the casino network using G2S & HTTPS standardized message protocols that manage the downloaded content. From control station 203, a user, such as casino staff, can change cabinet or game options, or games in EGMs 213. There are numerous selections that the staff can schedule to configure or make a minor change. Some examples of the types of software that may be downloaded or options which may be re-configured are:

| Cabinet Options | Game Options | Download Options |
| --- | --- | --- |
| Sound | Game/Theme | Change a game, theme, &/or paytable |
| Reel spin speed | Paytable | |
| Background color | Denomination | Change game operating system |
| Attract mode | | |

In order to implement the download and configuration features, one approach is to install slot management system 101 at a facility, such as, for example, the Bally$_{13}$ Live slot management system 101. The implementation of the download and configuration features further contemplates the implementation of server hardware and related equipment as shown in the figures, and particularly FIGS. 2A(1)-2E, including software to perform the needed functions for communicating relevant data and instructions, the implementation of download ready EGMs 213, such as EGMs 213 with an Alpha operating system with remote download and configuration capability. An example system for implementing the download and configuration network 201 may be a Bally One System together with the Bally Live Floor program. Another example implementation of the Download and Configuration server network 201 may be in conjunction with other slot management systems incorporating the Bally Live Core program.

An example process for using the download and configuration server network 201 is as follows: A casino operator decides to change game themes on the Alpha V20D-20 EGMs 247. The software game themes are located on the SDDP Server 252. The Download management tools are located on the Application/Database Server System 251. One or more servers separate from the SDDP Server 252 contain the game theme software, such as for security or redundancy purposes. The Alpha EGMs 247 are identified on the casino floor using the BCP 216. A Download management tool, such as the BCP scheduler may be used through a menu to identify: the date and time to download the game packages; the game packages to send to the specific EGMs 213; the date and time to automatically activate the games on the EGMs 213 after the download. At the selected date and time, the EGM 213 may open communication with the Download Database 227. The EGM 213 requests software from the SDDP server 252. The SDDP server 252 downloads the specified game information to the EGM 213 using a secure transmission protocol such as HTTPS. The download to the EGM 213 may occur in the background operation of the Alpha OS, so that game play is not interfered with. The EGM 213 may de-activate game operation a pre-determined amount of time subsequent to the last play on the EGM 213, such as five minutes, and issue a message on one of its display panels that it is temporarily offline, at which point the EGM 213 can initiate installation of the downloaded software. A record of the transmissions and corresponding activity of the EGM 213 is relayed to a retrievable storage on the network, such that a privileged user may operate the BCP 216 to run the reports identifying the old and new games, date changed, and by whom. User privileges may be restricted as discussed previously to provide additional levels of security and flexibility within the system and for the casino operator or users of slot management system 101 and download and configuration server network 201.

Example download and configuration components that are shown in FIGS. 2D and 2E indicate a system that supports up to 10 EGMs 213 through a single Cisco 2950 switch. As the number of EGMs 213 increase, the type and/or number of servers, switches, firewalls, and pipelines may be changed to accommodate higher traffic volumes and improve or avoid degradation of performance. In an example embodiment, the following apparatuses and software are incorporated.

An SDDP server 252 includes a download software library. The SDDP server 252 executes game server software, and the download software library stores download game software.

An application/database server 227 includes core databases, and provides core services as well as download services. The core databases may include a core database, a meter database and an activity database. The core services may include: communications, initiation and validation, certificate, IIS, MSMQ, DNS, DHCP, and active directory services. The core services may also include: meter services, activity services, cabinet services, and game play services. The download services may include certificate, IIS, MSMQ, DNS, DHCP, and active directory services. The download services may further include: a Web service, a configuration Web service, a scheduler Web service, a download handler Web service, an option configuration handler Web service and a scheduler service.

A panel control (BPC) 203.

A G2S may include certificate, IIS, MSMQ, DNS, DHCP, and active directory services. The G2S may also include a SQL Report, Web Service, and delivery agent.

Download and configuration databases may include: a download database, a configuration database and a scheduler database.

An adaptive security appliance (ASA) may create a firewall between back-end and floor systems. Such may provide proactive threat defense that stops attacks before they spread through the network, controls network activity and application traffic, and delivers flexible VPN connectivity.

| Example Components | Example Hardware | Example Software |
|---|---|---|
| SDDP server 252 (SDDP 252 may be placed on its own server to comply with some jurisdiction requirements.) | Pentium IV 2 GB RAM 100 GB SATA 2 NIC cards | OS - Microsoft Windows 2003 Microsoft SQL 2005 |
| Application Library Server | Pentium IV 2 GB RAM 100 GB SATA 2 NIC cards | OS - Microsoft Windows 2003 Microsoft SQL 2005 |
| Databases: • Scheduler • Download • Configuration | Pentium IV 2 GB RAM 100 GB SATA 2 NIC cards | OS - Microsoft Windows 2003 Microsoft SQL 2005 |
| Networking | Cisco 2950 Switch, 24-port Cisco ASA 5510 (firewall) | |
| Connecting wiring between devices | CAT-5 cables 15 feet long 2 cables per EGM 213 | |

Figure 3:
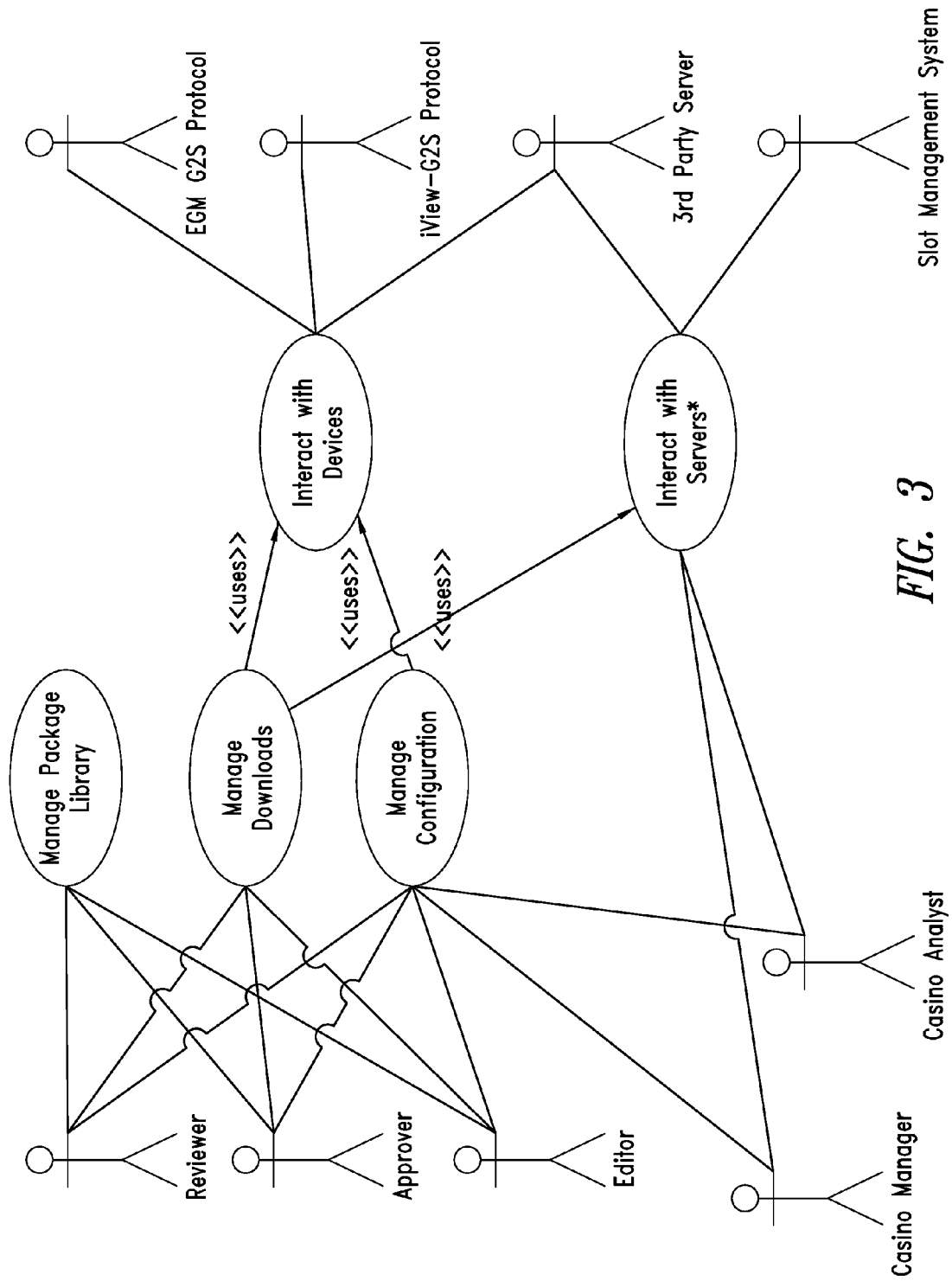
FIG. 3 is a flow diagram showing a download and configuration user tree logic, according to one illustrated embodiment.

FIG. 3 shows an exemplary download and configuration use-based tree logic flow diagram, according to one illustrated embodiment. The exemplary users shown in the diagram have the following descriptive names: Reviewer, Approver, Editor, Casino Manager, and Casino Analyst. The Reviewer is a user who can view tasks that are only related to view; this user doesn't have the right to change anything in the system. The responsibility of the Approver is to approve the tasks that need to be approved by an additional user. The Editor has the right to edit, view, set and cancel tasks. The Casino Manager is a user who may or may not be directly involved with day to day management of gaming terminals. Approves changes to configuration, and views gaming performance data. The Casino Analyst (i.e., performance analyst) may generally report directly to the Casino Manager and may be tasked with analyzing the financial performance of the casino, including the network of electronic gaming machines. After analysis, the Casino Analyst may produce a list of recommendations to the Casino Manager designed to optimize the electronic gaming network performance.

The following devices and systems may be included within the described slot management network system and may have the referenced capabilities:

EGM—G2S Protocol: An Electronic Gaming Machine (EGM) 213 that implements the Game To System (G2S) protocol for download and configuration.

iView-G2S Protocol: Device for player touch point services. It may be used to display marketing and player tracking information. It may be incorporated within the network to provide gaming independent of or incorporated with an EGM 213. It has a separate network connection as indicated in the prior figures.

3rd Party Server: Third party server that provides download and configuration management of non-G2S EGM 213 devices. The Control Panel (BCP) 216 may use an extension of System to System (S2S) protocol to manage download and configuration of proprietary EGMs 213 through the proprietary (3rd party) server.

Slot Management System: Central system responsible for accounting, vouchering, player tracking, etc. (e.g., Slot Data System).

Figure 4:
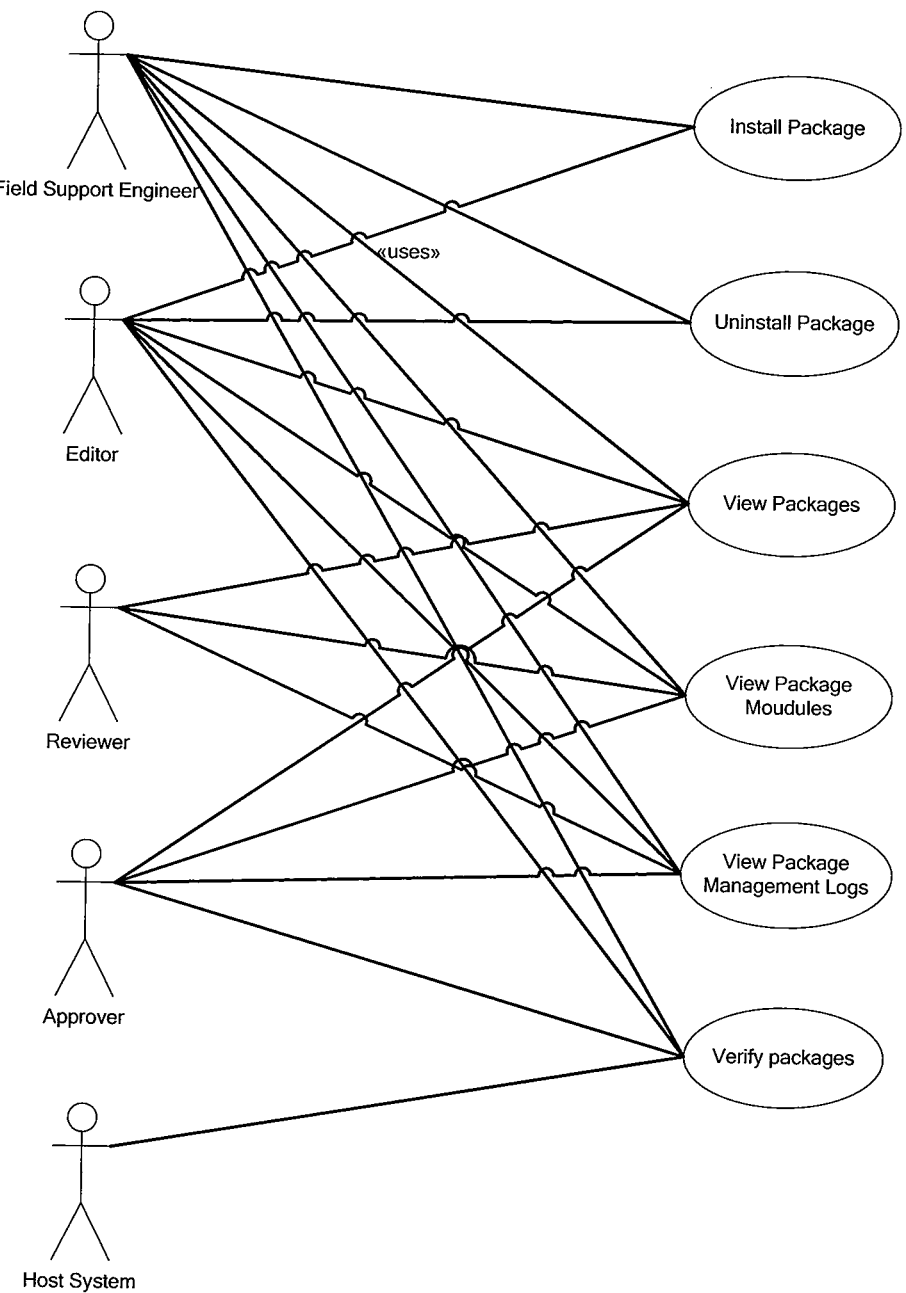
FIG. 4 is a flow diagram showing a download and configuration user tree logic to manage a package library (SDDP), according to one illustrated embodiment.

FIG. 4 shows an exemplary download tree-logic flow diagram for managing a software package library with the SDDP 252, according to one illustrated embodiment. In the illustrated example:

Install Package—A package is a transport container designed to deliver one or more modules to a downloadable device (like an EGM 213, iView or GC hereafter referred to as EGM 213). This use case allows users to install packages to the SDDP 252. This may include three primary functions. 1) copy the packages files themselves from the CD to the correct directories on the SDDP 252; 2) update the SDDP 252 inventory tables in the download database 227; and 3) log all of this activity.

Uninstall Package—Removes the package from the SDDP 252, updates the download database 227 inventory and logs the activity.

View Packages—This use case allows the users to examine the packages that exist at the SDDP 252.

View Package Modules—This use case indicates that users may view the modules contained in a package.

View Package Management Logs—All activities like installing and uninstalling of packages are logged by the system; this use case denotes the user's ability to review these logs.

Verify Packages—Check the hash values and certificates of the packages in the SDDP 252 directories to confirm no tampering has occurred. Confirm that no unauthorized packages exist on the SDDP 252.

Figure 5:
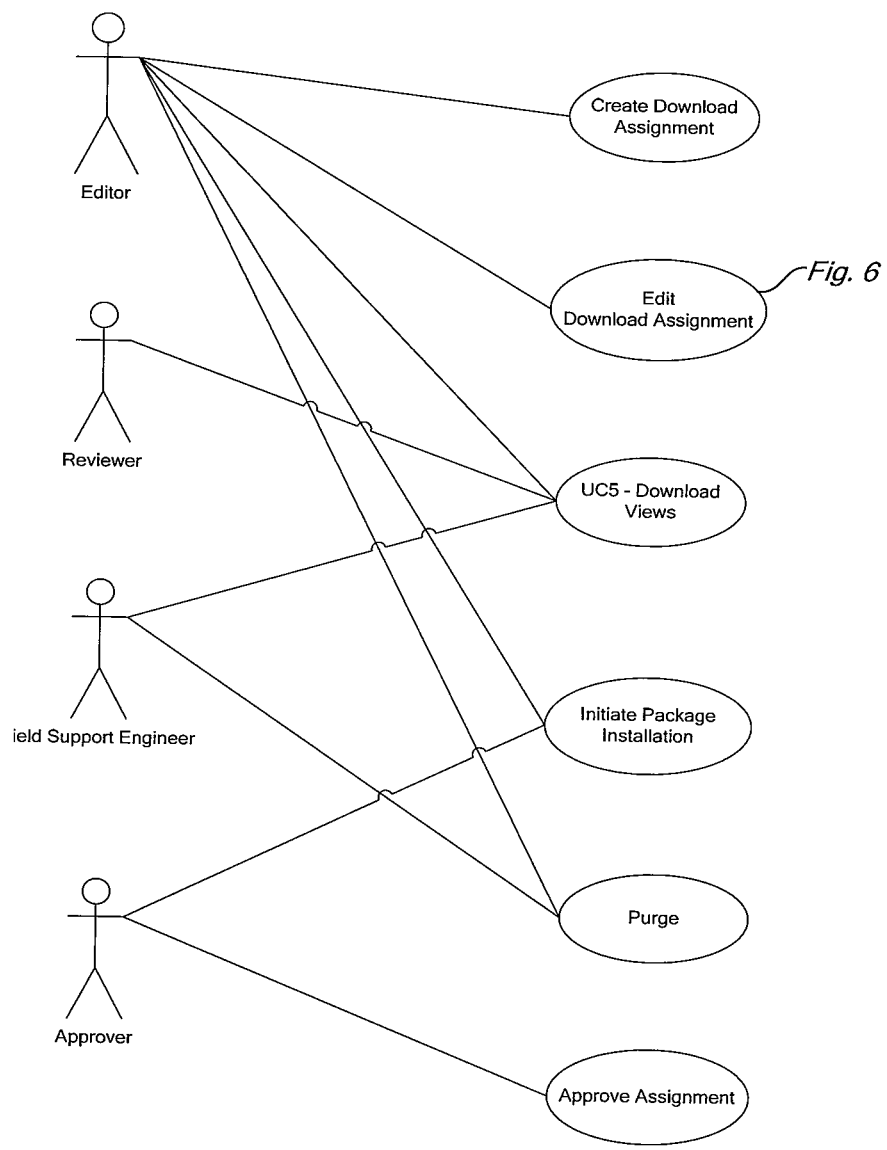
FIG. 5 is a flow diagram showing a download and configuration user tree logic to manage downloads, according to one illustrated embodiment.

FIG. 5 shows an exemplary download management tree logic flow diagram, according to one illustrated embodiment:

Create Download Assignment—Create an assignment of packages(s) to a collection. A new assignment is inactive, and has a default schedule of now, an empty collection, and contains no packages.

Edit Download Assignment—Described in detail below with regard to FIG. 6. This includes managing the collection membership, what is assigned for download, whether the assignment is active, and its schedule.

Download Views—Described in detail below with regard to FIG. 8. Users can examine current EGM 213 inventory, the package library (via packages, or via modules), pending jobs (scheduled, active assignments), running jobs (changes in progress), and completed jobs.

Initiate Package Installation—When a package has been distributed to one or more EGMs 213, the EGM 213 escrows the package, verifies it is what it is professed to be, and awaits an "initiating event". What that means varies by jurisdiction; it may be an attendant action at the EGM 213, at the system, or allowed to occur automatically. This use case covers the concept that a BCP user may manually initiate a package installation, or it may be automated at the system level.

Purge—This refers to the function of purging old assignments from the database Assignments are marked deleted and may become invisible to the user interface (UI) tools. Deleted assignments may be purged if they were never active.

Approve Assignment—This use case shows that an assignment may be approved by an Approver. This is a user with approval role in the system.

Figure 6:
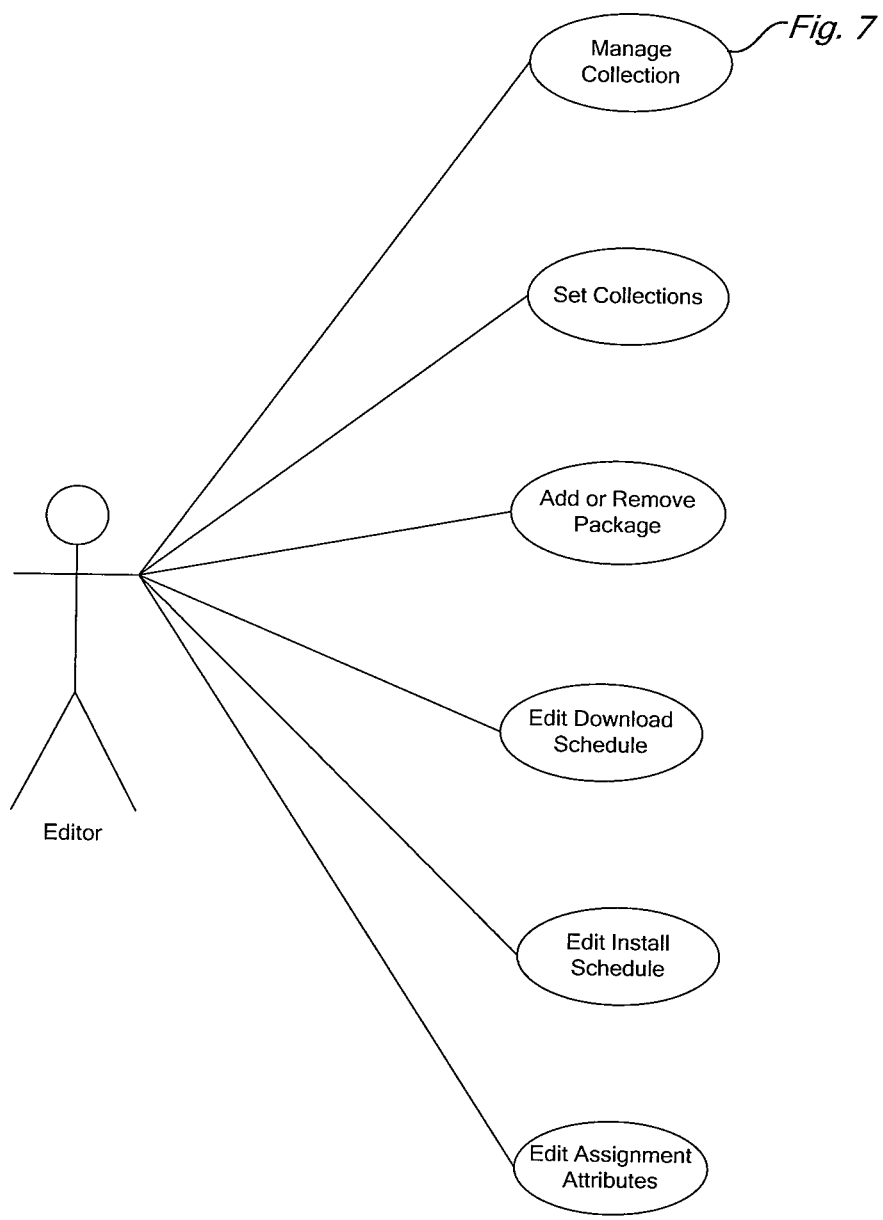
FIG. 6 is a flow diagram showing a download and configuration user tree logic to edit download assignments, according to one illustrated embodiment.

FIG. 6 shows an exemplary flow diagram for editing download assignments, according to one illustrated embodiment.

Manage Collection—A collection may be used by more than one assignment. The user can modify the membership of the collection:

Add and remove EGMs 213. Dynamic collection may be allowed. These are based on matching some criteria such as, for example, All EGMs 213 playing nickel poker.

In the case of dynamic collections, Change how a dynamic collection's members are determined and Convert a dynamic collection to a static one.

Managing a collection is described in more detail below with regard to FIG. 7.

Set Collections—Choose which EGMs 213, directly or via other collections that this assignment will affect.

Add or Remove Package—The user can pick from available packages and add them to the assignment for download. The modules included within packages are also displayed for reference.

Edit Download Schedule—The user can edit scheduling options for download.

User can schedule a start date for download using the BCP 216. It may be noted that the start date indicates the date the download process begins. It may take indeterminate amount of time for the downloaded package to be ready to be installed on a given EGM 213. This is the case where download occurs in a facility that is operating. If the facility is shutdown at a selected point in time or if it is not yet operational, download may occur as rapidly as the throughput pipelines and bandwidth of the servers and routers will allow on the system. Also, according to one embodiment, to avoid download conflict when multiple download assignments exist for the same module type on an EGM 213, the assignment with the latest creation date may take precedence.

Edit Install Schedule—The user can edit scheduling options to install packages.

Edit Assignment Attributes—The user can edit the name and description of an assignment. According to one embodiment, one of the most important attributes is active. Assignments can be created, edited, scheduled, and saved without having them take effect. For an assignment to be scheduled and affect the collection, it must be made active. The user may also de-activate an assignment.

Figure 7:
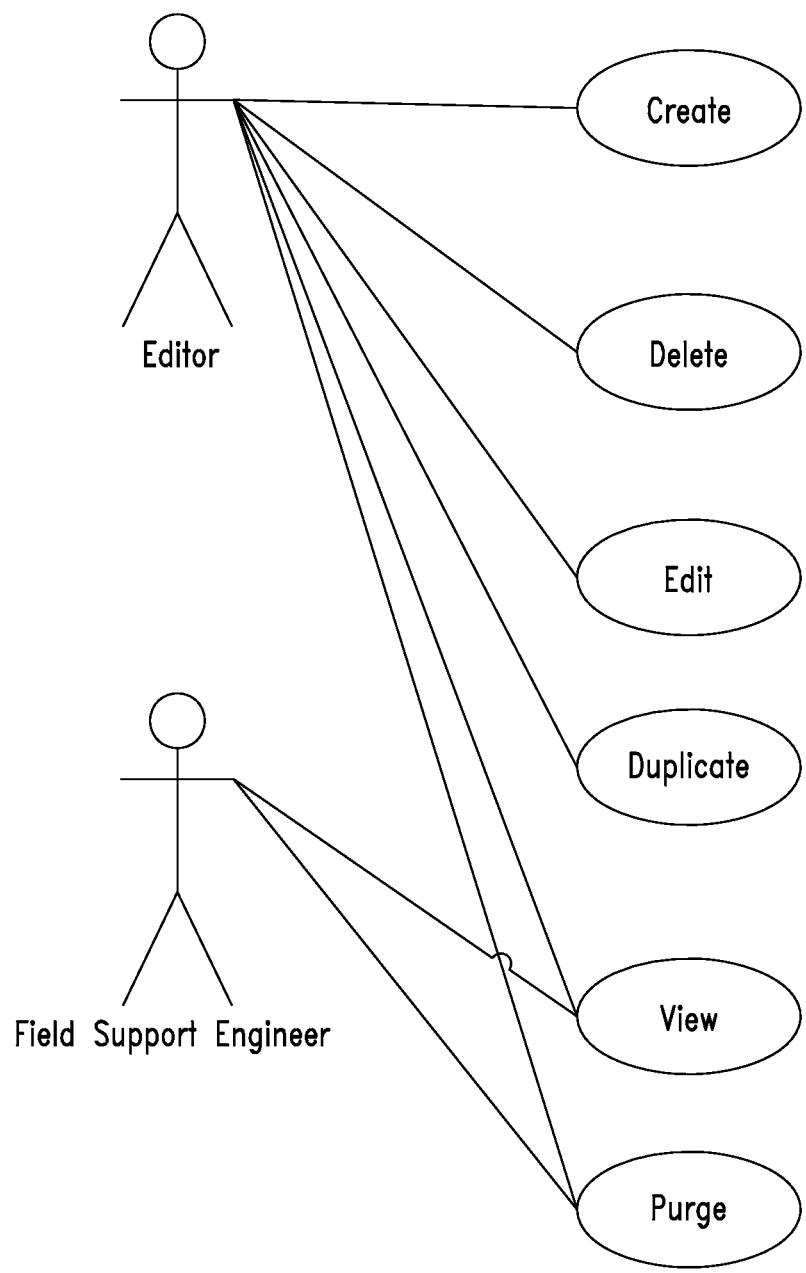
FIG. 7 is a flow diagram showing a download and configuration user tree logic to manage a collection, according to one illustrated embodiment.

FIG. 7 shows an exemplary download and configuration flow diagram for managing a collection, according to one illustrated embodiment.

Create—Create an empty EGM collection. A collection is a list of EGMs 213. A collection may also include other collections. On the BCP 216 user interface and display, these may be referred to as EGM groups.

Delete—Remove EGMs 213 or EGM collection from a collection.

Edit—Add or remove EGMs 213 or EGM collection from a collection.

Duplicate—Make a copy of an existing collection and give it a new name.

View—View EGMs 213 or EGM collection.

Purge—Remove a deleted collection from the Database if it is unreferenced.

Figure 8:
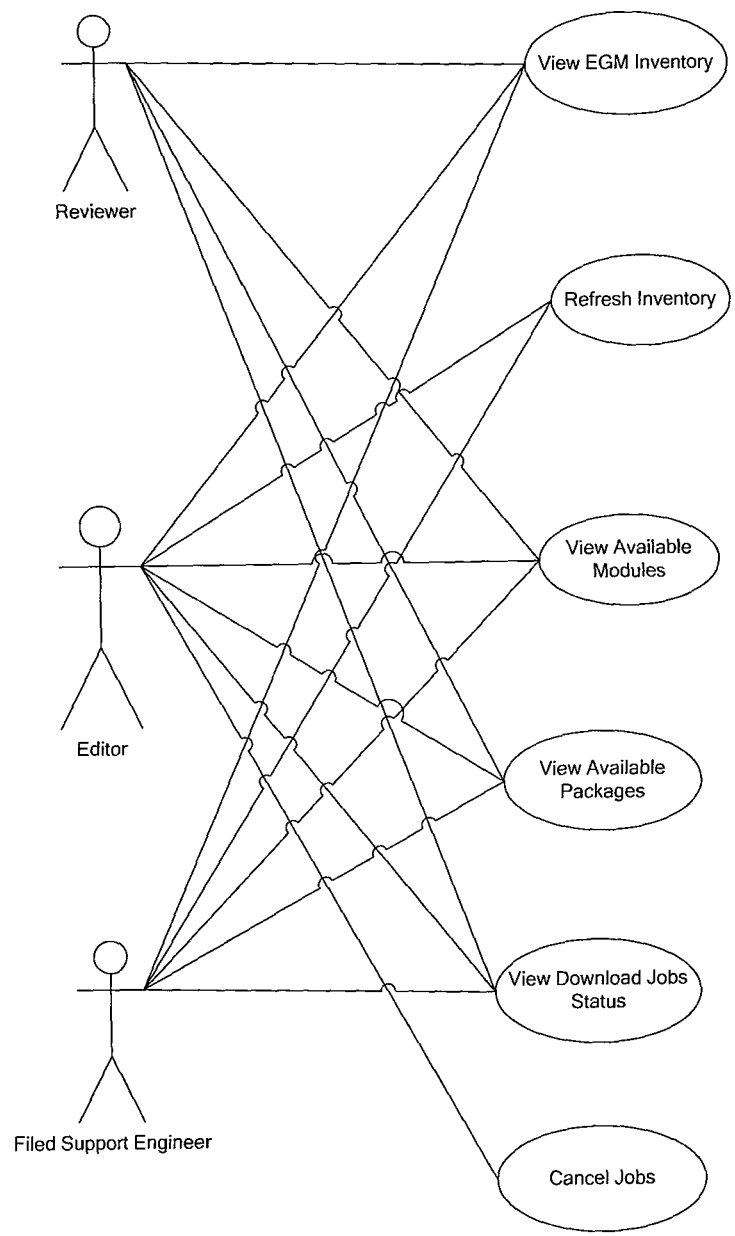
FIG. 8 is a flow diagram showing a download and configuration user tree logic to download views, according to one illustrated embodiment.

FIG. 8 shows an exemplary flow diagram of download views, according to one illustrated embodiment.

View EGM Inventory—The user may select any EGM within the currently selected download assignment, and see the EGM module 213, component, and package inventory.

Refresh Inventory—Force an Obtain inventory job to run on the EGM 213 and update the BCP 216 to display the newest data. Additionally and/or alternatively the refresh inventory may report on differences detected. Normally the DB inventory may be expected to substantially match the actual EGM inventory.

View Available Modules—The download system maintains a library of packages, which deliver (i.e., install or un-install) modules. The user can browse which packages are available for download. According to some embodiments, only the package(s) that are compatible with the referenced EGMs 213 are shown. In other embodiments, other choices may be permitted, like packages compatible with the reference EGM in a collection.

View Available Packages—The download system maintains a library of packages, which deliver (install or un-install) modules. The user can browse which packages are available (in the library) for download. The borne module(s) are displayed in association with each available package, including any module or [hardware] component that the package depends on for its installation to succeed.

View Download Jobs Status—This use case allows the users to view the current status of download jobs. The download jobs may have different status such as, for example, Pending, Running or Completed. Individual package downloads may, for example, have states as defined by the G2S protocol that are sub states of the pending jobs. The individual package downloads may include, for example:

Pending Download Jobs: The host maintains a job queue of upcoming download jobs, based on the schedule. (e.g., an active download assignment scheduled to run in the future will have a pending job).

Running Download Jobs: The host monitors download jobs that are in progress. This allows the user to examine which jobs are currently running, their status, and any log entries against that job. It is noted that each assignment-level job may have one or more EGM-level jobs. The user interface displays such relationship by nesting EGM-level jobs under each assignment-level job.

Completed Download Jobs: Once a job has completed, the job and its log entries may be archived for 180 days. The user can examine the history of completed jobs for an assignment. Similarly to running jobs, each assignment-level job may have one or more EGM-level jobs. The user interface may display such relationship by nesting EGM-level jobs under each assignment-level job.

Cancel Jobs—Informs the host system via the BCP 216 to abort an existing job. Any new commands for the JOB are not run. An attempt may be made to send cancel commands to the EGM 213 if appropriate.

Figure 9:
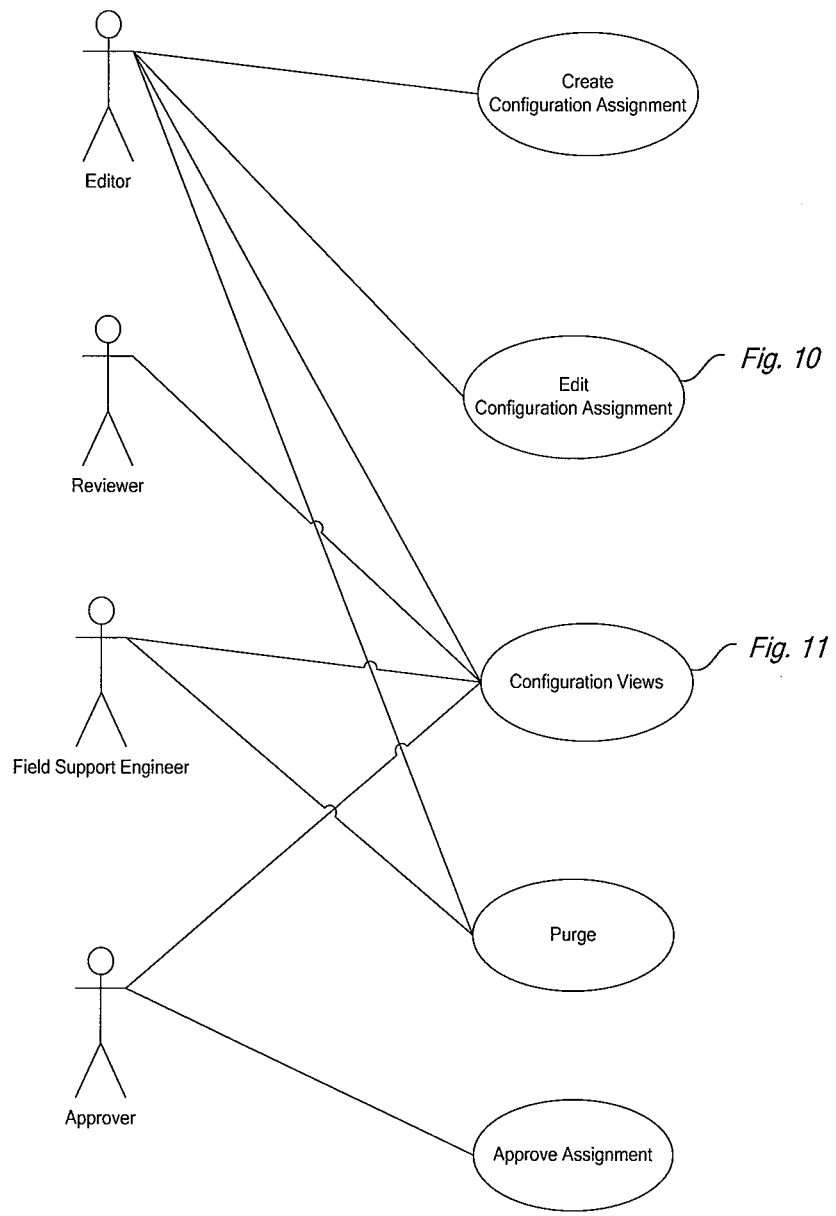
FIG. 9 is a flow diagram showing a download and configuration user tree logic to manage configurations, according to one illustrated embodiment.

FIG. 9 shows an exemplary flow diagram for managing configurations, according to one illustrated embodiment.

Create Configuration Assignment—A configuration assignment supports the definition and scheduling of EGM configuration changes. This use case identifies different ways for the user to create new configuration assignments.

Edit Configuration Assignment—Once created, the configuration assignment provides powerful and flexible means to manage the configuration of EGM collections over time. The configuration assignment is described in more detail below with regard to FIG. 10.

Configuration Views—Users may examine current EGM settings, pending jobs (e.g., scheduled, active assignments), running jobs (e.g., changes in progress), and completed jobs. Configuration views are described below in more detail with regard to FIG. 11.

Purge—This refers to the function of purging old assignments from the database. Assignments may be marked as deleted and become invisible to the UI tools.

Approve Assignment—This use case shows that an assignment is approved by an approver.

Figure 10:
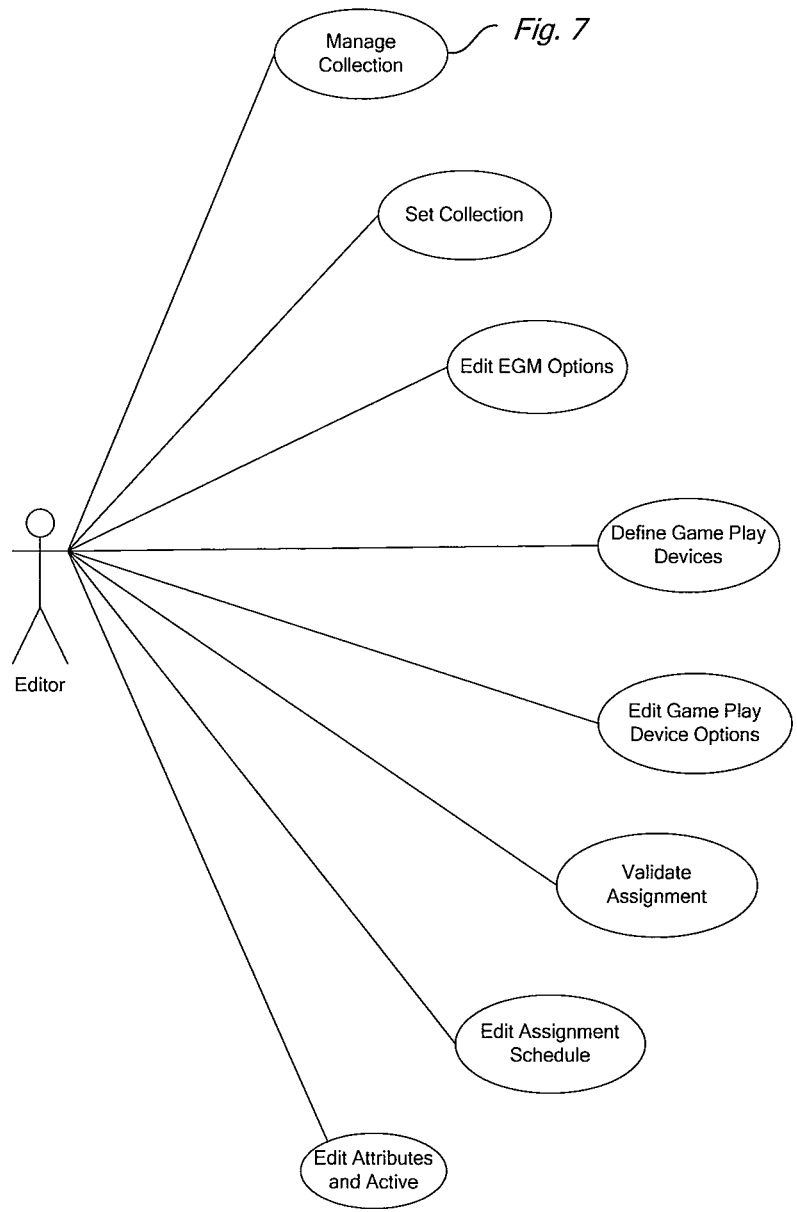
FIG. 10 is a flow diagram showing a download and configuration user tree logic to edit configuration assignments, according to one illustrated embodiment.

FIG. 10 shows an exemplary flow diagram for editing configuration assignments, according to one illustrated embodiment.

Manage Collection—As described in detail above with regard to FIG. 7, a collection may be used by more than one assignment.

Set Collection—Specify the collection to be used for an assignment.

Edit EGM Options—The user may select one or more option groups for the assignment to affect, and edit the options within each selected group. EGM options are described with reference to FIG. 14.

Define Game Play Devices—User may create, delete, or modify the game play device that is available on the EGM 213. A game play device is defined as a game theme and pay table with one or more denominations. For example, Alpha OS EGMs may support up to 100 game play devices. Each may have additional options which can be configured directly at the EGM 213 or remotely through the BCP 216 once the Game Play Device is defined on the EGM 213.

Edit Game Play Device Options—The user may select one or more game devices to be activated by the assignment, and edit the options within each device activated by the assignment.

Validate Assignment—Using configuration assignments may provide a fully automate slot floor reconfiguration such as, for example, defining a default configuration, then overriding it for weekends or a holiday. Such may be accomplished by layering or stacking assignments, which may be conflicting. The 'validate assignment' operation performs a conflict analysis that reports on such conflicts and may be reportable in the case of a conflict, such as at the BCP 216. It is noted that by allowing dynamic collections or non-permanent collections a point-in-time analysis is provided.

Edit Assignment Schedule—Configuration assignment scheduling may advantageously be flexible. In one embodiment the configuration assignment scheduling may be restricted as download assignments are. Scheduling may be understood in terms of how the host arrives on proper EGM settings at a given moment in time. Configuration assignments may be run in order of schedule type such as, for example, Permanent, Permanent with start date, Re-occurring Override and One Time Override. Within the schedule types, the one with the earlier start date goes first. Within matching start dates, assignments with static collections run before dynamic. If the assignments having matching start dates also have matching collection types, the assignments with earlier create dates run first. It is noted that in some embodiments configuration assignments of permanent and permanent with start date may include static collections.

Edit Assignment Attributes—Names and description are editable. According to one embodiment, an important attribute is Active. The user can create, edit, schedule, and save assignments without having it take effect. For an assignment to be scheduled and affect the collection, the assignment is made active. The user may also de-activate an assignment.

Figure 11:
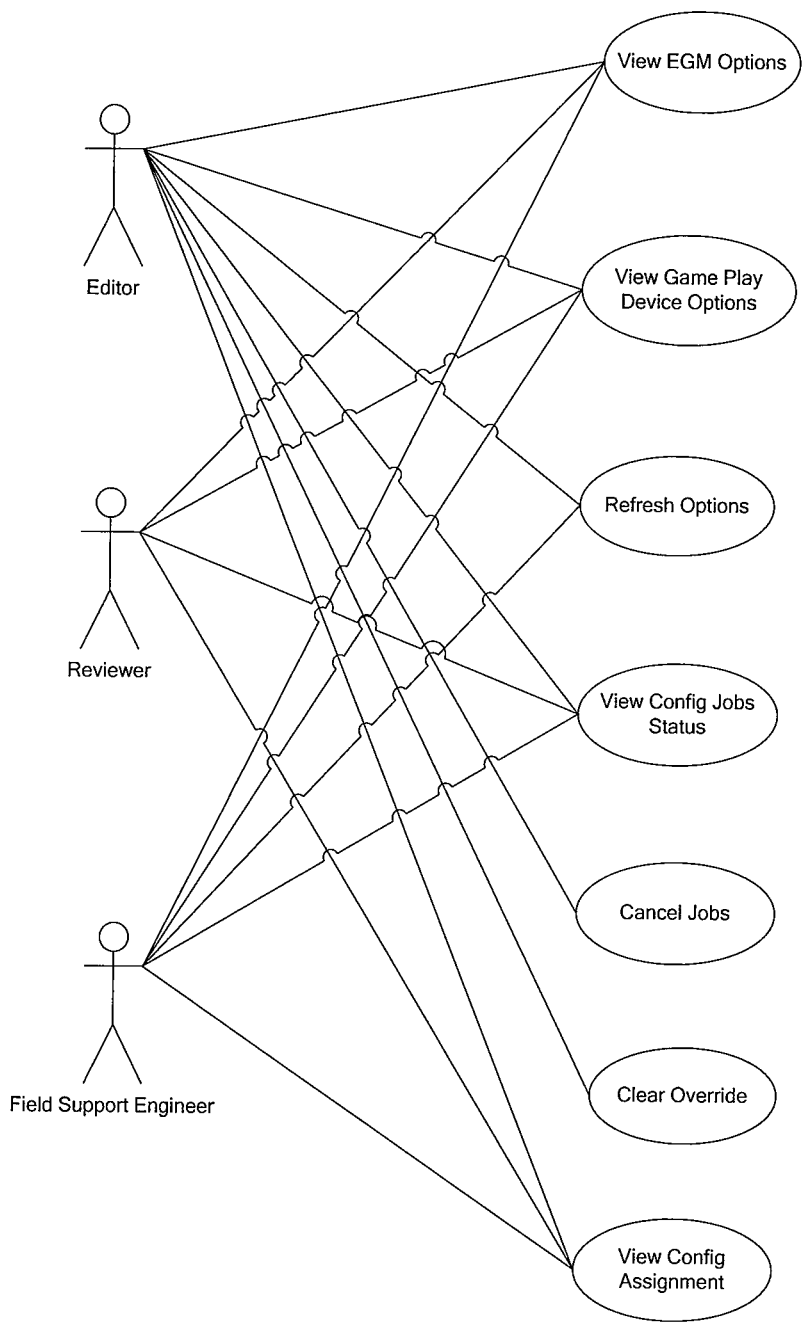
FIG. 11 is a flow diagram showing a download and configuration user tree logic of various configuration views, according to one illustrated embodiment.

FIG. 11 shows an exemplary flow diagram of configuration views, according to one illustrated embodiment.

View EGM Options—Within the configuration context, the user may select any EGM in the currently selected assignment, and view the current settings for that EGM.

View Game Play Device Options—View the options which have been set for each individual game play device on an EGM.

Refresh Options—From the BCP 216, a user may instruct the host to re-obtain the configuration options from an EGM. These are compared to the current settings and differences may be noted. Normally the host may have an exact copy in its DB as changes are to be reported to the host according to GSA G2S.

View Configuration Jobs Status—This use case allows the users to view the current status of Configuration jobs. The configuration jobs can have different status like Pending, Running or Completed. Pending jobs will have a sub-status of the configuration set itself as defined by the G2S protocol.

Pending Configuration Jobs—The host maintains a job queue of upcoming configuration jobs, based on the schedule. For example, an active recurring assignment may have a job pending, scheduled for the next occurrence. When that job runs, a new pending job is created for that assignment.

Running Configuration Jobs—The host monitors configuration jobs that are in progress. This allows the user to examine which jobs are currently running, their status, and any log entries against that job. Note that each assignment-level job may have one or more EGM-level jobs. The user interface is operable to display this relationship by nesting EGM-level jobs under each assignment-level job.

Completed Configuration Jobs—Once a job has been completed, the job and its log entries may be archived for 180 days. The user can examine the history of completed jobs for an assignment. Similarly to running jobs, each assignment-level job may have one or more EGM-level jobs. The user interface may display this relationship by nesting EGM-level jobs under each assignment-level job.

Cancel Jobs—A user may cancel pending jobs and, in response, the system may discontinue the pending jobs if they are in progress. If possible, the system will also send the cancel command for each open configuration set.

Clear Override—An optional item is considered overridden if it has been changed via the machine's touch screen menus. In this case the host receives an unsolicited optionList to report the changes. The host will respect these overridden settings, even if a subsequent assignment would modify them, until such time as the user clears the override via this function.

View Configuration Assignment—A user may view but not modify the configuration assignment. This may be a read only version of the complete wizard or it may be just a view of the review page of the wizard.

Figure 12:
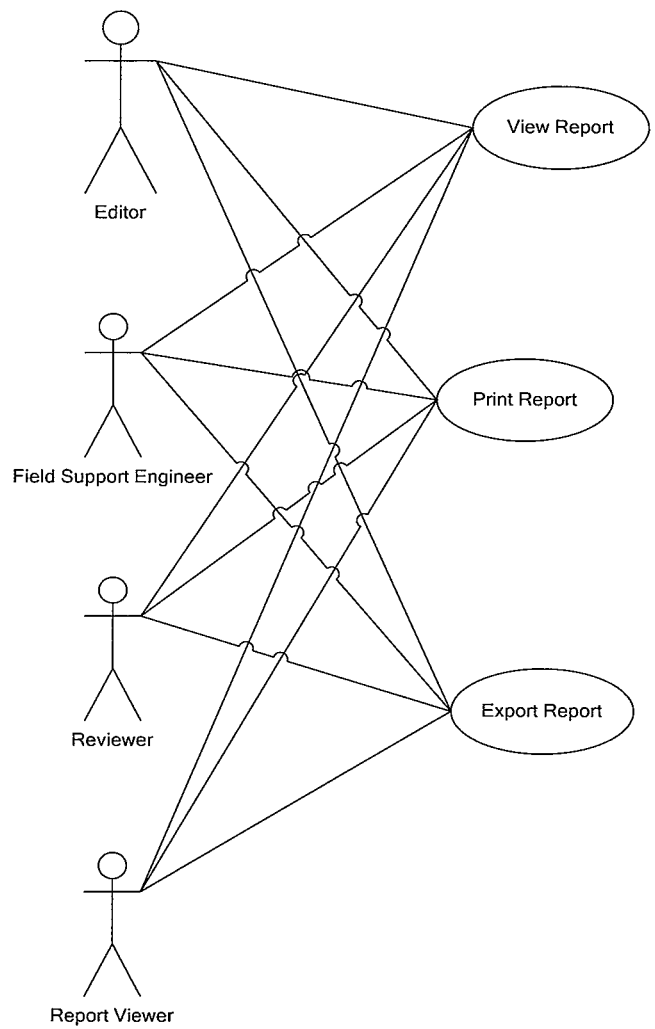
FIG. 12 is a flow diagram showing a download and configuration user tree logic to manage reports, according to one illustrated embodiment.

FIG. 12 shows an exemplary flow diagram for managing reports, according to one illustrated embodiment.

View Report—This use case may be used to view reports from the Report user interface.

Print Report—This use case may be used to print reports from Report user interface.

Export Report—This use case may be used to export reports via the Report user interface.

Figure 13:
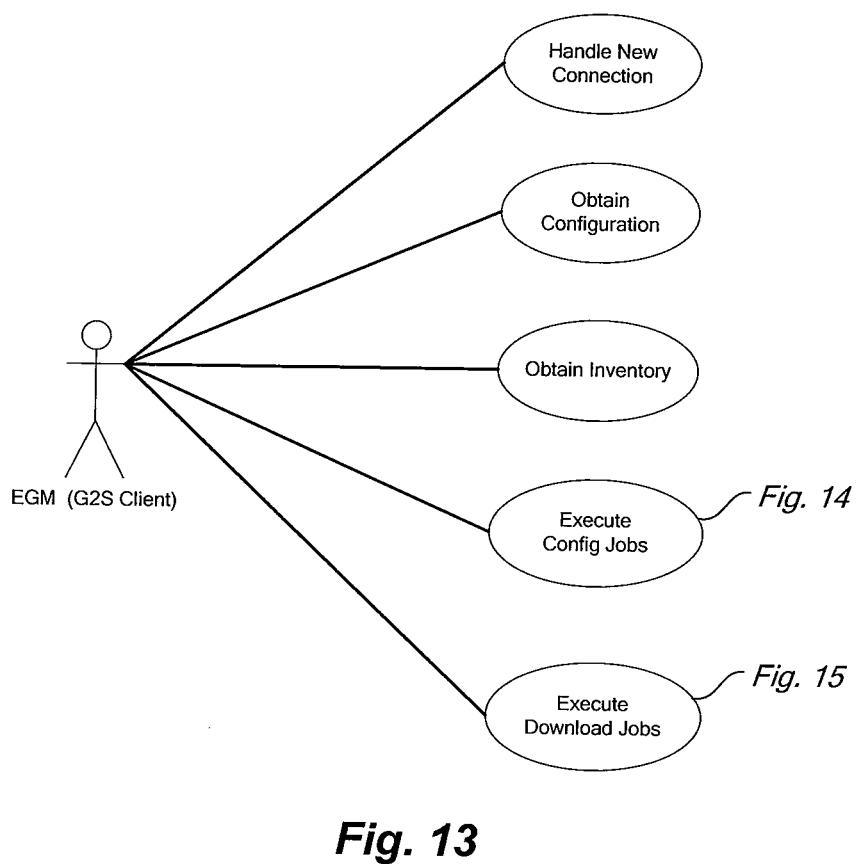
FIG. 13 is a flow diagram showing a download and configuration user tree logic to interact with various electronic game machines (EGMs) 213, according to one illustrated embodiment.

FIG. 13 shows an exemplary flow diagram for communicating (interacting) with EGMs 213, according to one illustrated embodiment.

Handle New Connection—When a G2S EGM first comes up, it will connect to a host address set manually at the EGM 213 or discovered via DNS or LDAP. This use case addresses the initial configuration activities that take place when the host accepts a new connection. For download and configuration, each handler listens for the commsStatus event and proceeds from there. By the time commsStatus says open, the initial handshake with the rest of the floor system may be completed and the EGM 213 may exist in the core database 231.

Obtain Configuration—Each EGM reports its current configuration settings, and reports the options it supports along with the range of valid settings for each option.

Obtain Inventory—EGMs 213 may report hardware and software inventory to the system.

Execute Configuration Jobs—Such is described in detail below with reference to FIG. 14.

Execute Download Jobs—Such is described in detail below with reference to FIG. 15.

Figure 14:
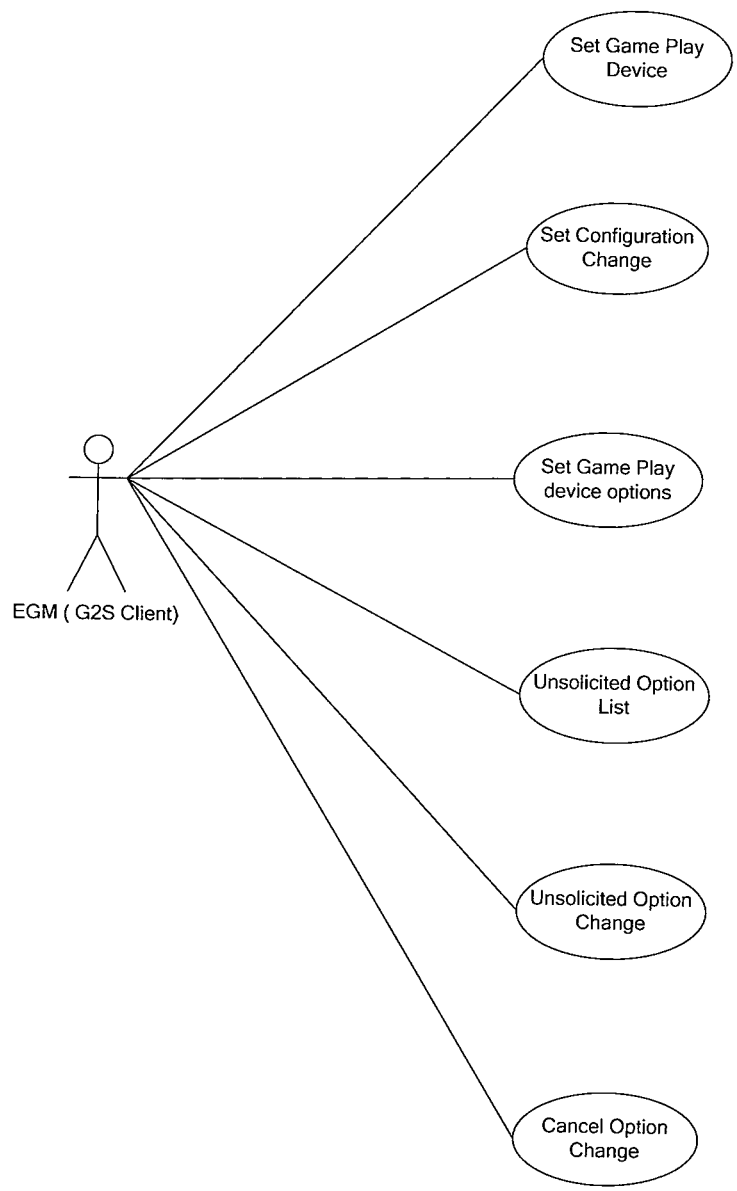
FIG. 14 is a flow diagram showing a download and configuration user tree logic to execute configuration jobs, according to one illustrated embodiment.

FIG. 14 shows an exemplary flow diagram for executing configuration jobs (assignments), according to one illustrated is shown:

Set Game Play Device—Send the sequence of commands used to define games on the EGM 213 as defined by the configuration assignment.

Set Configuration Change—Send the sequence of commands used to set options for all devices except game play devices as defined by the configuration assignment.

Set Game Play device options—Send the sequence of commands to set options for all game play devices as defined by the configuration assignment.

Unsolicited Option List—Handle an unsolicited OptionList command from an EGM. This command may cause the setting of EGM overrides in the configuration database 228.

Unsolicited Option Change—Handle an unsolicited Option Change command from an EGM. This may be logged as warning.

Cancel Option Change—When reviewing job status, a user may choose to cancel any job that has not completed. The host may send the required commands to the EGM 213 to cancel this job. If the job completes before this happens the cancel may fail.

Figure 15:
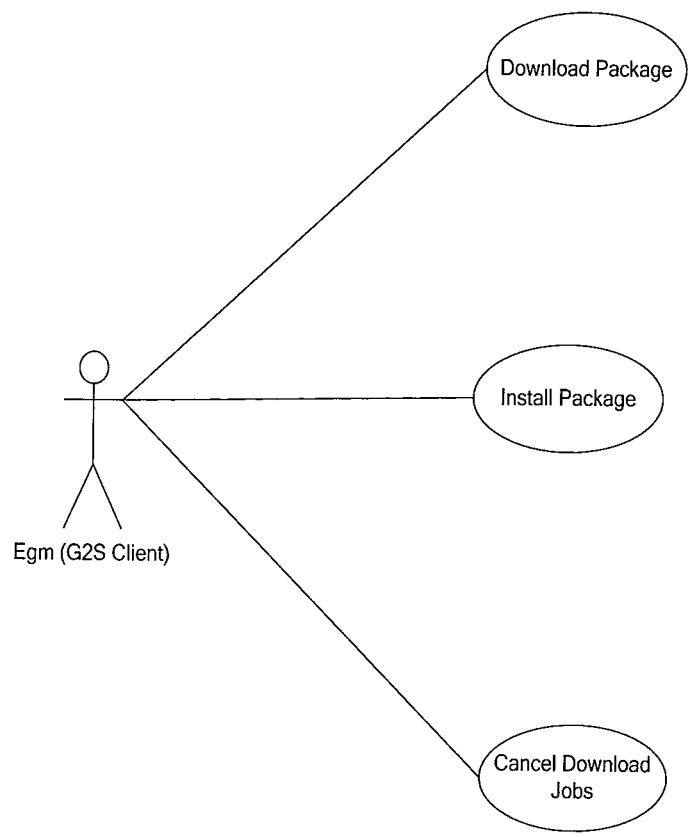
FIG. 15 is a flow diagram showing a download and configuration user tree logic to execute download jobs, according to one illustrated embodiment.

FIG. 15 shows an exemplary flow diagram for executing download jobs (assignments), according to one illustrated embodiment.

Download Package—Carry out the sequence of commands required to move the package from the SDDP 252 to the EGM 213 escrow area.

Install Package—When a package has been downloaded to one or more devices, the device escrows the package, verifies it is what it is professed to be, and awaits an "initiating event". In some embodiment the initiating event may be an attendant action at the EGM 213, at the system, or allowed to occur automatically. This use case covers the concept that a BCP user may manually initiate a package installation, or it may be automated at the system level to carry out the sequence of command required to install the package on the EGM 213.

Cancel Download Jobs—When reviewing job status, a user may choose to cancel any job that has not completed. The host may send the required commands to the EGM 213 to cancel this job. If the job completes before this happens the cancel will fail. Some EGMs 213 may not support canceling a download in midstream. If so, they will report this error and it will be displayed in the job status for the cancel job.

Figure 16:
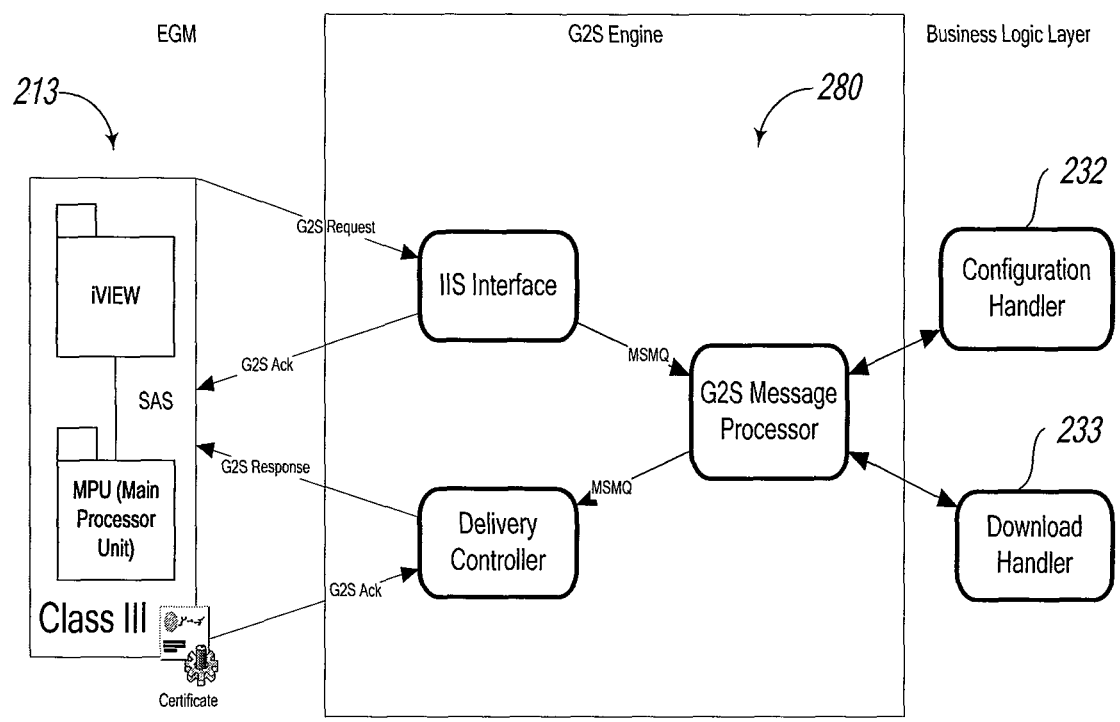
FIG. 16 is a flow diagram showing a method of handling down and configuration messages, according to one illustrated embodiment.

FIG. 16 shows an exemplary flow diagram for handling configuration jobs (assignments), according to one illustrated embodiment.

Figure 17:
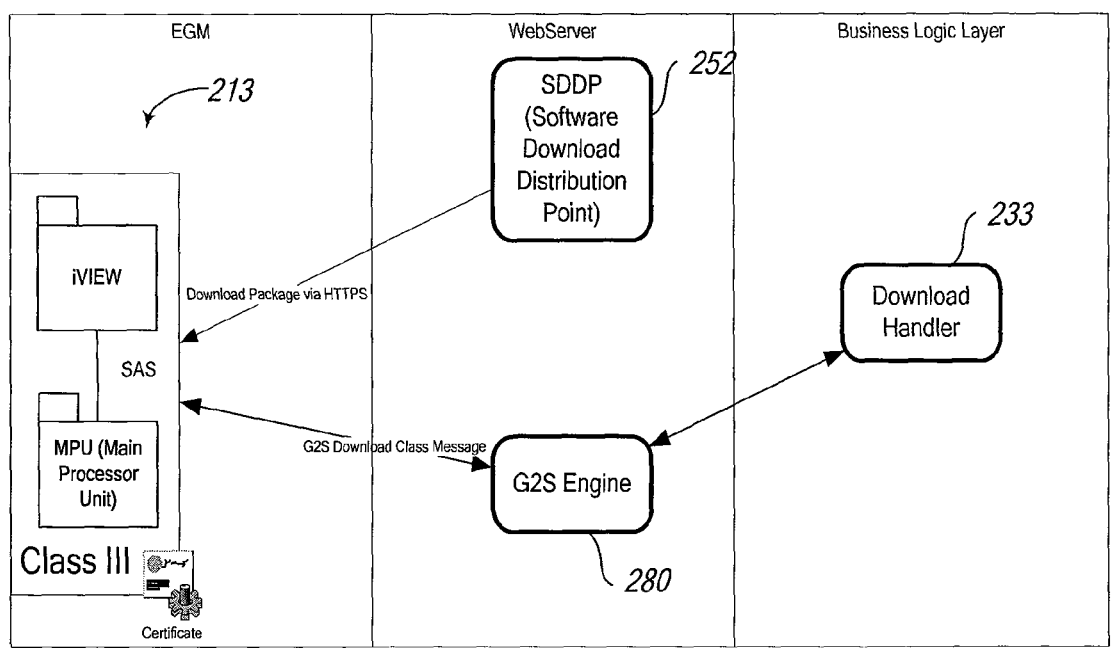
FIG. 17 is a flow diagram showing a method of downloading packages, according to one illustrated embodiment.

FIG. 17 shops an exemplary flow diagram for handling download packages, according to one illustrated embodiment.

Figure 18:
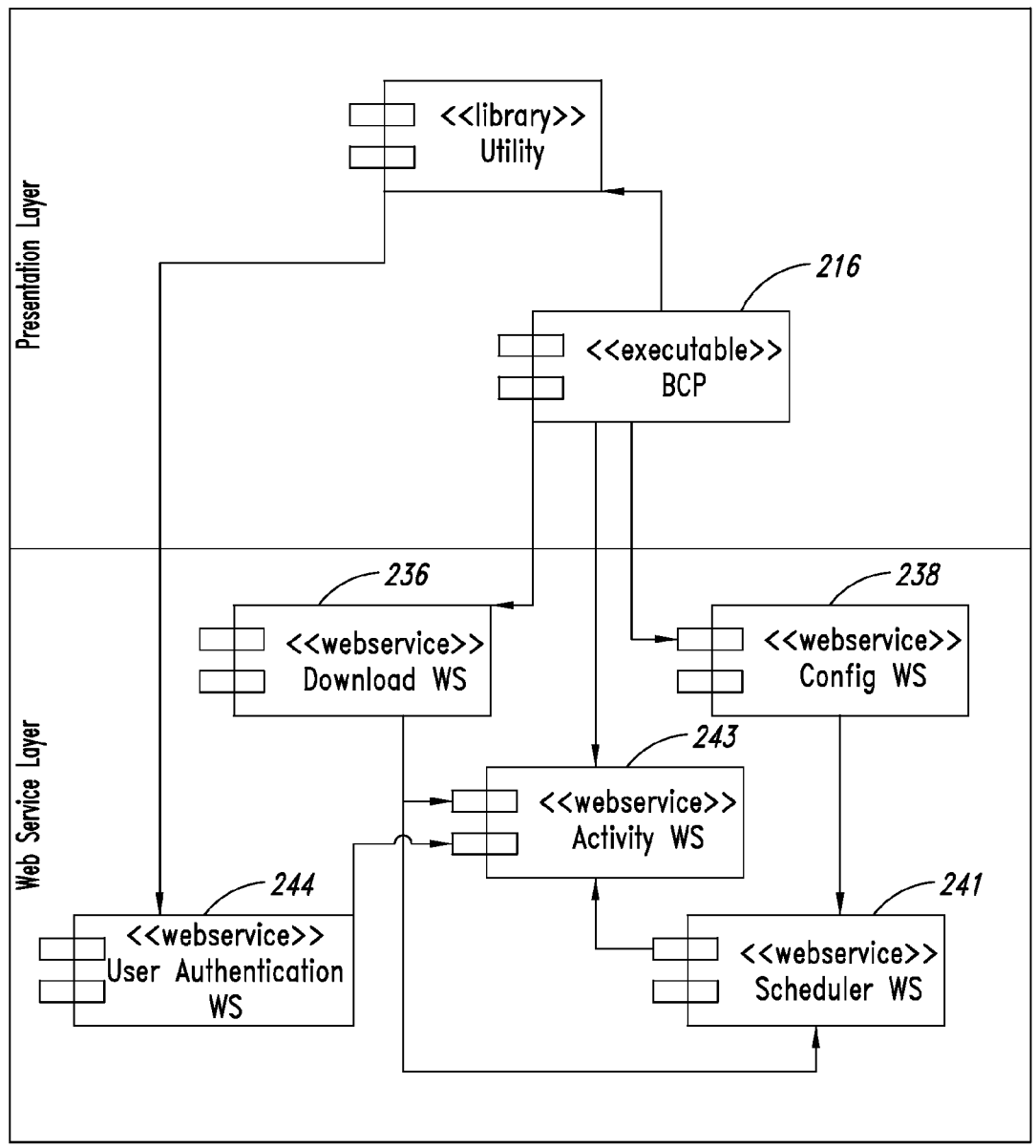
FIG. 18 is a block diagram showing various components of a DCL control panel, according to one illustrated embodiment.

FIG. 18 shows an exemplary block diagram of a control panel 216 componentization, according to one illustrated embodiment. In one embodiment, the Control panel 216 (BCP) is a window's forms Smart Client application that operates on control station 203 which may, for example, be a Pentium PC with a Microsoft Windows operating system or a Linux-based operating system with windows. The BCP 216 Application may encapsulate all the functionality to support the command and control portions of the download and configuration features of the project. The BCP 216 provides operators with an interface to remotely specify and control download and configuration functions for the EGM 213 or devices acting as EGMs 213 such as, for example, an IView or Game Controller. The BCP 216 also provides regulators and managers with the ability to review and approve these functions. The BCP 216 combines the functions of Download and Configuration into one application since they may be tightly linked and the metaphors or concepts used to make them visible to users may be substantially the same. Some terms associated with Download and Configuration are Named Collections, Assignments, Jobs, Manual Overrides, Notifications, Packages, Device Classes, Game Play Devices, Option Groups, and Option Items:

Named Collection: A set of EGMs 213 can be treated as or operated on as group in a manner similar to an Email Group.

Assignment: A set of download or configuration instructions grouped together as a "document" that can be saved, recalled, and reused. Common to Download and Configuration assignments are a name, description, and a group of EGMs 213 the assignment will apply to. A schedule may be attached to any assignment as well.

Download Assignment: An assignment that lists the packages that should be downloaded to the EGMs 213 in the assignment's collection as well as the installation rules to use.

Configuration Assignment: An assignment that lists the configuration options to be set on the EGMs 213 in the assignment's collection includes option items in option groups for ordinary device classes as well as G2S_gameplay device option groups.

Job: Encapsulation of the data and commands used to carry out an assignment. An assignment job will normally be split in to EGM jobs for each EGM referenced by the assignment.

Manual Overrides: If an operator opens the game cabinet and sets configuration options via the menus, these options are considered overridden by the EGM 213 and may retain their settings unless the override is explicitly cleared via an interface in the BCP 216.

Notifications: Any tasks or results that must be displayed to the user. In some embodiments, notifications require action of some sort such as, for example, approval. In other embodiments, notifications can simply be acknowledged. For example, if a download is saved and ready to run, it may first require regulator approval. The regulator can look in the notifications list, examine this entry, and approve or deny it.

Package: A structured file containing header information and the downloadable payload. This payload could be a Game OS, Game Theme, Removal Scripts, or any set of modules defined by the manufacturer. Packaged are stored on the Software Download Distribution Point (SDDP 252)

Device Class One of the predefined G2S device classes such as G2S_cabinet or G2S_gamePlay.

Game Play Device: A type of Device Class representing a game bundle or combination that is ultimately selectable by a player on the EGM 213. A Game Play device specifies a particular theme, pay table and denomination list.

Option Group: Each device class may have many option items which are arranged into named option groups.

Option Item: The root level configurable item. Option items are defined to have among other things an ID, name, type, value, default value, min and max values. Option items may also include a list of values. For example, "car color" might have the values "red" and "gold". One embodiment of the user interface is modeled after many common windows applications with dockable panes to show items one can navigate on or to display options. Another embodiment of the user interface includes a document area much like Visual Studio for displaying things like assignments that can be saved. The main windows or pains are listed in the composition section below.

The BCP 216 is a smart client application that may depend on the Dot Net 2.0 or similar framework. It may be deployed via the Systems Web site. Any software dependencies may be automatically downloaded with the application. The BCP 216 may run on Windows 2000 or newer OS machines. In one embodiment, as illustrated in FIG. 18, the BCP 216 communicates with the rest of the download and configuration network system solely through Web Services 223. The BCP 216 may, for example, utilize the Dot Net 2.0, Infragistics 5.3, and various conventional utility DLLs. These may be automatically downloaded and installed as part of an initial deployment on control station 201. In order to operate with the Web-based services, control station 201 may be connected to the Web and the BCP 216 application may be able to reach the Web server running said Web-based services. A user with proper credentials may be required to log in. Also, the workstation (control station 201) upon which the BCP 216 application is operating may need to be registered with the system (or identifiable as an authorized apparatus and/or software) via the System Web site before it may be allowed to connect.

The following are exemplary windows of the BCP 216 application that may be available.

EGM Navigator: A list of EGMs 213 that can be selected or dragged onto other windows.

Collection Navigator: List of named collections that have been saved

Override Navigator List of EGMs 213 with a current Manual override in affect.

Assignment Navigator: List of assignments that have been saved.

Inventory Pane: Show full details of one or more selected EGMs 213.

Find Results: Shows results of a search function.

Activity Pane: Show log of what's occurred since the application has launched. May also provide access to transaction logs throughout the system for selected periods of time including tracing activity related to a specific EGM, specific server, or any other network connected device receiving and/or transmitting data or instructions.

Download Assignment Wizard: Allows user to specify a download assignment. For example, the download assignment wizard may have panes such as: Identity, Packages, Schedule, and Review.

Configuration Assignment Wizard: Allows user to specify a configuration assignment. For example, the configuration assignment wizard may have panes such as: Identity, Device Options, Game Bundles, Schedule, and Review.

Floor Layout: A visual representation of the floor that can be used for navigation and selection in a manner equivalent to the EGM 213 navigator.

Notifications Tab: List of notifications for the currently logged in user.

Schedule Tab: Allows user to review jobs, see their status and or progress.

The application may also have a menu bar, toolbar, and status bar. Other dialogs such as an about box, logon dialog, change password dialog and error dialogs may be included.

In an example embodiment, the BCP 216 interacts directly with the following Web-based services: Activity, User Authentication, Download, and Configuration.

In addition to the Web Services 223, the BCP 216 may require file system access for local debug/trace logging. It may have no direct Database access. It may be capable of printing but does not require a printer to perform its functions. The BCP 216 uses the tradition .net processing model.

Figure 19:
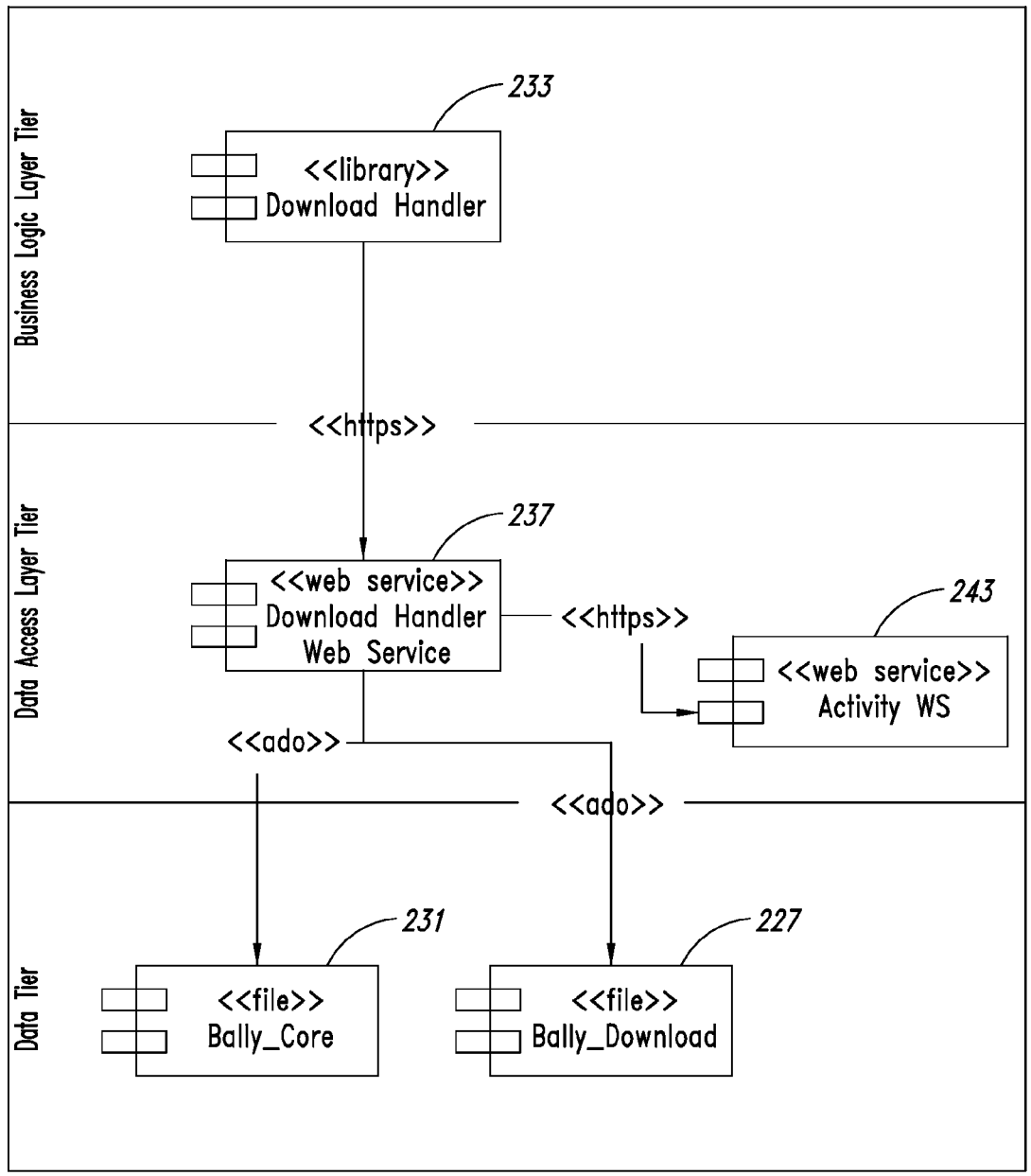
FIG. 19 is a block diagram showing a download handler, according to one illustrated embodiment.

FIG. 19 shows an exemplary block diagram of a download handler 233, according to one illustrated embodiment. The responsibilities of the Download handler 233 may include the following.

Poll for job requests

Translate job requests to G2S download class commands

Send G2S host command to destination EGMs 213

Process G2S command responses from EGMs 213

Process G2S events

Update job status

Update EGM State through Data Access Layer 222

In an example implementation, communication with EGM devices may be exclusively via G2S messages, and there may not be a connection with BCP or other clients which create work requests. The Download handler 233 may be a .Net assembly. The assembly may be loaded by the G2S Engine 280 and may run in the context of this process (service).

| Subcomponent | Description |
|---|---|
| Configuration | Private storage of settings, limits and constants. |
| Job Reader | Poll work queue from data tier |
| Protocol Translator | Transform job context to G2S commands |
| G2S Message Handlers | Process responses from EGMs to G2S host commands |
| Event Handlers | Process exceptions and state changes from EGMs |
| Logging | Output of event and diagnostics |
| Controller | Controls the processing |

The Download handler 233 may interact with the Data Tier 224, G2S Core, Activity (EGM events), and Microsoft Enterprise Library Logging components. In an example embodiment, there is no direct interaction to/from the end users. Job requests may be output to the database (Data Access Layer 222) and polled by the Download component.

Example Resources for the Download Handler 233:

| | |
|---|---|
| CPU | The Download handler may not require a dedicated processor. CPU utilization may be proportional to the quantity of messages processed. The traffic pattern of download messages may be a "burst" pattern where average/mean traffic is minimal, but peak message rates can be high. Generally, the Download handler may not require more than a single processor, but during peak download message peaks the G2S server may be processor constrained and enhancements may be anticipated for the G2S Engine to scale the application across multiple servers. |
| Disk | In an example embodiment, the download handler does not directly access disk resources. The Download handler interfaces to the Data Access Layer, Activity and Logging. Only minimal disk space for the assembly file (.dll) may be required. |
| Network | In an example embodiment, the download handler does not directly access network resources. The messages sent to/from EGMs are normally small and don't consume significant network resources apart from the bandwidth that may be required to download/update package files from the Download Services Point. |

The Data access layer 222 may store configuration and state information for the objects being managed by the download handler. Configuration files may be used to store all persistent data that is not stored in the Data tier 224. The distinction between storing a value in the configuration files instead of adding the element to the Data access layer 222 database and interface(s) can be arbitrary. For example, if there is a requirement to limit the maximum size for a package this value could be added to the Data access layer 222, or stored in a configuration file.

The configuration files may include, but are not limited to, values for:
1) settings required for testing; 2) limits and constraints; 3) constants.

The hierarchy for a value stored in a configuration data store may be:
i) File; ii) Section; and iii) Key/Value pairs.

Programmatic access to the configuration files may, for example, be with the Microsoft. Practices. EnterpriseLibrary- .Configuration namespace classes. These classes allow a single application to use multiple configuration files, and for multiple applications to share common configuration files. The details of the data store implementation are hidden from the Download component.

In an example embodiment, the Download handler 233 does not receive work requests directly from the Control panel 216 (BCP) client or the scheduling component. These components add/modify job records in the database via the Data Access Tier. The Download Service may have a subcomponent that will poll the job data via the Data Access Tier and update job status The interface between the Download Service and the Data tier 224 is a Web service. The required methods for polling and updating the job data may include: 1) GetJobList—A collection of all job requests. The method includes filtering parameters; 2) GetJob—Get a single job request; and 3) UpdateJob—Change the status of a job request.

The G2S Core may provide communication between the Download Service and the EGM 213 devices. Host commands may be sent from the Download Service to an EGM via the G2S Core Interface, and the G2S Core Interface may provide the response from the EGM 213. The G2S Core component(s) may provide persistent storage.

From G2S Message Protocol Download Class Draft v0.8 (hereby incorporated by reference), the requirements implicitly mandate that this interface provide the capability to send the following G2S host commands to an EGM:

Enable/Disable EGM download (setDownloadStatus)
Refresh EGM Enable/Disable State (getDownloadStatus)
Refresh EGM Download Profile (getDownloadProfile)
Download Package To EGM (addPzackage)
Create Package For Upload (createPackage)
Upload Package From EGM (updatePackage)
Delete Package From EGM (deletePackage)
Refresh Package Status (getPackageStatus)
Refresh EGM Package List (getPackageContents)
Refresh all EGM Packages Status (getPackageList)
Refresh Package Log Status (getPackageLogStatus)
Refresh Current Package Log(getPackageLog)
Set EGM Package Installation Script (setScript)
Remove Script from EGMs List of Scripts (deleteScript)
Authorize Script (authorizeScript)
Refresh EGM Script Status (getScriptStatus)
Refresh EGM Script List (getScriptList)
Refresh EGM Script Log Status (getScriptLogStatus)
Refresh EGM Script Log(getScriptLog)
Refresh EGM Module List (getModuleList)

Each of the above G2S host commands may need a response and the server system 201 may utilize handler(s) to process the EGM 213 response.

The Download Service may "register" to receive the following Events:
a) G2S_DLX (download exceptions). There are approximately 25 DLX events to be handled, and b) G2S_DLE (download events). There are approximately 30 DLE events to be handled.

The events indicate a change in the state of processing an SMP (Service Management Platform) command by an EGM 213. The processing of these events will update the database via the Data Access Layer interface. The processing actions are specified in the sequence diagrams for the download class commands.

The Data tier 224 provides an API (Application Program Interface) between the Download Service component and the database for storing the configuration/state information of the objects being managed by slot management system 101, and the "job" information that is the primary input source for the Download Service. Because these two sets of data objects (i.e., config/state and job) may be loosely coupled, they may be implemented as separate classes.

All download class command responses from the EGMs 213 may result in a database operation through the Data access layer 222, excluding event class commands, which may be processed through the Activity Interface independently of the Download Service. The methods required may correlate directly with the EGM 213 command responses except as noted. The required methods for processing command responses from the EGM 213 may include:

DownloadStatus
Download Profile
PackageStatus
PackageContents
PackageList (Collection of PackageStatus Nodes)
PackageLogStatus
PackageLogList
ScriptStatus
ScriptList
ScriptLogStatus
ScriptLogList
ModuleList The implementation of the Data access layer 222 interfaces may be a "synchronous" transaction, meaning that the success/failure of the database operation is included in the response.

In an example embodiment, some Business Rules include: a) an event record may be created for every request/response process with an EGM, via the Activity Web Service 243; b) package sizes may be limited to a configurable maximum size; and c) the OptionConfig handler may replicate the required EGM data from the Core database 231 to the Configuration database 228 in order to support reporting.

The Download handler 233 may consist of a single .Net assembly file. This assembly may be deployed to the disk location required by the G2S Engine 280.

Figure 20:
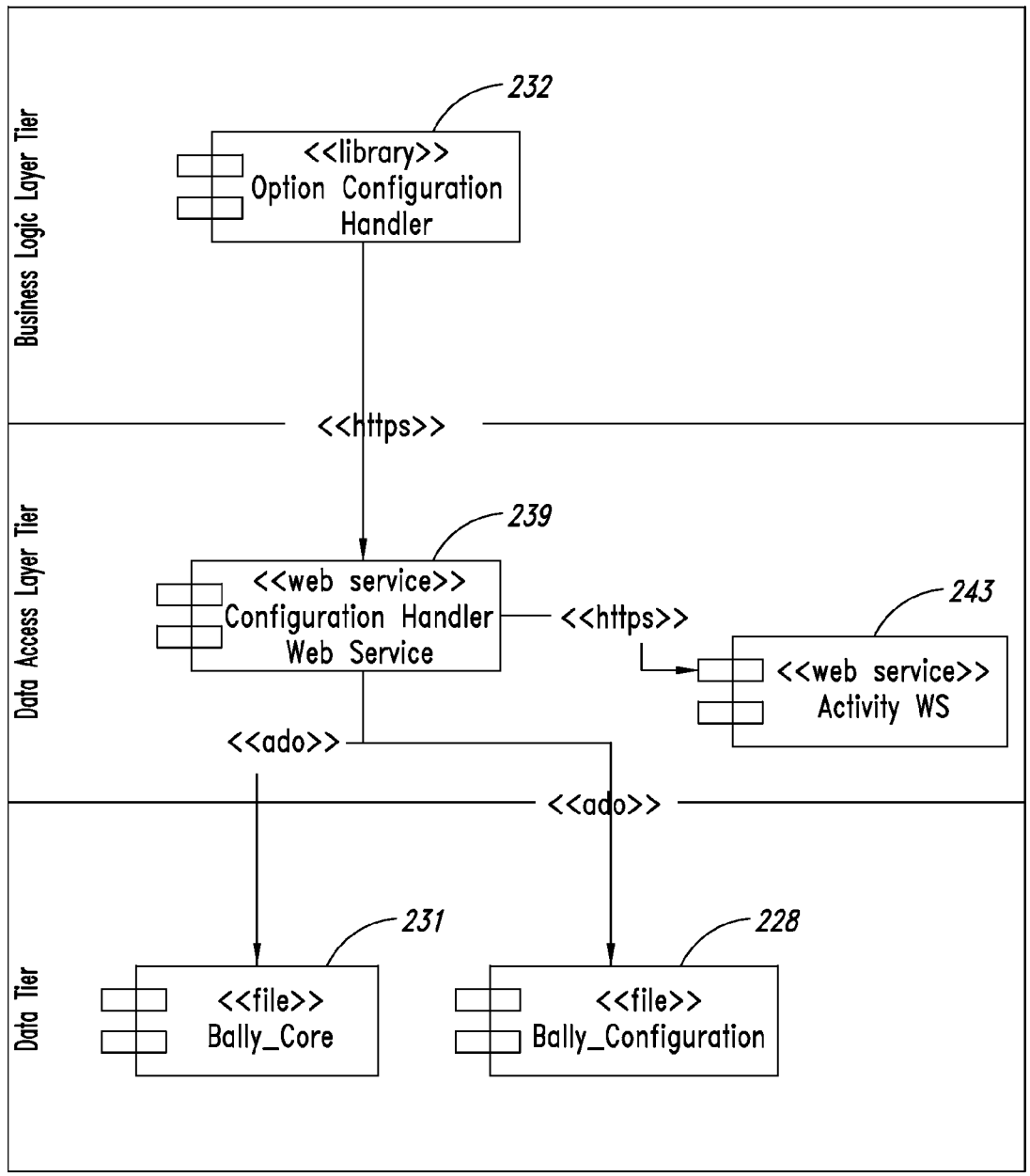
FIG. 20 is a block diagram showing a configuration handler, according to one illustrated embodiment.

FIG. 20 shows an exemplary block diagram of a configuration handler 232, according to one illustrated embodiment. Example responsibilities of OptionConfig handler may include:

Received unsolicited messages from EGMs 213
Persist the data the from the unsolicited messages to the Config Database
Manage and route G2S Messages
Process G2S command responses from EGMs 213
Process G2S events
Update job status Example Constraints may include: a) communication with EGM devices may be exclusively via G2S messages; and b) there may be no connection with BCP or other clients which create work requests.

An example Composition may include:

| Subcomponent | Description |
| --- | --- |
| Configuration | Private storage of settings, limits and constants. |
| Job Reader | Poll work queue from data tier |
| Protocol Translator | Transform job context to G2S commands |
| G2S Message Handlers | Process responses from EGMs to G2S host commands |

-continued

| Subcomponent | Description |
| --- | --- |
| Event Handlers | Process exceptions and state changes from EGMs |
| Logging | Output of event and diagnostics |
| Controller | Controls the processing |

The OptionConfig Service component may interact with the Data tier 224, G2S Core and the Activity (EGM events) components. The Data access layer 222 may store configuration and state information for the objects being managed by slot management system 101.

Configuration files may be used to store all persistent data that is not stored in the Data tier 224. The distinction between storing a value in the configuration files instead of adding the element to the Data Access Layer database and interface(s) can be arbitrary. For example, if there is a requirement to limit the maximum size for a package this value could be added to the Data Access Layer, or stored in a configuration file. The configuration files may include, but are not limited to, values for: 1) settings required for testing; 2) limits and constraints; and constants Programmatic access to the configuration files may be with the .Net Framework 2.0 System, incorporated by reference herein. Configuration namespace classes and the Microsoft Practices, Enterprise, Library, Common Configuration classes, are all incorporated by reference herein. These classes allow a single application to use multiple configuration files, and for multiple applications to share common configuration files.

In an example embodiment, the Option Config handler does not receive work requests directly from the Control panel 216 (BCP) client or the scheduling component. These components add/modify job records in the database via the Data Access Tier. The Download Service may have a subcomponent that will poll the job data via the Data Access Tier and update job status.

The interface between the Option Config Service and the Data tier 224 may be a Web service. Methods for polling and updating the job data may include: a) GetJobList—A collection of all job requests. The method includes filtering parameters; b) GetJob—Get a single job request; and c) UpdateJob—Change the status of a job request.

The G2S Core may provide the communication between the Option Config Service and the EGM 213 devices. In which case, Host commands may be sent from the Option Config Service to an EGM via the G2S Core.

According to some embodiments, the Option Config Service may "register" to receive the following Events: a) G2S_DLX (download exceptions). For example, there may be 25 DLX events to be handled; and b) G2S_DLE (download events). For example, there may be 30 DLE events to be handled.

The events may indicate a change in the state of processing an SMP (Service Management Platform) command by an EGM. The processing of these events will update the database via data access layer 222 interface. The processing actions may be specified in the sequence diagrams for the download class commands.

The Data tier 224 provides an API (Application Program Interface) between the OptionConfig Service component and the database for storing the configuration/state information of the objects being managed by slot management system 101, and the "job" information that may be the primary input source for the Download Service. Because these two sets of data objects (config/state vs job) may be loosely coupled, they may be implemented as separate classes.

Figure 21:
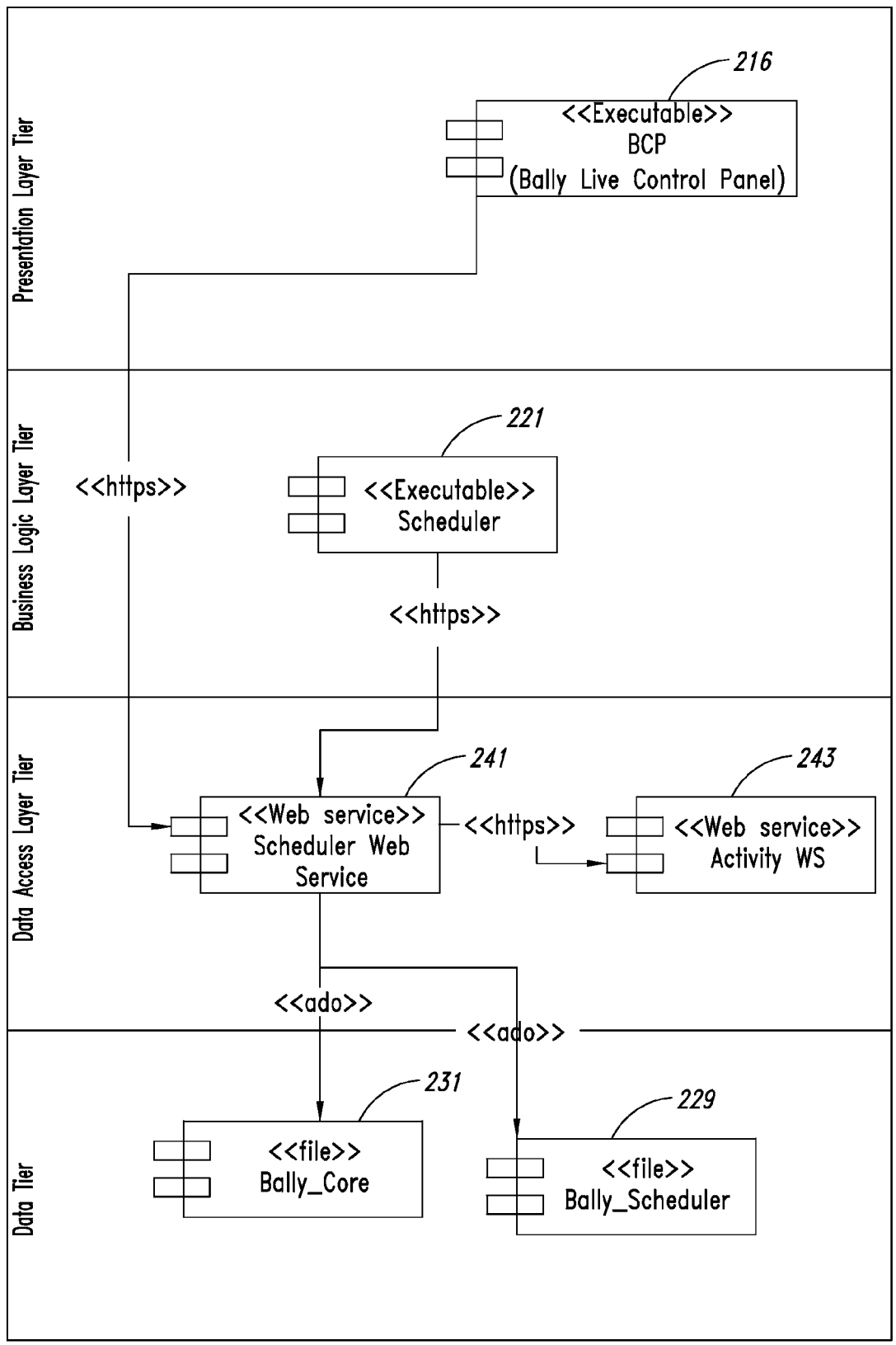
FIG. 21 is a block diagram illustrating a scheduler service, according to one illustrated embodiment.

All Option Config class command responses from the EGMs 213 may result in a database operation through data access layer 222. The methods may correlate directly with the EGM 213 command responses except as otherwise noted. According to one embodiment, the methods for processing command responses from the EGM 213 may include:

optionList
optionChangeStatus
setOptionConfigStatus
getOptionList
setOptionChange
cancelOptionChange
authorizeOptionChange
getOptionChangeLogStatus
getOptionChangeLog FIG. 21 shows an exemplary block diagram of a scheduler service 221, according to one illustrated embodiment. The Scheduler (Scheduler Service) 221 may be implemented as an executable program. According to one embodiment, there may be two types of Scheduling: Download Scheduling and Config Scheduling.

Configuration assignments may be run in order by schedule type: Permanent, Permanent with start date, Re-occurring Override, One Time Override. Within a schedule type, the assignment with the earlier start date may be initiated first. Within matching start dates, assignments having static collections may be initiated before dynamic; if still tied, those assignments with earlier create dates may be initiated first. Configuration assignments of permanent and permanent with start date may include static collections.

Download Scheduling gets the start date that download process begins. It may take an indeterminate amount of time for the downloaded package to be ready to be installed on a given EGM. Also, to avoid download conflict, if multiple download assignments exist for the same module type on an EGM, the assignment with the latest creation date takes precedence.

The Scheduler may be reliant upon the Schedule database 229.

An Example Scheduler Composition may Include:

| Subcomponent | Description |
| --- | --- |
| Error Handlers | Process and gracefully handle exceptions |
| Logging | Output of event and diagnostics |

Exemplary Interactions may include: 1) scheduler listens to Schedule database 229; 2) scheduler interacts with Schedule Web service; 3) the Web Service may, for example, include a Windows Server version 2000 or 2003 (hereby incorporated by reference) with the following Windows components running: a).net Framework version 2.0 and/or b) Internet Information Server (IIS 260)

Processing—The Scheduler service 221 may query the Schedule database 229 for jobs that are scheduled to be run. The Scheduler may initiate the processing of the jobs by notifying the GUI Download Web Service 262 or the GUI Configuration Web Service 264.

Interface/Exports—The Scheduler service 221 may consume the Activity Web Service 243 to log its processing events. The Scheduler service 221 may also interact with the Schedule SQL database with ActiveX Data Objects (ADO) commands.

Figure 22:
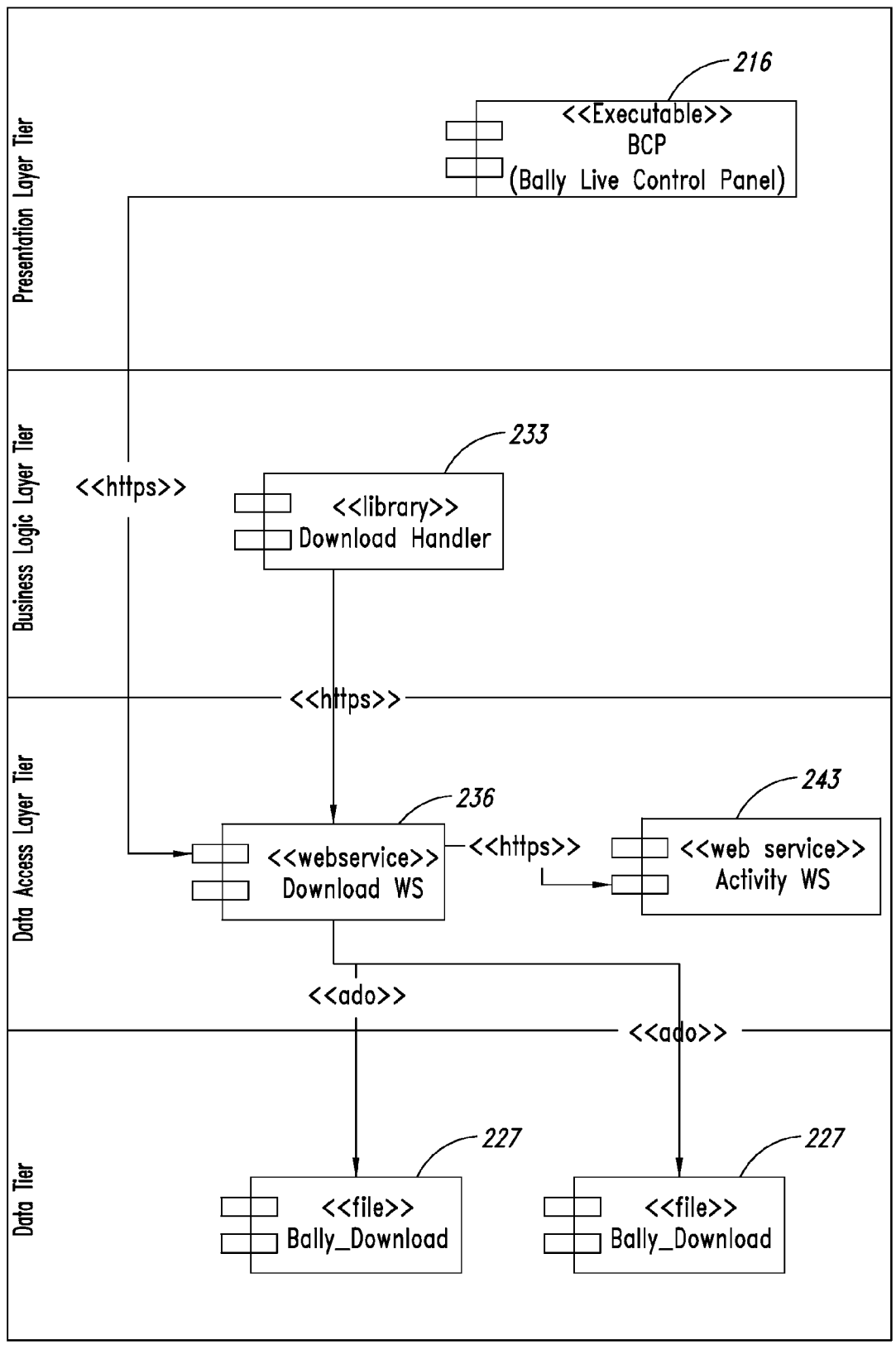
FIG. 22 is a block diagram illustrating a user interface download Web service, according to one illustrated embodiment.

FIG. 22 shows an exemplary block diagram of a user interface download Web service 262 according to one illustrated embodiment.

Classification—Web Service

Definition—The Web Service may expose Web Methods to consuming components to allow the interaction with the Download database 227.

The data access logic for the BCP 216 to interact with the Download database 227 may be included within the Download Web service 236.

The GUI Download Web Service 262 may be responsible for interacting with the Data tier 224 for those components that are consuming its exposed methods.

The BCP 216 may consume this Web Service and utilize its Web Methods to create and read necessary Download data in the database.

The GUI Download Web Service 262 may be used by the BCP 216 as a communication layer with the Download database 227.

Example Constraints may include: 1) consuming components may need to communicate via the Simple Object Access Protocol (SOAP) in order to consume the Web Service; 2) the Web Service may publish a Web Service Description Language (WSDL) to describe the Web service, the message format and protocol details; and 3) the Web Service may return its requested results in the form of a Serialized DataSet.

An Example Composition may Include:

| Subcomponent | Description |
| --- | --- |
| SOAP Proxy | Communication |
| Data Access Handlers | Process requests made by consuming components by communicating with the database with ActiveX Data Objects (ADO) logic |
| Error Handlers | Process and gracefully handle exceptions |
| Logging | Output of event and diagnostics |

Example Interactions may include
The GUI Download Web Service 262 may interact specifically with the Control panel 216 (BCP) via Simple Object Access Protocol (SOAP).
The GUI Download Web Service 262 may interact with the Download SQL database with ActiveX Data Objects (ADO) logic.
The Web Service may, for example, include a Windows Server version 2000 or 2003 with the following Windows components running: a) .net Framework version 2.0 and/or b) Internet Information Server (IIS 260)

Processing—The GUI Download Web Service 262 may process requests made by consuming components. The requests may be made by the consuming component calling the GUI Download Web Service 262 exposed Web Methods. A successful request may be dependent upon the consuming component calling a Web Method by supplying the appropriate query parameters as dictated by the Web Service Description Language (WSDL) file. The Web Service processes the request by executing its embedded Business Logic while logging exceptions and events. The resulting output is returned to the consuming component.

Interface/Exports

The GUI Download Web Service 262 may consume the Activity Web Service 243 to log its processing events. It may also interact with the Download SQL database with ActiveX Data Objects (ADO) commands. Its capabilities may be exposed as Web Methods which are accessed via the Simple Object Access Protocol (SOAP).

Figure 23:
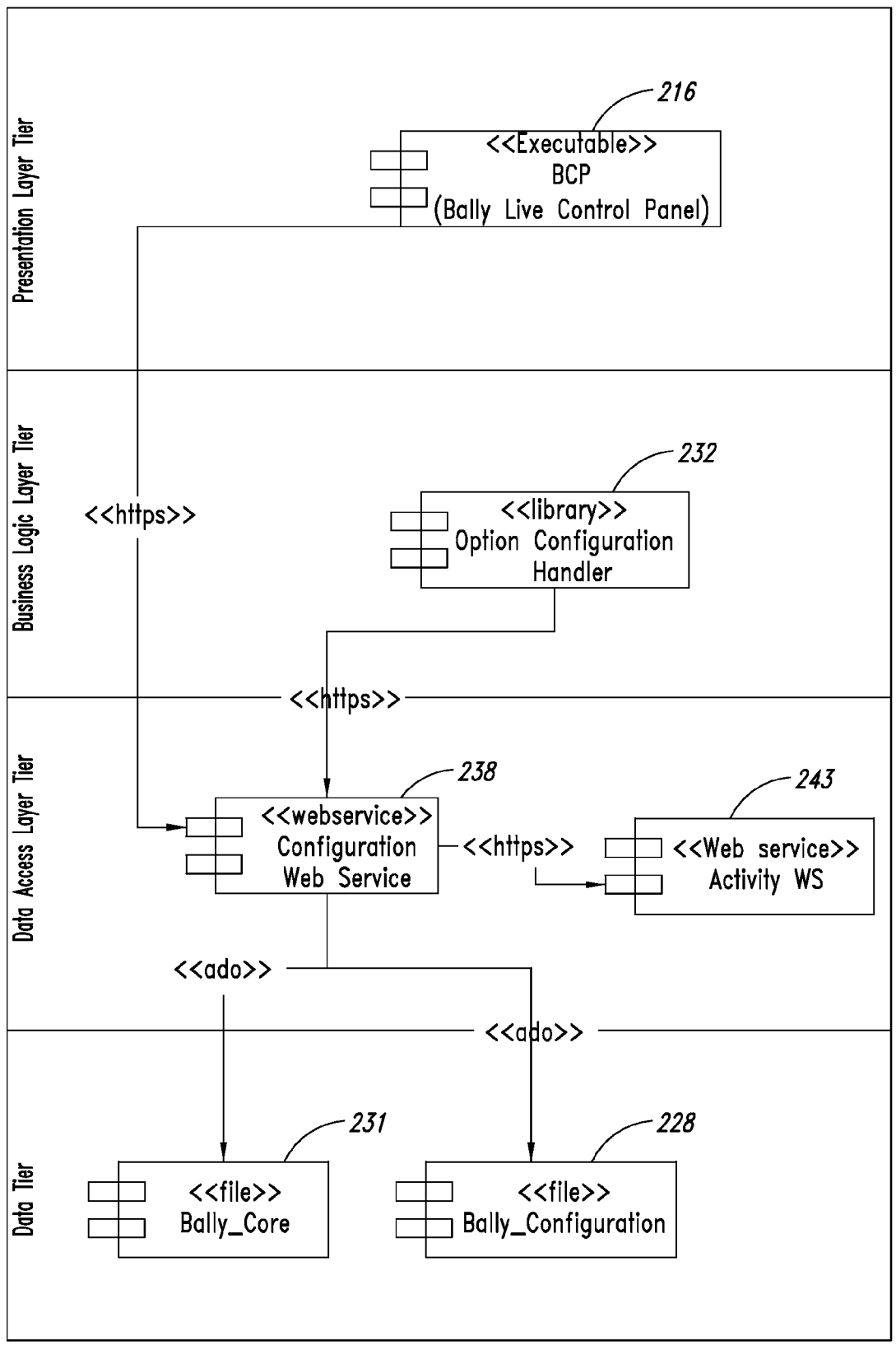
FIG. 23 is a block diagram illustrating a user interface configuration Web service, according to one illustrated embodiment.

FIG. 23 shows an exemplary block diagram of a user interface configuration Web service, according to one illustrated embodiment.

Classification—Web Service

Definition—This Web Service may expose Web Methods to consuming components to allow the interaction with the Configuration database 228. The data access logic used for the BCP 216 to interact with the Configuration database 228 may be arranged within the Configuration Web service 238.

The Configuration Web service 238 may be responsible for interacting with the Data tier 224 for those components that are consuming its exposed methods.

The BCP 216 may consume the Configuration Web service 238 and utilize its Web Methods to create and read necessary Option Configuration data in the database.

The Configuration Web service 238 may be advantageously used by the BCP 216 as communication layer with the Configuration database 228.

Example Constraints may include: 1) consuming components may communicate via the Simple Object Access Protocol (SOAP) in order to consume the Web Service; b) the Web Service may publish a Web Service Description Language (WSDL) to describe the Web service, the message format and protocol details; and c) the Web Service may return its requested results in the form of a Serialized DataSet.

An Example Composition may Include:

| Subcomponent | Description |
| --- | --- |
| SOAP Proxy | Communication |
| Data Access Handlers | Process requests made by consuming components by communicating with the database with ActiveX Data Objects (ADO) logic |
| Error Handlers | Process and gracefully handle exceptions |
| Logging | Output of event and diagnostics |

Example Interactions may include:

The GUI Configuration Web Service may interact with the Control panel 216 (BCP) via Simple Object Access Protocol (SOAP).

The Configuration Web service 238 may interact with the Configuration SQL database with ActiveX Data Objects (ADO) logic.

The Web Service may, for example, include a Windows Server version 2000 or 2003 with the following Windows components running: a) .net Framework version 2.0 and/or b) Internet Information Server (IIS 260).

The GUI Configuration Web Service may process requests made by consuming components. The requests may be made by the consuming component calling the GUI Configuration Web Services exposed Web Methods. A successful request may be dependent upon the consuming component calling a Web Method by supplying the appropriate query parameters as dictated by the Web Service Description Language (WSDL) file. The Web Service processes the request by executing its embedded Business Logic while logging exceptions and events. The resulting output is returned to the consuming component.

Example Interface/Exports may include:

The GUI Configuration Web Service may consume the Activity Web Service 243 to log its processing events. It may also interact with the Configuration SQL database with ActiveX Data Objects (ADO) commands. Its capabilities may be exposed as Web Methods which are accessed via the Simple Object Access Protocol (SOAP).

Figure 24:
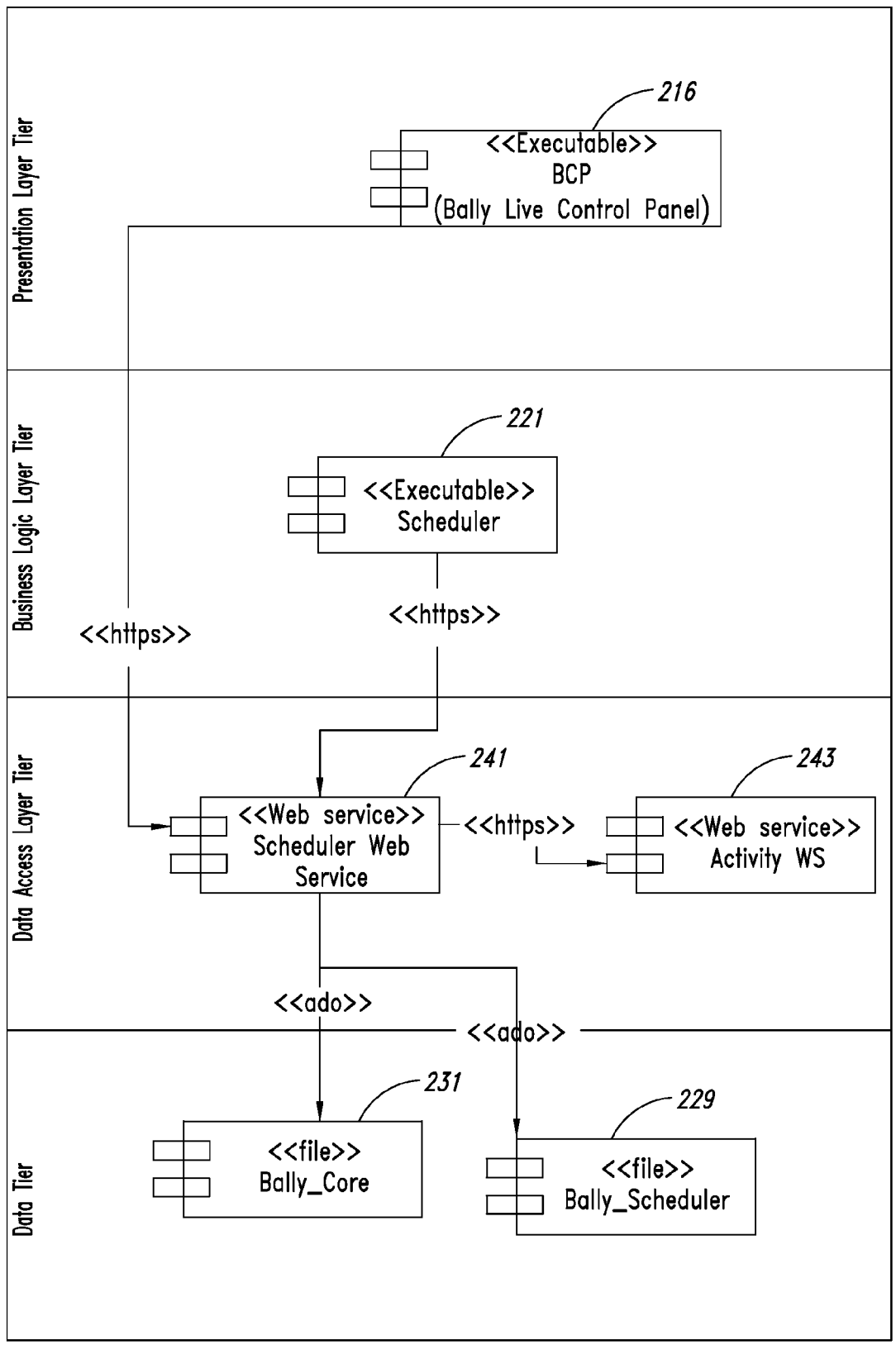
FIG. 24 is a block diagram illustrating a scheduler Web service, according to one illustrated embodiment.

FIG. 24 shows an exemplary block diagram of a scheduler Web service 241, according to one illustrated embodiment.

Classification—Web Service

Definition—According to one embodiment, the scheduler Web service 241 exposes Web Methods to consuming components to allow the interaction with the Scheduler database. The data access logic used for the Scheduler to interact with the Scheduler database may be included within the Scheduler Web service 241.

Exemplary Constraints may include: 1) consuming components may communicate via the Simple Object Access Protocol (SOAP) in order to consume the Web Service; 2) the Web Service may publish a Web Service Description Language (WSDL) to describe the Web service, the message format and protocol details; and 3) the Web Service may return its requested results in the form of a Serialized DataSet.

An example Composition may Include:

| Subcomponent | Description |
| --- | --- |
| SOAP Proxy | Communication |
| Data Access Handlers | Process requests made by consuming components by communicating with the database with ActiveX Data Objects (ADO) logic |
| Error Handlers | Process and gracefully handle exceptions |
| Logging | Output of event and diagnostics |

Example Uses/interactions may include:

The Scheduler Web service 241 interacts specifically with the Scheduler component via Simple Object Access Protocol (SOAP).

The Scheduler Web service 241 interacts with the Scheduler SQL database with ActiveX Data Objects (ADO) logic.

Example platform for the Web Service may include a Windows Server version 2000 or 2003 with the following Windows components running a) .net Framework version 2.0 and/or b) Internet Information Server (IIS 260).

Example Processing may include:

The Scheduler Web service 241 may process requests made by consuming components. The requests are made by the consuming component calling the Scheduler Web service 241 exposed Web Methods. A successfully request may be dependent upon the consuming component calling a Web Method by supplying the appropriate query parameters as dictated by the Web Service Description Language (WSDL) file.

The Web Service may process the request by executing its embedded Business Logic while logging exceptions and events. The resulting output may return to the consuming component.

Example Interface/Exports may include:

The Scheduler Web service 241 may consume the Activity Web Service 243 to log its processing events. It may also interact with the Scheduler SQL database with ActiveX Data Objects (ADO) commands. Its capabilities may be exposed as Web Methods which are accessed via the Simple Object Access Protocol (SOAP).

Figure 25:
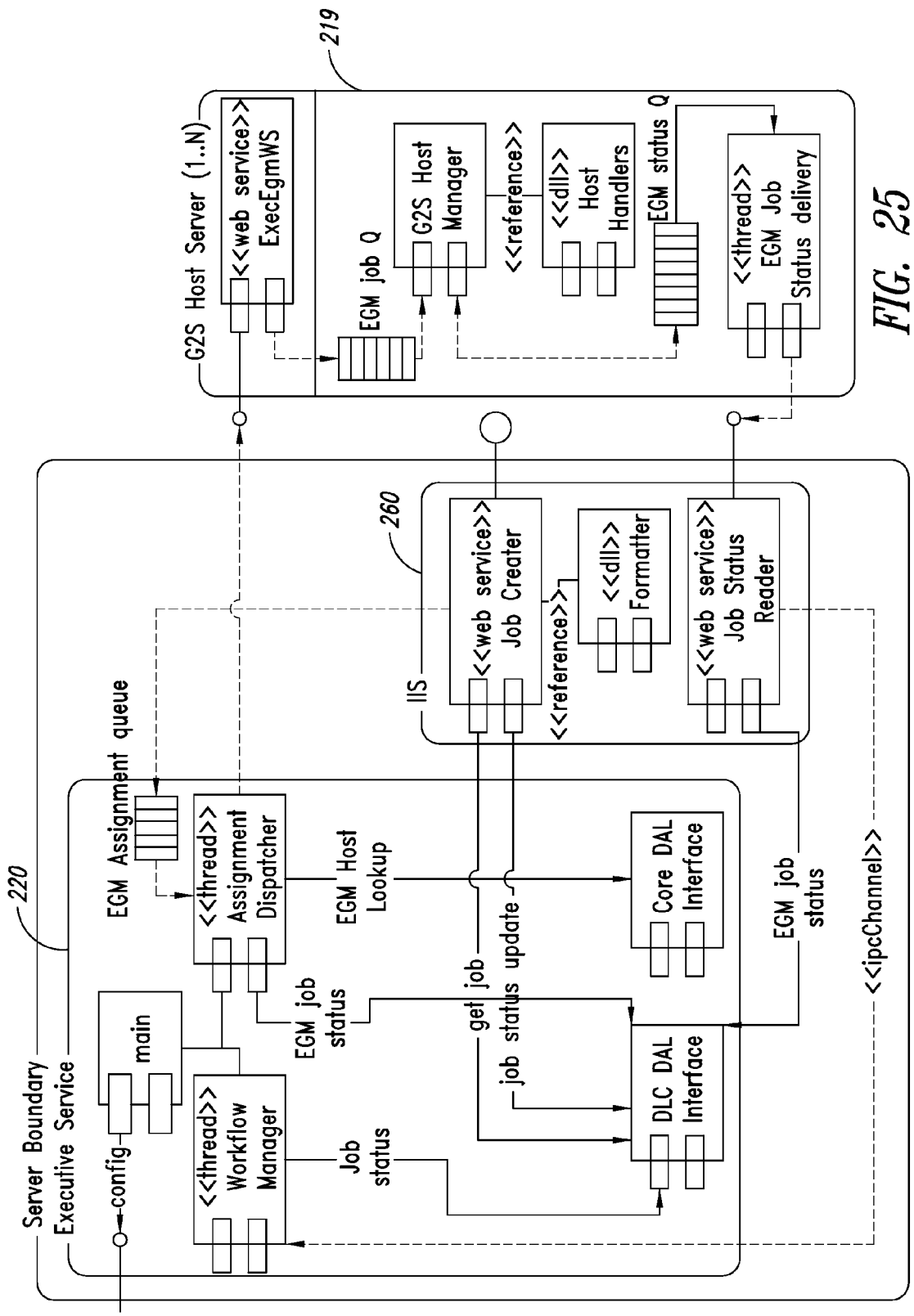
FIG. 25 is a block diagram showing an executive unit, according to one illustrated embodiment.

FIG. 25 shows an exemplary block diagram of an executive unit, according to one illustrated embodiment. According to one embodiment, the responsibilities of the Executive component may include: 1) receive job notifications from the Scheduler; 2) determine destination G2S Host for a given EGM assignment; 3) deliver an assignment job to the destination G2S Host; 4) receive status updates from G2S Hosts; 5) update job assignment status in the data store (via Web Services 223 Tier); 6) manage workflow of job and job steps; and 7) automatic recovery of work flow processing upon start up.

Example Constraints may include: a) there may be no direct connection with the Presentation Layer (BCP) or EGM devices and/or b) inter-server communications may be secure. For example, a Secure Sockets Label (SSL) Web service is one approach to provide secure communications.

An example Composition may include:

The Executive component may be multiple components.
Deployment may include an executable program deployed as, for example, a Windows Service, IIS 260 Web services deployed on the same server as the Windows Service, and IIS 260 Web services deployed on each G2S Host Server 211.

| Subcomponent | Description |
| --- | --- |
| Job Creator | Interface for receiving job requests. Transforms jobs to individual Egm Assignments and adds to the EGM 213 Assignment Queue for delivery to the destination EGM host. |
| Assignment Dispatcher | Reads the EGM 213 Assignment Queue. Determines the G2S Host currently providing the G2S Host device for a given EGM/Device pair and delivers EGM assignment to that G2S Host. |
| EGM Assignment Status Reader | Receive job status updates and updates the device class database (e.g., Config and Download) and notifies the Workflow Manager of the status change. |
| Workflow Manager | Determines changes to job status and assignment status from the EGM 213 assignment status. Controls the order and flow of multi-sequence assignment jobs. |
| DAL Interfaces | Encapsulate database access to the job assignment data and EGM Core data. |
| G2S Executive Interface | Receives EGM assignment from the Assignment Dispatcher. The assignment is relayed to the G2S Host's Executive Queue, which is read by the G2S Host and forwarded to the destination EGM. |
| EGM Job Status Delivery | Sends EGM status data from the G2S Host to the Executive's EGM Assignment Status Reader. |
| Logging | Output of event and diagnostics |

Example Uses/interactions may include:

The Executive component interacts with the Scheduler, Data Tier Web Services, G2S Core, Activity (EGM events), and Logging components. There may be no direct interaction to/from the end users (Presentation Layer) or the EGM 213 devices.

The Executive may receive the following from the Scheduler via the Job Reader interface: a) run new job (See e.g., FIG. 14 and FIG. 15) and/or b) cancel pending job (See e.g., FIG. 11 and FIG. 14)

Example Resources may Include:

| | |
| --- | --- |
| CPU | The traffic pattern of incoming requests is not expected to be high and the processing requirements are minimal. This component may not require a dedicated processor and should scale to 2500 EGMs utilizing under 20% CPU resources |
| Disk | The Executive component may not directly access disk resources. The interactions to data access layer 222, Activity and Logging may require disk space. The Scheduler queue and G2S Host queue, but the quantity and size of the messages in these queues is not significant. Only minimal disk space for the assembly file (.dll) may be required. |
| Database | The Execute component may generate a small number of database read, insert and update queries, the quantity of which is proportional to the number of assignment operations. |
| Network | This component interacts with the Scheduler, G2S Host and Web Services data tier across the network. The quantity of data for all these transactions is small and should not create significant traffic on the network. |

Example Configuration Interface may include:

Data access layer 222 may store configuration and state information for the objects being managed by slot management system 101. Configuration files will be used to store all persistent data that is not stored in the Data tier 224. The configuration files may include, but are not limited to, values for: a) settings required for testing; b) limits and constraints; and c) constants.

Configuration data values that may be shared across multiple applications include: 1) executive host; 2) G2S host(s); 3) executive job interface Uri (referenced by Scheduler); 4) outbound G2S Host job queue (referenced by G2SHost) and/ or 5) inbound G2S Host job status queue (referenced by G2SHost).

Programmatic access to the configuration files may be with the Microsoft.Practices.EnterpriseLibrary.Configuration namespace classes. These classes allow a single application to use multiple configuration files, and for multiple applications to share common configuration files. The details of the data store implementation are hidden from the Executive component.

The configuration for the Job Reader Interface may be in the system.runtime.remoting section of the application configuration file. The Scheduler may require the client configuration, and the Executive may use the service and channels configuration. The host name (or some form of identification) may be used for the client remoting configuration. If the Scheduler and Executive are not collocated on the same server and failover is required then a virtual IP address or host name in the client configuration may be used.

An example Job Creator may be incorporated as follows:

The Executive receives job requests from the Scheduler via a Web service interface. This Web service interfaces with the Job Creator component and may comprise two methods of calls: RunJob and CancelJob. The parameters may include the data that identifies the job.

The Job Creator reads the EGM 213 assignments comprising the job from the database via data access layer 222 subcomponents and outputs the individual EGM assignments to the Assignment Dispatcher via a Message Queue. The items in the queue are an internal representation of the EGM 213 assignment. That is, the items may not be G2S messages or any standard representation and may be consumed by internal components.

The Web service interface may be encapsulated into a proxy class whose assembly may be used by the caller (Scheduler). The classes referenced by the interface may be in an assembly shared by both the Scheduler and Executive classes.

The name of the EGM 213 Assignment message queue may be known to both the Job Creator (writer) and Assignment Dispatcher (reader) and may be included in the configuration data store for the respective components.

An example Assignment Dispatcher may be incorporated as follows:
The EGM 213 assignments created by the Job Creator are consumed by the Executive service 220, transformed to the destination format and dispatched to the appropriate G2S Host to which is providing G2S services to the destination host.
The destination information for the EGM 213 Assignment is determined by a database query via data access layer 222 subcomponents. The destination information includes the target server and delivery method/protocol (only G2S for this project).
The objects read from the EGM 213 Assignment Queue are transformed from an internal representation to the format required by the destination. For G2S, the delivery method is a Web service interface exposed by the
This interface to the G2S Host is encapsulated into a proxy class. The classes referenced by the interface will be in an assembly shared by both the Assignment Dispatcher and Executive EGM Web service component.

An example EGM Assignment Web Service may be incorporated as follows:
The G2S Host Handlers will send progress and/or completing status of the EGM 213 assignment to the Job Status Reader subcomponent. This interface will be a private Message Queue. The handlers write to this queue and the EGM 213 Assignment Delivery component will read from the queue and deliver to the Executive's Job Status Reader.
The EGM 213 Assignment Delivery component is a thread within the G2S Host and may require modification to the G2S Host to launch and terminate this thread.
This interface to the Job Status Reader is encapsulated into a proxy class. The classes referenced by the interface will be in an assembly shared by both this component and the Job Status Reader.

An example Job Status Reader may be incorporated as follows:
The Job Status Reader is the interface between the G2S Host's EGM Assignment Delivery and the Executive. This component updates the EGM 213 Assignment status in the appropriate database(s), and notifies the Workflow Manager of the state change.
The Job Status Reader is a Web service deployed on the same server as the Executive service 220 to allow intra-server communication methods to the Workflow Manager rather than requiring yet another Web service interface.

An example Workflow Manager may be incorporated as follows:
The Workflow manager may be responsible for determining when updating a job's status based of the status of the EGM 213 assignments of which the job is composed. For example, if there is an assignment for 5 EGMs 213, then after the fifth EGM assignment is at a terminal state then the job status is at a terminal state.
The Workflow Manager will also contain business logic for controlling workflow of multi-sequence job assignments with conditional logic between job assignment sequences. For example, a denomination change is executed after a game theme change is successfully completed. Conditional logic may not be within the scope of this project.
The Workflow Manager may be a thread within the Executive service 220.

An example EGM Job Status Delivery may be incorporated as follows:
The G2S Host Handlers will send progress and/or completing status of the EGM 213 assignment to the Job Status Reader subcomponent. This interface will be a private Message Queue. The handlers write to this queue and the EGM 213 Assignment Delivery component will read from the queue and deliver to the Executive's Job Status Reader.
The EGM 213 Assignment Delivery component is a thread within the G2S Host and may require modification to the G2S Host to launch and terminate this thread.
This interface to the Job Status Reader may be encapsulated into a proxy class. The classes referenced by the interface may be in an assembly shared by both this component and the Job Status Reader.

An example Activity Interface may be incorporated as follows:
The Executive may send log information to the Activity Recorder via the Activity Recorder Web Service. The interfaces implemented for the Floor System may be used and no enhancements required.

An example Data Access Layer Interfaces may be incorporated as follows:
The Data tier 224 provides an API between the Executive component and the database for storing the configuration/state information of the objects being managed by Download and Configuration server network 201, and the "job" information. While there are three separate databases, the database may hide the details of the physical implementation from the Executive.
The Executive may request or effectuate the following transactions via data access layer 222: 1) query job assignments for a given schedule; 2) query EGM server identify given the EGM 213 ID and G2S host class; 3) update EGM Job status; 4) update Assignment Job status; and 5) get next EGM Job step.
The implementation of data access layer 222 interface may be a "synchronous" transaction, meaning that the success/failure of the database operation may be included in the response.
Example Business Rules may include an event record may be created for every request read from the Job Reader interface.

Figure 26:
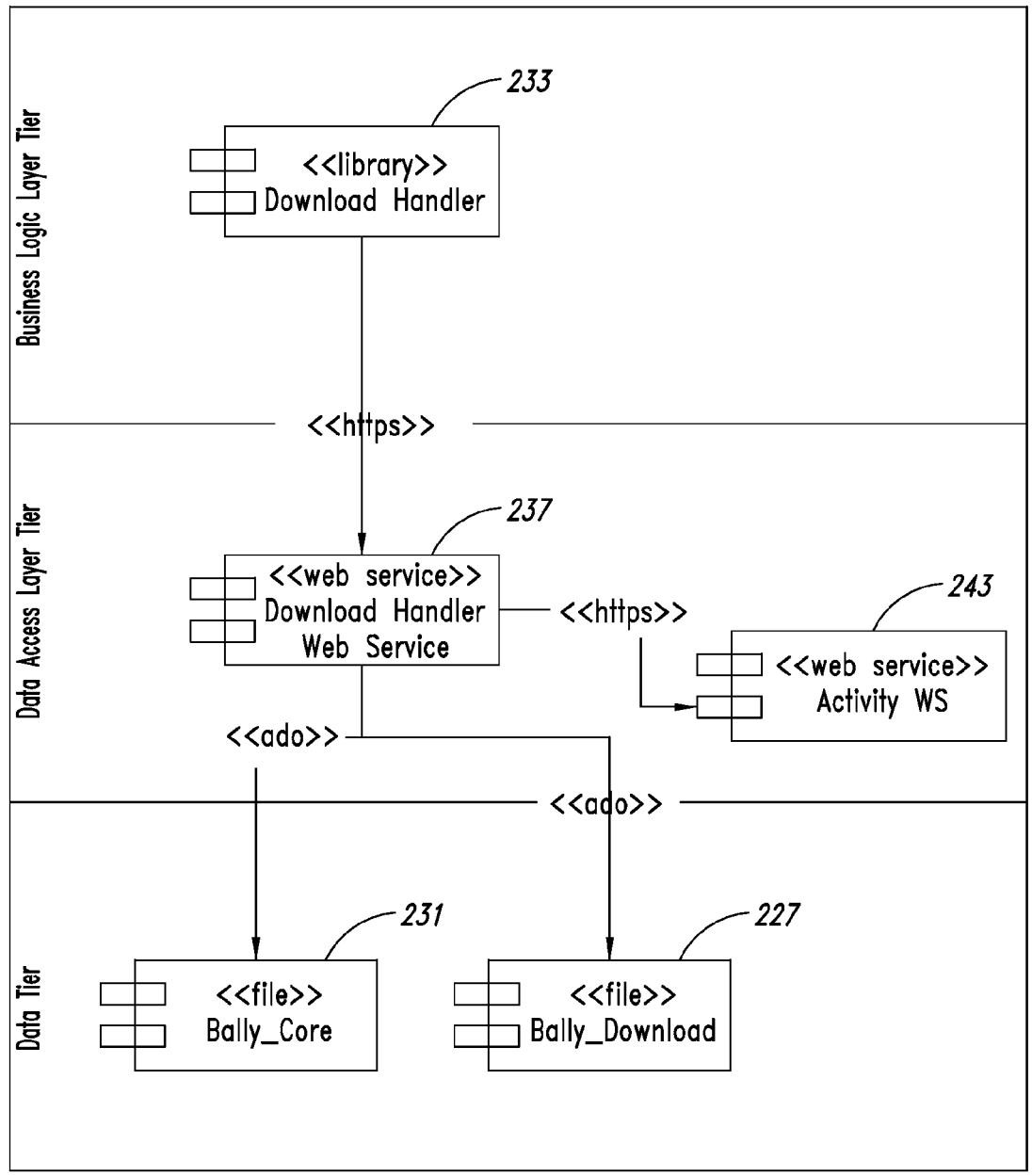
FIG. 26 is a block diagram illustrating a download handler Web service, according to one illustrated embodiment.

Example Deployment Requirements may include the Executive being deployed in four separate components: 1) executive Windows Service, 2) executive IIS 260 Web services (2), 3) G2S Executive IIS 260 Web service; and 4) G2S Host.
Configuration file(s) may also be used for the deployment.
FIG. 26 shows an exemplary block diagram of a download handler Web service, according to one illustrated embodiment.

Classification—Web Service

Definition—This Web Service may expose Web Methods to consuming components to allow the interaction with the Download database 227. The data access logic required for the Download Handler to interact with the Download database 227 is contained within the Download Handler Web Service.

Example Constraints may include: a) consuming components may need to communicate via the Simple Object Access Protocol (SOAP) in order to consume the Web Service; b) the Web Service may publish a Web Service Description Language (WSDL) to describe the Web service, the message format and protocol details and/or c) the Web Service may return its requested results in the form of a Serialized DataSet.

An Example Composition may Include:

| Subcomponent | Description |
| --- | --- |
| SOAP Proxy | Communication |
| Data Access Handlers | Process requests made by consuming components by communicating with the database with ADO logic |
| Error Handlers | Process and gracefully handle exceptions |
| Logging | Output of event and diagnostics |

Example Uses/interactions may include:

The Download Handler Web Service interacts specifically with the Download Handler via Simple Object Access Protocol (SOAP).

The Download Handler Web Service interacts with the Download SQL database with ActiveX Data Objects (ADO) logic.

Example Resources may include:

The Web Service may utilize a Windows Server version 2000 or 2003 platform with the following Windows components running. a).net Framework version 2.0 and/or b) Internet Information Server (IIS 260).

Example Processing may include:

The Download Handler Web Service processes requests made by consuming components. The requests may be made by the consuming component calling the Download Handler Web Services exposed Web Methods. A successfully request is dependent upon the consuming component calling a Web Method by supply the appropriate query parameters as dictated by the Web Service Description Language (WSDL) file. The Web Service processes the request by executing its embedded Business Logic while logging exceptions and events. The resulting output is returned to the consuming component.

Example Interface/Exports may include:

The Download Handler Web Service may consume the Activity Web Service 243 to log its processing events. The Download Handler Web Service may also interact with the Download SQL database with ActiveX Data Objects (ADO) commands. Its capabilities are exposed as Web Methods which are accessed via the Simple Object Access Protocol (SOAP).

Figure 27:
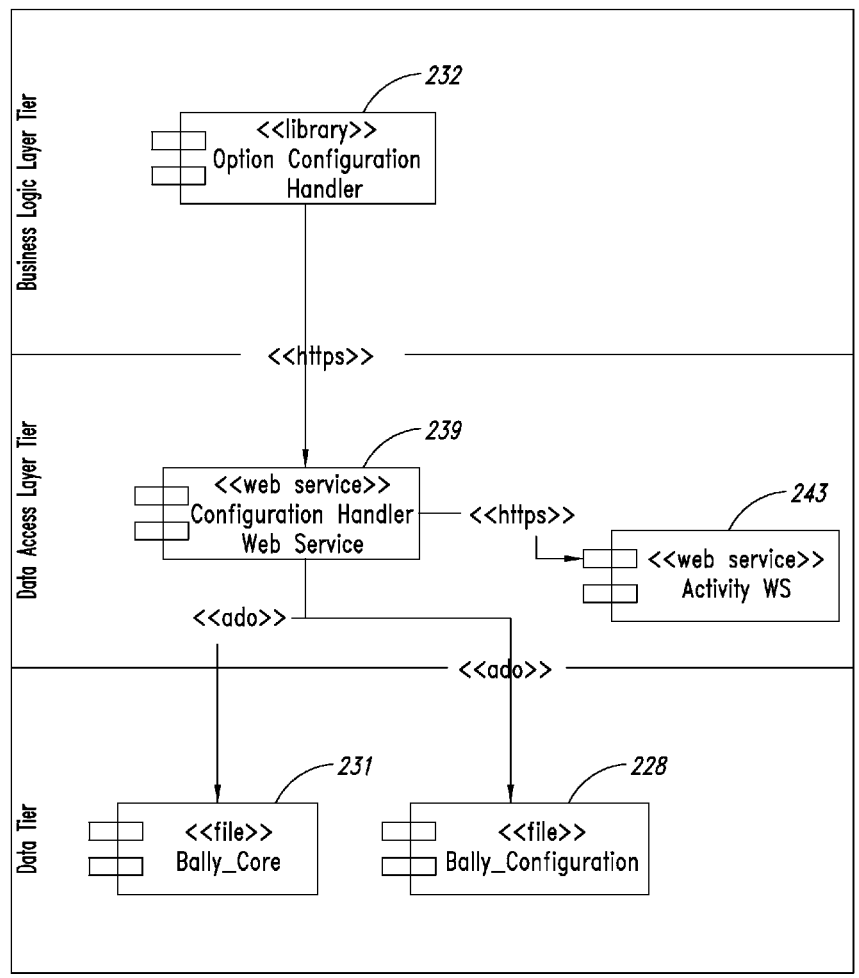
FIG. 27 is a block diagram illustrating an option configuration handler Web service, according to one illustrated embodiment.

FIG. 27 shows an exemplary block diagram of an alternative configuration handler Web service 239, according to one illustrated embodiment.

Classification—Web Service

Definition—This component may expose Web Methods to consuming components to allow the interaction with the Configuration database 228. The data access logic required for the Configuration Handler 232 to interact with the Configuration database 228 is contained within the Configuration Handler Web Service 239.

Example Constraints may include: a) consuming components may communicate via the Simple Object Access Protocol (SOAP) in order to consume the Web Service and/or b) the Web Service may publish a Web Service Description Language (WSDL) to describe the Web service, the message format and protocol details.

The Web Service may return its requested results in the form of a Serialized DataSet.

Example Composition may Include:

| Subcomponent | Description |
| --- | --- |
| SOAP Proxy | Communication |
| Data Access Handlers | Process requests made by consuming components by communicating with the database with ADO logic |
| Error Handlers | Process and gracefully handle exceptions |
| Logging | Output of event and diagnostics |

Example Uses/interactions may include:

The Configuration Handler Web Service 239 interacts with the Configuration Handler 232 via Simple Object Access Protocol (SOAP).

The Configuration Handler Web Service 239 interacts with the Configuration SQL database with ActiveX Data Objects (ADO) logic.

Example Resources may include:

The Web Service may utilize a Windows Server version 2000 or 2003 platform with the following Windows components running. a).net Framework version 2.0 and/or b) Internet Information Server (IIS 260).

Example Processing may include:

The Configuration Handler Web Service 239 may process requests made by consuming components. The requests may be made by the consuming component calling the Configuration Handler Web Services 239 exposed Web Methods. A successfully request is dependent upon the consuming component calling a Web Method by supply the appropriate query parameters as dictated by the Web Service Description Language (WSDL) file. The Web Service processes the request by executing its embedded Business Logic while logging exceptions and events. The resulting output is returned to the consuming component.

Example Interface/Exports may include:

The Configuration Handler Web Service 239 may consume the Activity Web Service 243 to log its processing events. It may also interact with the Configuration SQL database with ActiveX Data Objects (ADO) commands. Its capabilities are exposed as Web Methods which are accessed via the Simple Object Access Protocol (SOAP).

Figure 28A:
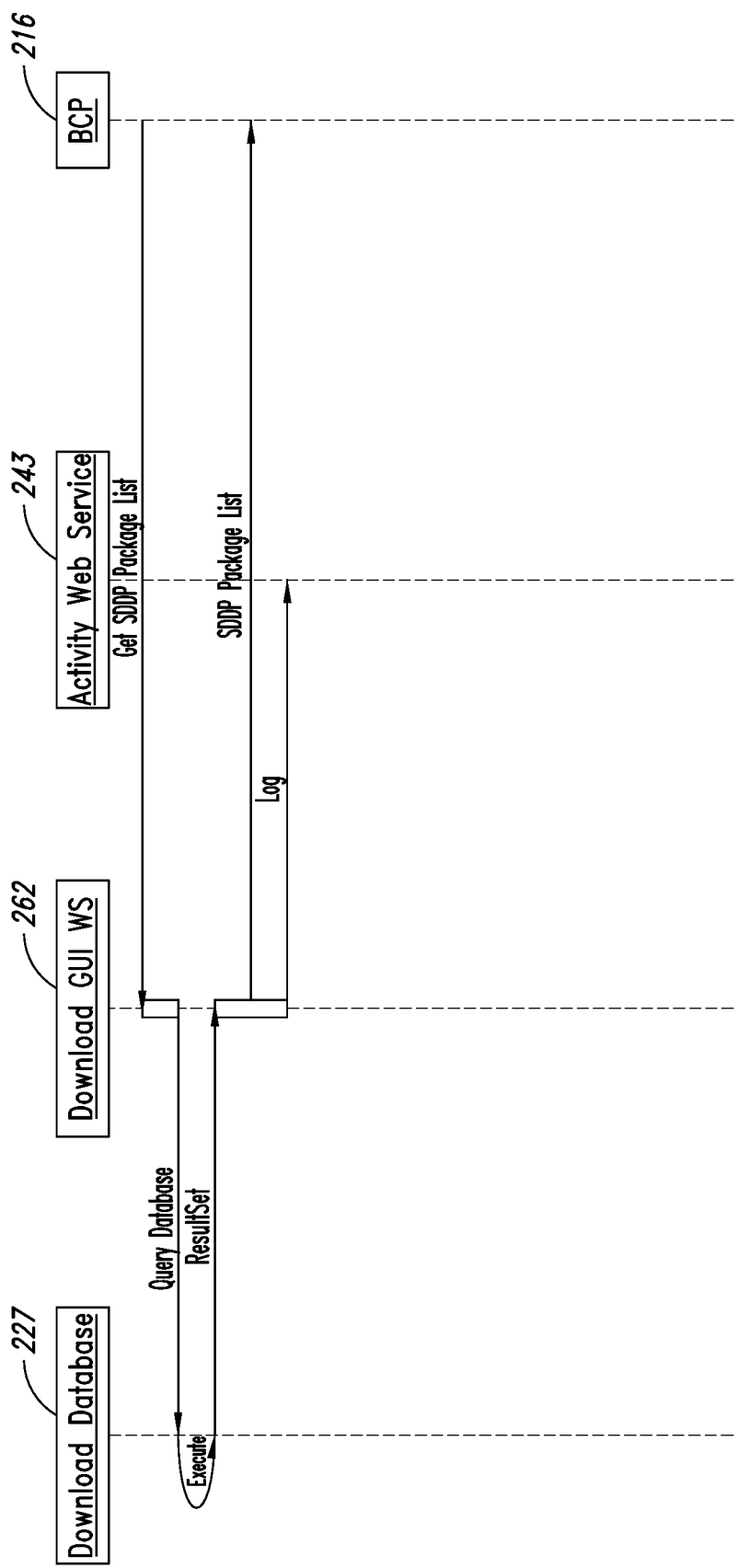
FIG. 28A is a flow diagram illustrating a method of viewing packages, according to one illustrated embodiment.
Figure 28B:
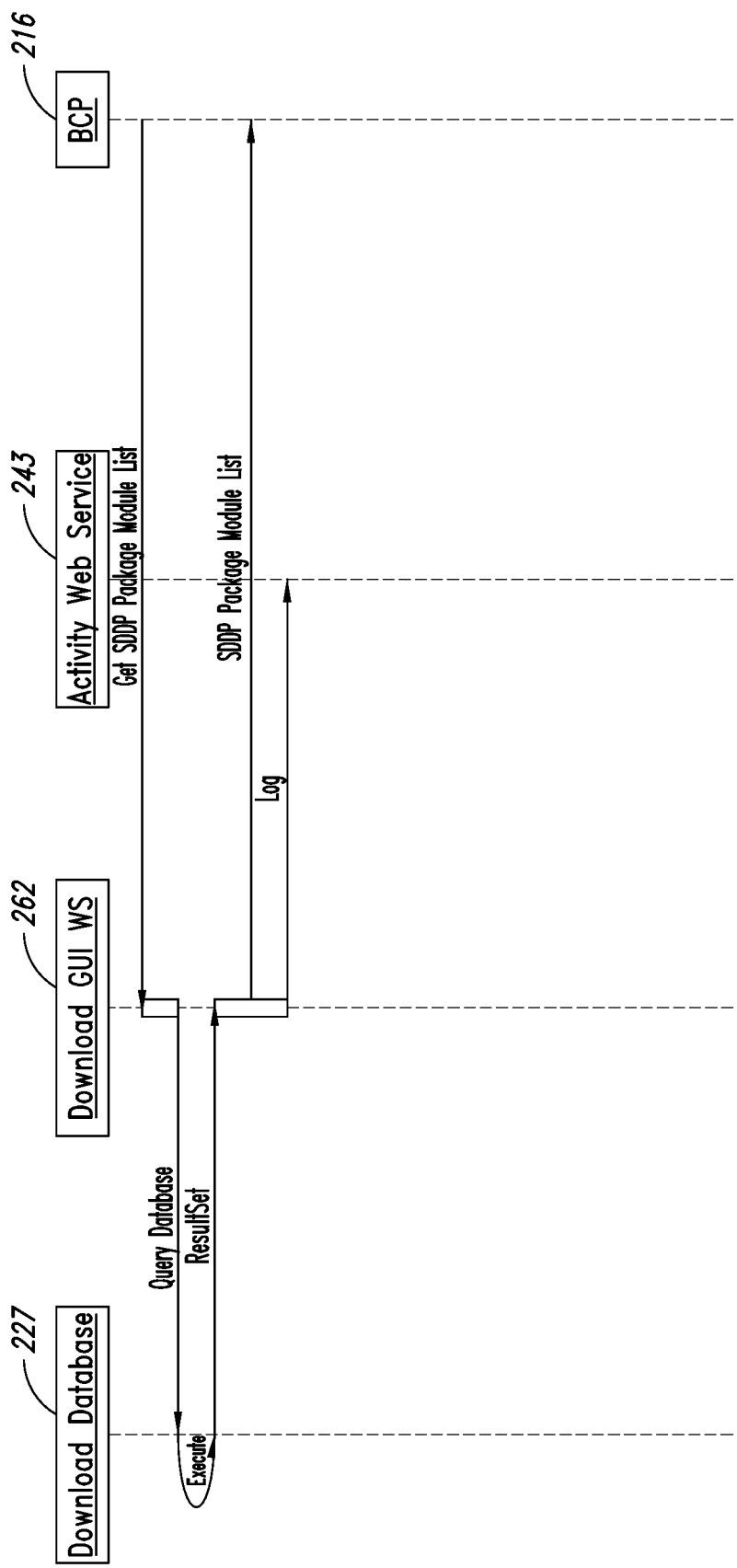
FIG. 28B is a flow diagram illustrating a method of viewing package modules, according to one illustrated embodiment.
Figure 28C:
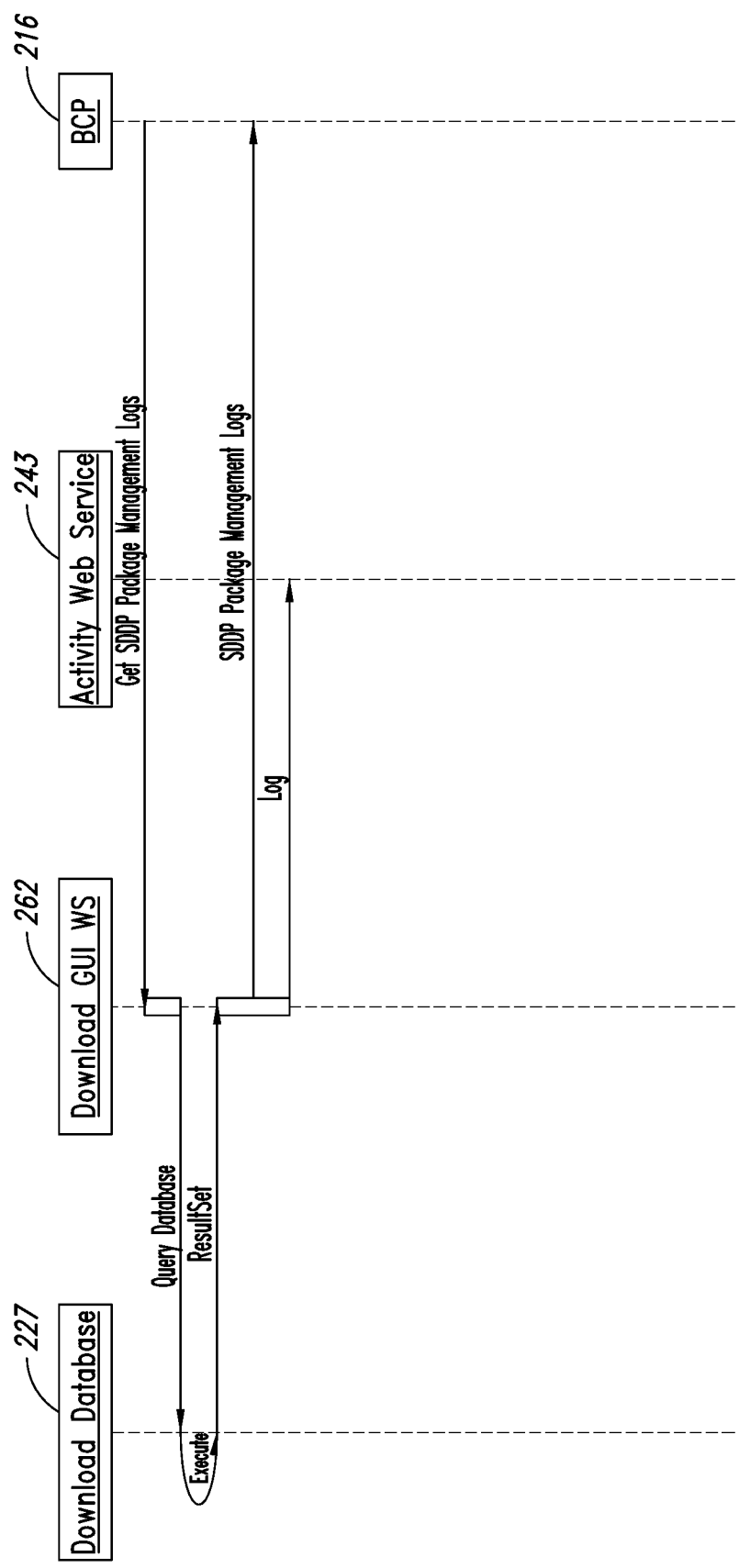
FIG. 28C is a flow diagram illustrating a method of viewing package management logs, according to one illustrated embodiment.
Figure 29:
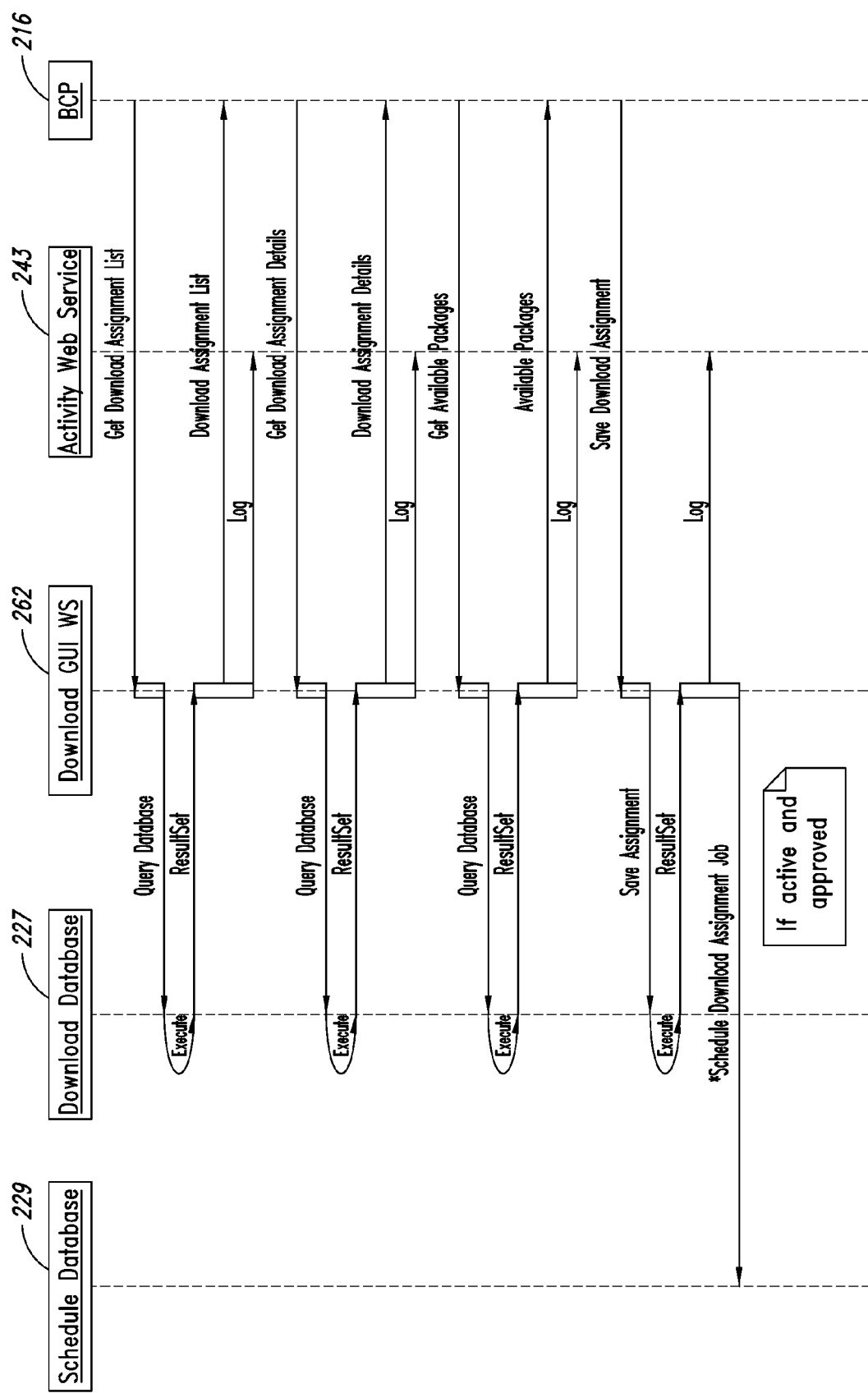
FIG. 29 is a flow diagram illustrating a method of creating a download assignment, according to one illustrated embodiment.
Figure 30:
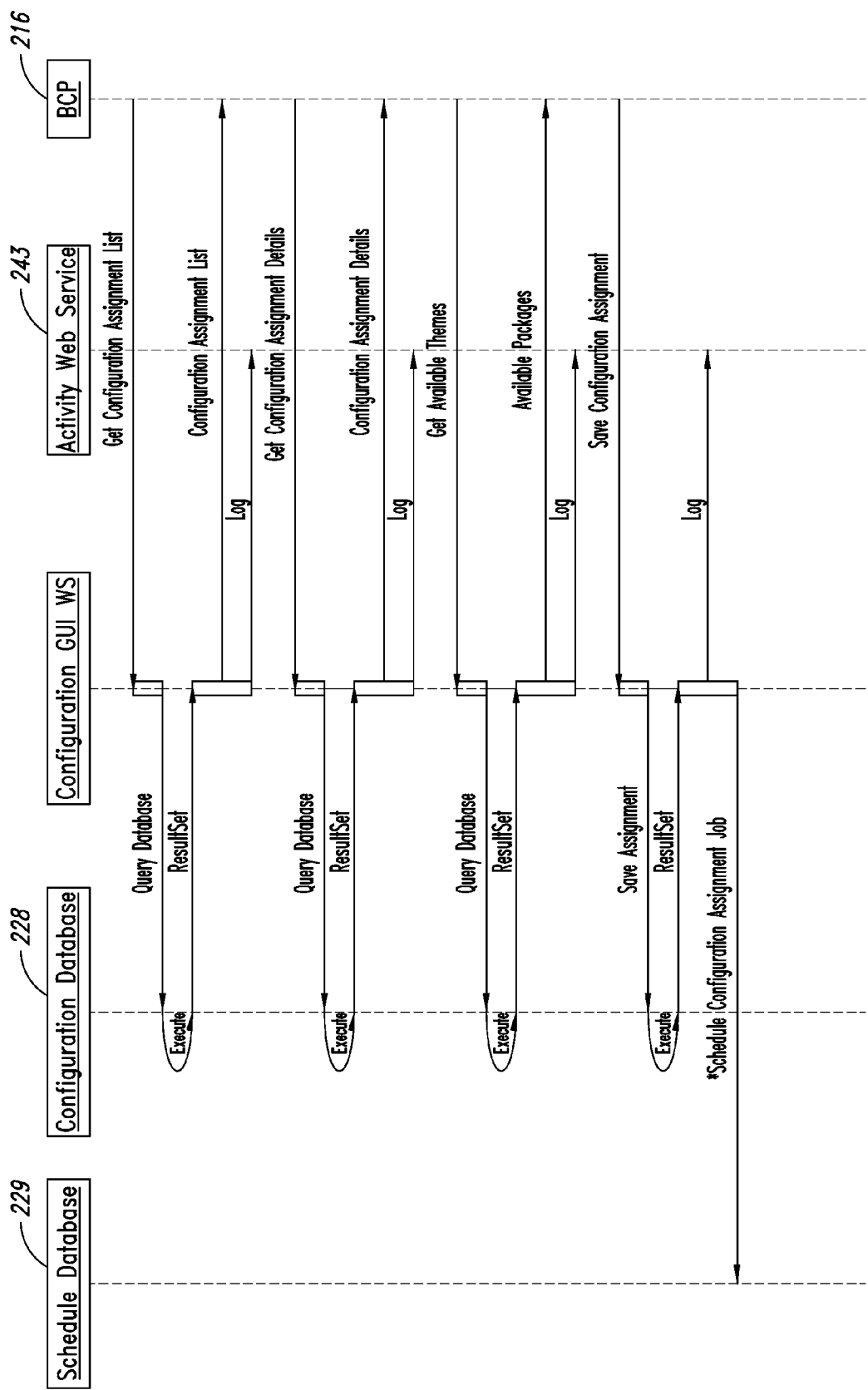
FIG. 30 is a flow diagram illustrating a method of creating a configuration assignment, according to one illustrated embodiment.
Figure 31:
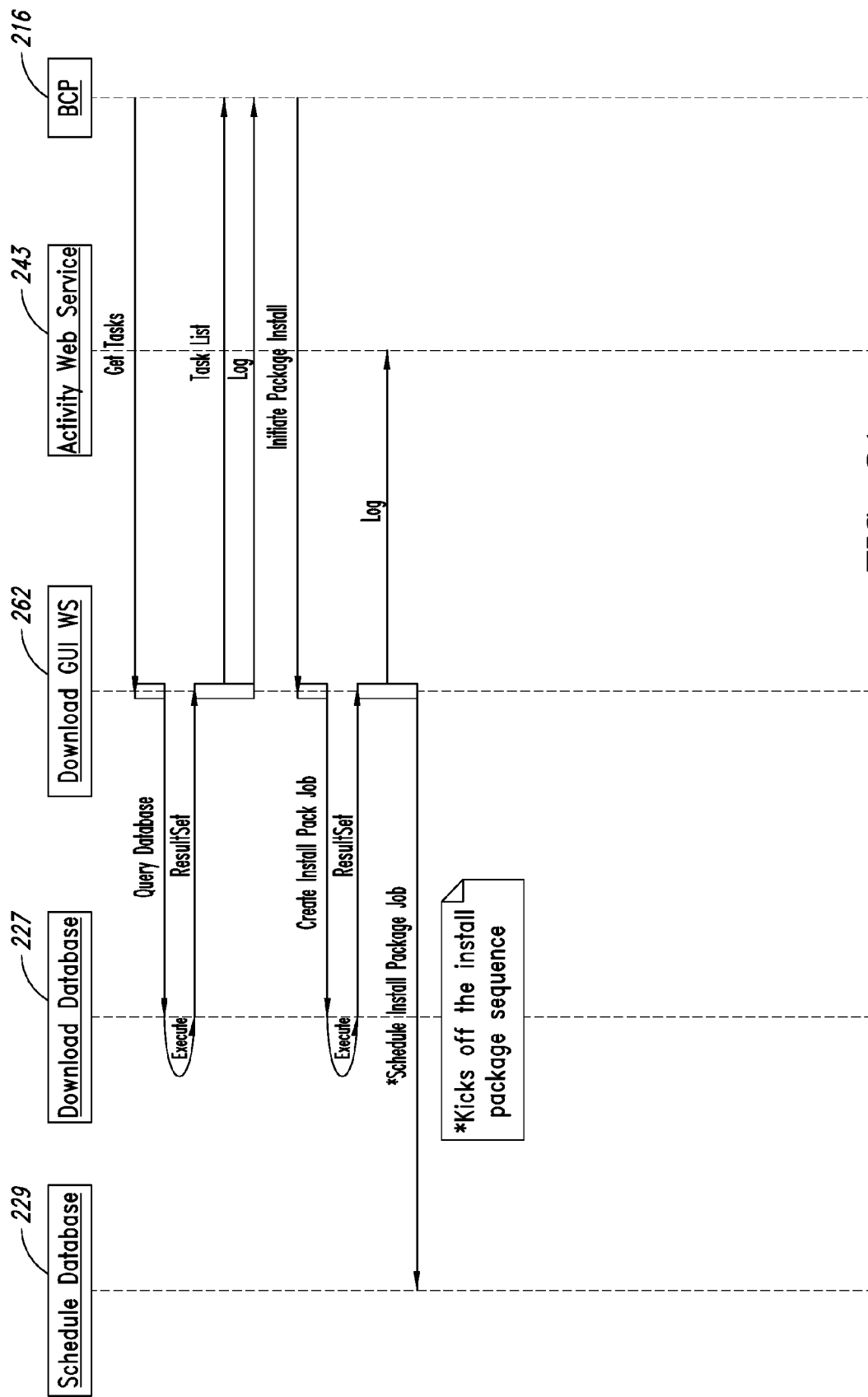
FIG. 31 is a flow diagram illustrating a method of initiating a package installation, according to one illustrated embodiment.
Figure 32:
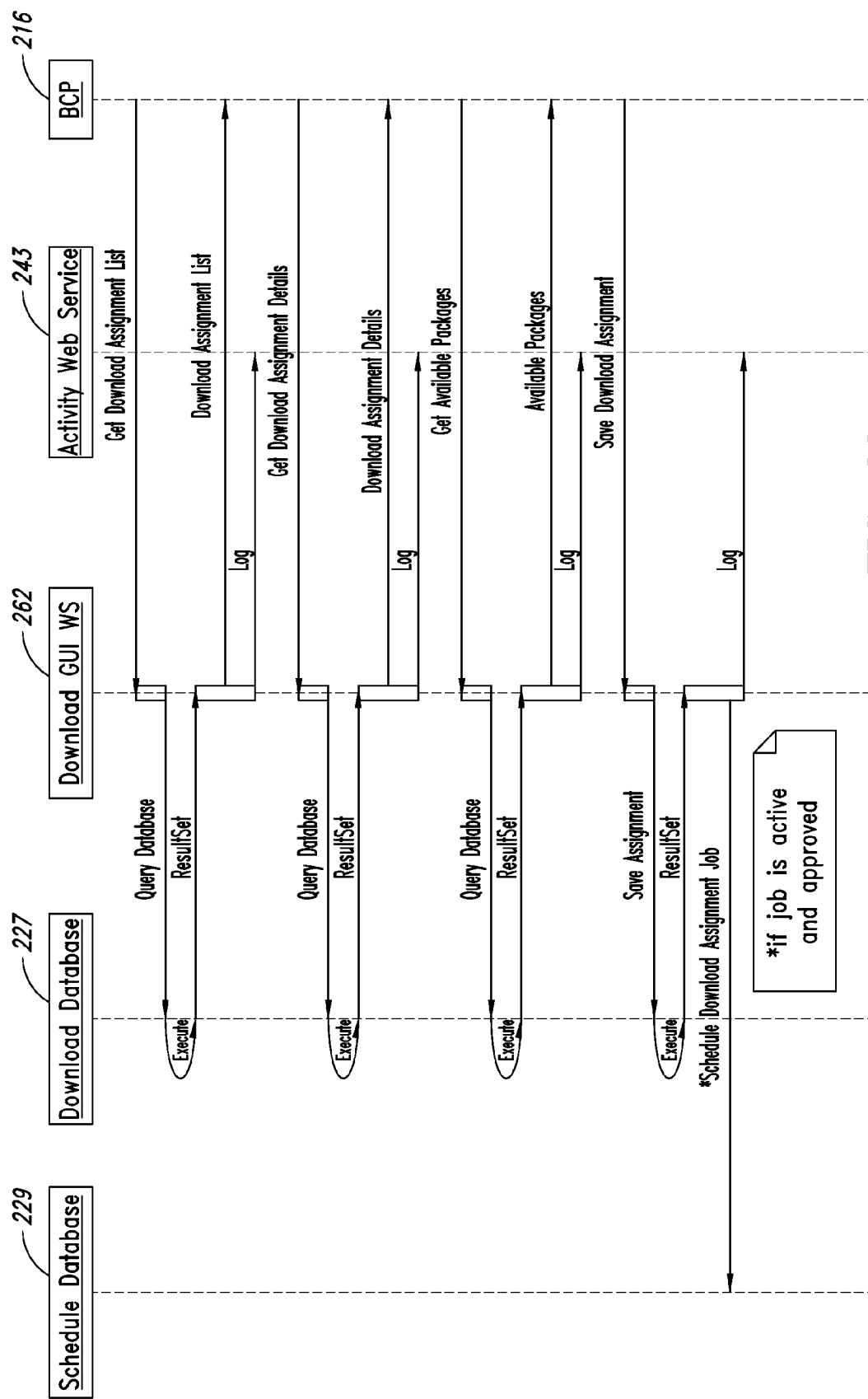
FIG. 32 is a flow diagram illustrating a method of editing a download assignment, according to one illustrated embodiment.
Figure 33A:
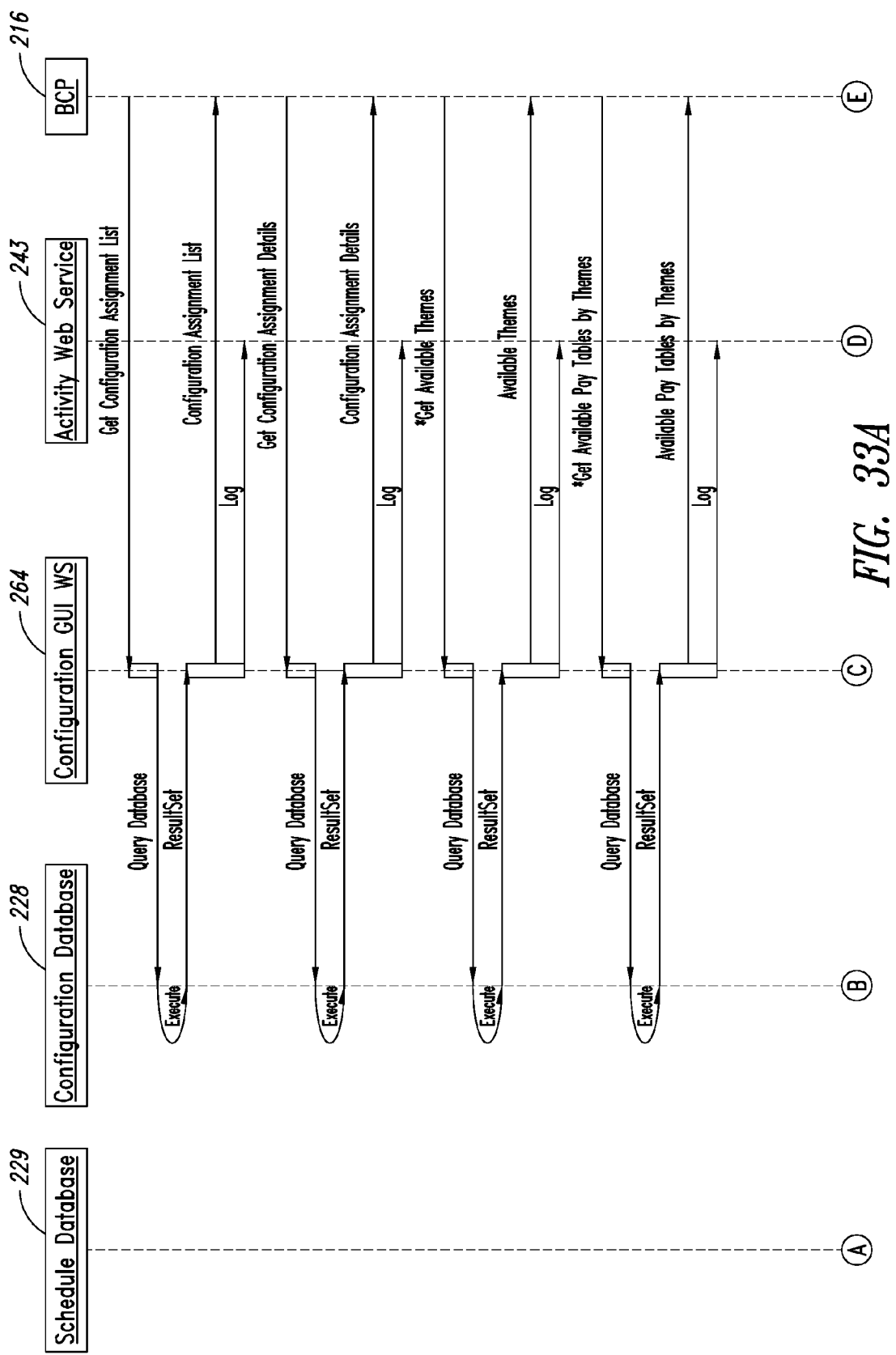
FIGS. 33A and 33B are a flow diagram illustrating a method of editing a configuration assignment, according to one illustrated embodiment.
Figure 33B:
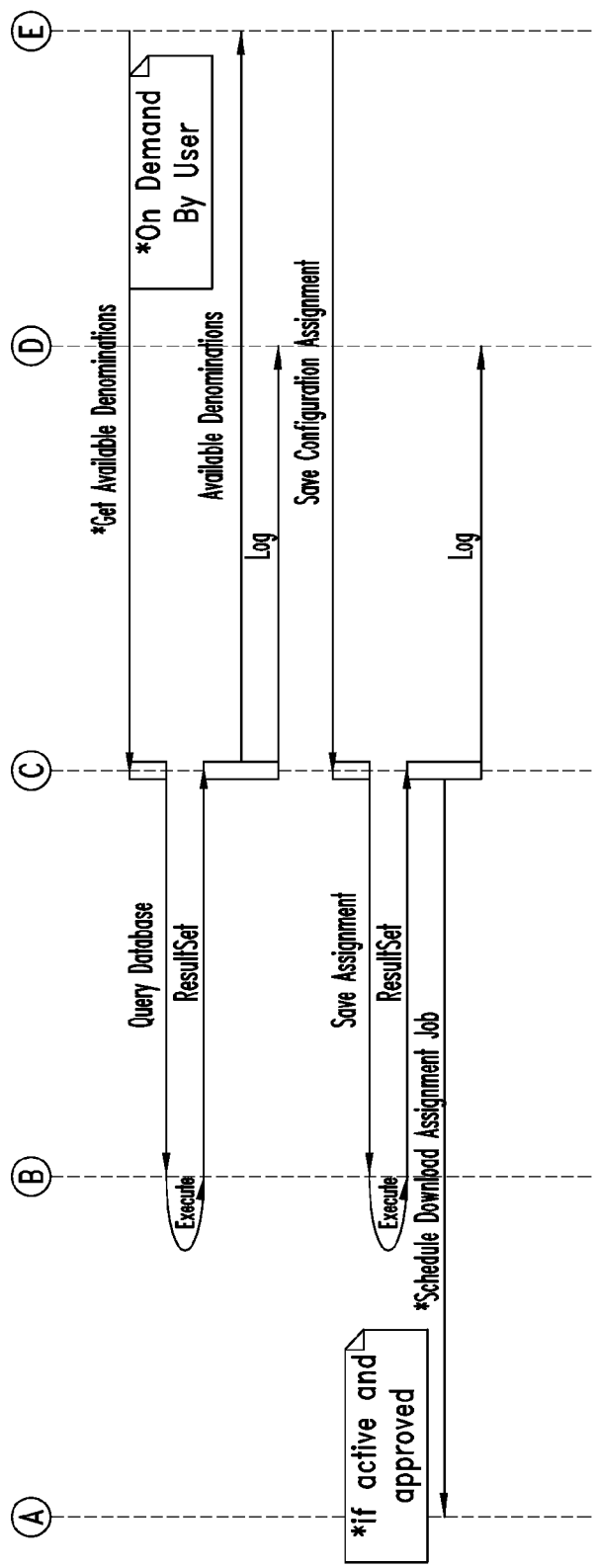
Figure 34:
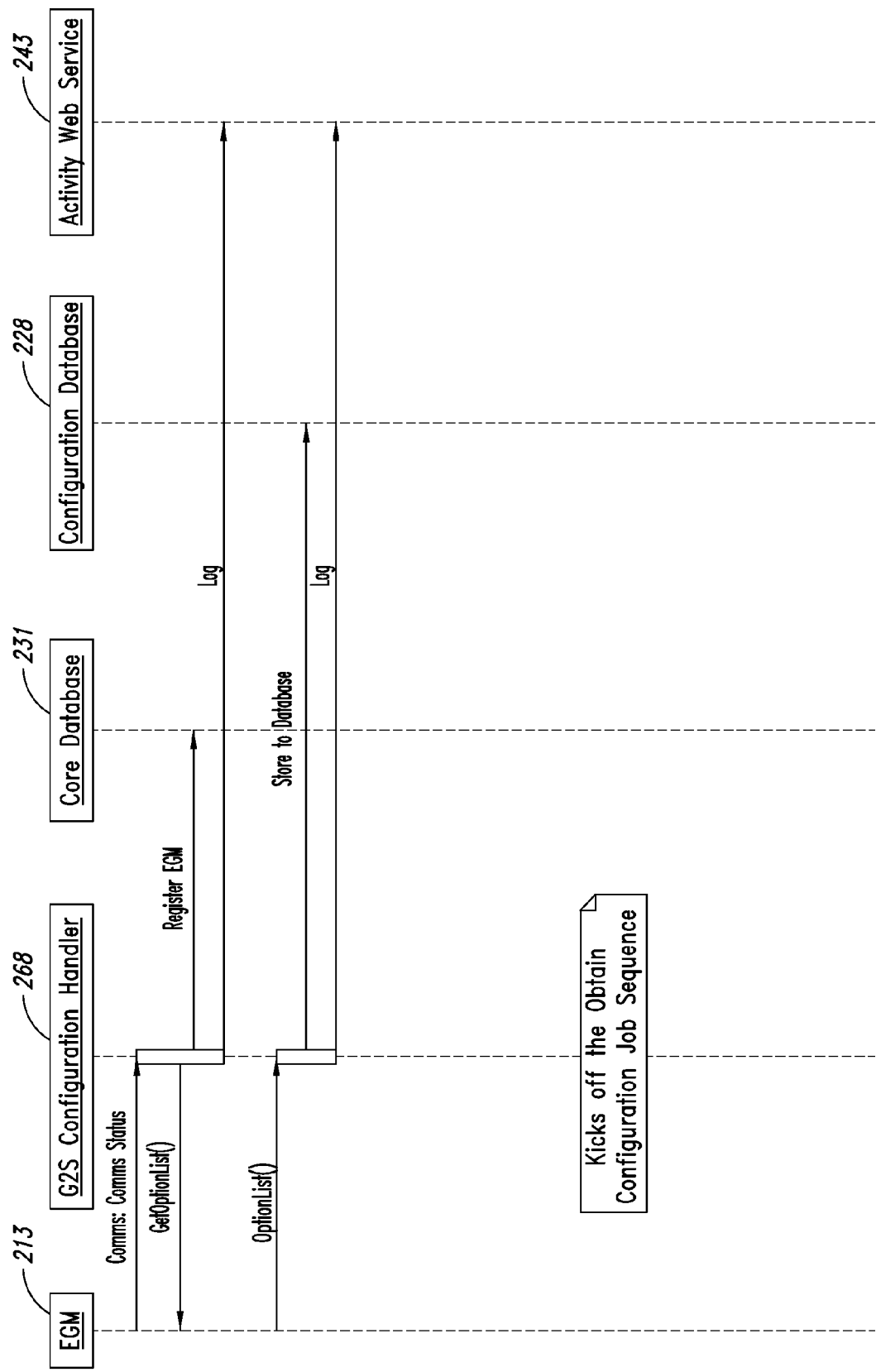
FIG. 34 is a flow diagram illustrating a method of performing an EGM configuration discovery, according to one illustrated embodiment.
Figure 35:
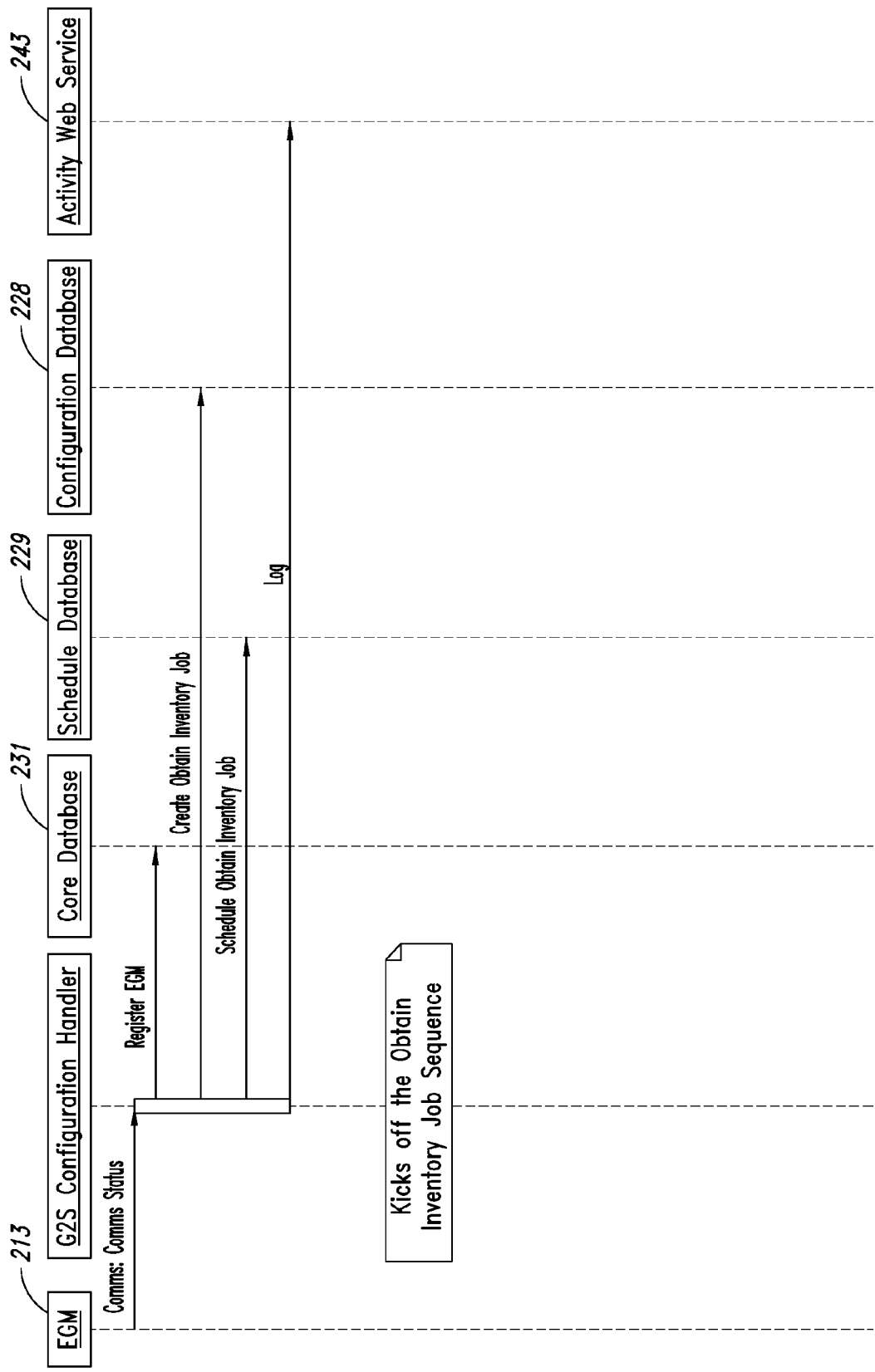
FIG. 35 is a flow diagram illustrating a method of performing an EGM download discovery, according to one illustrated embodiment.
Figure 36A:
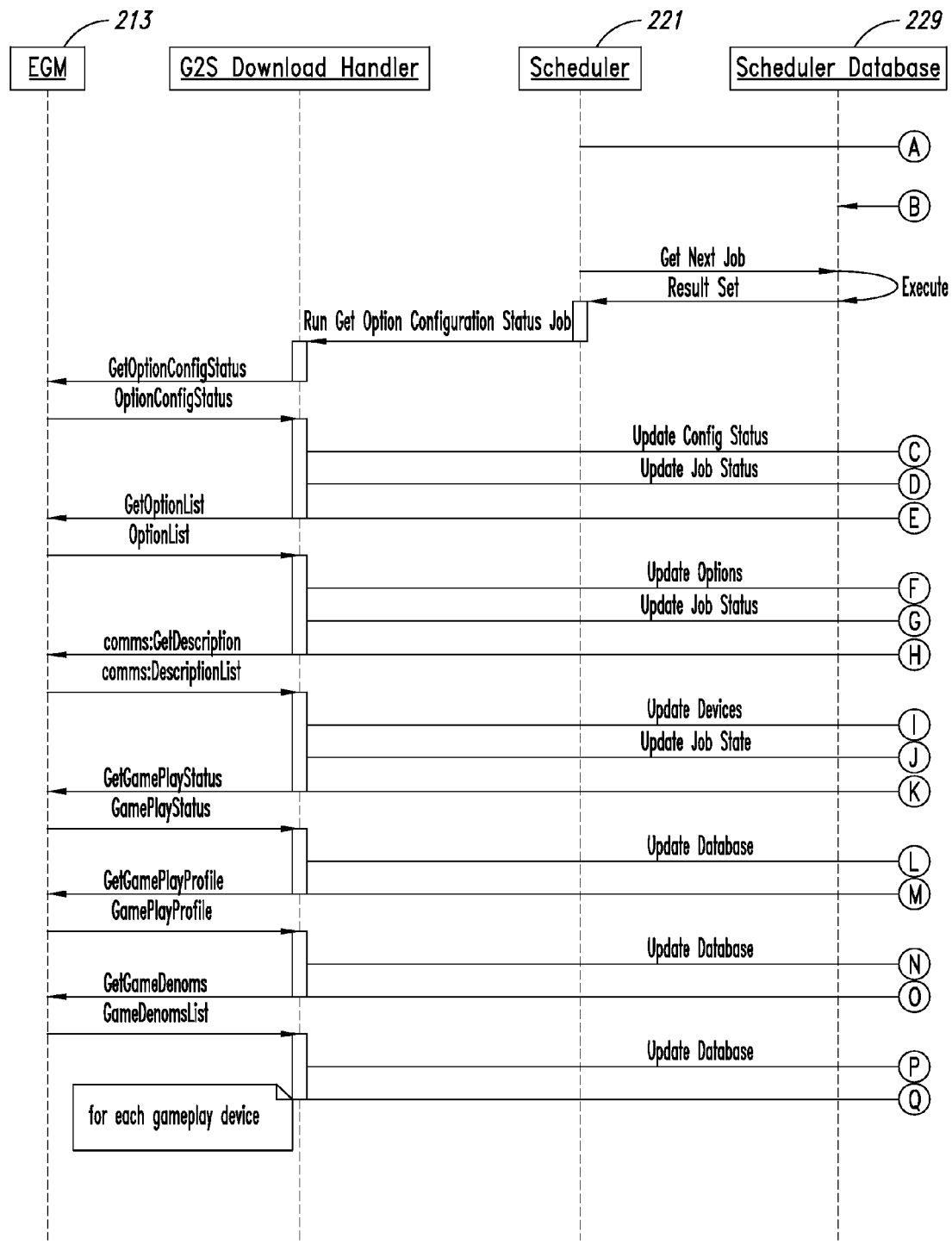
FIGS. 36A and 36B are a flow diagram illustrating a method of obtaining a configuration, according to one illustrated embodiment.
Figure 36B:
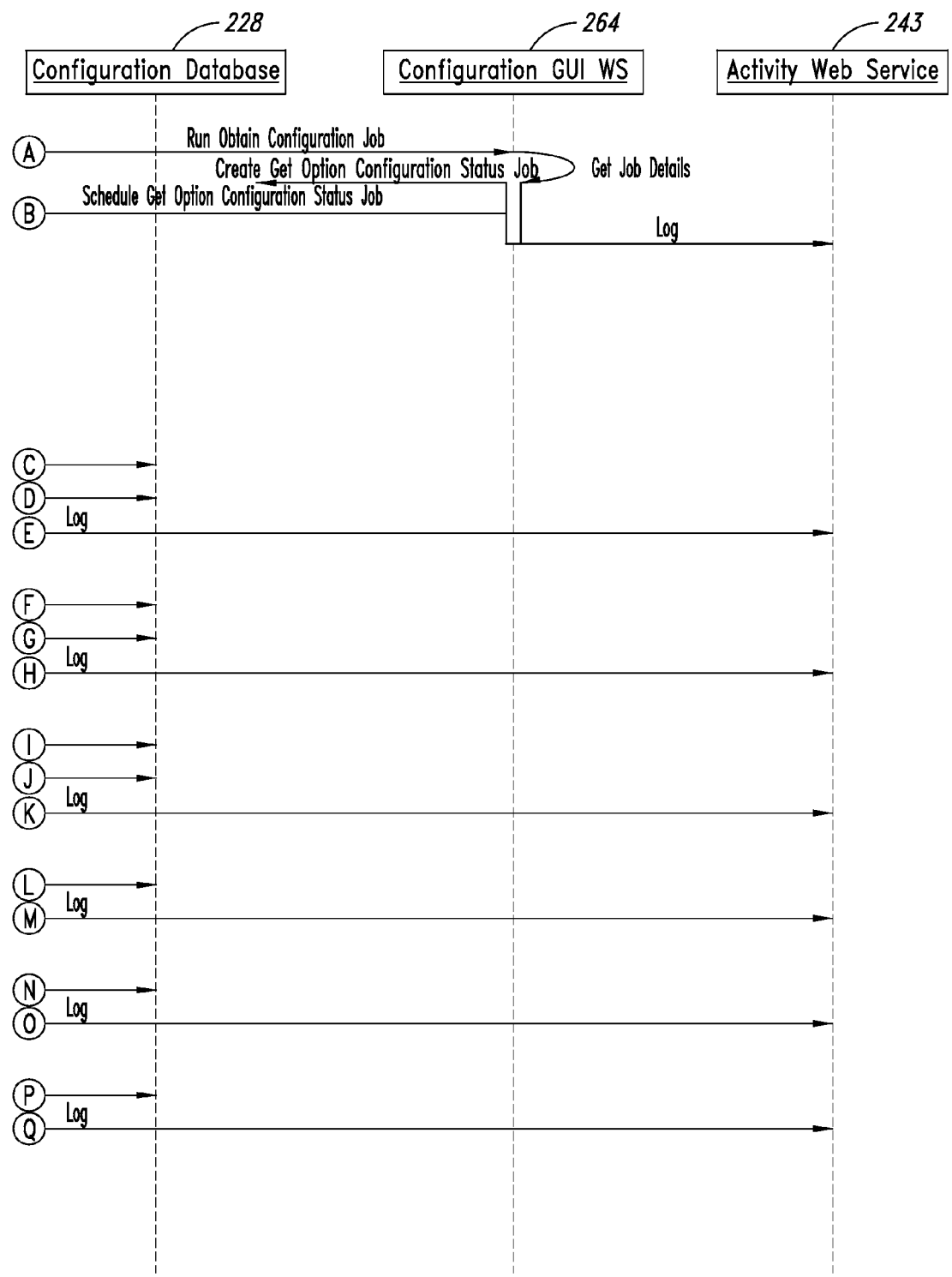
Figure 37:
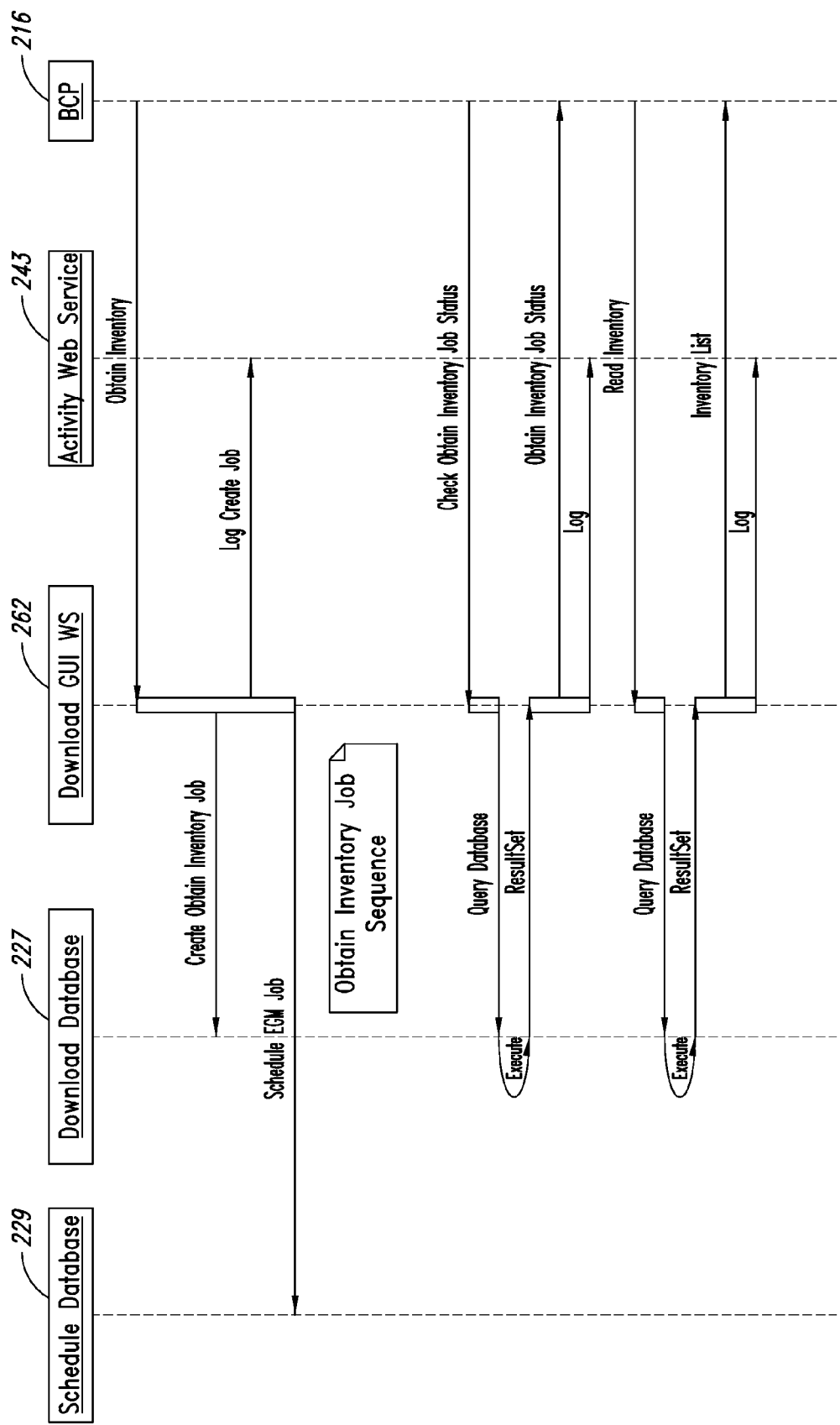
FIG. 37 is a flow diagram illustrating a method of refreshing an inventory, according to one illustrated embodiment.
Figure 38A:
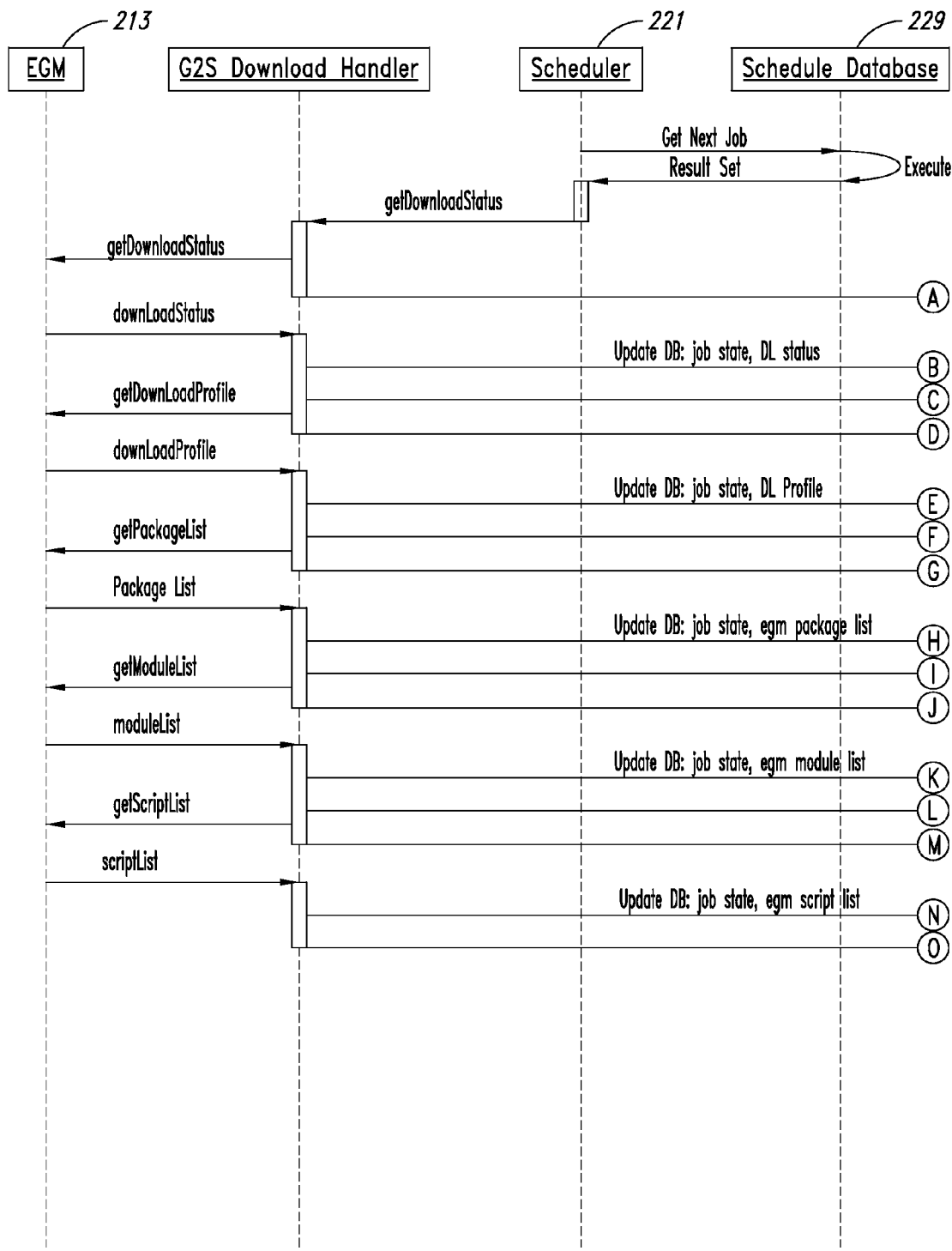
FIGS. 38A and 38B are a flow diagram illustrating a method of obtaining an inventory job, according to one illustrated embodiment.
Figure 38B:
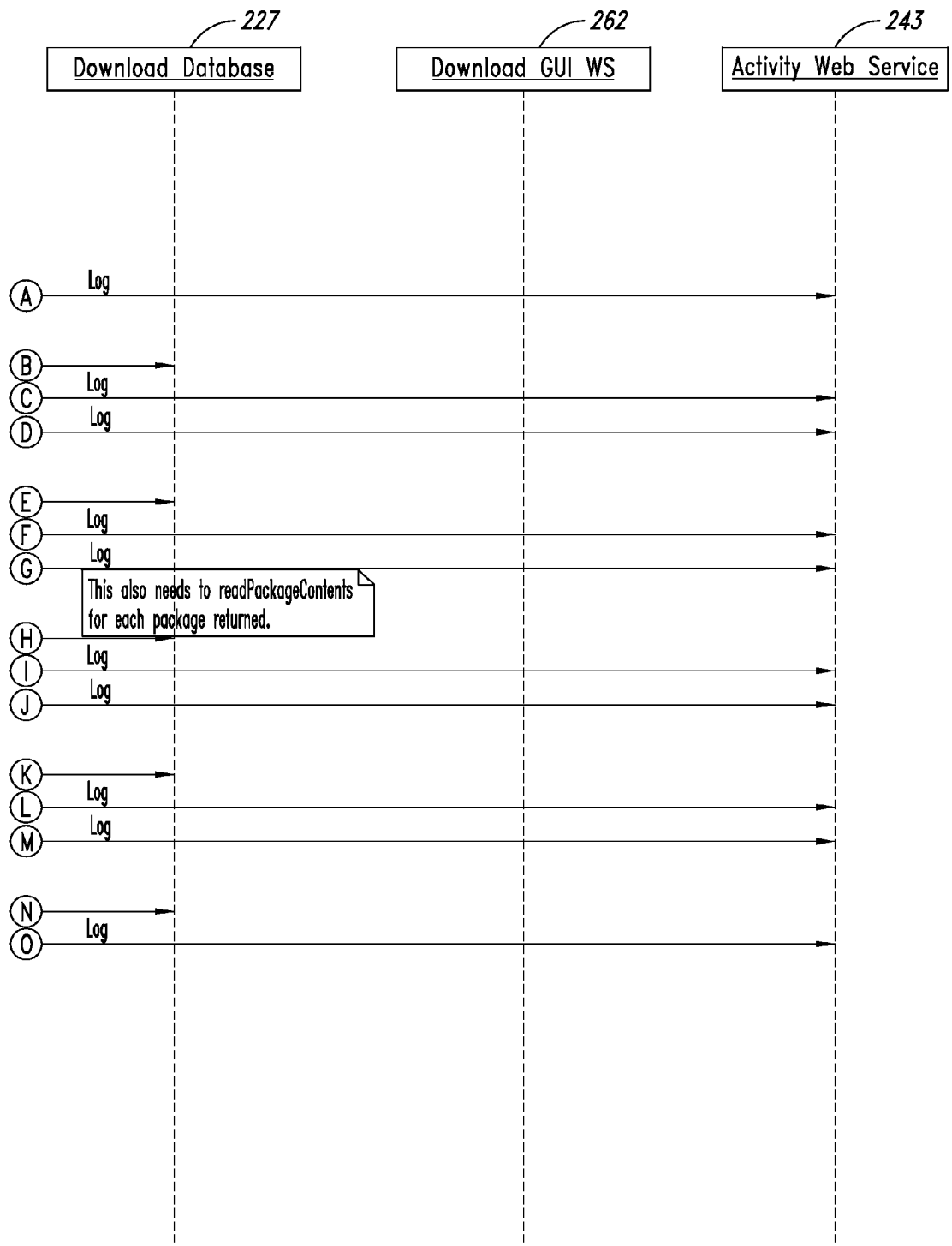
Figure 39A:
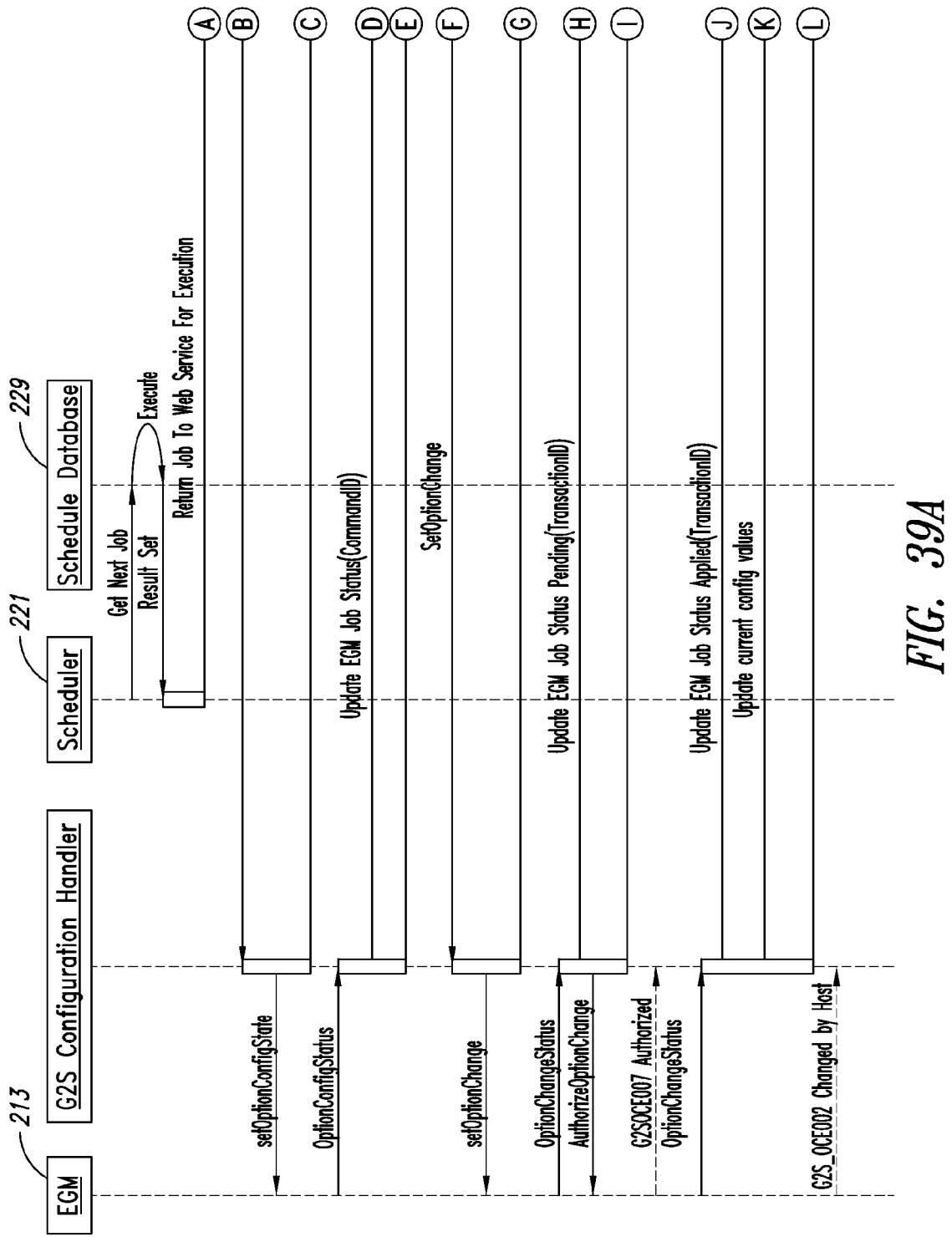
FIGS. 39A and 39B are a flow diagram illustrating a method of setting configuration changes jobs, according to one illustrated embodiment.
Figure 39B:
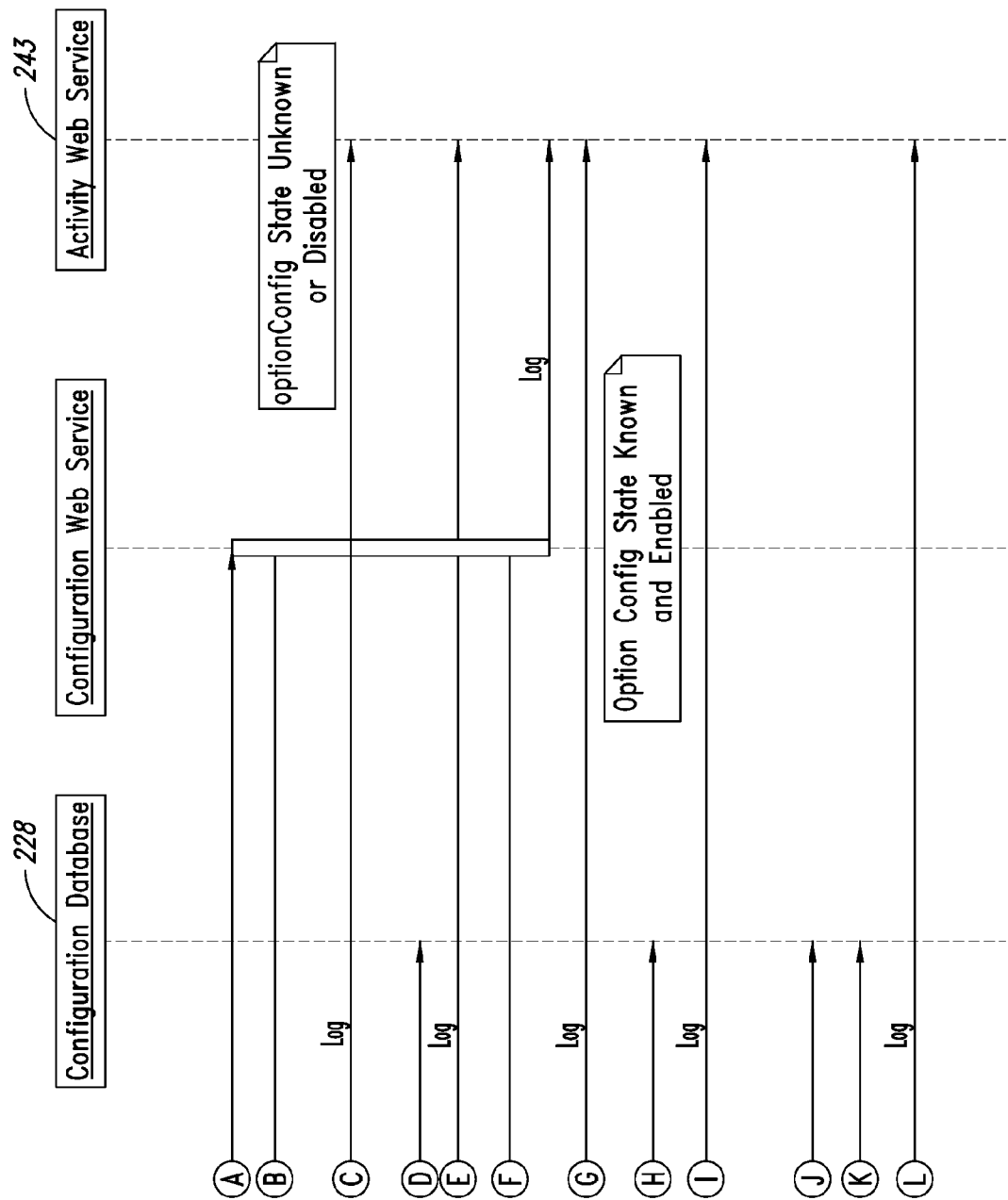
Figure 40A:
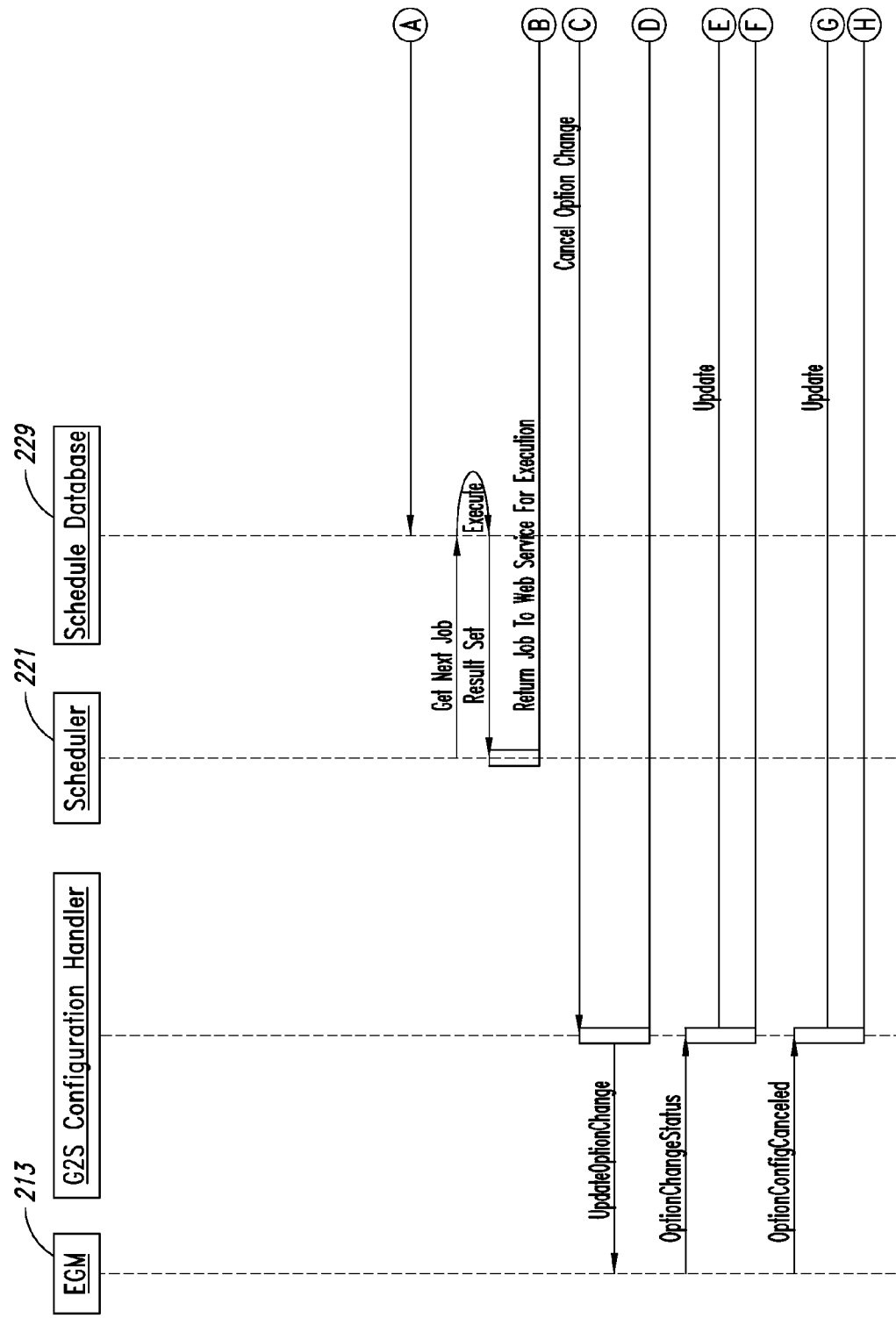
FIGS. 40A and 40B are a flow diagram illustrating a method of cancelling an option change, according to one illustrated embodiment.
Figure 40B:
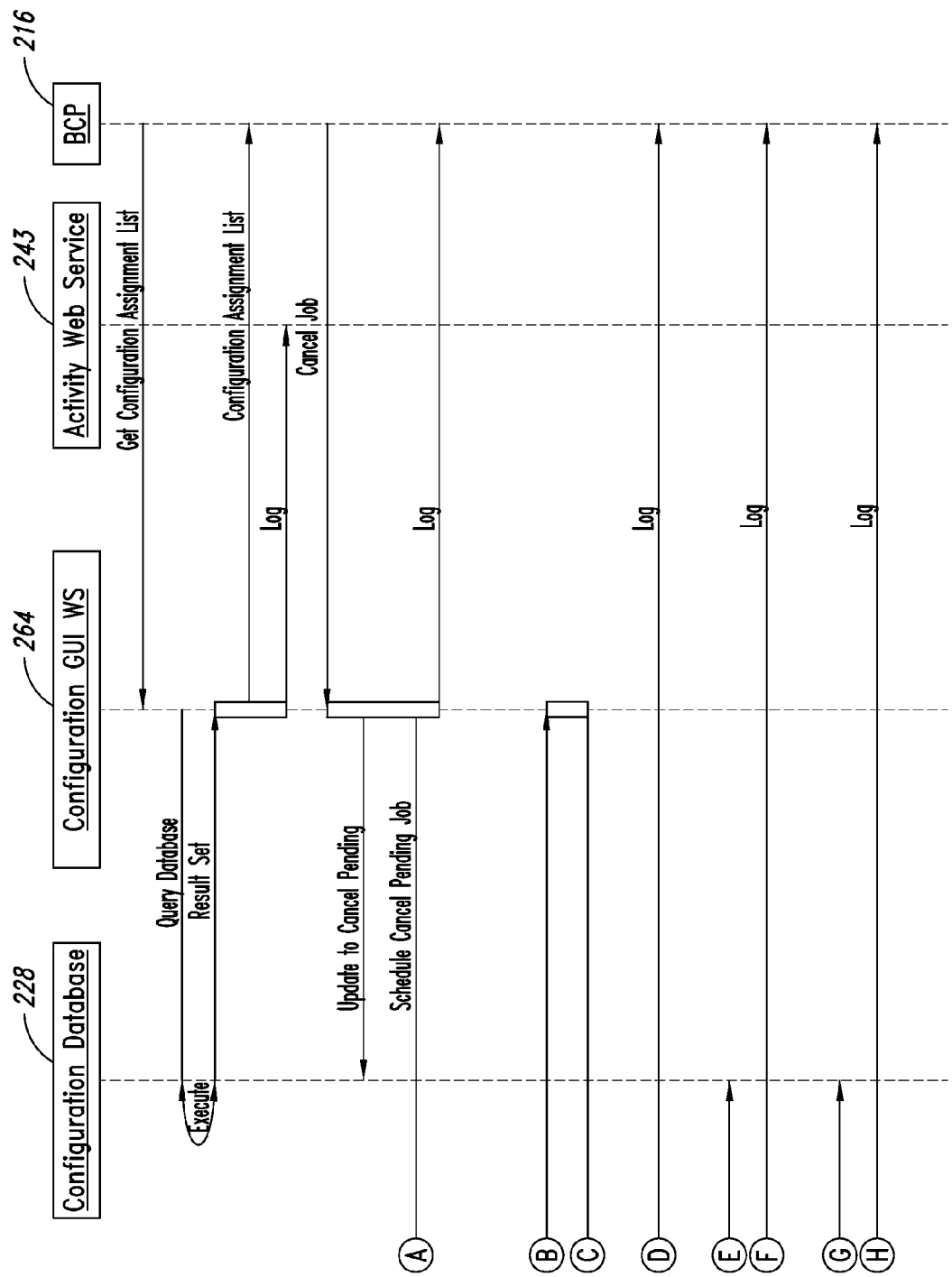
Figure 41:
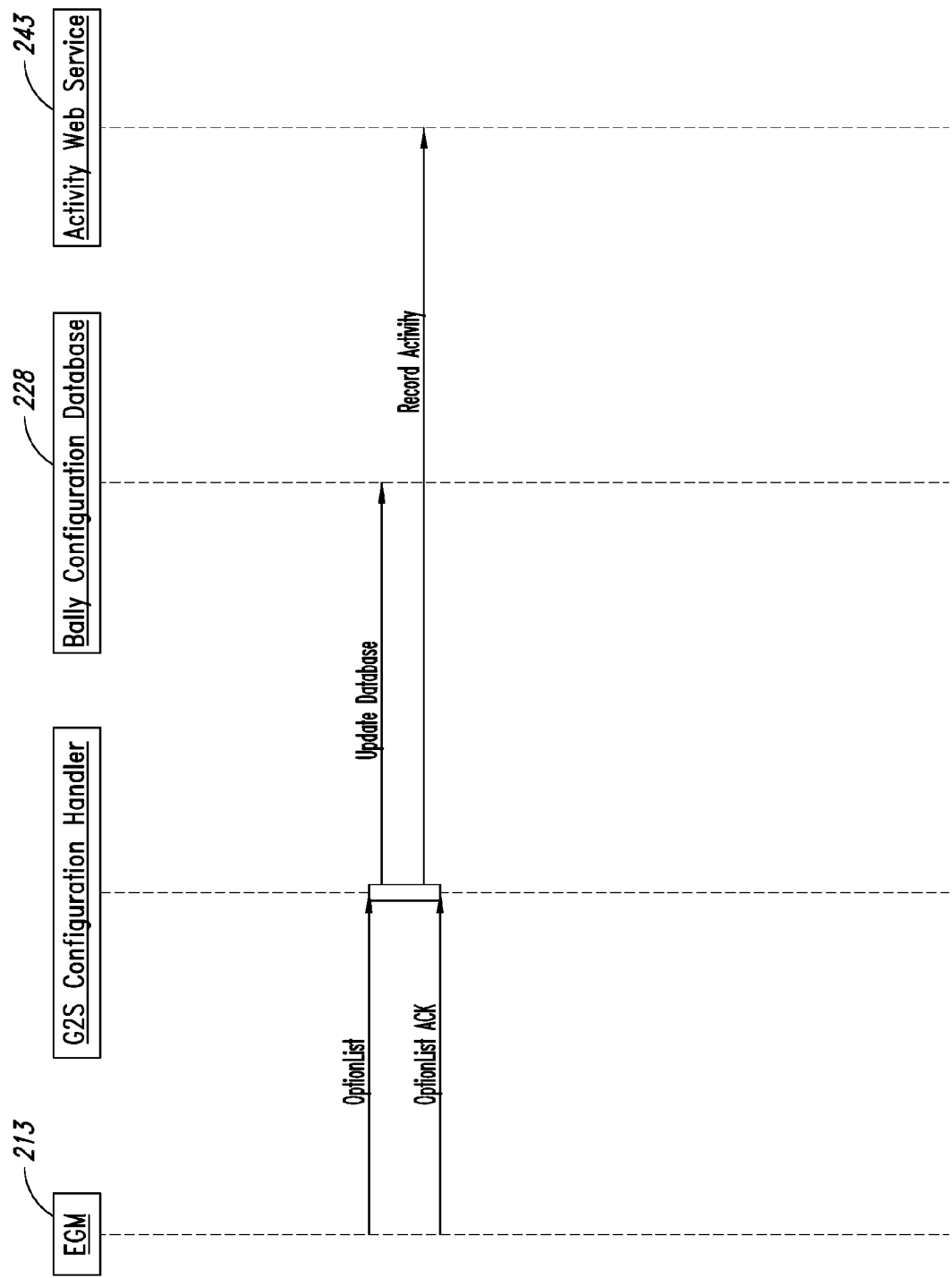
FIG. 41 is a flow diagram illustrating a method of performing an unsolicited options list, according to one illustrated embodiment.
Figure 42:
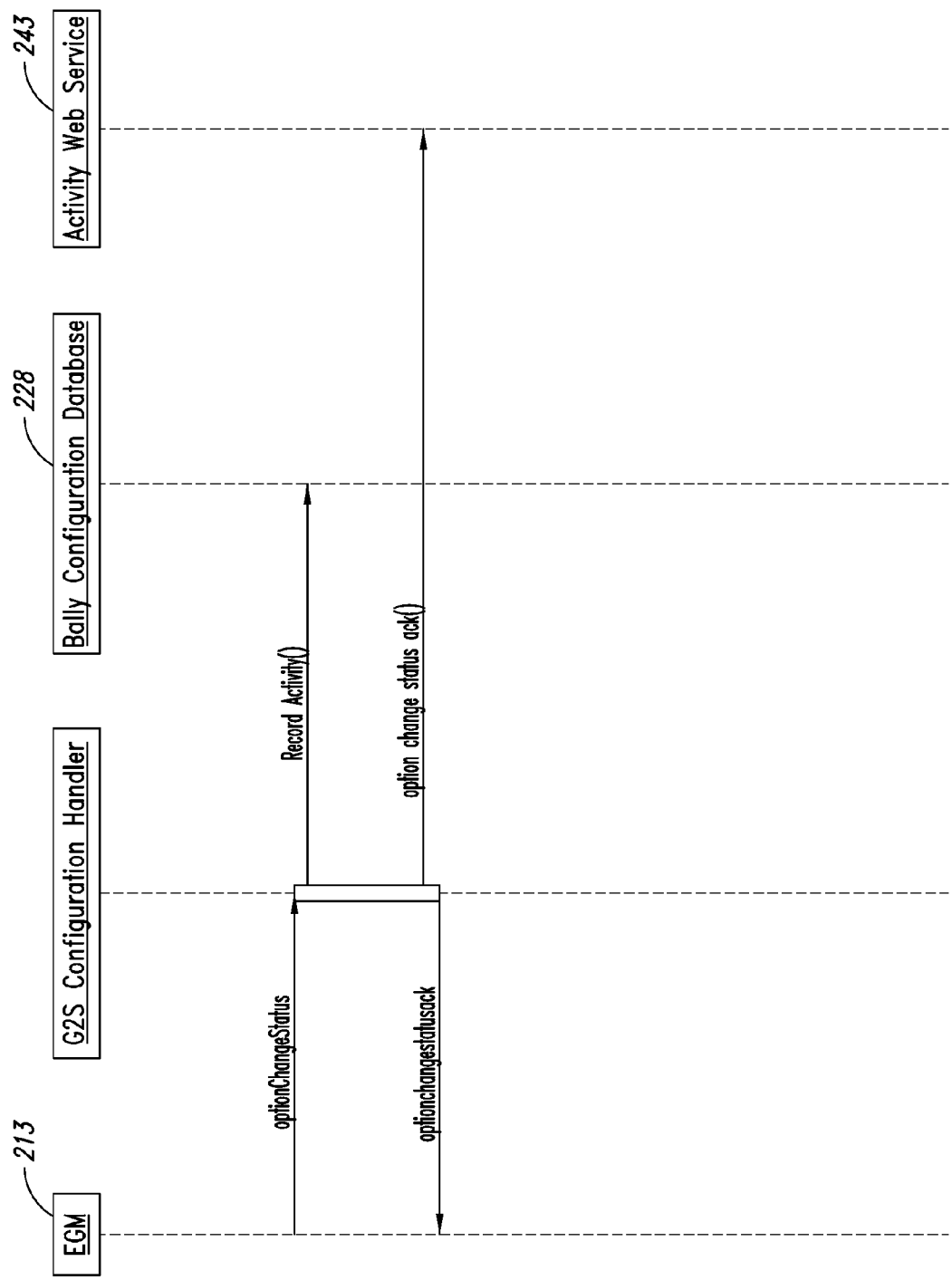
FIG. 42 is a flow diagram illustrating a method of performing an unsolicited options change status, according to one illustrated embodiment.
Figure 43A:
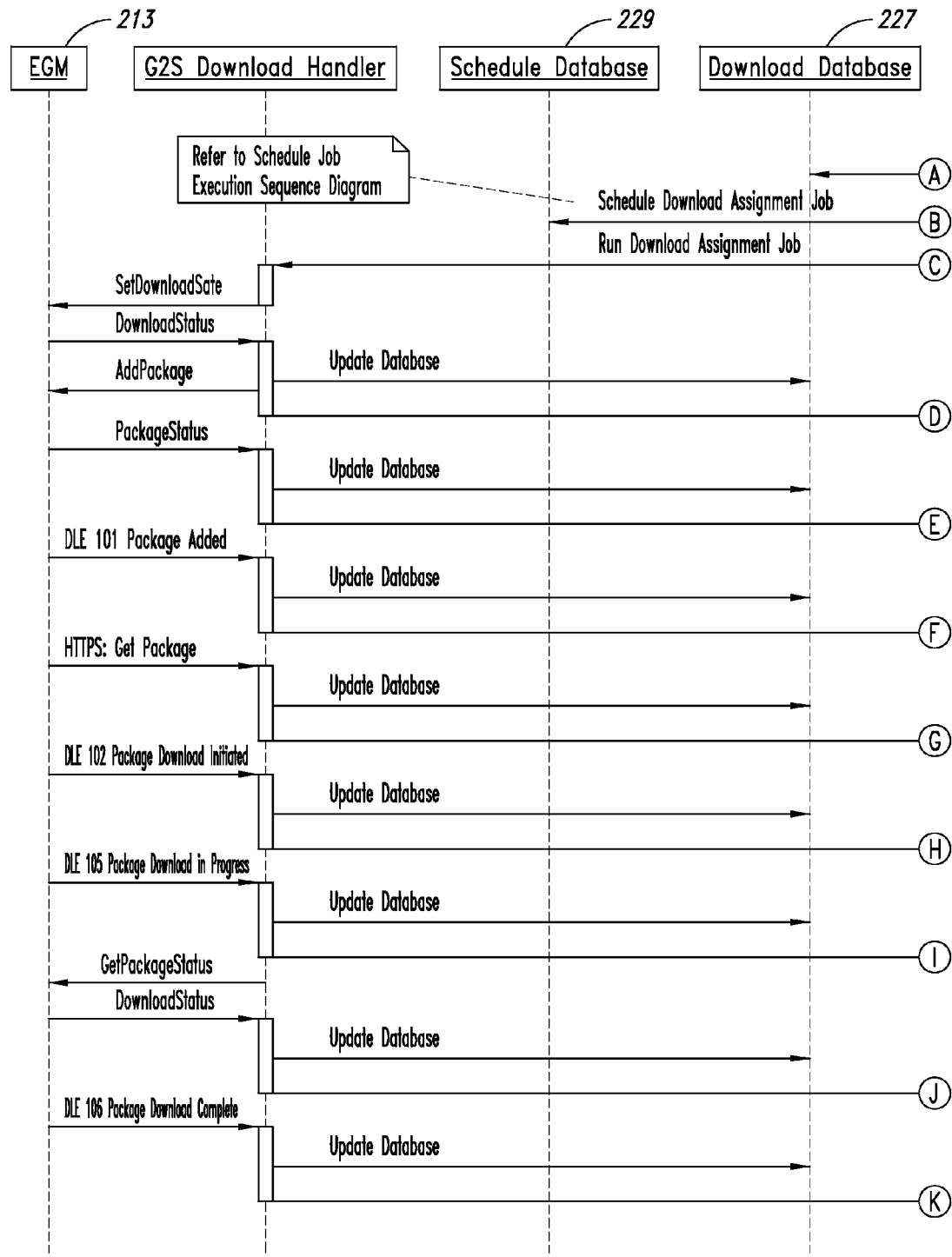
FIGS. 43A and 43B are a flow diagram illustrating a method of downloading a package, according to one illustrated embodiment.
Figure 43B:
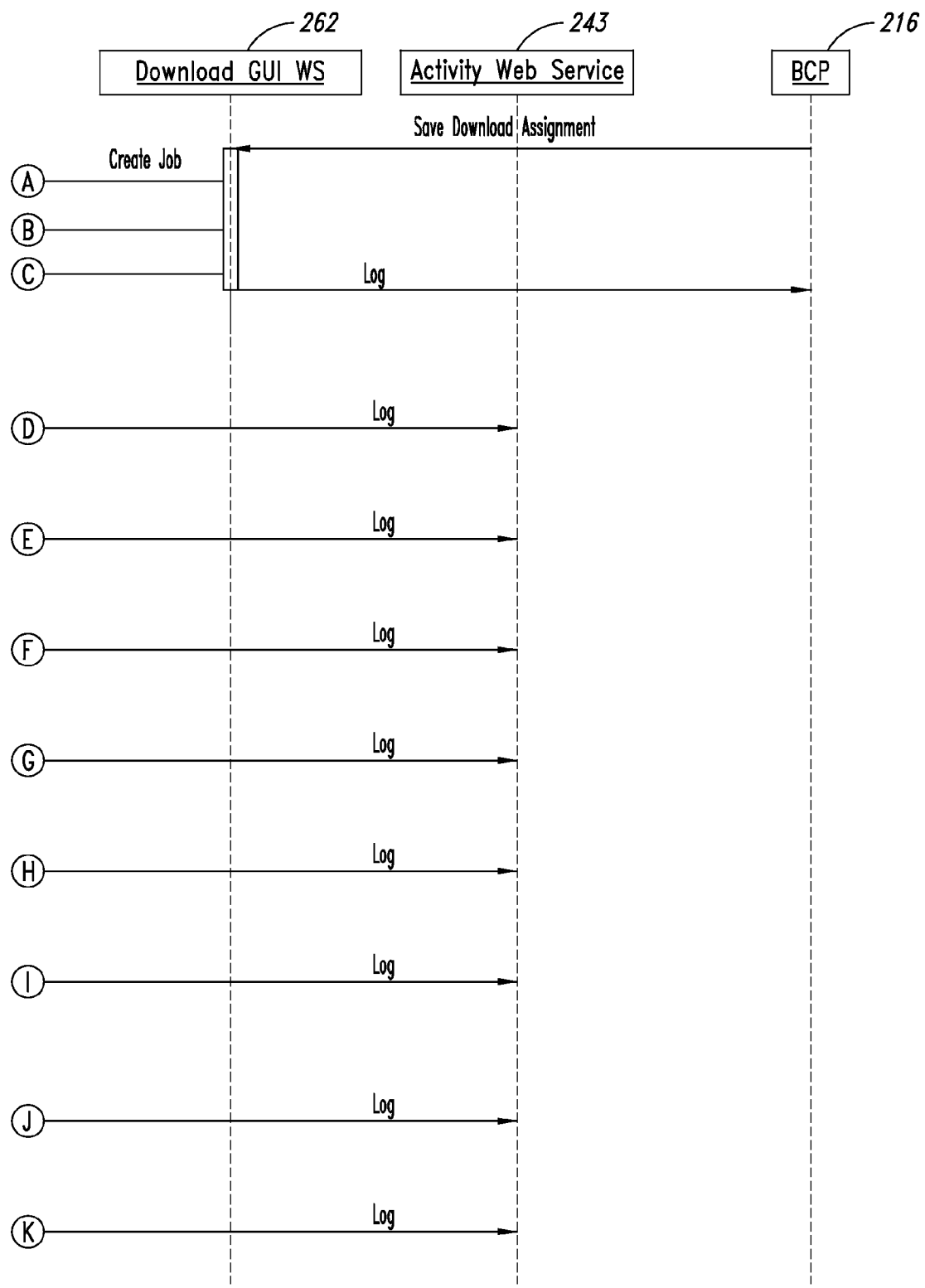
Figure 44A:
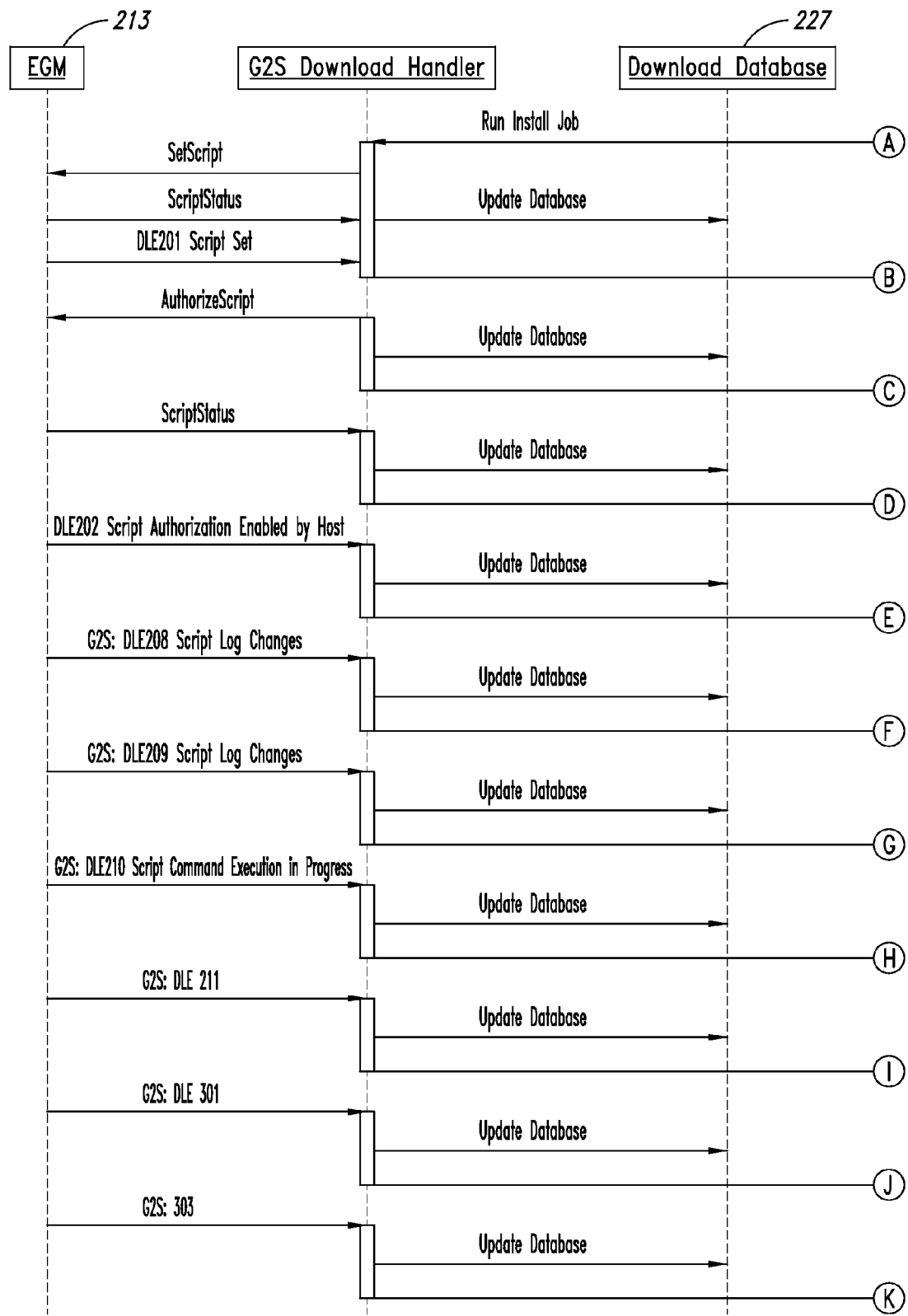
FIGS. 44A and 44B are a flow diagram illustrating a method of installing a package, according to one illustrated embodiment.
Figure 44B:
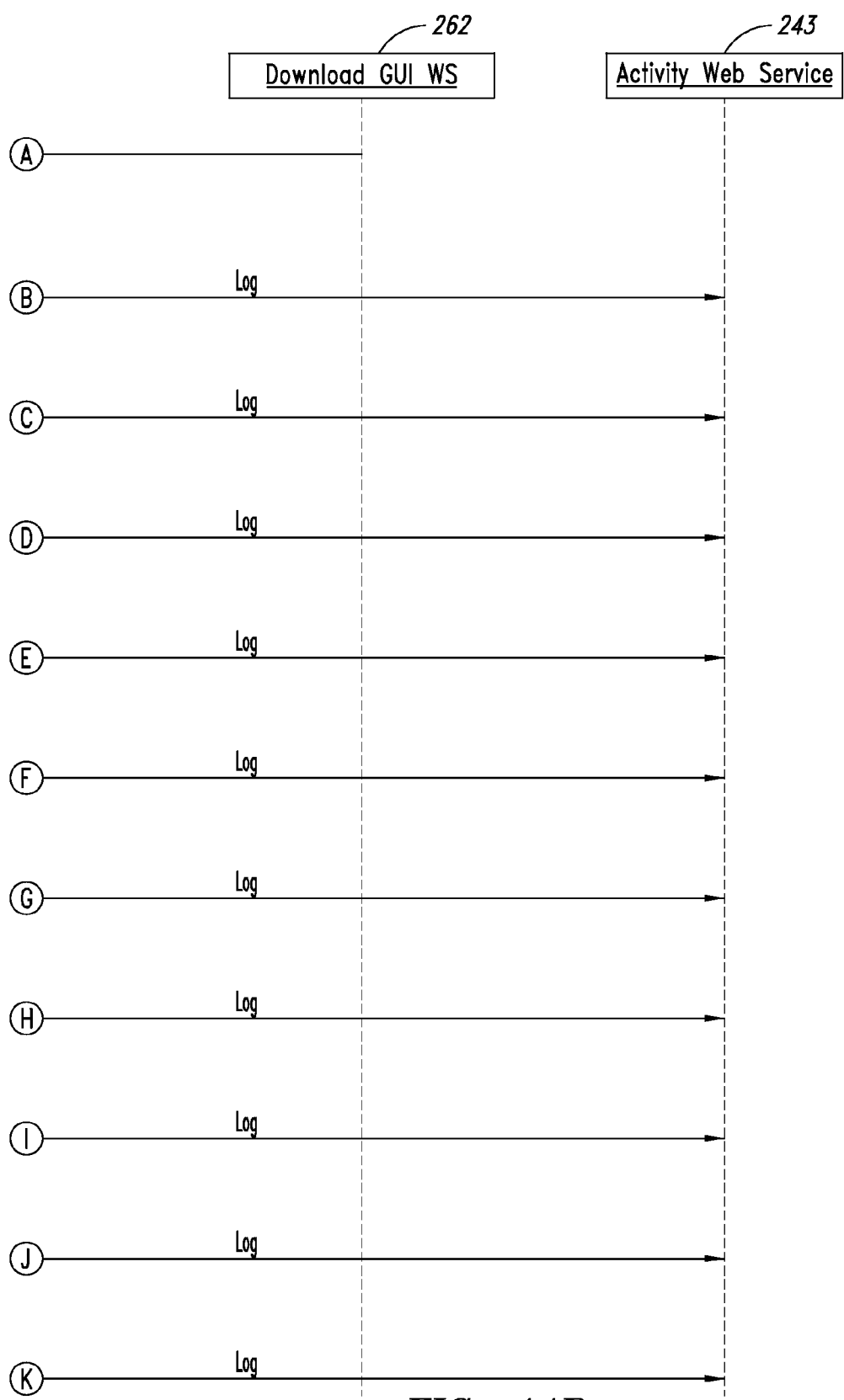
Figure 45A:
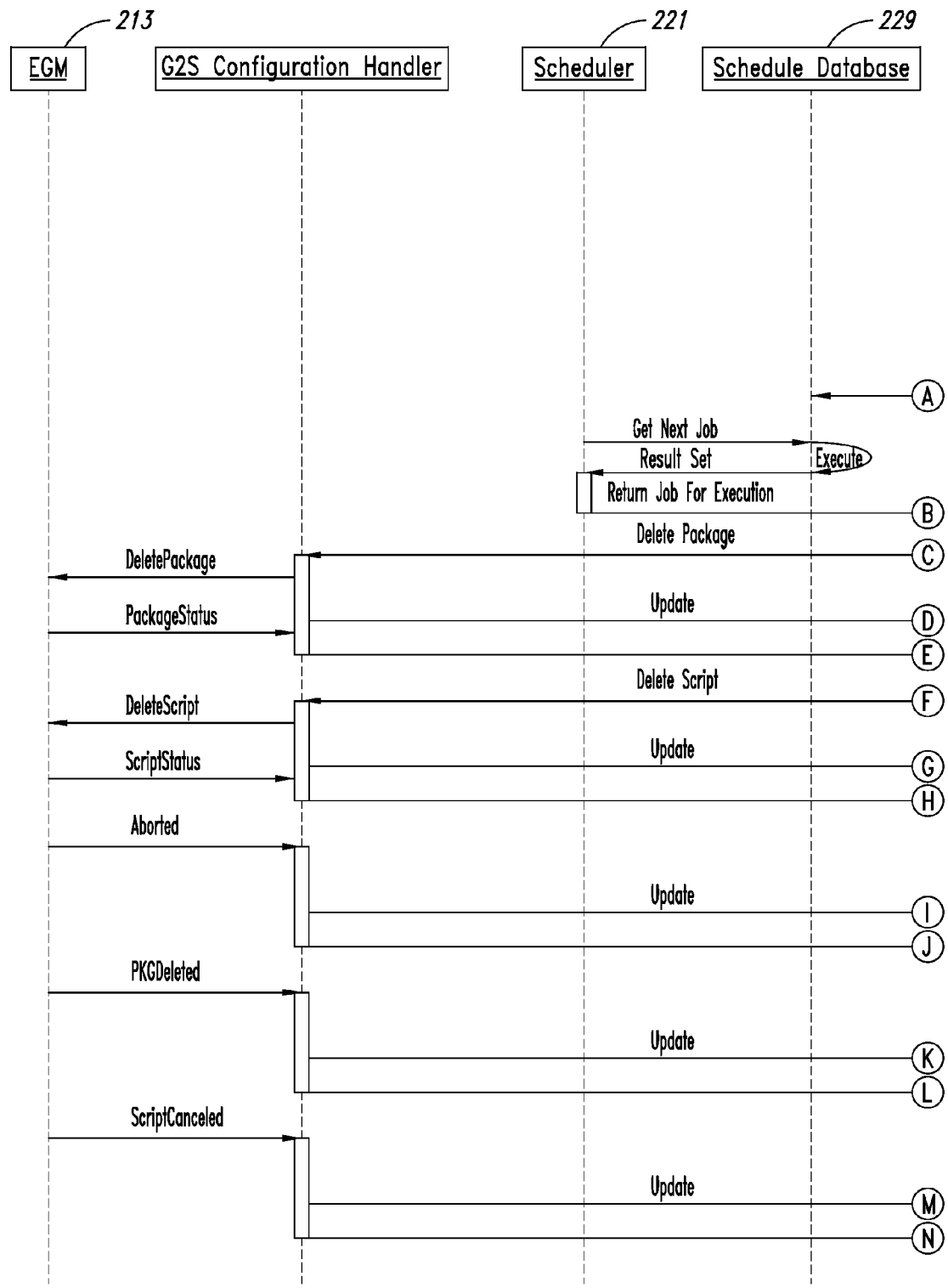
FIGS. 45A and 45B are a flow diagram illustrating a method of canceling a pending download of a package, according to one illustrated embodiment.
Figure 45B:
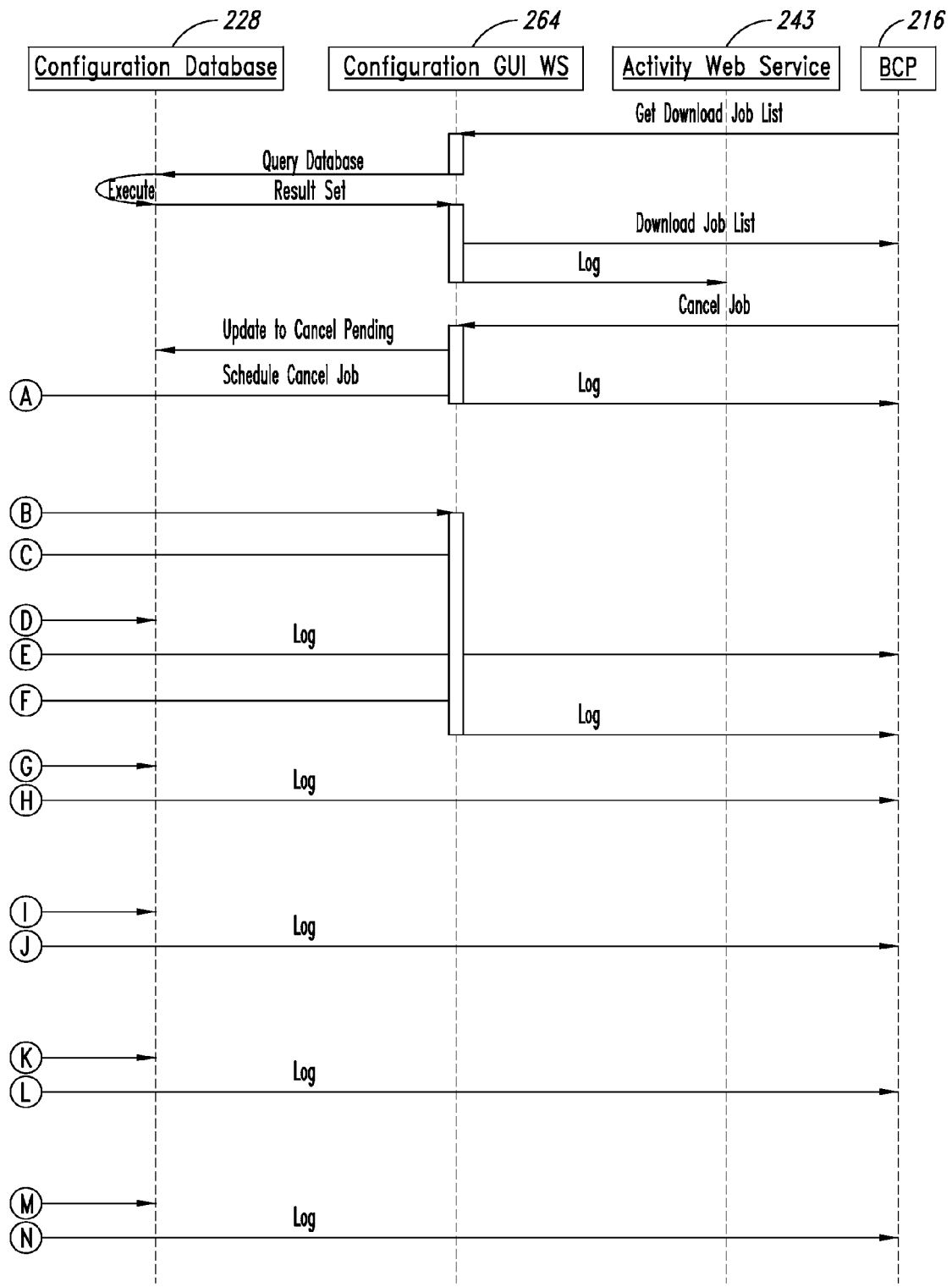
Figure 46:
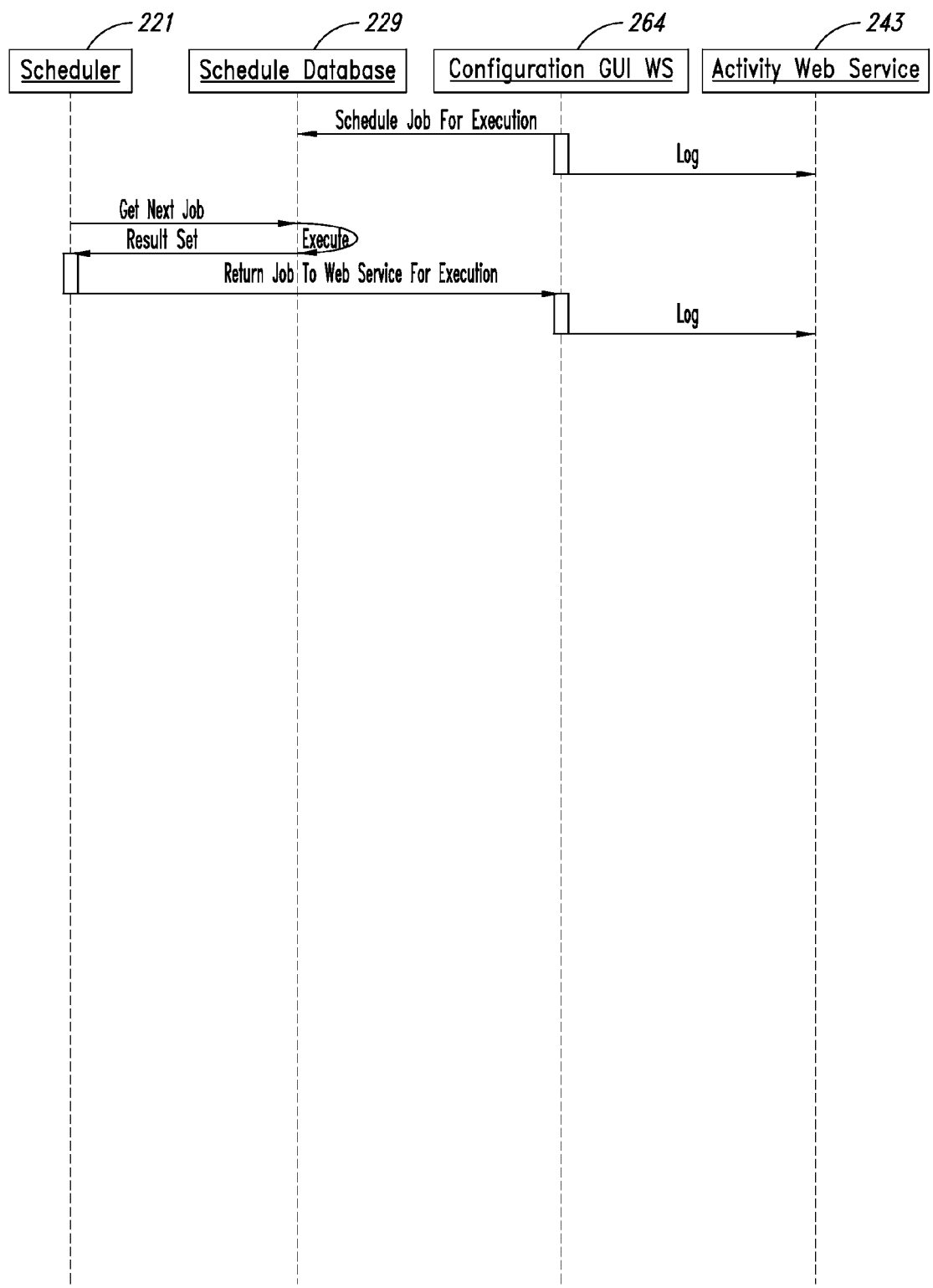
FIG. 46 is a flow diagram illustrating a method of scheduling a job execution, according to one illustrated embodiment.
Figure 48A:
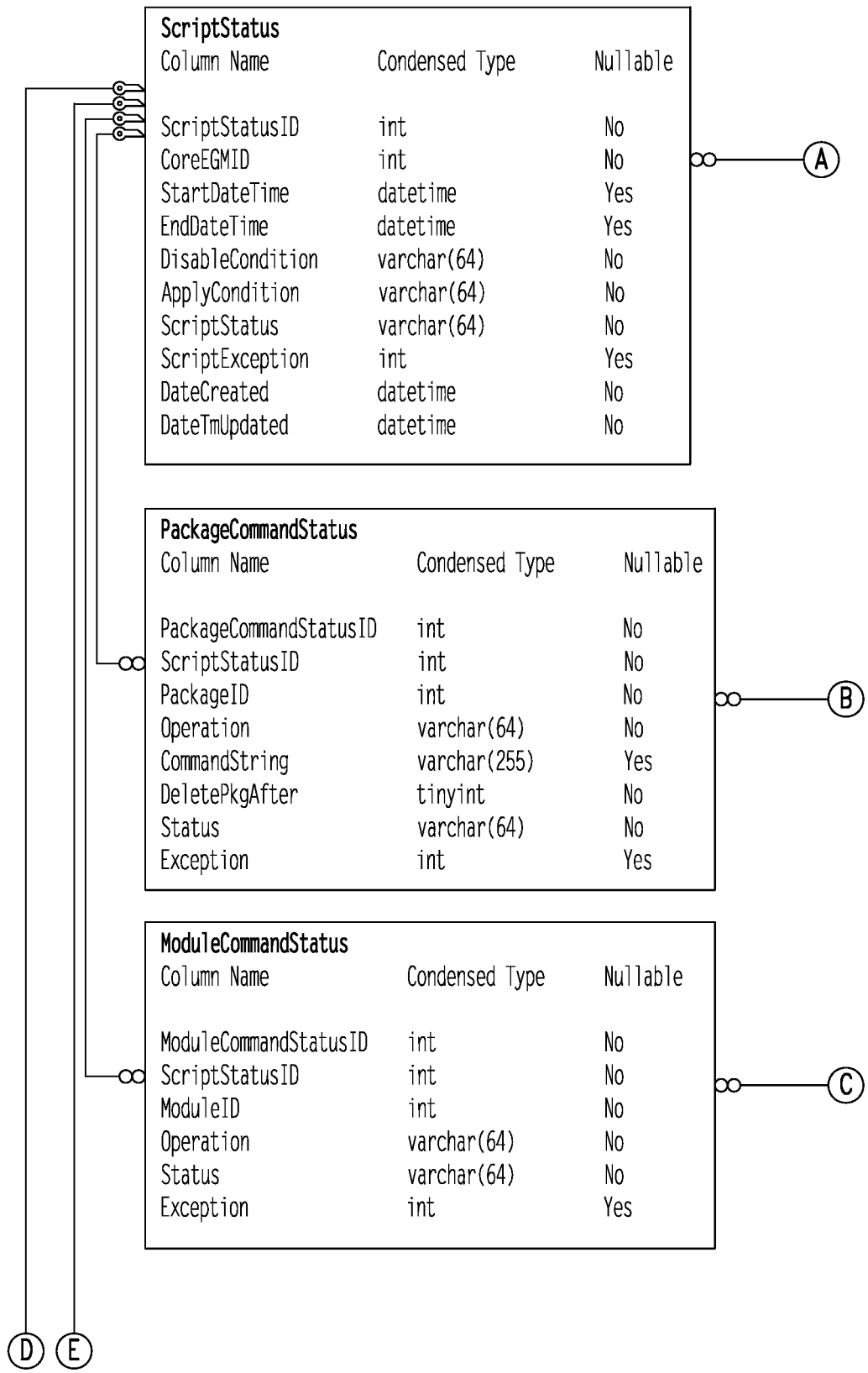
Figure 48B:
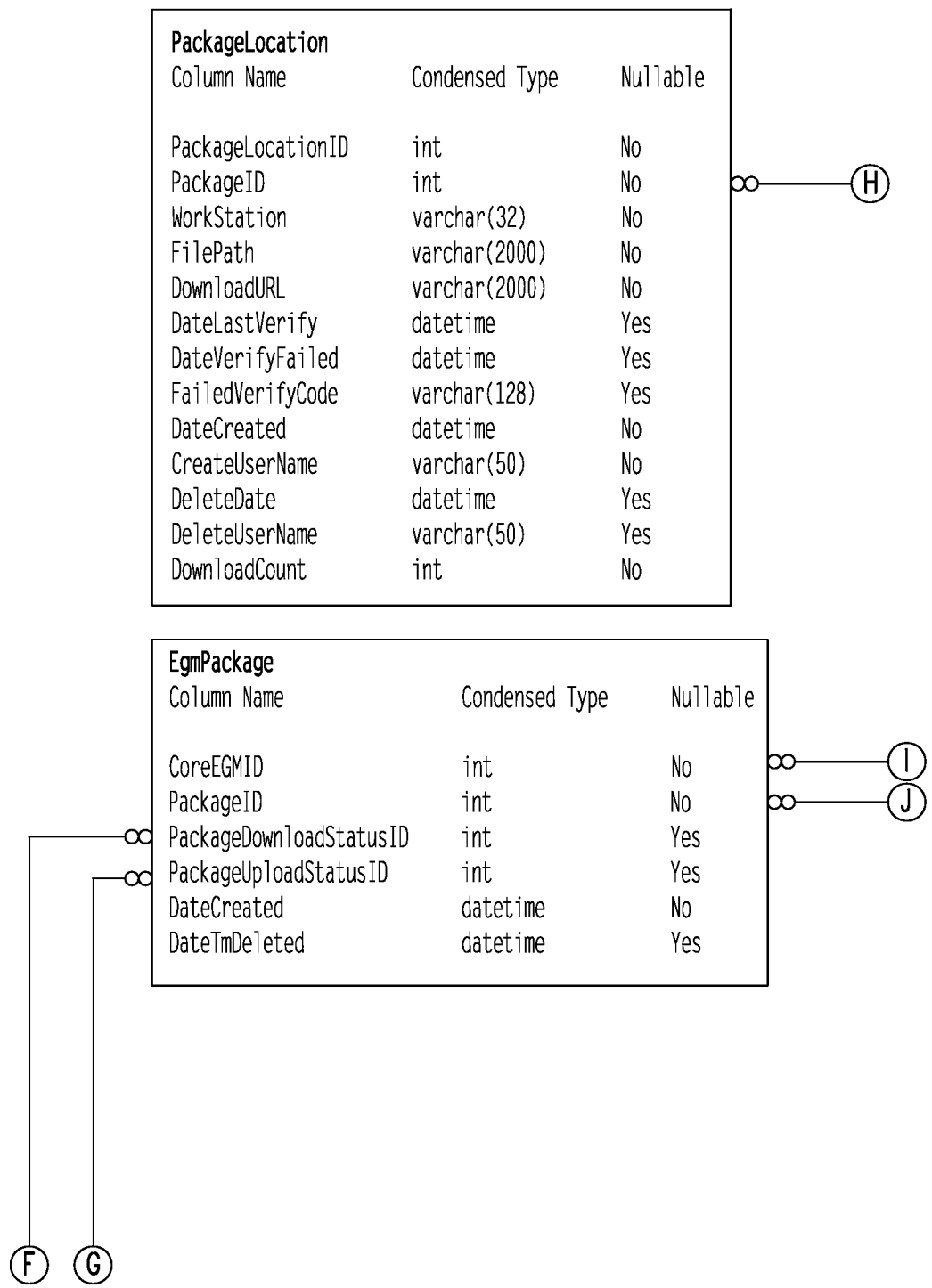
Figure 48C:
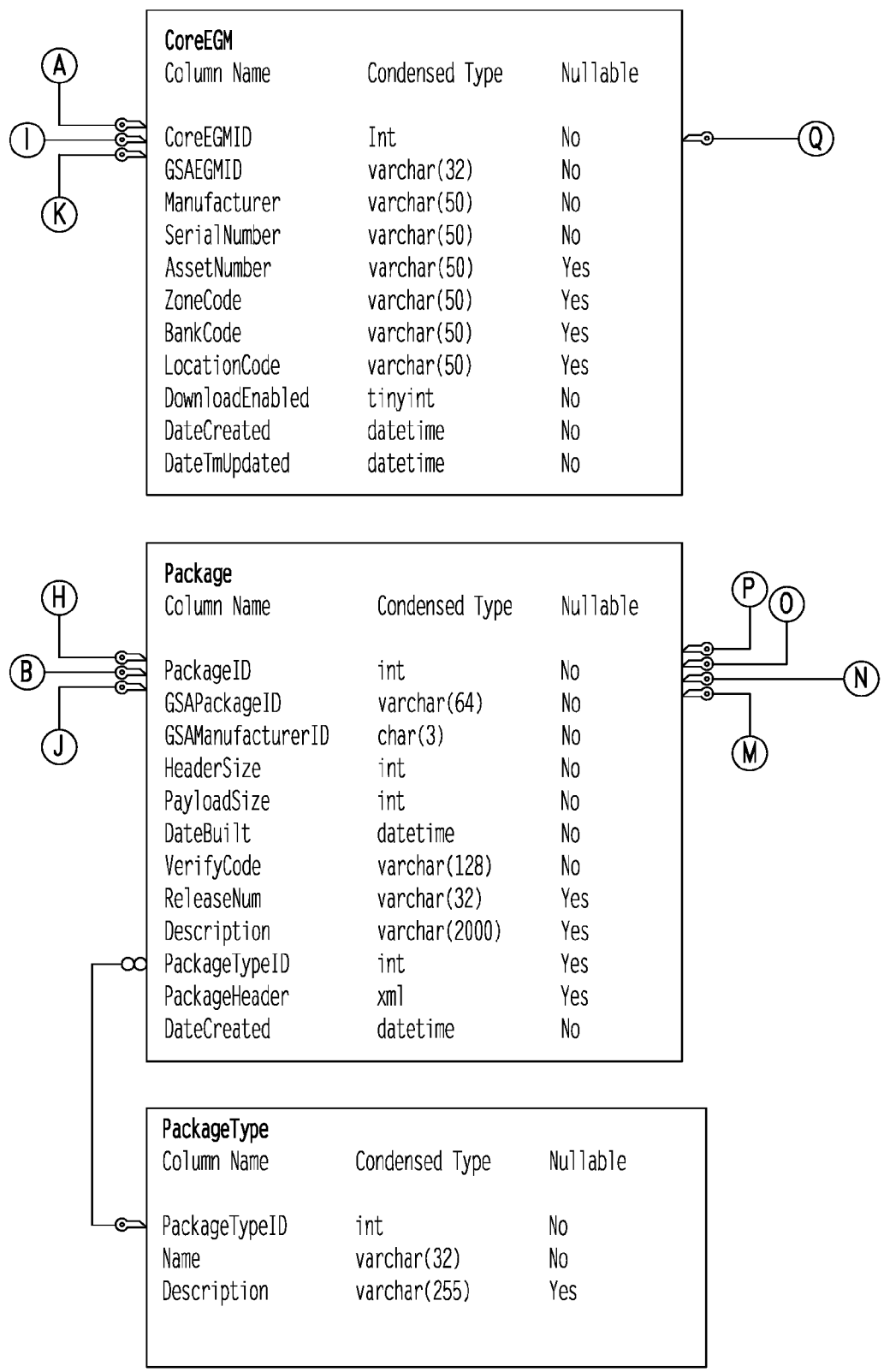
Figure 48D:
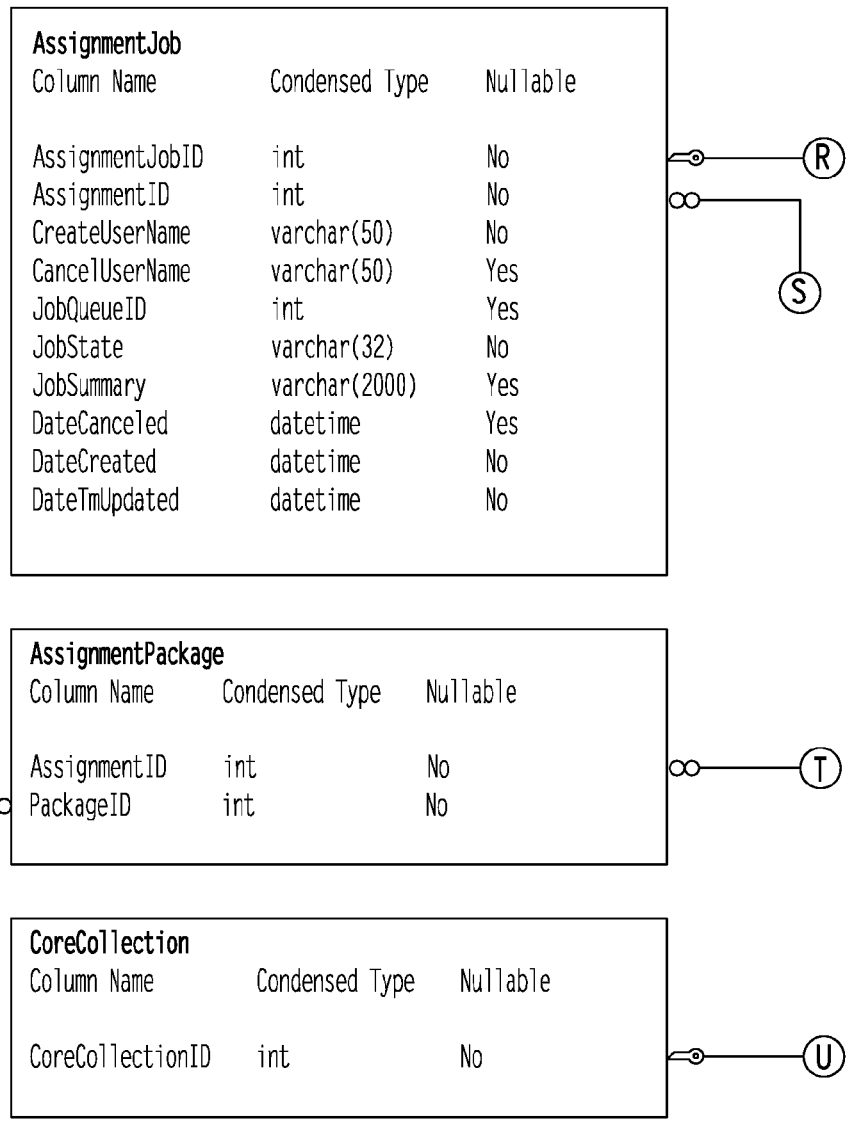
Figure 48E:
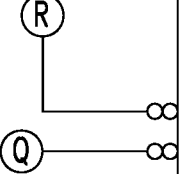
Figure 48F:
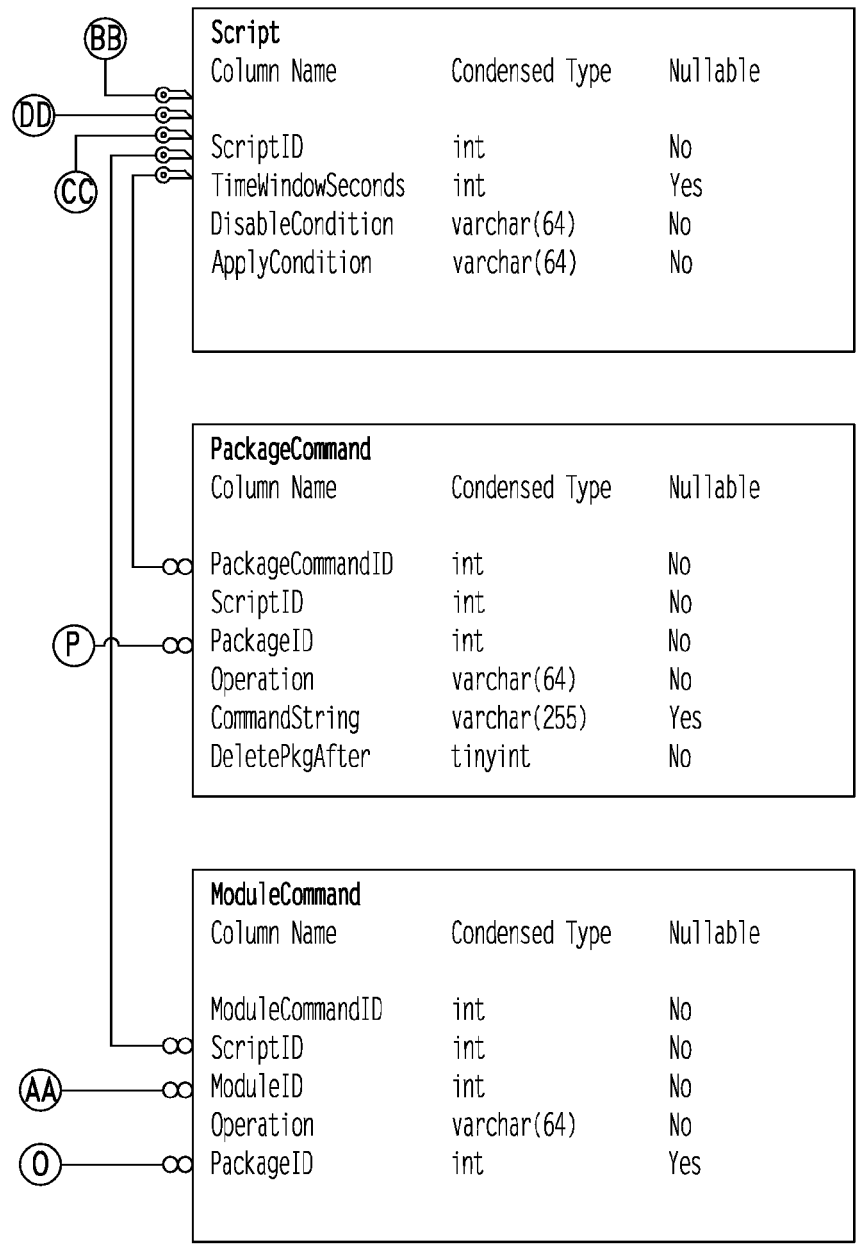
Figure 48H:
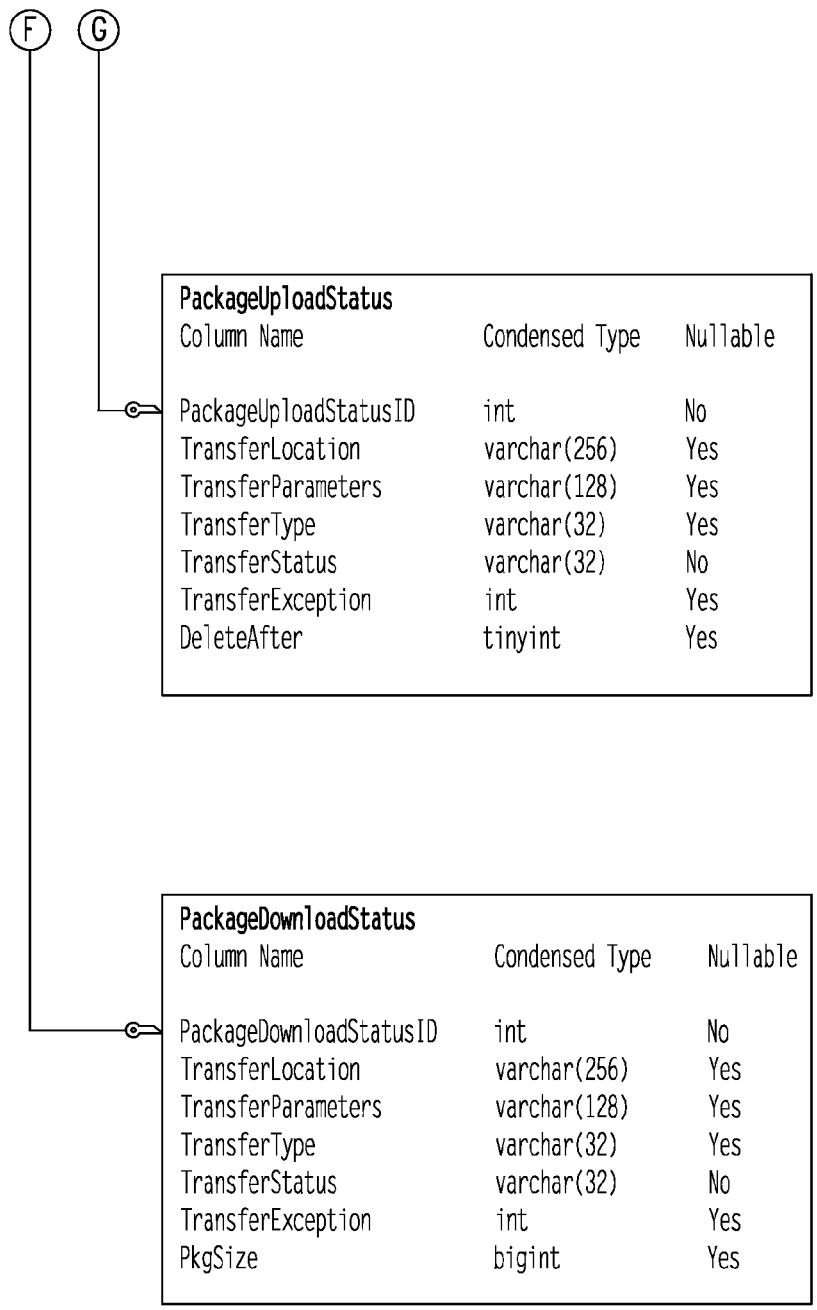
Figure 48I:
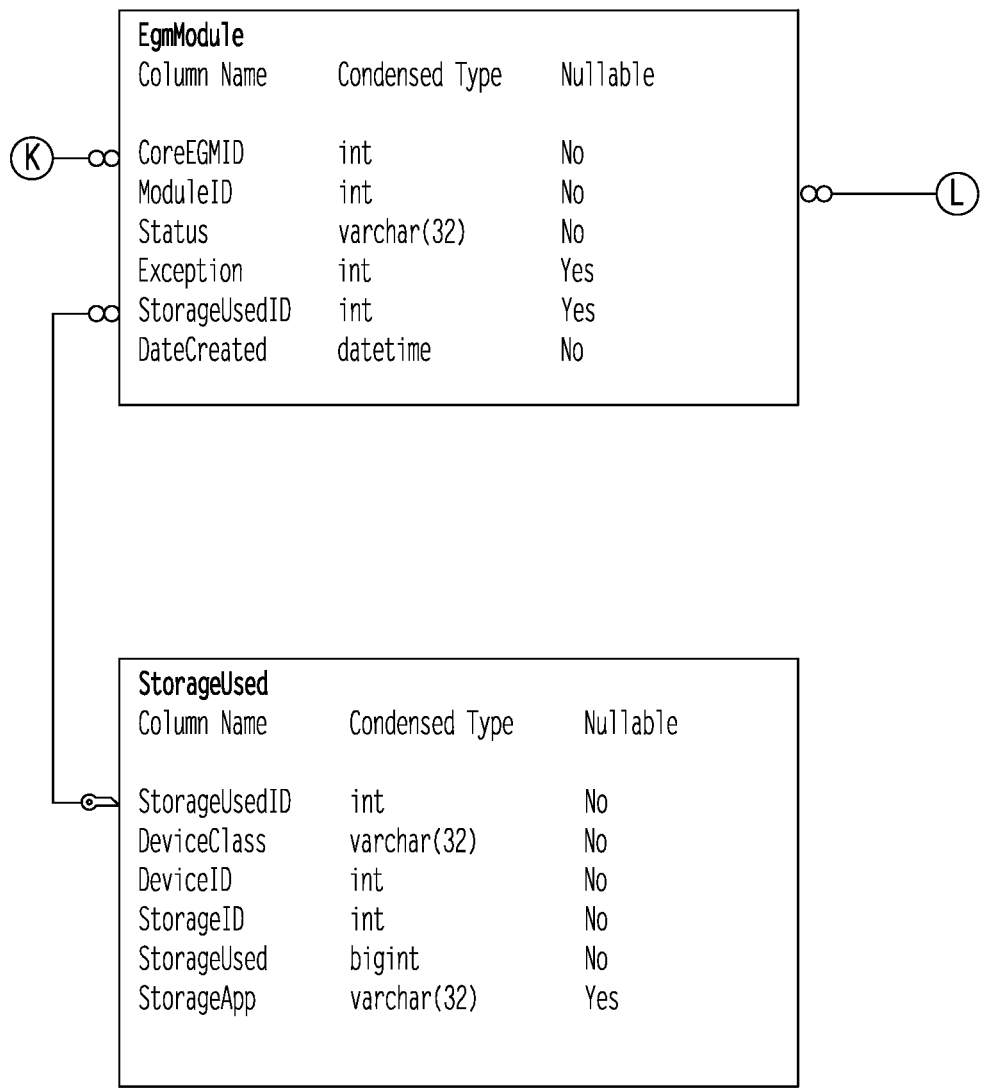
Figure 48J:
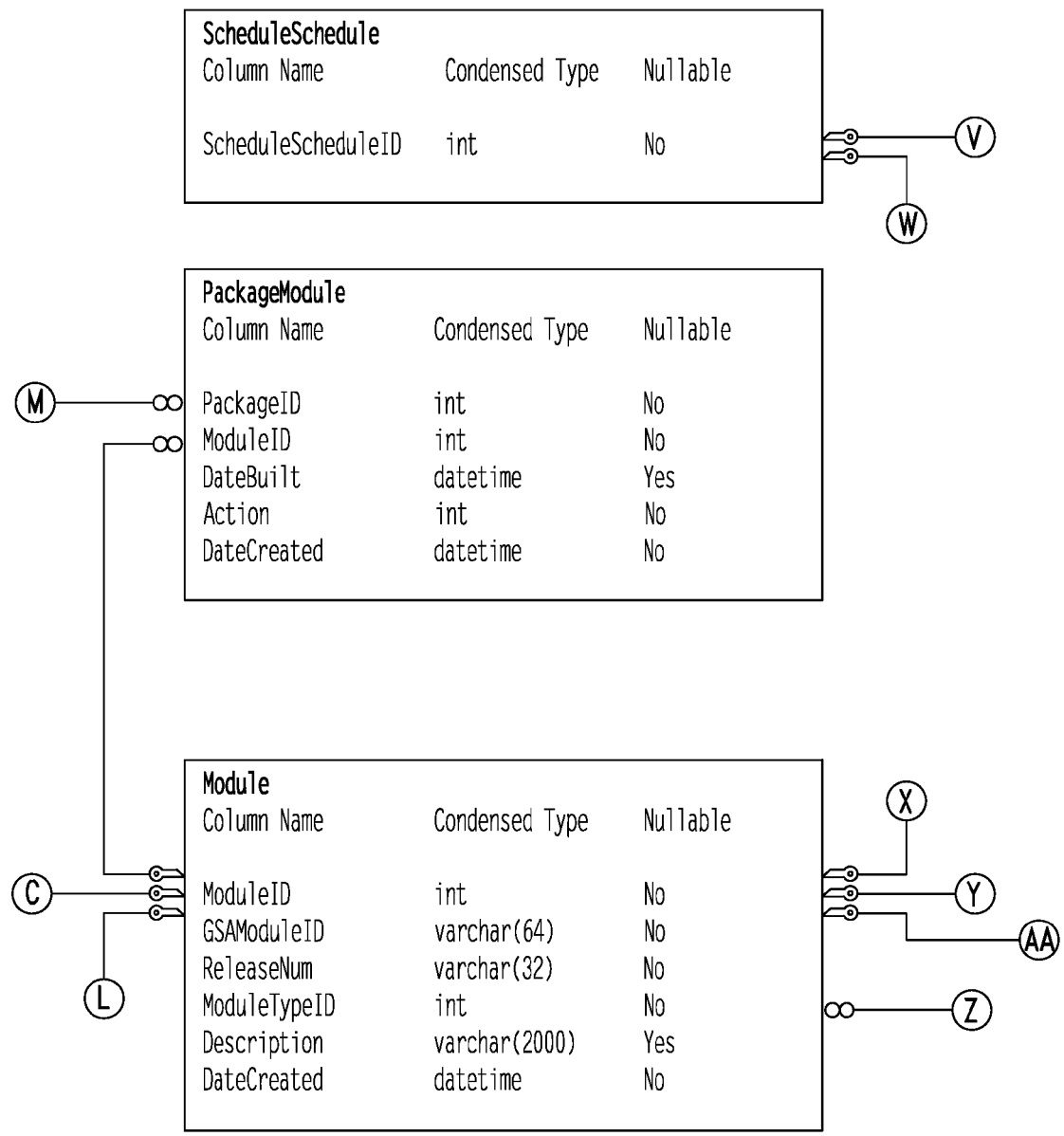
Figure 48K:
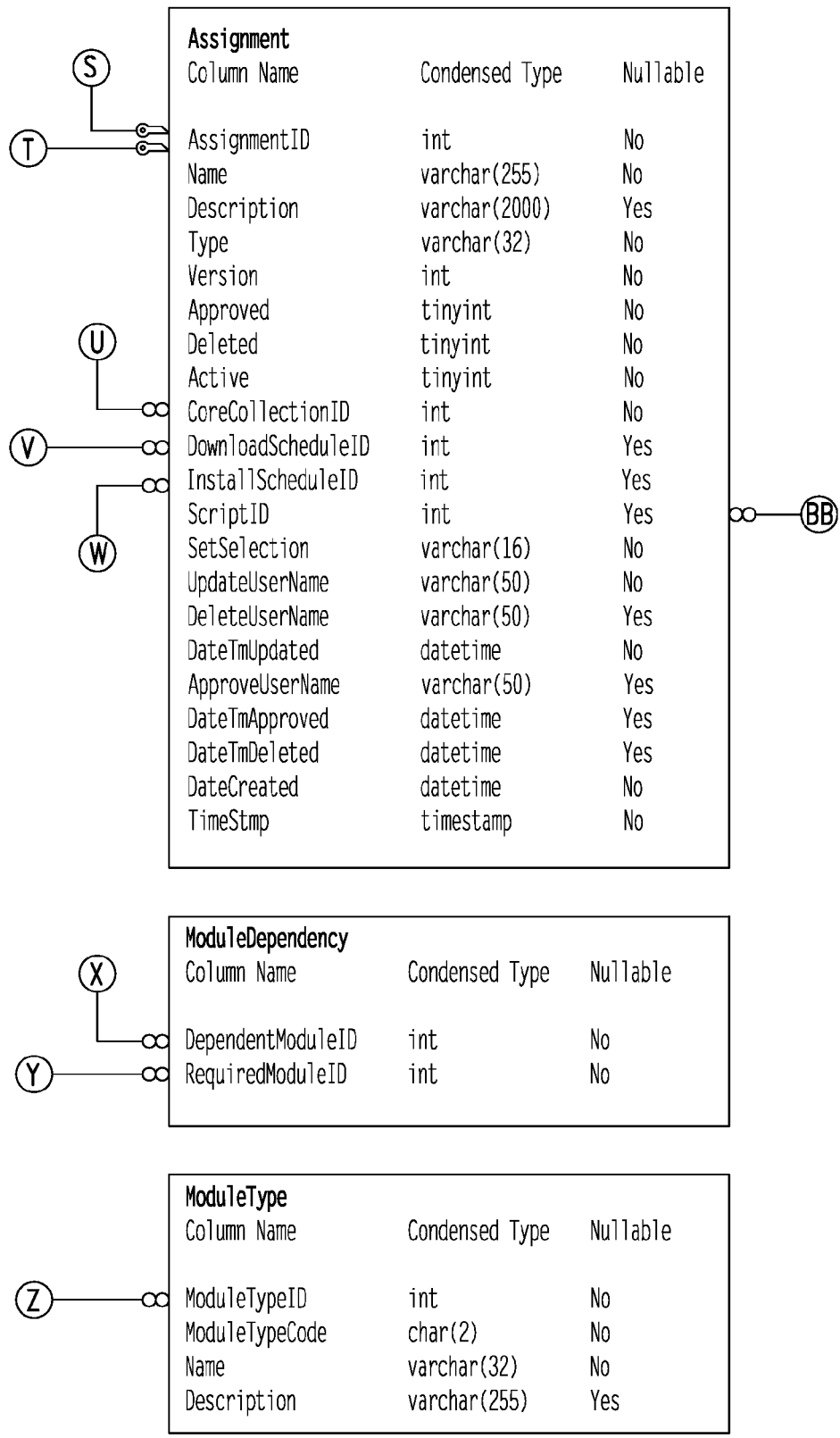
Figure 49A:
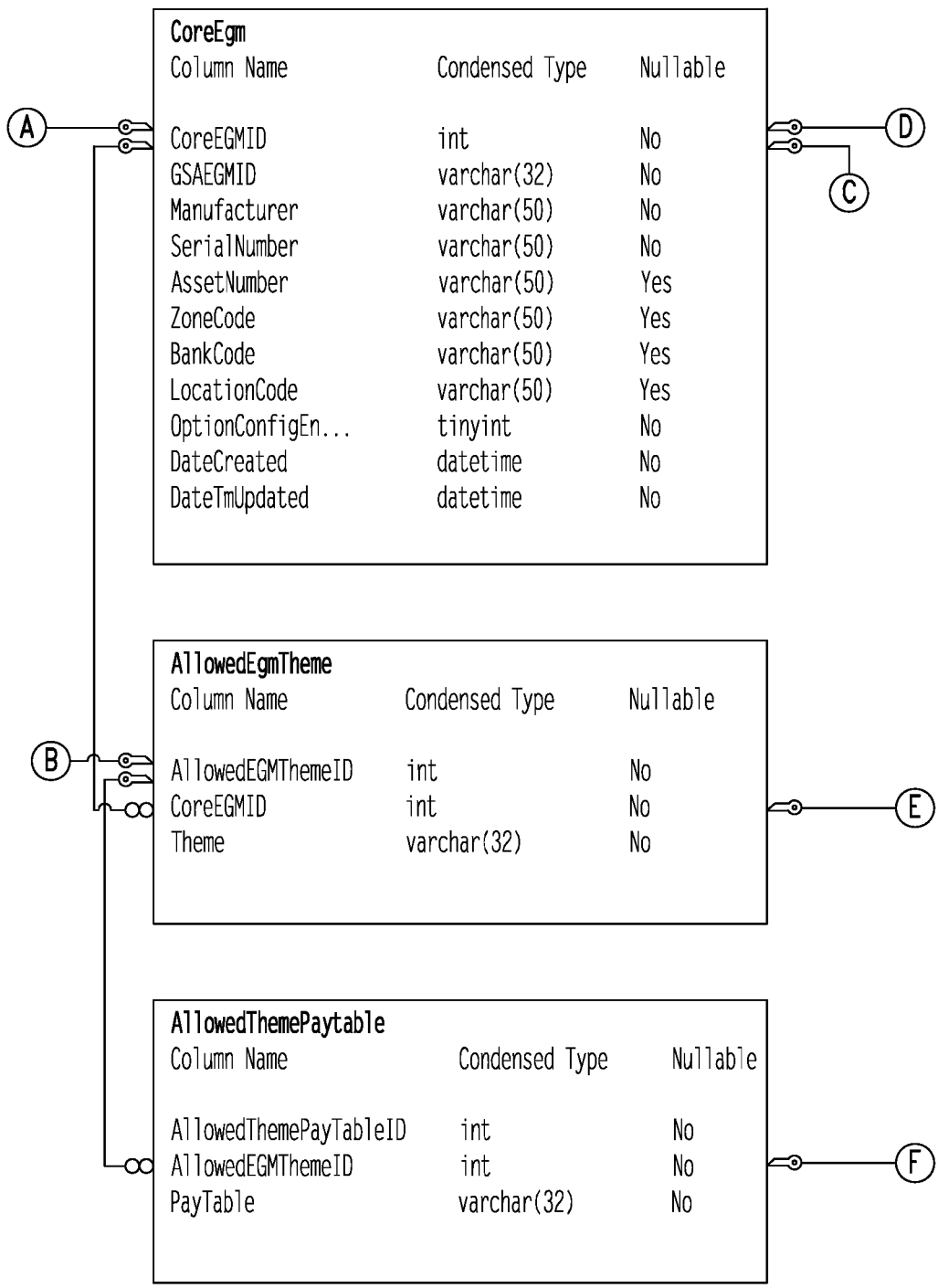
Figure 49D:
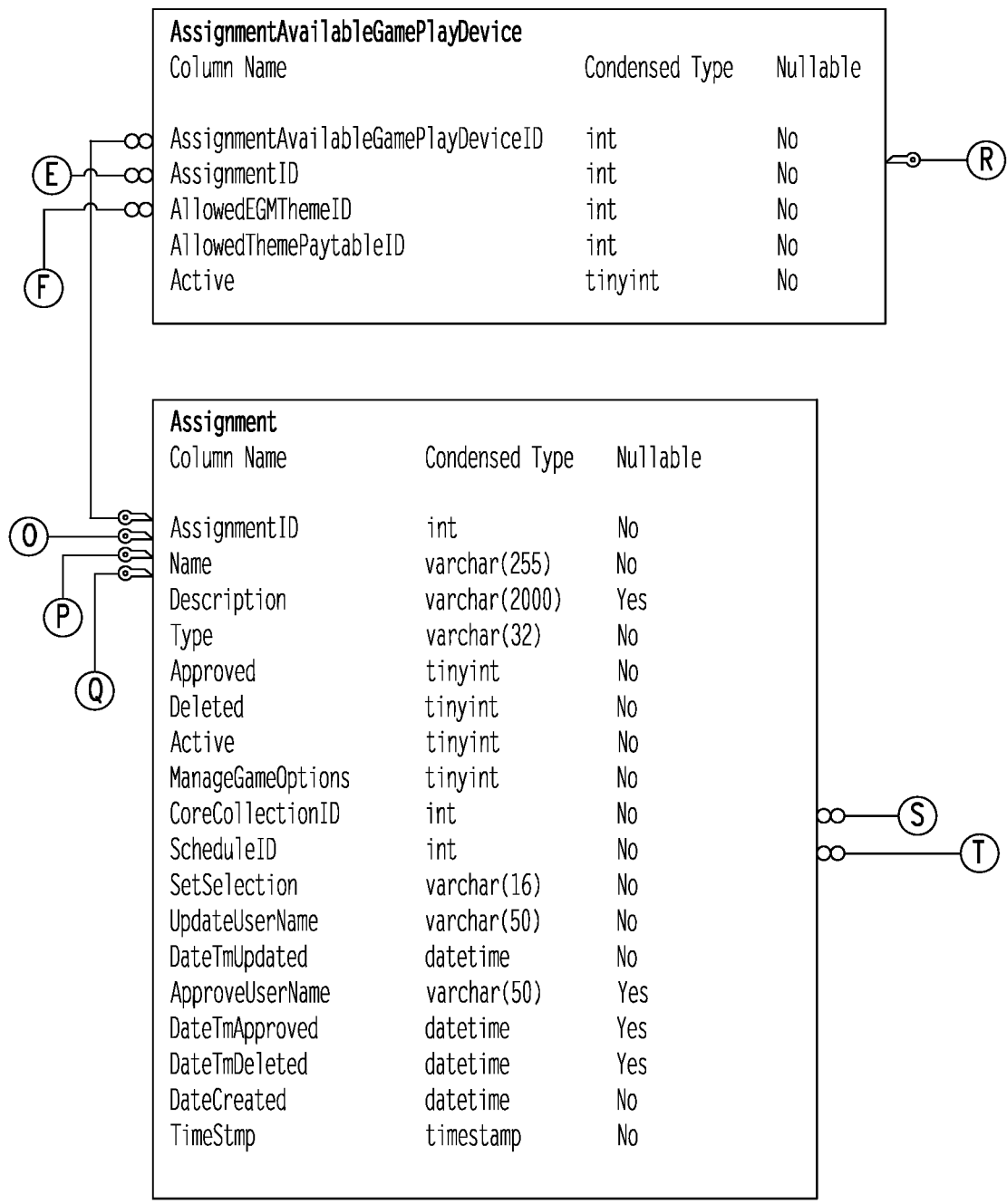
Figure 49F:
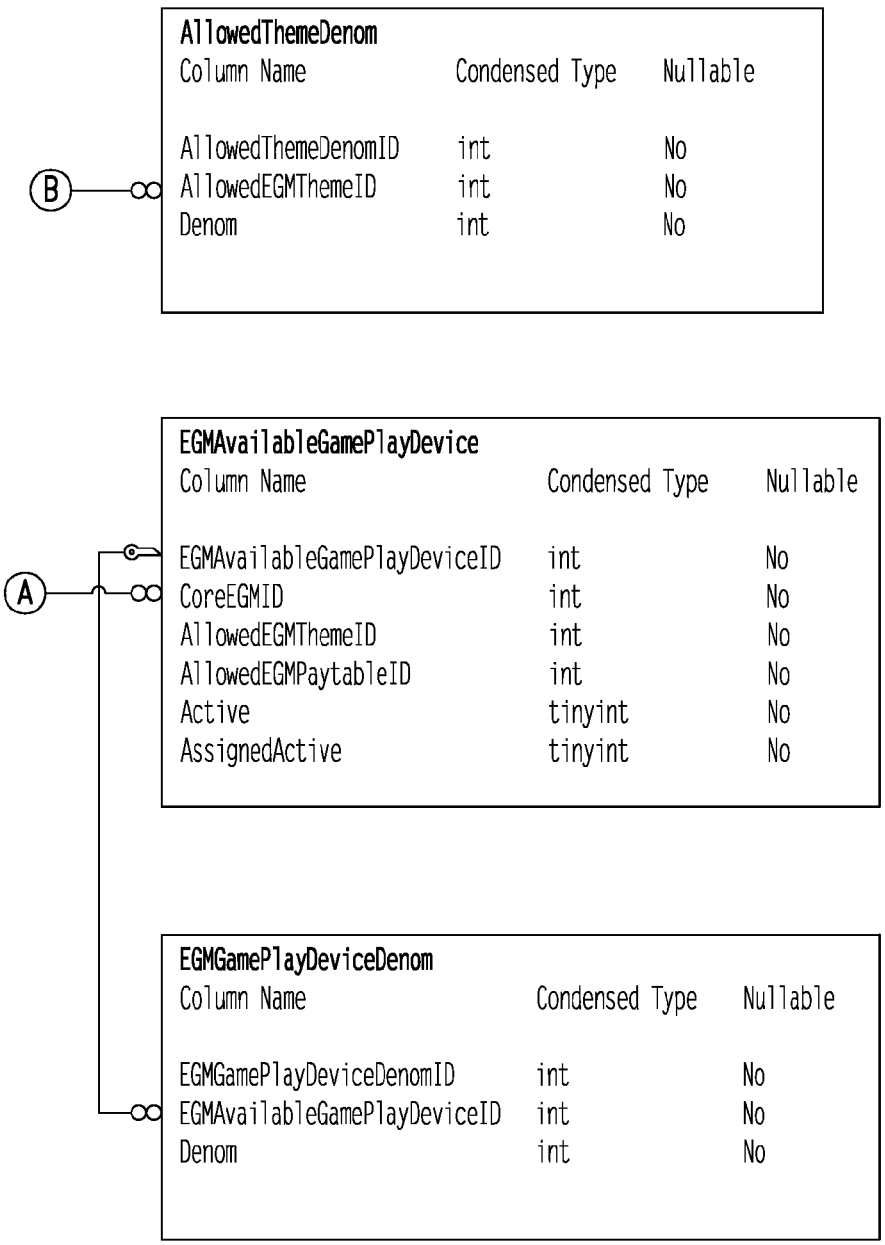
Figure 49H:
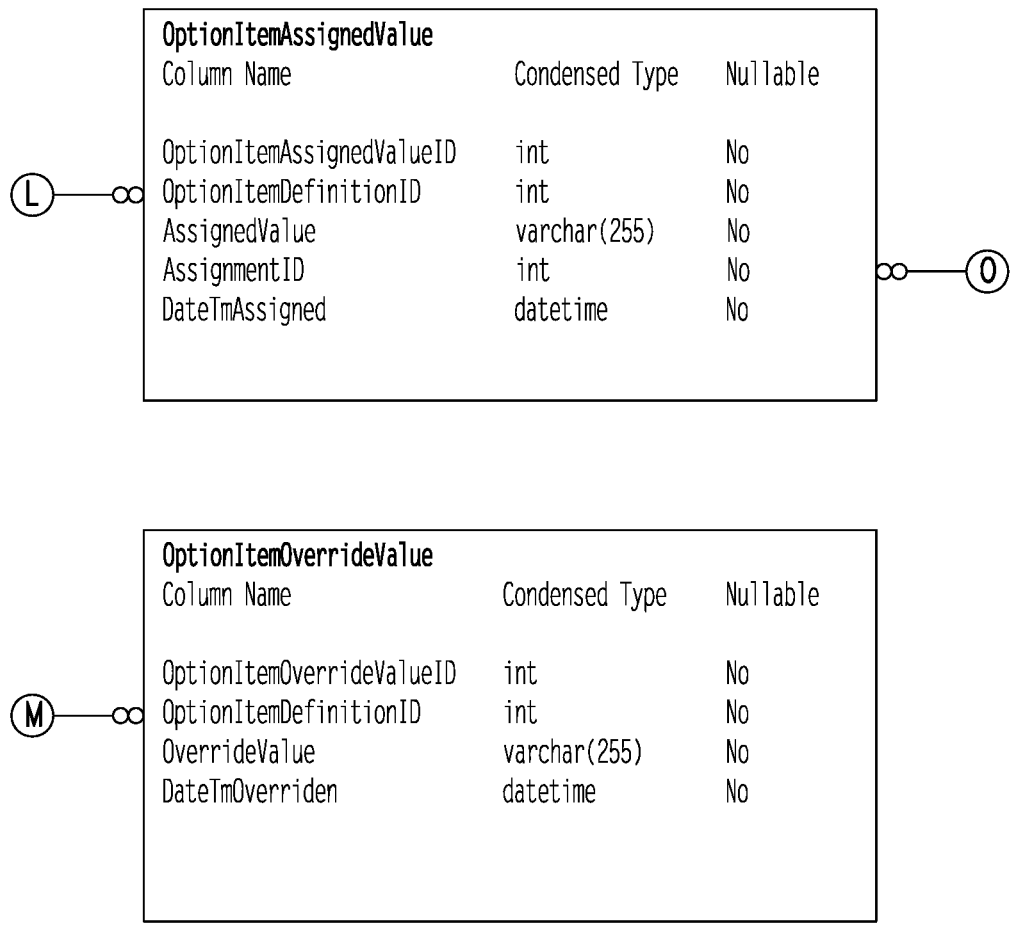
Figure 49I:
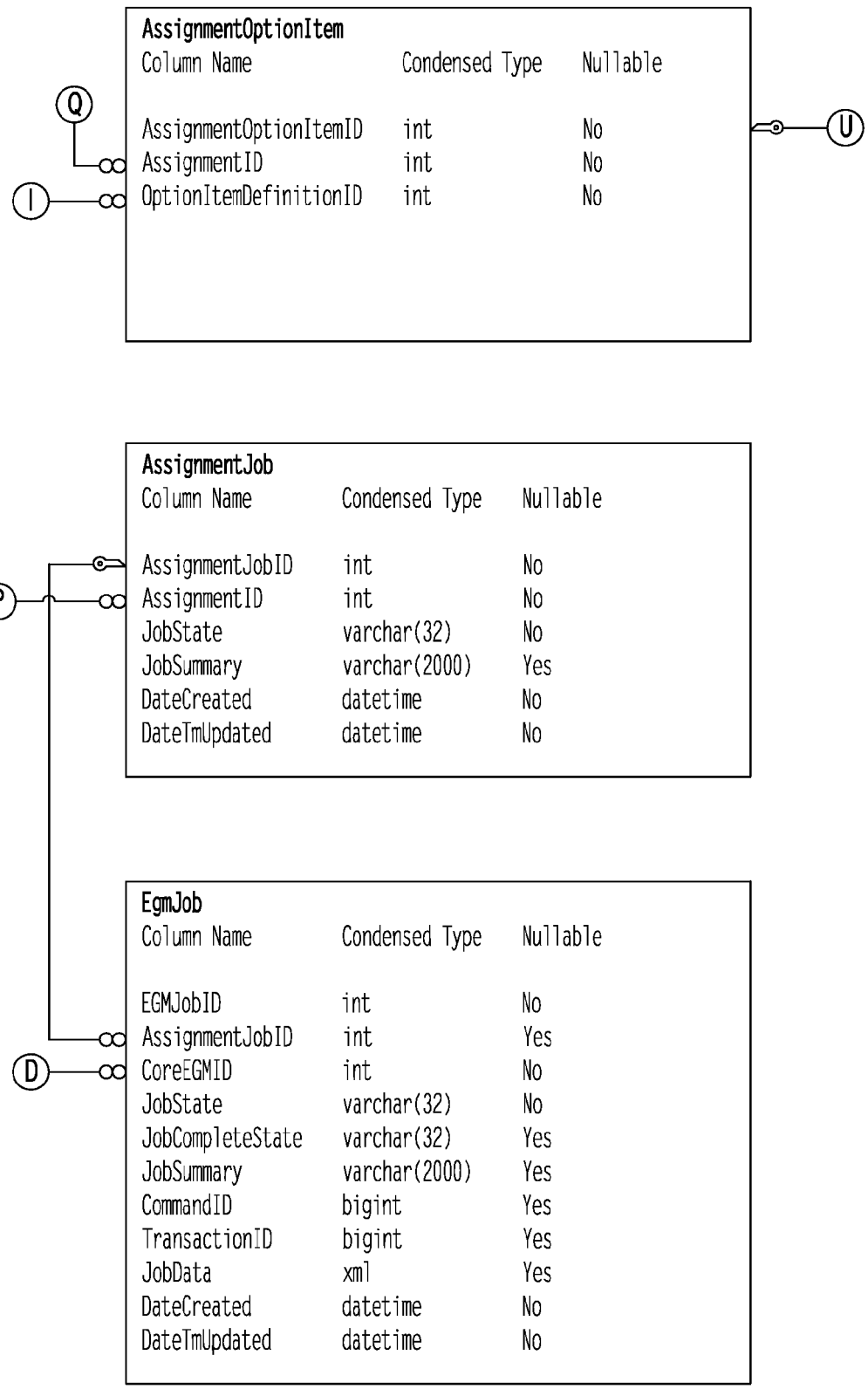

FIGS. 28, 28B, and 28C show sequence diagrams of an exemplary view package, view package modules, and view package management logs, according to one illustrated embodiment. Some examples of possible message sequences are shown that may be used to accomplish the tasks described herein. As most of the Control panel 216 driven user interface tasks have similar sequences, a few have been shown to demonstrate the several sequences which are generalizable and representative of the various procedures available to a user. Web Services 223 may be designed with fewer and chunkier messages than what might be done if these were simple procedure or function calls. Thus the sequence may be one message such as, for example, GetAssignmentData which would return a complex XML response spelling out all the attributes of an assignment. Later the BCP 216 may call SaveAssignment and pass the entire structure back with modifications.

The SaveAssignment sequence may be created as part of detailed design and implementation. The SaveAssignment sequence may serve as a bridge between the UI and the database, both of which have been specified in detail herein.

Other sequences in this section document the message flow between the host and an EGM. These have been implemented for all major use cases as this is an external integration point. While the G2S protocol documents may specify how these should work, they are often open to multiple interpretations. These sequences allow the iView and Alpha teams to compare their expectations with ours and give the whole team a chance to resolve differences earlier in the development cycle when it is cheaper.

An example Verify Package (described in FIG. 4) Sequence may include:

The Verify Package use case may perform verification and authentication on the Software Download Distribution Point (SDDP 252). It may use an encryption algorithm that is stored on a read-only media so that the regulators can place a tape seal over the media to prevent any un-authorized DVD/CD into the media.

There may be two actors who can perform the verification process. The first actor may be a user on the BCP 216 with the security role of the Approver. That user can initiate a verification process on demand from the GUI interface. The second actor may be the Host System which may be a scheduled task that runs the verification process once every 24 hours.

The verification process may be to read an encryption algorithm and content hash values from a read-only media and perform the algorithm on the content server to produce new hash values. Then the two hash values may be compared with each other to detect if the content has been tampered with. The results from the verification process may be logged to the database so that audit reports can be ran that show when the process was initiated, by who, and what the results were. The verification process may also report if any un-authorized files have been copied to the Software Download Distribution Point.

FIGS. 29-46 show exemplary sequence diagrams, according to some illustrated embodiments.

FIGS. 47A(1), 47A(2), 47B(1) and 47B(2) show exemplary sequence diagrams of a package management process and a package management system configuration, according to one illustrated embodiment.

Example Package Management Sequence may include:

This sequence diagram depicts the four major steps that may be done to install a package from read only drive (DVD Drive 276) to SDDP server 252 disk.

1—Obtaining SDDP server 252 Disks list: To allow users to choose the destinations of a package, obtaining SDDP server 252 disks list sequence diagram shows the steps to be implemented to request SDDP server 252 disks list from core database 231 and send the result back to Package Management GUI 274, so that the user may select appropriate destination disk.

2—Verifying Hash Codes: Before copying a package from read only drive to SDDP server 252 disks the validity of the package may be verified. Verifying hash codes process may compare the hash code which may be one of read only drive with another hash code that may be available in package drive, and may verify that those two are identical.

3—Storing Package Info: In this process the package info which may include hash code, may be stored in Download database 227. Also, the path of SDDP server 252 disk may be stored in this database.

4—Copying Package: In this process the package may be copied from read only drive to SDDP server 252 disk.

In one embodiment, the read only drives may be in the same machine which runs the Package Management GUI 274. Also, SDDP server 252 disks paths may be hard coded in Package Management GUI 274 (Console Application). Connections to databases may be through Download GUI Web Service 262.

FIGS. 48A-48L show an example block diagram of a download ERD database organization, according to one illustrated embodiment.

An Example Data View—Download

The download database 227 may encapsulate all the storage needed to support the download component of the system. It may hold the current inventory of all EGMs 213 as discovered via the G2S protocol (which is hereby incorporated) via the communications and download classes. It may store the assignments used to change that inventory via download class commands. It may store job state information for the jobs those assignments use to carry out downloads and installations. And it may store the inventory of the SDDP 252.

Download may be coupled directly or indirectly to the Schedule and Core databases 231. It leverages schedule to store assignment schedules for download and install and to queue pending jobs. It references core to replicate basic EGM information and to manage EGM collections. As with at least some components, activity history may be posted to the activity database 230 through Web Services 223 and may be stored locally in a limited fashion.

G2S may use the concept of scripts to install downloads and specify the approvals and other conditions that must be met for an install to occur. In the Download Database 227 the Script table with it related command tables may be linked to an assignment. When a script is sent to an individual EGM to be used, the script data from these tables maybe used as a template to create the ScriptStatus and related Command Status tables. The ScriptStatusID may be used as the script ID in the setScript command. Status for this script may be tracked within these Script Status tables and the rows may be used for that instance of the script.

Data Dictionary

An example JobQueue

Hold jobs that are waiting to be run. Scheduler may poll this table and kick off jobs when the start time has passed. If the schedule a job is tied to is recurring, then once the current instance succeeds, the scheduler may create a new row in this table for the next occurrence of the job using the same parameter data as the current job.

| QueuedDateTm | datetime | Date time job placed in queue |
|---|---|---|
| PrevCalledDateTm | datetime | Date time last attempt to call Web method occurred |
| NextCallDateTm | datetime | Date time that this job is meant to be run. Job is run by calling the Web method. |
| CallSucceeded | tinyint | Defautls 0. Set to 1 when call succeeds and scheduler can purge this record. |
| ScheduleID | int | FK to schedule record this job |
| JobQueueID | int | is controlled by Identity PK |
| MaxRetries | int | Max retries scheduler should attempt when Web service is unavailable, 0 if no retries |
| Retries | int | Number of re-tries attempted. Set to 1 only after the first retry |
| RetryIntervalSeconds | int | Number of seconds between retries |
| ParamData | xml | Parameter to pass to Web service |
| WebServiceURI | varchar | URI of Web service to call |
| WebMethod | varchar | Web method on service to call |

An Example Schedule

May Hold schedule records used by any parts of the system that stores a schedule. In one embodiment, simple schedule types with a start date may be supported. In another embodiment, recurring tasks may also be supported.

| | | |
|---|---|---|
| DateCreated | datetime | Date record created in DB |
| ScheduleTypeID | int | FK to the type of schedule |
| ScheduleID | int | Identity PK |
| EndDateTm | datetime | Optional end date and time |
| StateDateTm | datetime | Start date and time |

An Example ScheduleType

May Hold schedule records used by any parts of the system that stores a schedule. In one embodiment, simple schedule types with a start date may be supported. In another embodiment, recurring tasks may also be supported.

| | | |
|---|---|---|
| Description | varchar | Description of the schedule type |
| ScheduleTypeID | int | Identity PK |
| ScheduleType | varchar | Permanent, PermanentWithStart, OneTimeOverride, RecurringOverride |

An example Assignment

Data for what, when, and who to download or install.

| | | |
|---|---|---|
| Deleted | tinyint | NULL |
| DateTmDeleted | datetime | NULL |
| TimeStmp | timestamp | NULL |
| Active | tinyint | 1 is active and will be applied to floor. 0 is not active |
| Approved | tinyint | 1 is approved. Must be approved and active to take affect |
| Name | varchar | Assignment name. |
| DateCreated | datetime | Date the assignment was created. |
| DateTmUpdated | datetime | Date the assignment was last updated. |
| DateTmApproved | datetime | date time approved |
| SetSelection | varchar | Defines the selection range for options. (0 all, 1 intersection, 2 union) |
| CoreCollectionID | int | FK to Associated collection of EGMs |
| DownloadScheduleID | int | FK to download schedule for assignment |
| InstallScheduleID | int | FK to install schedule for assignment |
| AssignmentID | int | Identity PK |
| UpdateUserName | varchar | login name of the user who last updated the assignment. |
| ApproveUserName | varchar | login name of user who approved assignment |
| Type | varchar | Type of assignment. Configuration or Download |
| Description | varchar | User entered description of the assignment |

An example AssignmentJob

Storage for state and status associated with an assignment job.

| | | |
|---|---|---|
| DateCreated | datetime | DateTime record created |
| DateTmUpdated | datetime | DateTime Status last updated |
| AssignmentID | int | FK to Assignment for Job. 0 or more Jobs per Assignment |
| AssignmentJobID | int | Identity PK |
| JobState | varchar | Queued, InProgress, Complete |
| JobSummary | varchar | Text to summarize jobs status for GUI. i.e., 4 of 5 EGMs completed without error 1 of 5 not found. |

An example AssignmentPackage

One or more packages that are part of this assignment.

| | | |
|---|---|---|
| AssignmentID | int | NULL |
| PackageId | int | NULL |

An example CoreEGM

EGM data replicated as encountered in messages from Core

| | | |
|---|---|---|
| DateTmUpdated | datetime | NULL |
| DownloadEnabled | tinyint | 1 if the download class functionality is enabled for the EGM 213, 0 otherwise |
| AssetNumber | varchar | Asset number as replicated from Core |
| BankCode | varchar | Bank Code as replicated from Core |
| GSAEGMID | varchar | EGM ID used by GSA G2S messages |
| Manufacturer | varchar | EGM Manufacturer Code replicated from Core |
| SerialNumber | varchar | EGM Serial Number replicated from Core |
| LocationCode | varchar | Location Code as replicated from Core |
| CoreEGMID | int | Same value as replicated from the Core DB |
| ZoneCode | varchar | Zone Code as replicated from Core |

An example EGMJob

Sub job of assignment job that applies to a particular EGM

| | | |
|---|---|---|
| CommandID | bigint | CommandID of last command sent. This will be returned in the response. |
| JobData | xml | Data containing state needed to carry out job - define by job type |
| DateCreated | datetime | DateTime record created |
| DateTmUpdated | datetime | DateTime Status last updated |
| JobCompleteState | varchar | Error or Success. Should we have a look up table? |
| CoreEGMID | int | FK to EGM for this Job |
| EGMJobID | int | Identity PK |
| JobState | varchar | Queued, InProgress, Complete. Should we have a look-up table? |
| JobSummary | varchar | Text to summarize jobs status for GUI. (e.g., 4 of 5 EGMs completed without error 1 of 5 not found.) |
| TransactionID | bigint | Transaction ID sent by EGM in response to command. Used to tie events to commands. |

An example EgmPackage

Packages that may be on an EGM. From the PackageList response.

| CoreEgmID | int | NULL |
|---|---|---|
| PackageID | int | NULL |
| PackageState | varchar | NULL |
| InstallStartDateTm | datetime | NULL |
| InstallEndDateTm | datetime | NULL |

An example Package

Data about a package in the SDDP.

| PackageID | int | NULL |
|---|---|---|
| GSAPackageID | varchar | NULL |
| Description | varchar | NULL |
| Type | varchar | NULL |
| Location | varchar | NULL |
| PackageDescriptor | xml | NULL |
| GSAManufacturerId | char | Manufacturer identifier. |

An example ScheduleSchedule

Replicated data from the Schedule table in the Schedule database 229. Allows for enforcing RI locally.

| ScheduleScheduleID | int | ID of the corresponding schedule record in the Schedule database. |
|---|---|---|

FIGS. 49A-49I show an exemplary block diagram of a configuration ERD database organization or tree, according to one illustrated embodiment.

An example Configuration may include:

The configuration database 228 may encapsulate all the storage needed to support the option configuration component of the system. It holds the current option configuration of all EGMs 213 as discovered via the G2S protocol in the communications, optionConfig, and gamePlay classes. This includes options items for ordinary devices and games which are known in the protocol as game play devices. It also stores the potential or available option item choices for each EGM. It stores the assignments used to change options item values via optionConfig class commands. And it stores job state information for the jobs those assignments use to carry out option changes.

Configuration may be directly or indirectly coupled to the Schedule and Core databases 231. It leverages schedule to store assignment schedules and to queue pending jobs. It references core to replicate basic EGM information and to manage EGM collections. As with all other components, activity history may be posted to the activity database 230 through Web Services 223 and may be stored locally.

| An example Configuration Database Dictionary | | | |
|---|---|---|---|
| AllowedEGMTheme | AllowedEGMThemeID | int | NULL |
| AllowedEGMTheme | CoreEGMID | int | Associated EGM identifier. |
| AllowedEGMTheme | Theme | varchar | Associated game theme identifier. |
| AllowedThemeDenom | AllowedEGMThemeID | int | NULL |
| AllowedThemeDenom | Denom | int | NULL |
| AllowedThemeDenom | AllowedThemeDenomID | int | Primary key allowable EGM denomination, e.g., 5 cents. |
| AllowedThemePaytable | AllowedThemePayTableID | int | NULL |
| AllowedThemePaytable | AllowedEGMThemeID | int | NULL |
| AllowedThemePaytable | PayTable | varchar | NULL |
| Assignment | DateTmDeleted | datetime | NULL |
| Assignment | TimeStmp | timestamp | NULL |
| Assignment | Deleted | tinyint | NULL |
| Assignment | Active | tinyint | 1 is active and will be applied to floor. 0 is not active |
| Assignment | Approved | tinyint | 1 is approved. Must be approved and active to take affect |
| Assignment | Name | varchar | Assignment name. |
| Assignment | DateCreated | datetime | Date the assignment was created. |
| Assignment | DateTmUpdated | datetime | Date the assignment was last updated. |
| Assignment | DateTmApproved | datetime | date time approved |
| Assignment | ManageGameOptions | tinyint | Defines if the Assignment is managing game combos. |
| Assignment | SetSelection | varchar | Defines the selection range for options. (0 all, 1 intersection, 2 union) |
| Assignment | CoreCollectionID | int | FK to Associated collection of EGMs |
| Assignment | ScheduleID | int | FK to schedule for assignment |
| Assignment | AssignmentID | int | Identity PK |
| Assignment | ApproveUserName | varchar | login name of user who approved assignment |

| An example Configuration Database Dictionary | | | |
|---|---|---|---|
| Assignment | UpdateUserName | varchar | Name of the user who last updated the assignment. |
| Assignment | Type | varchar | Type of assignment. Configuration or Download |
| Assignment | Description | varchar | User entered description of the assignment |
| AssignmentAvailableGamePlayDevice | Active | tinyint | 1 means the assignment is meant to make this an active game on the EGM 213 |
| AssignmentAvailableGamePlayDevice | AssignmentID | int | FK to assignment for this GamePlayDevice |
| AssignmentAvailableGamePlayDevice | AllowedThemePaytableID | int | FK to Paytable for this GamePlayDevice |
| AssignmentAvailableGamePlayDevice | AllowedEGMThemeID | int | FK to Theme for this GamePlayDevice |
| AssignmentAvailableGamePlayDevice | AssignmentAvailableGamePlayDeviceID | int | Identity PK |
| AssignmentGamePlayDeviceDenom | AssignmentGamePlayDeviceDenomID | int | NULL |
| AssignmentGamePlayDeviceDenom | AssignmentAvailableGamePlayDeviceID | int | NULL |
| AssignmentGamePlayDeviceDenom | Denom | int | NULL |
| AssignmentJob | DateCreated | datetime | DateTime record created |
| AssignmentJob | DateTmUpdated | datetime | DateTime Status last updated |
| AssignmentJob | AssignmentID | int | FK to Assignment for Job. 0 or more Jobs per Assignment |
| AssignmentJob | AssignmentJobID | int | Identity PK |
| AssignmentJob | JobState | varchar | Queued, InProgress, Complete |
| AssignmentJob | JobSummary | varchar | Text to summarize jobs status for GUI. i.e., 4 of 5 EGMs completed without error 1 of 5 not found. |
| AssignmentOptionItem | AssignmentOptionItemID | int | NULL |
| AssignmentOptionItem | AssignmentID | int | NULL |
| AssignmentOptionItem | OptionItemDefinitionID | int | NULL |
| AssignmentOptionItemValue | AssignmentOptionItemValueID | int | NULL |
| AssignmentOptionItemValue | AssignmentOptionItemID | int | NULL |
| AssignmentOptionItemValue | AssignedValue | varchar | NULL |
| CoreCollection | CoreCollectionID | int | ID of the collection in the Core Database |
| CoreEGM | DateCreated | datetime | NULL |
| CoreEGM | DateTmUpdated | datetime | NULL |
| CoreEGM | OptionConfigEnabled | tinyint | 1 if the optionConfig class functionality is enabled for the EGM 213, 0 otherwise |
| CoreEGM | AssetNumber | varchar | Asset number as replicated from Core |
| CoreEGM | BankCode | varchar | Bank Code as replicated from Core |
| CoreEGM | GSAEGMID | varchar | EGM ID used by GSA G2S messages |
| CoreEGM | Manufacturer | varchar | EGM Manufacturer Code replicated from Core |
| CoreEGM | SerialNumber | varchar | EGM Serial Number replicated from Core |
| CoreEGM | LocationCode | varchar | Location Code as replicated from Core |
| CoreEGM | CoreEGMID | int | Same value as replicated from the Core DB |
| CoreEGM | ZoneCode | varchar | Zone Code as replicated from Core |
| EGMAvailableGamePlayDevice | EGMAvailableGamePlayDeviceID | int | NULL |
| EGMAvailableGamePlayDevice | CoreEGMID | int | NULL |
| EGMAvailableGamePlayDevice | AllowedEGMThemeID | int | NULL |
| EGMAvailableGamePlayDevice | AllowedEGMPaytableID | int | NULL |
| EGMAvailableGamePlayDevice | Active | tinyint | NULL |
| EGMAvailableGamePlayDevice | AssignedActive | tinyint | NULL |
| EGMGamePlayDeviceDenom | EGMGamePlayDeviceDenomID | int | NULL |
| EGMGamePlayDeviceDenom | EGMAvailableGamePlayDeviceID | int | NULL |
| EGMGamePlayDeviceDenom | Denom | int | NULL |
| EGMJob | AssignmentJobID | int | NULL |

| An example Configuration Database Dictionary | | | |
|---|---|---|---|
| EGMJob | CommandID | bigint | CommandID of last command sent. This may be returned in the response. |
| EGMJob | JobData | xml | Data containing state used to carry out job - define by job type |
| EGMJob | DateCreated | datetime | DateTime record created |
| EGMJob | DateTmUpdated | datetime | DateTime Status last updated |
| EGMJob | JobCompleteState | varchar | Error or Success. Should we have a look up table? |
| EGMJob | CoreEGMID | int | FK to EGM for this Job |
| EGMJob | EGMJobID | int | Identity PK |
| EGMJob | JobState | varchar | Queued, InProgress, Complete. Should we have a look-up table? |
| EGMJob | JobSummary | varchar | Text to summarize jobs status for GUI. i.e., 4 of 5 EGMs completed without error 1 of 5 not found. |
| EGMJob | TransactionID | bigint | Transaction ID sent by EGM in response to command. Used to tie events to commands. |
| OptionDevice | deviceID | int | Device ID as reported by optionList command |
| OptionDevice | CoreEGMID | int | FK to EGM this device was reported with via optionList. 1 or more devices per EGM |
| OptionDevice | deviceClass | varchar | G2S class enumeration value like G2S_cabinet or G2S_gamePlay |
| OptionDevice | OptionDeviceID | int | Identity PK |
| OptionDevice | DateCreated | datetime | Rows in this table are never modified so we only keep create date |
| OptionGroup | DateCreated | datetime | DateTime record created |
| OptionGroup | OptionDeviceID | int | FK to device this group belongs to. 1 or more groups per device. |
| OptionGroup | GroupProtocolID | varchar | ID of group as defined by protocol |
| OptionGroup | OptionGroupID | int | Identity PK |
| OptionGroup | GroupProtocolName | varchar | Name of group as defined by protocol |
| OptionGroup | DateTmUpdated | datetime | Updates would only occur if name changes for a give ID |
| OptionItemAssignedValue | OptionItemDefinitionID | int | 1 or more assigned values may exist for the referenced definition |
| OptionItemAssignedValue | AssignmentID | int | Assignment for which value was derived |
| OptionItemAssignedValue | DateTmAssigned | datetime | DateTime of update |
| OptionItemAssignedValue | OptionItemAssignedValueID | int | Identity PK |
| OptionItemAssignedValue | AssignedValue | varchar | Value the system has calculated that the EGM 213 should currently have for this item. It may not match current until the setChange operation succeeds |
| OptionItemCurrentValue | DateTmUpdated | datetime | NULL |
| OptionItemCurrentValue | OptionItemDefinitionID | int | 1 or more current values may exist for the referenced definition |
| OptionItemCurrentValue | CurrentValue | varchar | Current Value of this item as reported by EGM |
| OptionItemCurrentValue | OptionItemCurrentValueID | int | Identity PK |
| OptionItemDefaultValue | DateTmUpdated | datetime | NULL |
| OptionItemDefaultValue | OptionItemDefinitionID | int | 1 or more default values may exist for the referenced definition |
| OptionItemDefaultValue | OptionItemDefaultValueID | int | Identity PK |

| An example Configuration Database Dictionary | | | |
|---|---|---|---|
| OptionItemDefaultValue | DefaultValue | varchar | The default value as reported by EGM |
| OptionItemDefinition | OptionProtocolID | varchar | NULL |
| OptionItemDefinition | OptionProtocolName | varchar | NULL |
| OptionItemDefinition | OptionHelp | varchar | NULL |
| OptionItemDefinition | OptionType | varchar | NULL |
| OptionItemDefinition | SecurityLevel | varchar | NULL |
| OptionItemDefinition | CanModEgm | tinyint | NULL |
| OptionItemDefinition | CanModHost | tinyint | NULL |
| OptionItemDefinition | MinValue | numeric | NULL |
| OptionItemDefinition | MaxValue | numeric | NULL |
| OptionItemDefinition | FractionalDigits | int | NULL |
| OptionItemDefinition | MinLength | int | NULL |
| OptionItemDefinition | MaxLength | int | NULL |
| OptionItemDefinition | CurrencyID | varchar | NULL |
| OptionItemDefinition | DenomID | numeric | NULL |
| OptionItemDefinition | ExchangeRate | numeric | NULL |
| OptionItemDefinition | MinSelections | int | NULL |
| OptionItemDefinition | MaxSelections | int | NULL |
| OptionItemDefinition | Duplicates | tinyint | NULL |
| OptionItemDefinition | DateCreated | datetime | NULL |
| OptionItemDefinition | DateTmUpdated | datetime | NULL |
| OptionItemDefinition | OptionGroupID | int | Group this item belongs to. 1 or more items per group. |
| OptionItemDefinition | OptionItemDefinitionID | int | Identity PK |
| OptionItemEnum | EnumValue | varchar | A possible legal value for this referenced definition |
| OptionItemEnum | OptionItemDefinitionID | int | FK to the related Option Item Definition. |
| OptionItemEnum | OptionItemEnumID | int | Identity PK |
| OptionItemOverrideValue | OptionItemOverrideValueID | int | NULL |
| OptionItemOverrideValue | OptionItemDefinitionID | int | NULL |
| OptionItemOverrideValue | OverrideValue | varchar | NULL |
| OptionItemOverrideValue | DateTmOverriden | datetime | NULL |
| ScheduleSchedule | ScheduleScheduleID | int | ID of the corresponding schedule record in the Schedule database. |

FIGS. 50A and 50B show an exemplary block diagram of the schedule database 229, according to one illustrated embodiment.

An Example Schedule database 229 may Include:

The schedule database 229 may have a few tables which reflect its scope. It may support functions, such as storing schedule data for other system components as needed, and kicking off jobs at the scheduled time for those components. Jobs are kicked off by calling the Web service provided with the parameter data provided at the time a job is registered with the scheduler.

The schedule databases and corresponding sub-system may be loosely coupled. Its reference to data in other components may be indirect via the Web method references it stores or it may be directly coupled to respective components. As with other components, activity history may be posted to the activity database 230 through Web Services 223 and may be stored locally.

An Example Schedule Database Dictionary may Include:

An example JobQueue that may Hold jobs that are waiting to be run. Scheduler may poll this table and kick off jobs when the start time has passed. If the schedule a job is tied to is recurring, then once the current instance succeeds, the scheduler will create a new row in this table for the next occurrence of the job using the same parameter data as the current job.

| | | |
|---|---|---|
| QueuedDateTm | datetime | Date time job placed in queue |
| PrevCalledDateTm | datetime | Date time last attempt to call Web method occurred |
| NextCallDateTm | datetime | Date time that this job is meant to be run. Job is run by calling the Web method. |
| CallSucceeded | tinyint | Defaults 0. Set to 1 when call succeeds and scheduler can purge this record. |
| ScheduleID | int | FK to schedule record this job is controlled by |
| JobQueueID | int | Identity PK |
| MaxRetries | int | Max retries scheduler should attempt when Web service is unavailable, 0 if no retries |
| Retries | int | Number of re-tries attempted. Set to 1 only after the first retry |
| RetryIntervalSeconds | int | Number of seconds between retries |
| ParamData | xml | Parameter to pass to Web service |
| WebServiceURI | varchar | URI of Web service to call |
| WebMethod | varchar | Web method on service to call |

An example Schedule that may Hold schedule records used by any parts of the system that stores a schedule. In one embodiment, simple schedule types with a start date may be supported. In another embodiment, recurring tasks may also be supported.

| DateCreated | datetime | Date record created in DB |
|---|---|---|
| ScheduleTypeID | int | FK to the type of schedule |
| ScheduleID | int | Identity PK |
| EndDateTm | datetime | Optional end date and time |
| StateDateTm | datetime | Start date and time |

An example ScheduleType may Hold schedule records used by any parts of the system that stores a schedule. In one embodiment, simple schedule types with a start date may be supported. In another embodiment, recurring tasks may also be supported.

| Description | varchar | Description of the schedule type |
|---|---|---|
| ScheduleTypeID | int | Identity PK |
| ScheduleType | varchar | Permanent, PermanentWithStart, OneTimeOverride, RecurringOverride |

Figure 51A:
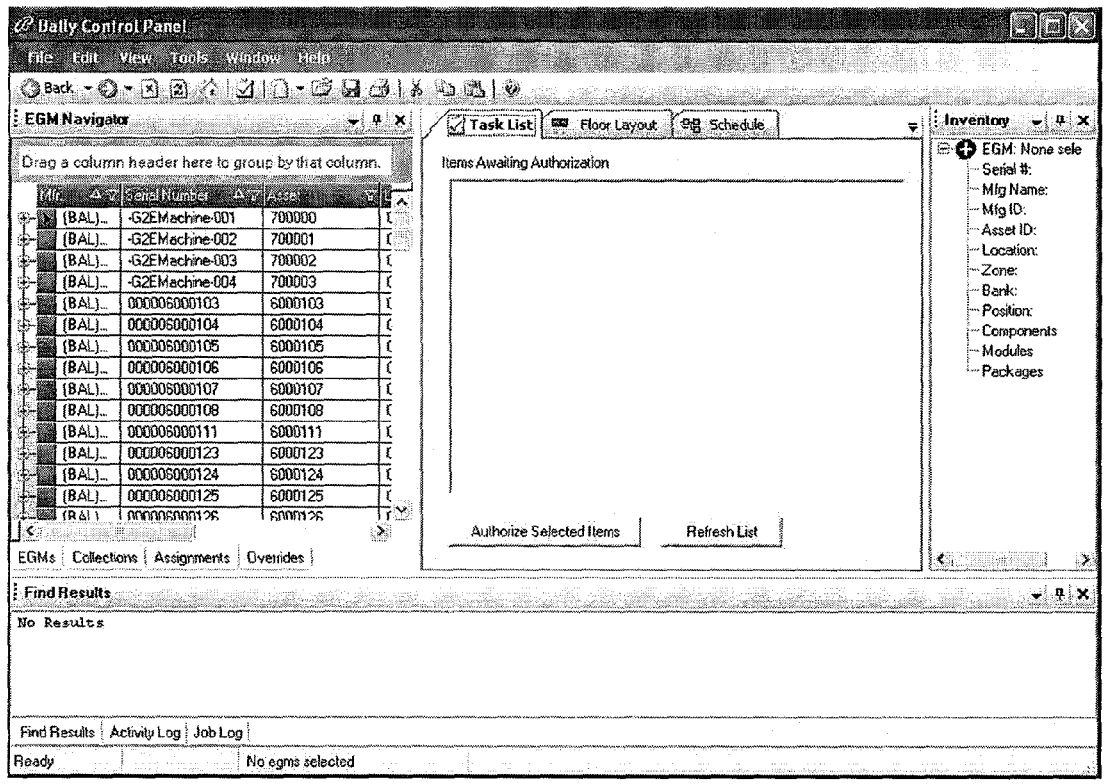
FIG. 51A is a screen print of a download and configuration control panel, according to one illustrated embodiment.
Figure 51B:
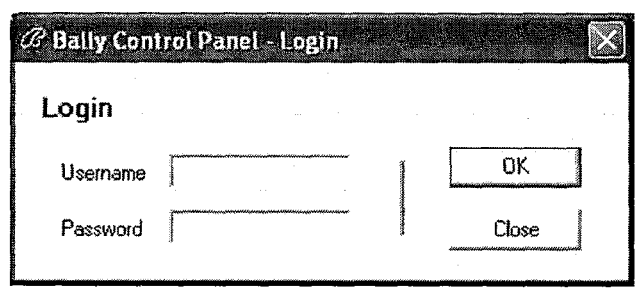
FIG. 51B is a screen print of a login control panel, according to one illustrated embodiment.

FIGS. 51A-51Z show exemplary diagrams of menu screens for a control panel 216, according to one illustrated embodiment.

Example User Interfaces—Control panel 216

The client may encapsulate all the functionality to support the command and control portions of the download and configuration features of the project. Downloads and configuration options can be scheduled, or deployed immediately. Notifications, approvals, searches, and reports in these areas can be viewed.

Control panel—login to control panel. A user can change the password through a login password menu.

Figures 51C, 51D:
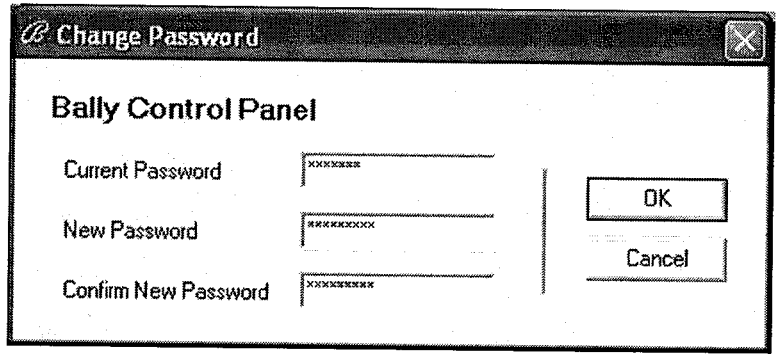
FIG. 51C is a screen print of a change login password control panel, according to one illustrated embodiment.
FIG. 51D is an EGM navigation control panel, according to one illustrated embodiment.

FIG. 51D shows an example list of EGMS 213 that may be selected or dragged onto other windows, according to one illustrated embodiment.

FIG. 51E shows an example Collection Navigator menu is shown that includes a List of named collections that have been saved, according to one illustrated embodiment.

FIG. 51F shows an example Assignment Navigator menu is shown that includes a List of assignments that have been saved, according to one illustrated embodiment.

Figure 51G:
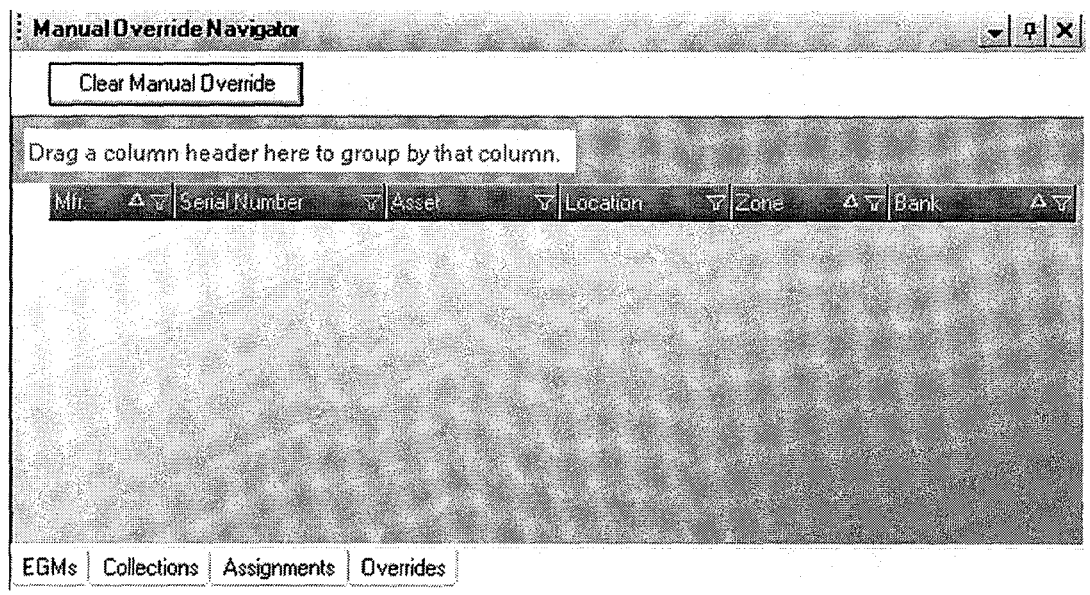
FIG. 51G is a screen print of a manual override control panel, according to one illustrated embodiment.

FIG. 51G shows an example Manual Override Navigator menu is shown that includes a List of EGMs 213 with a current Manual override in affect, according to one illustrated embodiment.

Figure 51H:
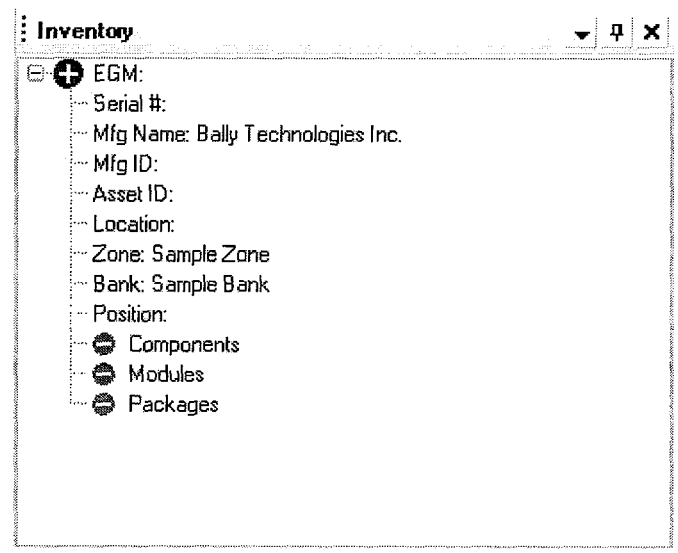
FIG. 51H is a screen print of an inventory control panel, according to one illustrated embodiment.

FIG. 51H shows an example Inventory menu that lists the full details of a currently selected EGM, according to one illustrated embodiment.

Figure 51I:
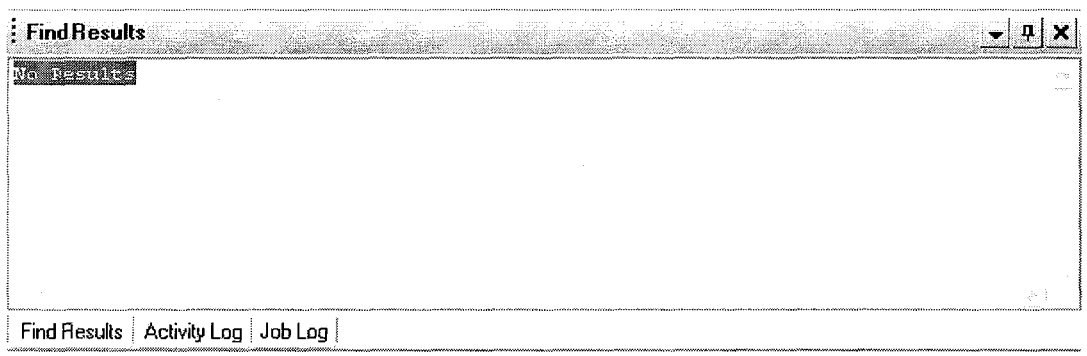
FIG. 51I is a screen print of a search, query and display control panel, according to one illustrated embodiment.

FIG. 51I shows an example Search menu that presents the results of a search function, according to one illustrated embodiment.

Figure 51J:
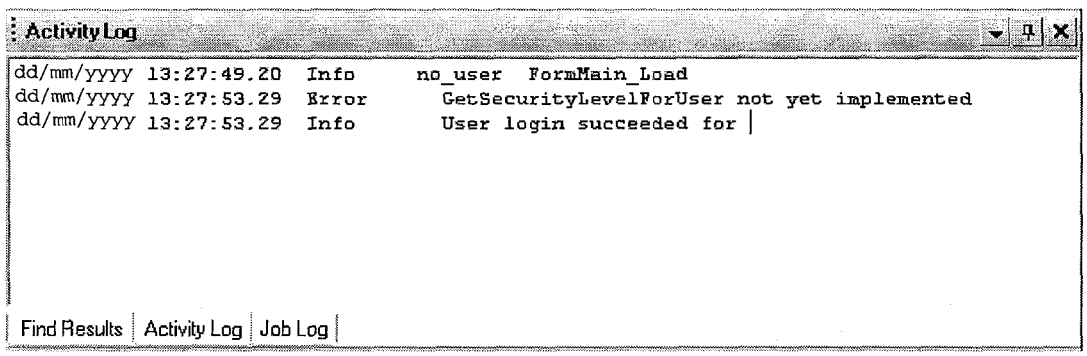
FIG. 51J is a screen print of an activity log query and display control panel, according to one illustrated embodiment.
Figure 52A:
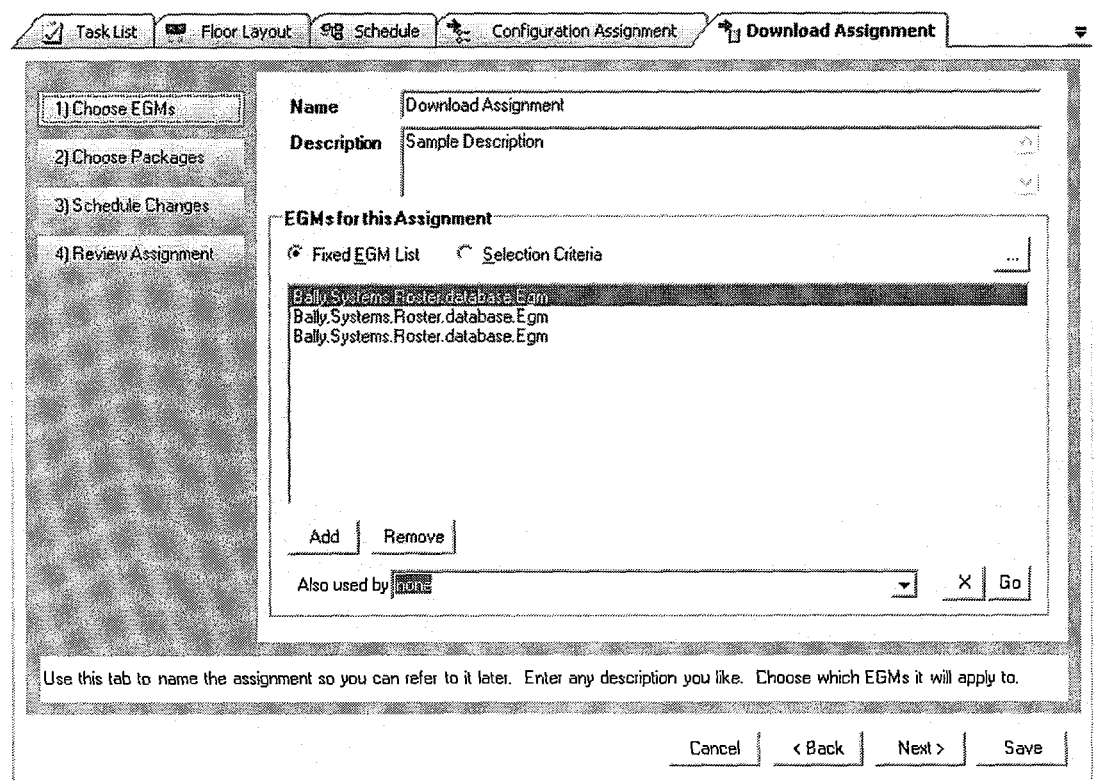
FIG. 52A is a screen print of a download wizard control panel to assist in choosing EGMs, according to one illustrated embodiment.
Figure 52B:
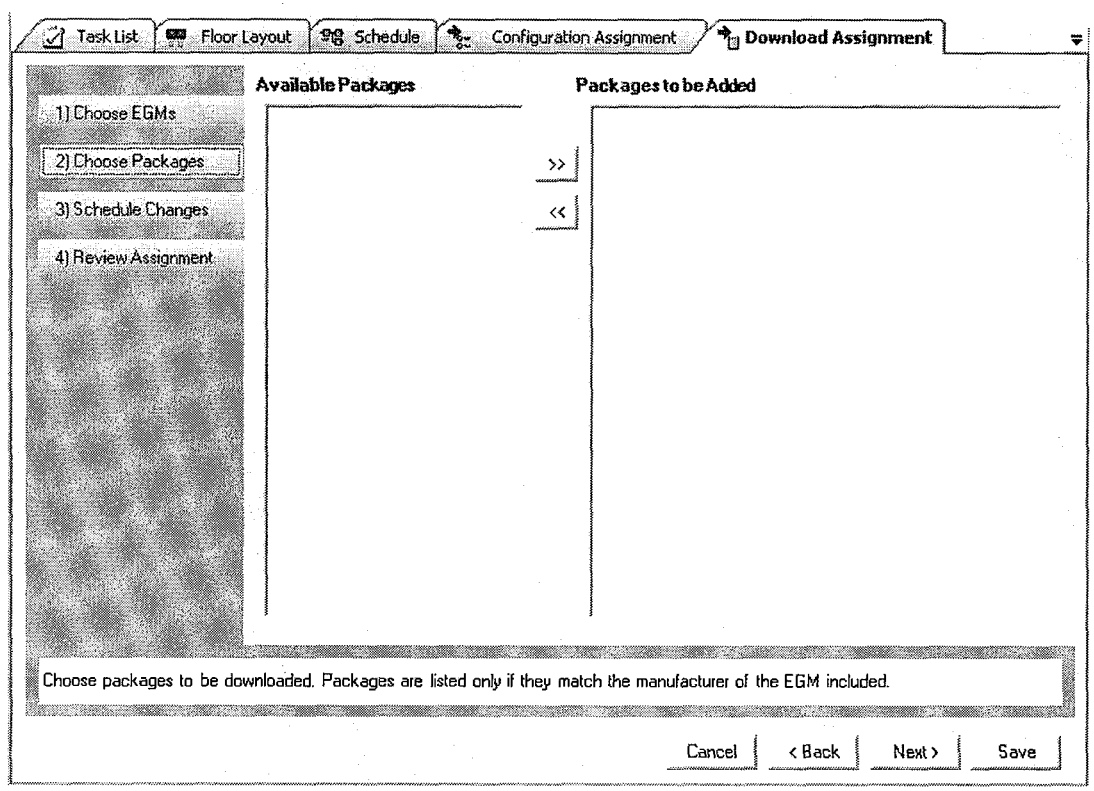
FIG. 52B is a screen print of a download wizard control panel assist in choosing packages, according to one illustrated embodiment.
Figure 52C:
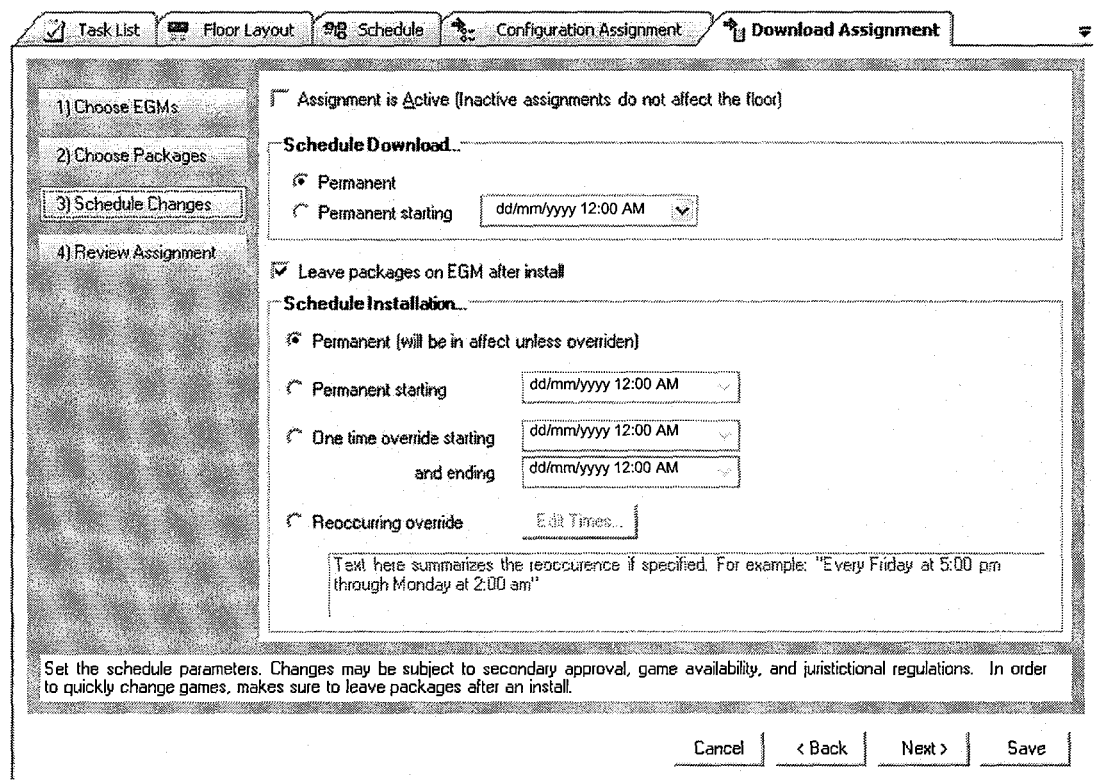
FIG. 52C is a screen print of a download wizard control panel assist in scheduling changes, according to one illustrated embodiment.
Figure 52D:
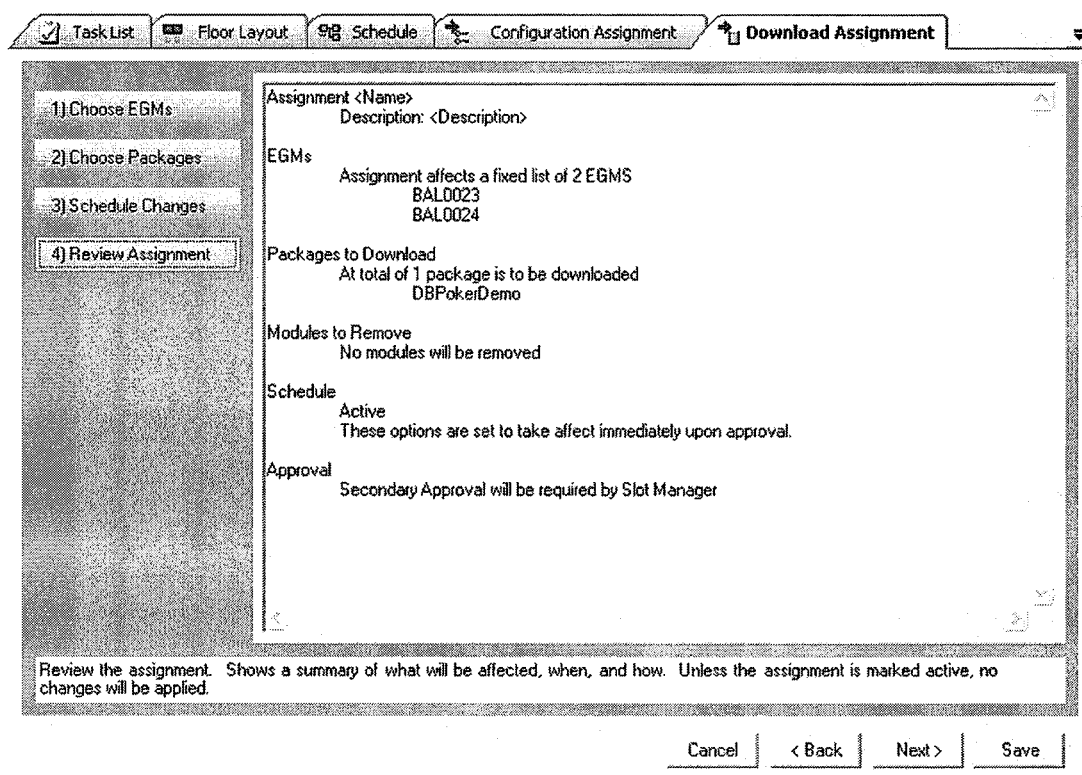
FIG. 52D is a screen print of a download wizard control panel assist in reviewing assignments, according to one illustrated embodiment.
Figure 53A:
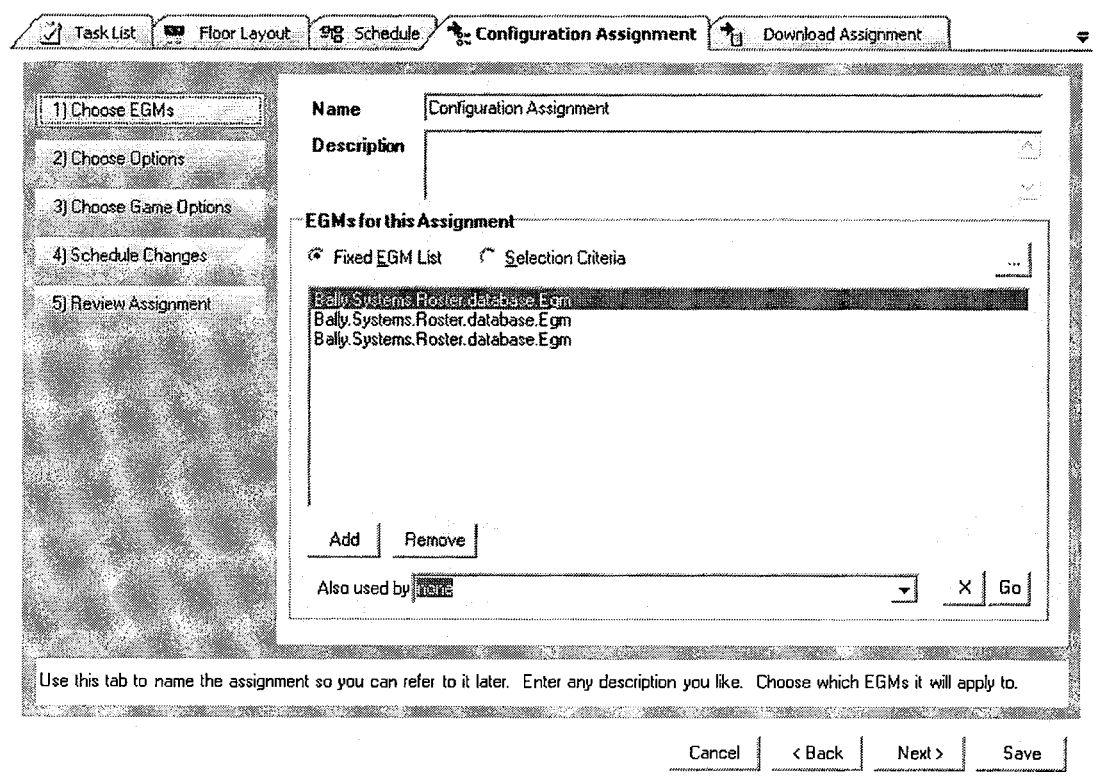
FIG. 53A is a screen print of a configuration assignment wizard control panel assist in choosing EGMs, according to one illustrated embodiment.
Figure 53B:
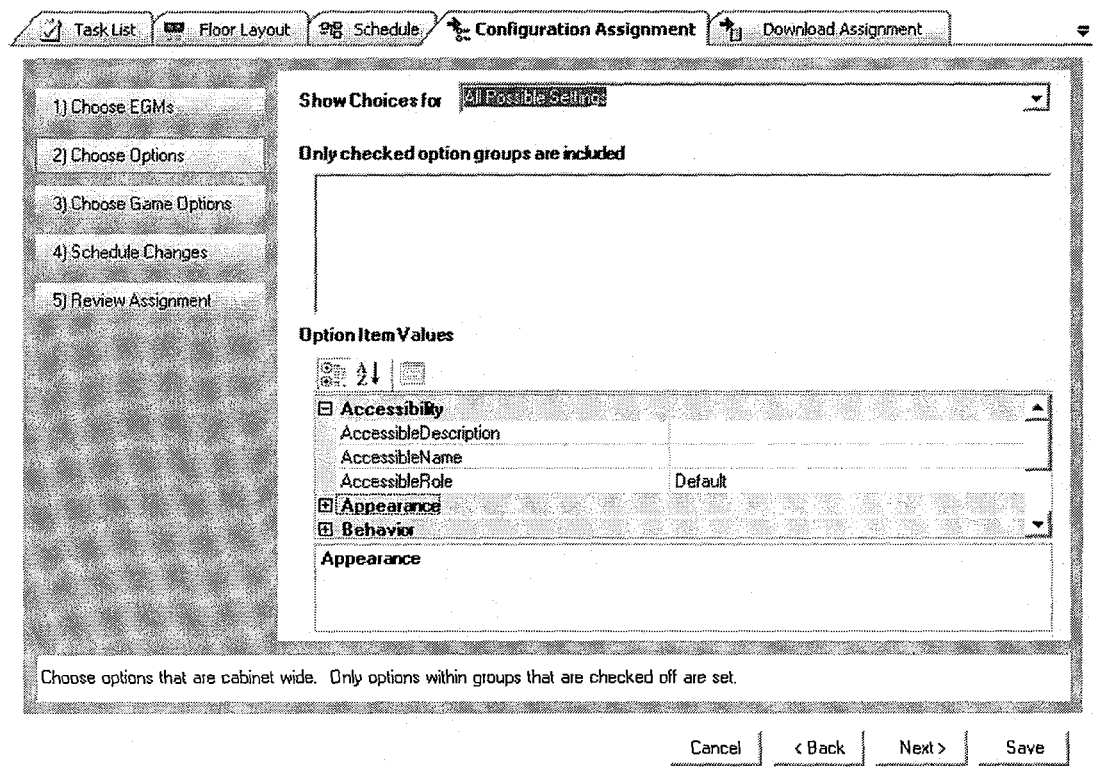
FIG. 53B is a screen print of a configuration assignment wizard control panel assist in choosing options, according to one illustrated embodiment.
Figure 53C:
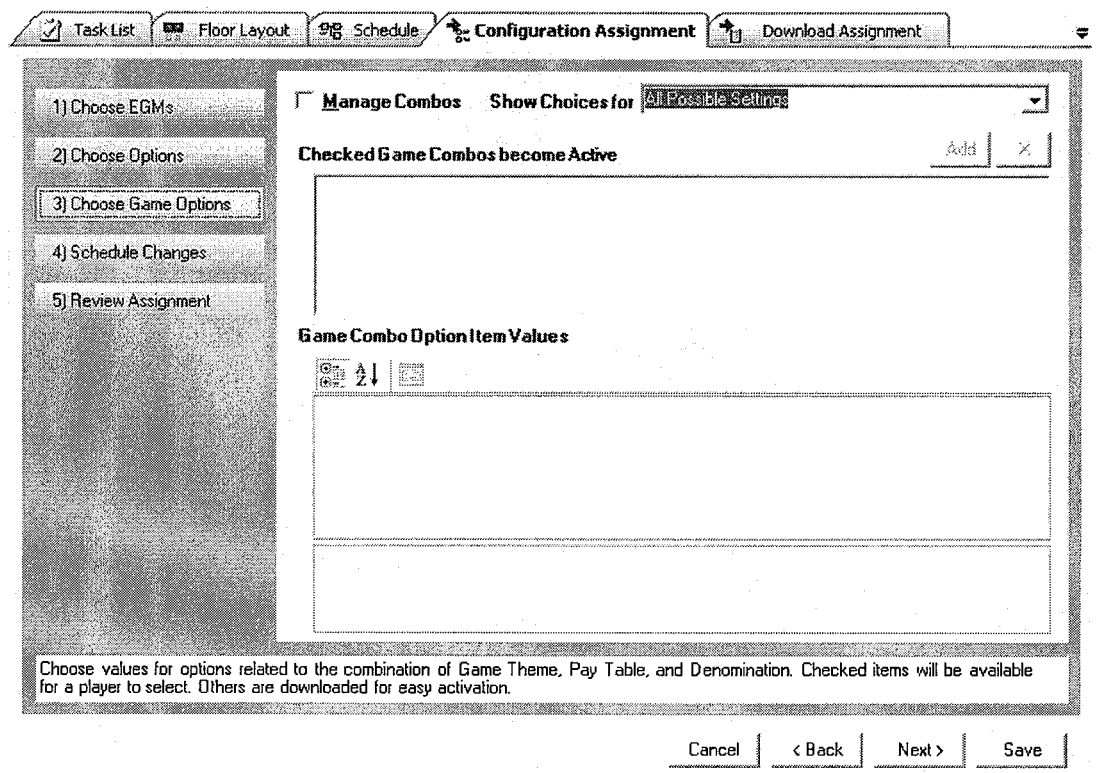
FIG. 53C is a screen print of a configuration assignment wizard control panel assist in choosing game options, according to one illustrated embodiment.
Figure 53D:
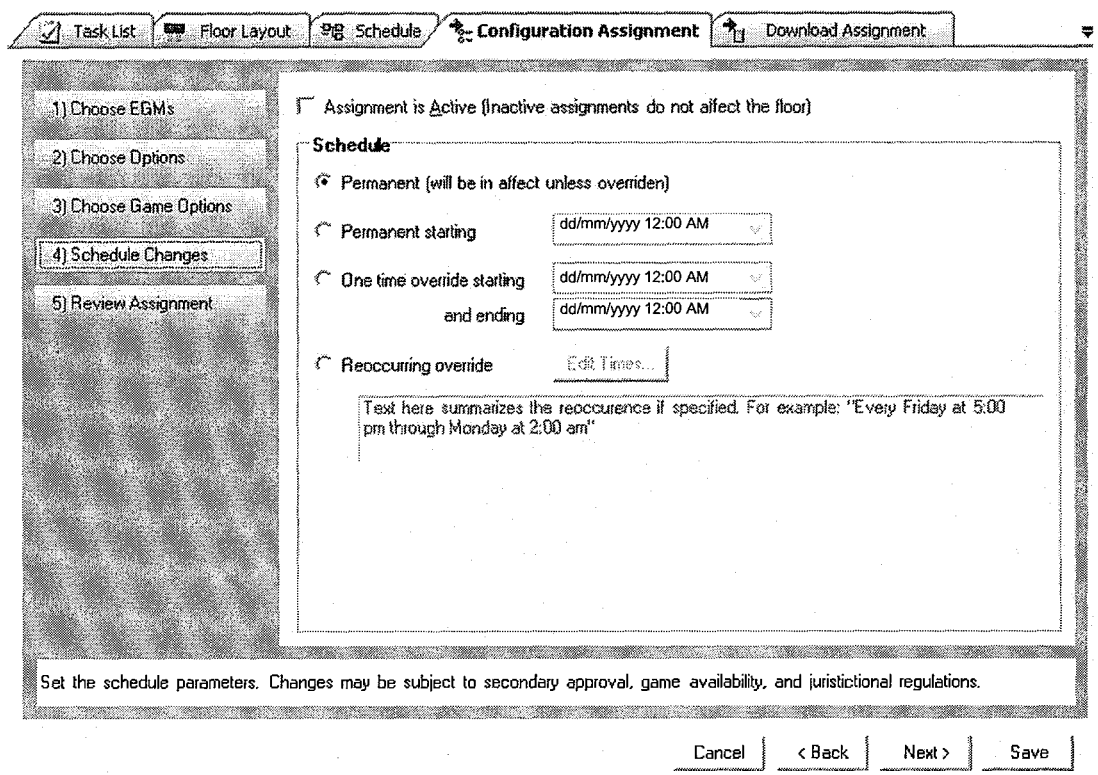
FIG. 53D is a screen print of a configuration assignment wizard control panel assist in making schedule changes, according to one illustrated embodiment.
Figure 53E:
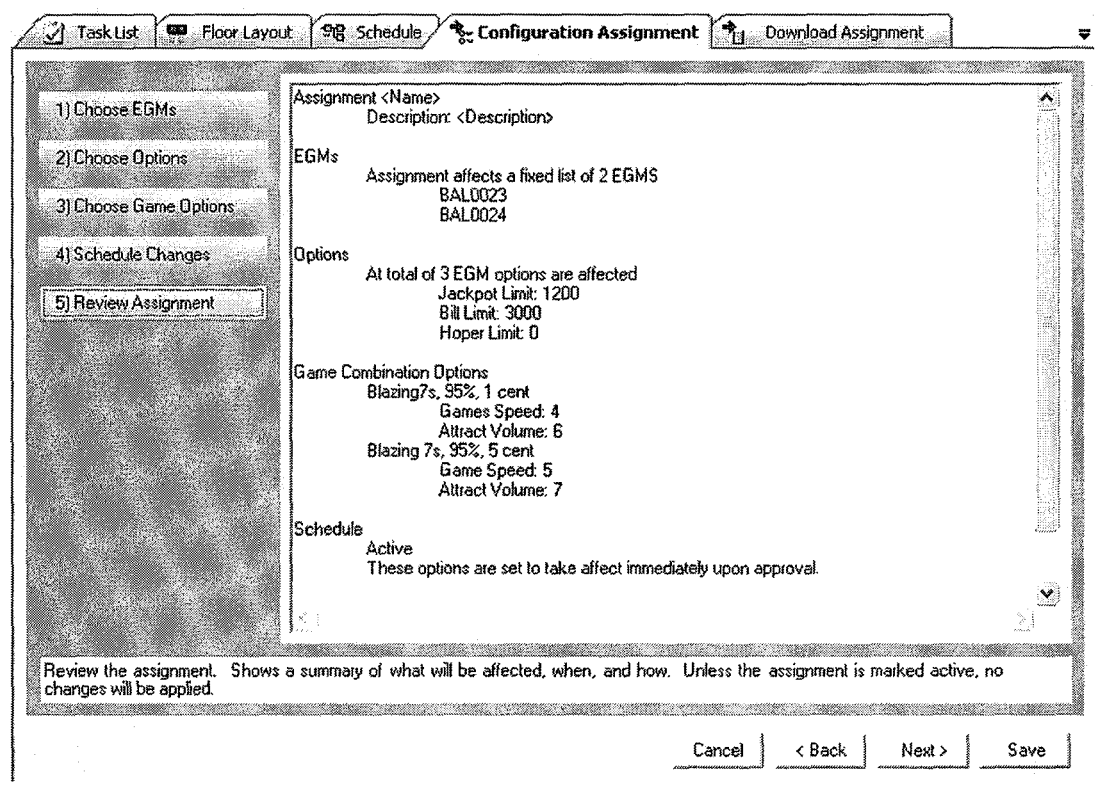
FIG. 53E is a screen print of a configuration assignment wizard control panel assist in choosing reviewing assignments, according to one illustrated embodiment.

FIG. 51J shows an example Activity Log query and display which displays a record of what has occurred since the application was launched, according to one illustrated embodiment.

FIG. 52A-D shows an example set of Download Assignment Wizard menus such that the wizard will let the user specify a download assignment, according to one illustrated embodiment. In one embodiment, it may have: Identity, packages, schedule, and review panes.

A Download Assignment Wizard may be included to pop-up and provide users with helpful tips or ask if the user needs assistance and then direct a user to a menu of information, similar to the Microsoft Windows Wizard. This feature can be disabled by a user, either by closing the Wizard display or selecting disablement from an options menu.

FIG. 53A-E show an example set of Configuration Assignment Wizard menus such that the wizard may let the user specify a configuration assignment, according to one illustrated embodiment. In one embodiment, it may have: Identity, device options, game bundles, schedule, and review panes.

Similar to the Download Assignment Wizard, a Configuration Assignment Wizard may be included to assist users.

Figure 54A:
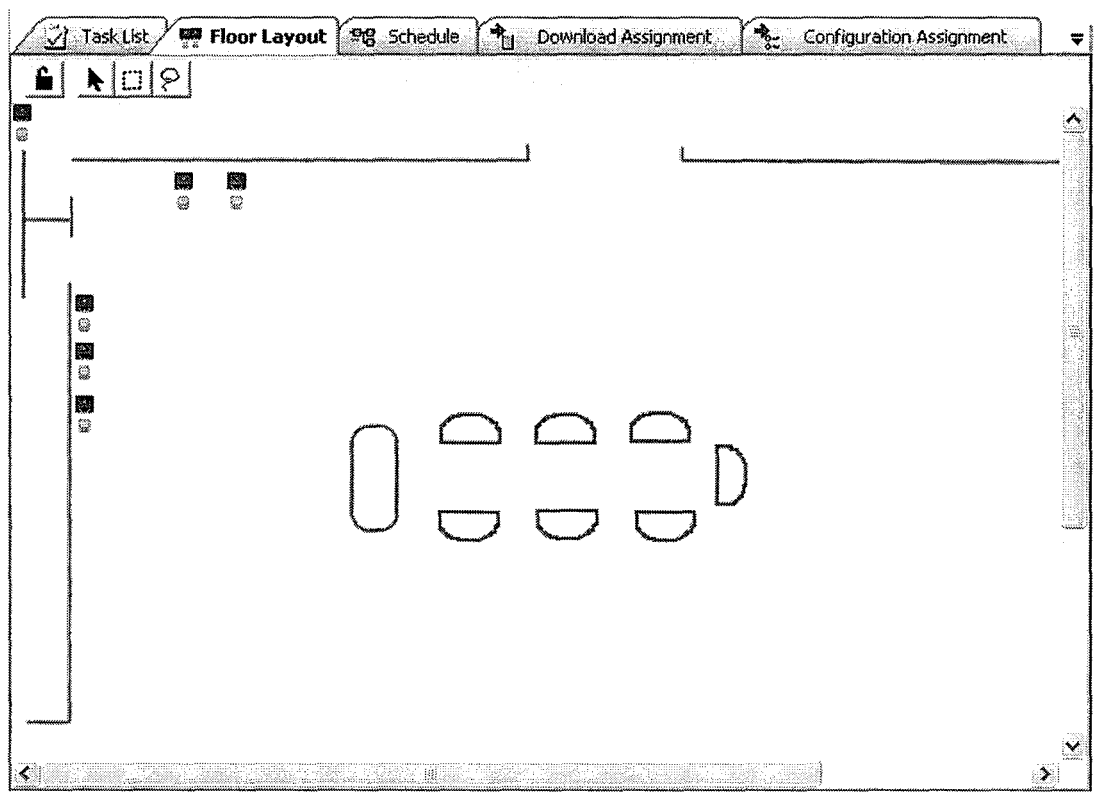
FIG. 54A is a screen print of a floor layout control panel, according to one illustrated embodiment.

FIG. 54A shows an exemplary floor layout panel that provides a visual representation of the floor that can be used for navigation and selection by a user with the BCP in a manner equivalent to the EGM 213 navigator, according to one illustrated embodiment.

Figure 54B:
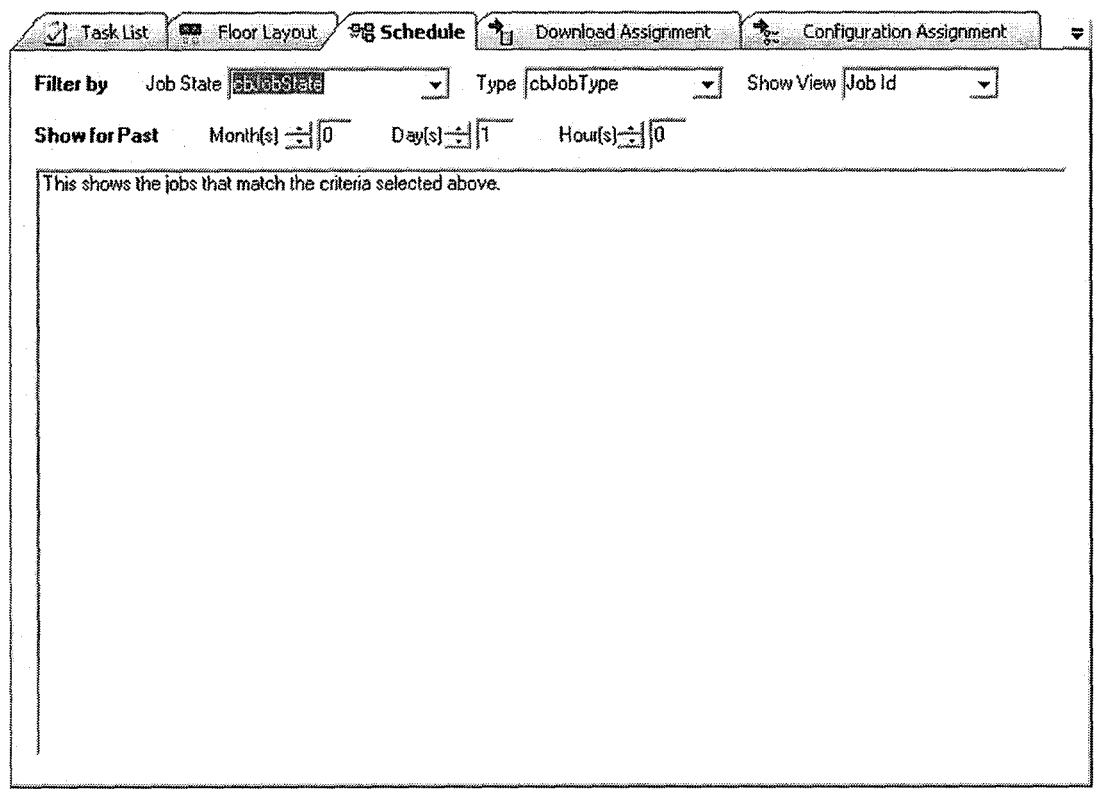
FIG. 54B is a screen print of a schedule control panel, according to one illustrated embodiment.

FIG. 54B shows an exemplary schedule menu and display that lets user review jobs, see their status and or progress, according to one illustrated embodiment.

Figure 54C:
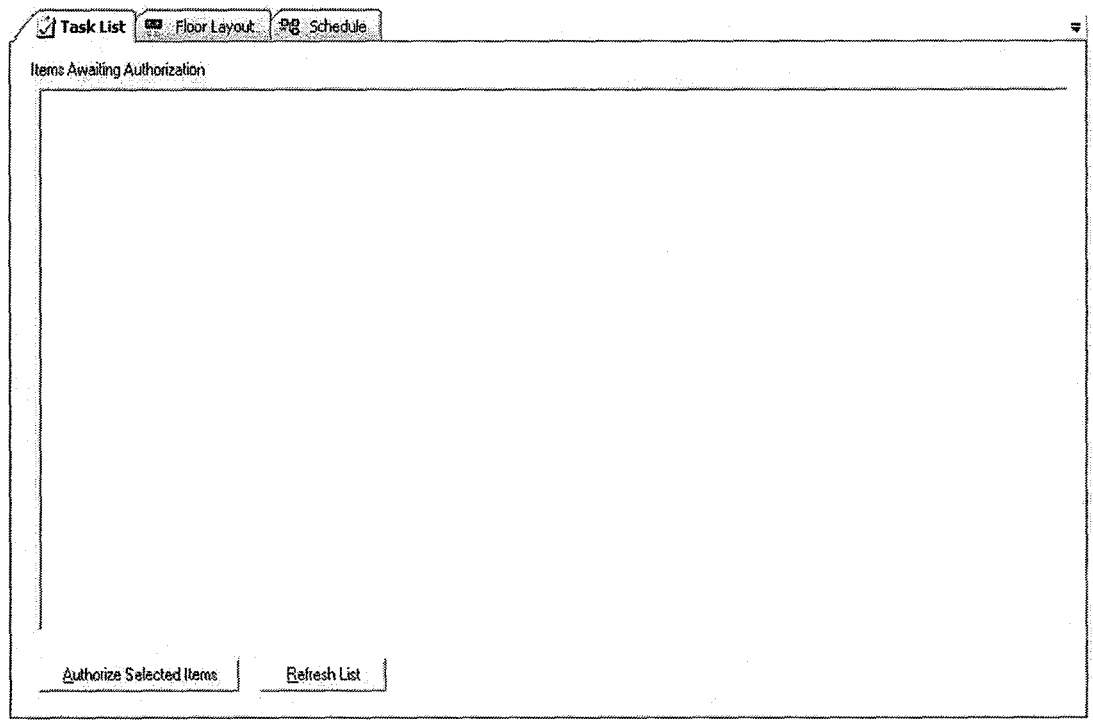
FIG. 54C is a screen print of a task lists control panel, according to one illustrated embodiment.

FIG. 54C shows an example tasks list display and menu that provides a list of tasks for the currently logged in user are displayed, according to one illustrated embodiment. This window may have three panels indicating notifications, pending tasks, and completed tasks. When applicable the user may click on it and obtain more details about each task. Controls may be utilized to acknowledge notifications and to mark tasks complete.

Figure 55:
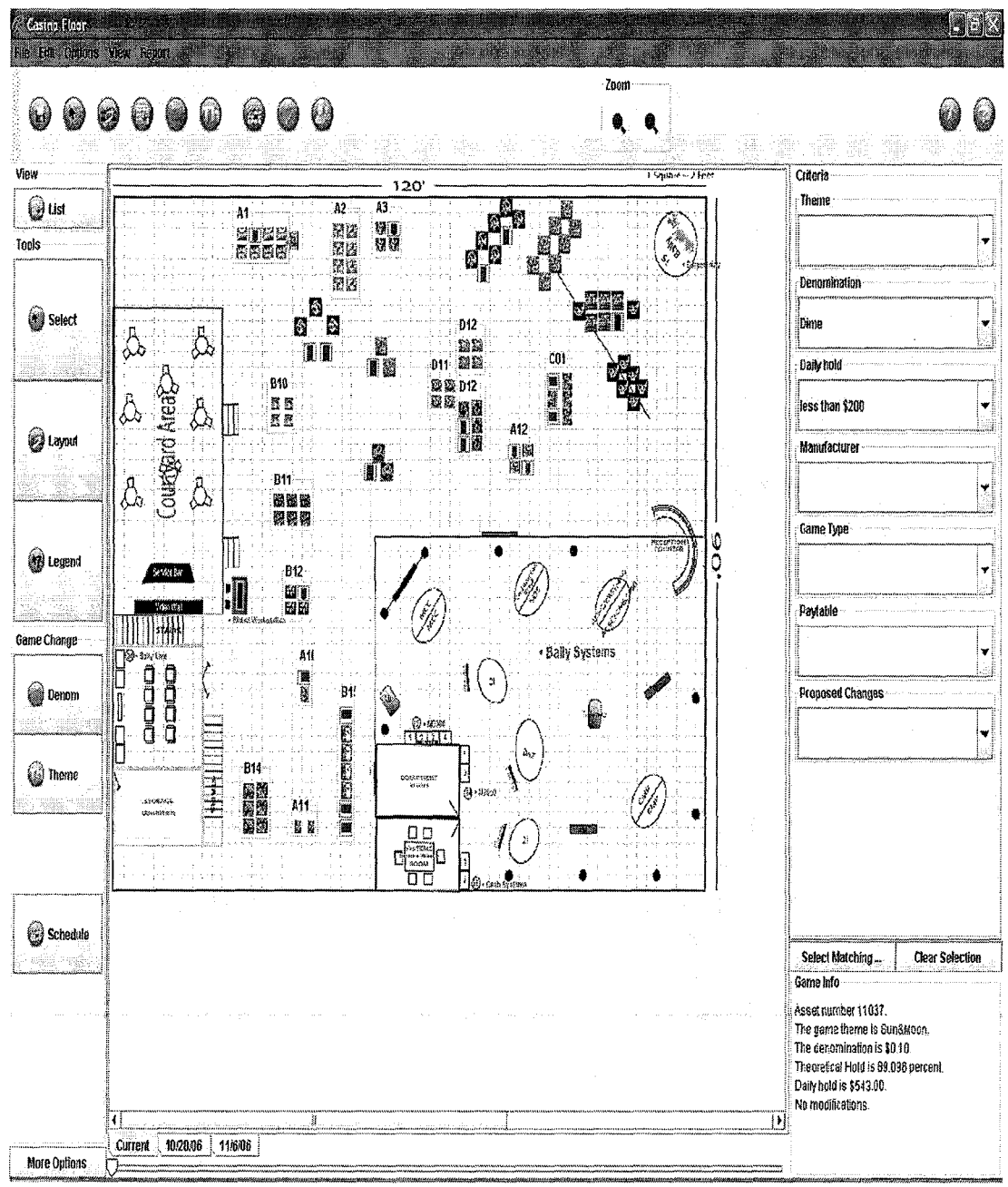
FIG. 55 is a screen print of a casino floor display, according to one illustrated embodiment.

FIG. 55 shows an exemplary casino floor display providing a visual representation of the casino floor, according to one illustrated embodiment.

Figure 56:
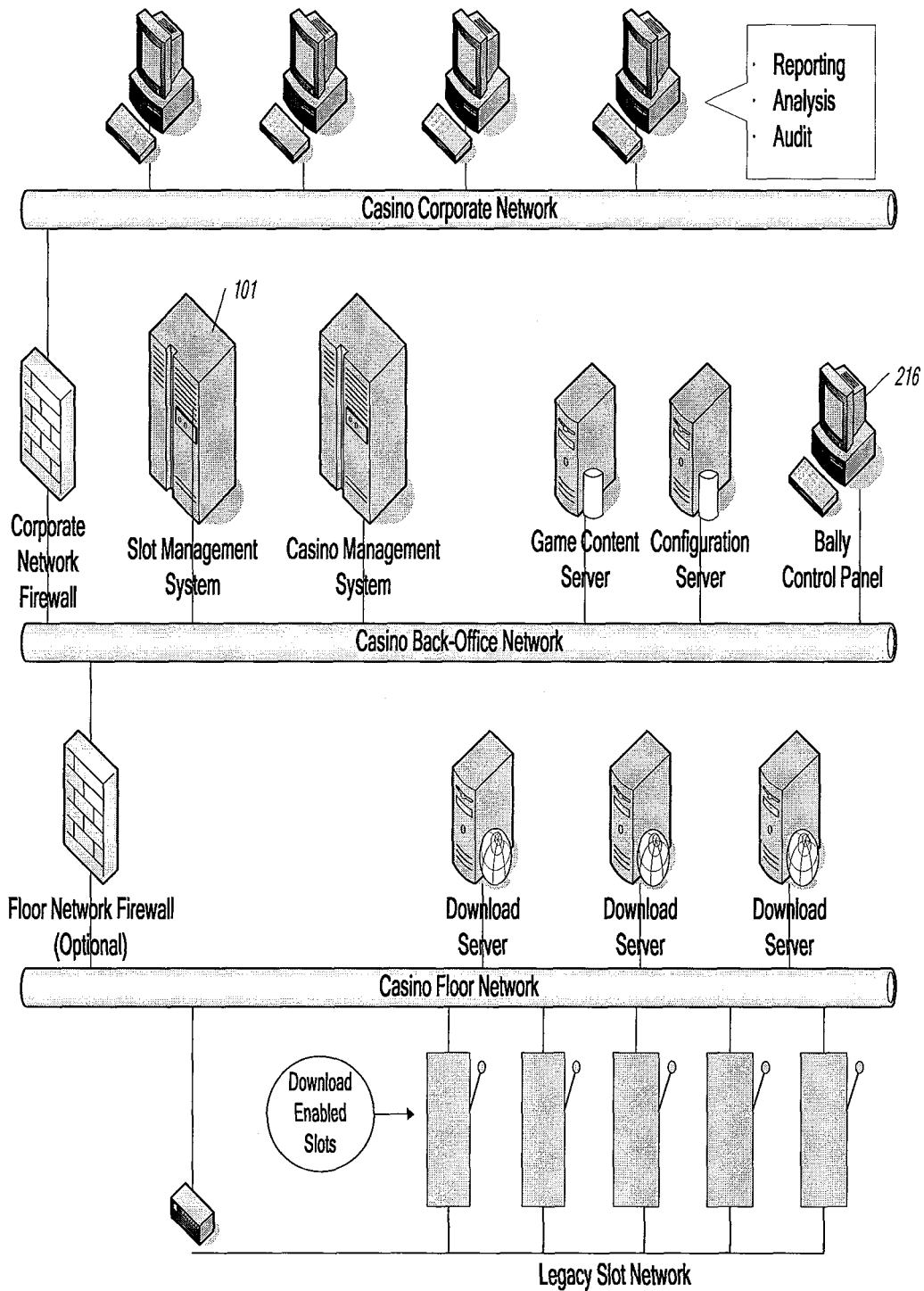
FIG. 56 is a schematic diagram of a casino network including corporate, back-office and floor networks, according to one illustrated embodiment.

FIG. 56 shows an exemplary schematic illustration of a casino network including corporate, back-office and floor networks, according to one illustrated embodiment.

Figure 57:
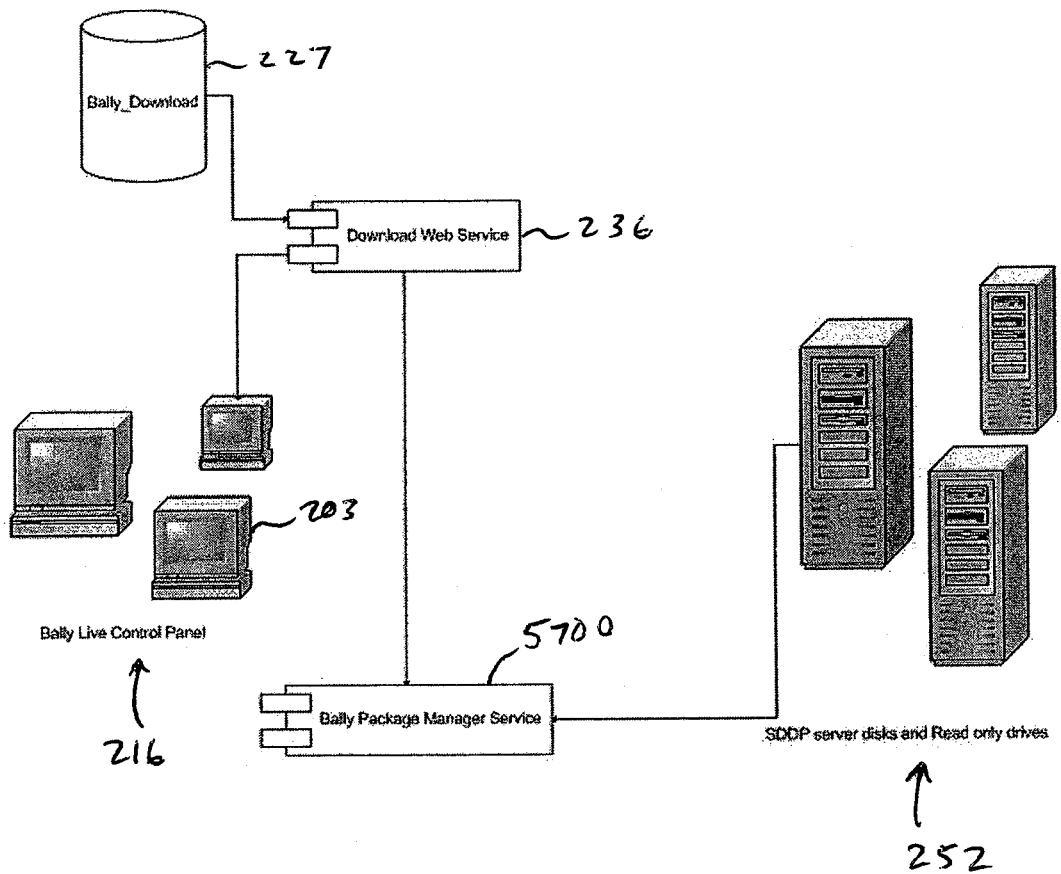
FIG. 57 is a schematic diagram of a download and configuration system having a package manager service, according to one embodiment.

FIG. 57 is a schematic diagram of a download and configuration system having one embodiment of package manager service 5700. For instance in the depicted embodiment of FIG. 57, the package manager service 5700 is shown as part of or otherwise interacting with (such as being operatively coupled to) various elements of the download and configuration system shown in FIGS. 2B(1) and 2B(2) and other figures previously described above. In another embodiment, the package manager service 5700 can be separate from the download and configuration system.

For simplicity of explanation of the embodiment(s) that will be described hereinafter, the package manager service 5700 will be described in the context of being a "service," such as a Web or Windows® service. As such, the label "service" is used in such embodiments for illustrative purposes and in a non-limiting manner. A package manager unit having similar capabilities and features as the package manager service 5700 may be implemented in other embodiments in forms such as a computer program, software or firmware, or other computer-readable instructions (which may not necessarily be a service) encoded on or otherwise stored on one or more computer-readable media and executable by one or more processors. In yet other embodiments, a package manager unit having similar capabilities and features as the package manager service 5700 may be implemented wholly or at least in part in hardware, such as hardware that operates in conjunction with software.

In one embodiment, the package manager service 5700 is adapted to manage or otherwise control the installation, removal, verification, and maintenance of integrity of packages on the SDDP server 252. The package manager service 5700 of one embodiment may be adapted to perform or otherwise control other operations, alternatively or additionally to these installation, removal, verification, and maintenance of integrity operations.

The package manager service 5700 of one embodiment may be a separate discrete unit to control these installation, removal, etc. operations. In another embodiment, one or more of the management units previously shown and described above can control these installation, removal, etc. operations, thereby themselves operating as the package manager service 5700, instead of separately providing a discrete unit to operate as the package manager service 5700.

The package manager service 5700 of one embodiment may be suitably installed or otherwise located anywhere in the download and configuration system shown in FIG. 57 and/or in the other figures. For instance, the package manager service 5700 of one embodiment may be installed in the control station 203 (such as a computer) that provides the control panel application 216. The package manager service 5700 of one embodiment may alternatively be present in a network device (such as a computer or server) different from the control station 203, with this network device having a storage unit to store the package manager service 5700 and having one or more processors to execute a computer program that embodies the package manager service 5700, if for example, the package manager service 5700 is embodied as software or other computer-readable instructions.

The package manager service 5700 is coupled to or otherwise adapted to communicate with the download database 227 in one embodiment through the download Web service 236. In another embodiment, the package manager service 5700 is adapted to communicate with the download database 227 and/or with other elements of the download and configuration system without necessarily having to use the download Web service 236 and/or other intermediate element. For the sake of simplicity of explanation hereinafter, the package manager service 5700 will be described in the context of communicating with the download database 227 via the download Web service 236.

The package manager service 5700 is coupled to or otherwise adapted to communicate with one of the control stations 203 and/or other stations capable to present a user interface so as to present, for example, state information regarding the packages and/or to permit user input commands via the user interface. For instance, the user interface can be a display screen that presents state or other status information regarding packages in the SDDP 252, such as whether a particular package has been successfully verified. Further for instance, such a user interface can receive user input commands to copy a package from a source destination into the SDDP 252. These various states will be described in further detail below.

The package manager service 5700 of one embodiment also be coupled to one or more servers of the SDDP 252, so as to perform or otherwise control the installation, removal, verification, etc. operations. The package manager service 5700 may communicate with the servers of the SDDP 252 directly or through an intermediate layer/interface.

Figure 58:
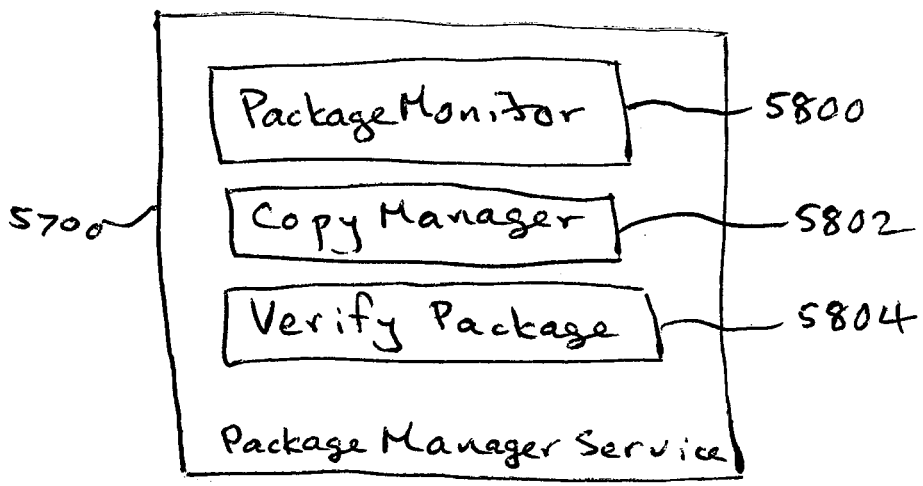
FIG. 58 shows one embodiment of the package manager service in more detail.

FIG. 58 shows elements 5800, 5802, 5804 of one embodiment of the package manager service 5700 in more detail. For example, if the package manager service 5700 is embodied as a service, the elements 5800, 5802, 5804 can be in the form of classes, such as those descriptively labeled in FIG. 58 as the PackageMonitor, CopyManager, and VerifyPackage classes respectively. Alternatively or additionally or as part of classes, the elements 5800, 5802, 5804 can comprise software modules, subroutines, independent applications, or other software and/or hardware element that can perform the operations described herein. For the sake of explanation, the elements 5800, 5802, 5804 will be described hereinafter in the context of being classes.

One embodiment of the package manager 5700 can include elements additionally or alternatively to the elements 5800, 5802, 5804 shown in FIG. 58. Moreover, the capability provided by the various elements 5800, 5802, 5804 can be combined into one or more elements, thereby reducing the need to provide separate elements for each of the monitoring, copying, verifying, etc. operations described herein.

In one embodiment, the element 5800 (PackageMonitor class) is adapted to monitor certain fields in the download database 227, by communicating with the download database 227 via the download Web service 236. The download Web service 236 is adapted to operate as a data access layer (such as the data access layer 222 shown in FIGS. 2B(1) and 2B(2), for instance such that queries to the download database 227 from the PackageMonitor class are in the form of web methods. Other techniques for querying the download database 227 may be provided in other embodiments.

The PackageMonitor class is adapted to query the download database 227 every n seconds, for example, with n being configurable. An example default setting for n can be 10 seconds. The query times (such as n) to the download database 227 can be set to any interval, such as intervals of seconds, minutes, hours, days, etc. or any portion thereof. Further, the query times need not necessarily be regular or constant, and thus can vary. For instance, the PackageMonitor class can be configured to query the download database 227 every 12 seconds during the first 12 hours of the day, and then be configured to query the download database every 30 seconds during the second 12 hours of the day or configured to adaptively change the query interval time based on certain metrics (e.g., network activity or load, user preferences, device processing capability, etc.).

In one embodiment, the configuration of the query times/interval (such as n) can be set through an appconfig file or other configuration file operatively linked to the package manager service 5700. The appconfig file can be accessible, for example, via the user interface(s) available at the control station 203 and/or at any other suitable location in the network.

The PackageMonitor class (element 5800) is adapted to read or otherwise monitor the contents of the fields in the download database 227, and update the contents as appropriate. For example and with reference to FIG. 59, the download database 227 can maintain a data structure 5900. The data structure 5900 can be in the form of a table, for instance, called "PackageLocation" stored in the download database 227 and having a plurality of fields 5902 and 5904. The fields 5902 contain package state identification (PackageStateID) alphanumeric characters that uniquely identify each package, and corresponding one of the fields 5904 each contain the state information for that package.

For illustrative purposes, the state information of each particular package is identified in FIG. 59 as Created, Copy in Progress, Completed, Copy Failed, Verified, and Verifying Failed. Other possible state information (symbolically represented in FIG. 59 by Other) for a particular package may be provided, such as Verify in Progress, Removal in Progress, Removed, Removal Failed, Error, Damaged, Unable to Locate, and various other state information that can be configured by a user and/or system administrator. Thus, the example state information shown in FIG. 59 and described herein not intended to be exhaustive or limiting to the types of state information that can be provided.

In one embodiment, the state information from the data structure 5900 can be presented in a user interface in the control station 203 or other location for viewing by the user or system administrator. In this manner, the user or system administrator can monitor the past and present state of the packages, including identifying any potential malfunction/failure.

The example state information in the fields 5904 corresponding for each of the PackageStateID fields 5902 are explained below for one or more embodiments:

Created: This state is shown in the field 5904 when package attributes such as GSAPackageID, the package's directory path in a read-only device (such as a storage unit or drive or other source where the package resides), and the package's directory path in the disk (or other storage unit) of the SDDP 252 have been inserted or otherwise provided to the download database via a user interface;

Copying in Progress: This state is shown in the field 5904 for a package's PackageStateID if the actual package file is in the process of being copied from the read-only device to a specific server(s) of the SDDP 252;

Completed: This state is shown in the field 5904 for a package's PackageStateID when the copying of the package and/or some other operation has successfully completed;

Copy Failed: This state is shown in the field 5904 for a package's PackageStateID if copying of the package has failed;

Verified: This state is shown in the field 5904 for a package's PackageStateID if the verifying process for a package is successful, such as if the package has been verified to be authentic or otherwise not altered/tampered;

Verifying Failed: This state is shown in the field 5904 for a package's PackageStateID if the verifying process failed, such as if the verifying process had a malfunction and/or if results of the verification process indicates that the package has been altered/tampered.

The CopyManager class (element 5802) of one embodiment controls the installing (copying) of package files from the read-only device (such as a CD, DVD, etc.) or other source into the specific storage location(s) in the SDDP 252 or other destination. An embodiment of a method 6000 to control or otherwise perform this copying is shown in the flowchart of FIG. 60.

Figure 60:
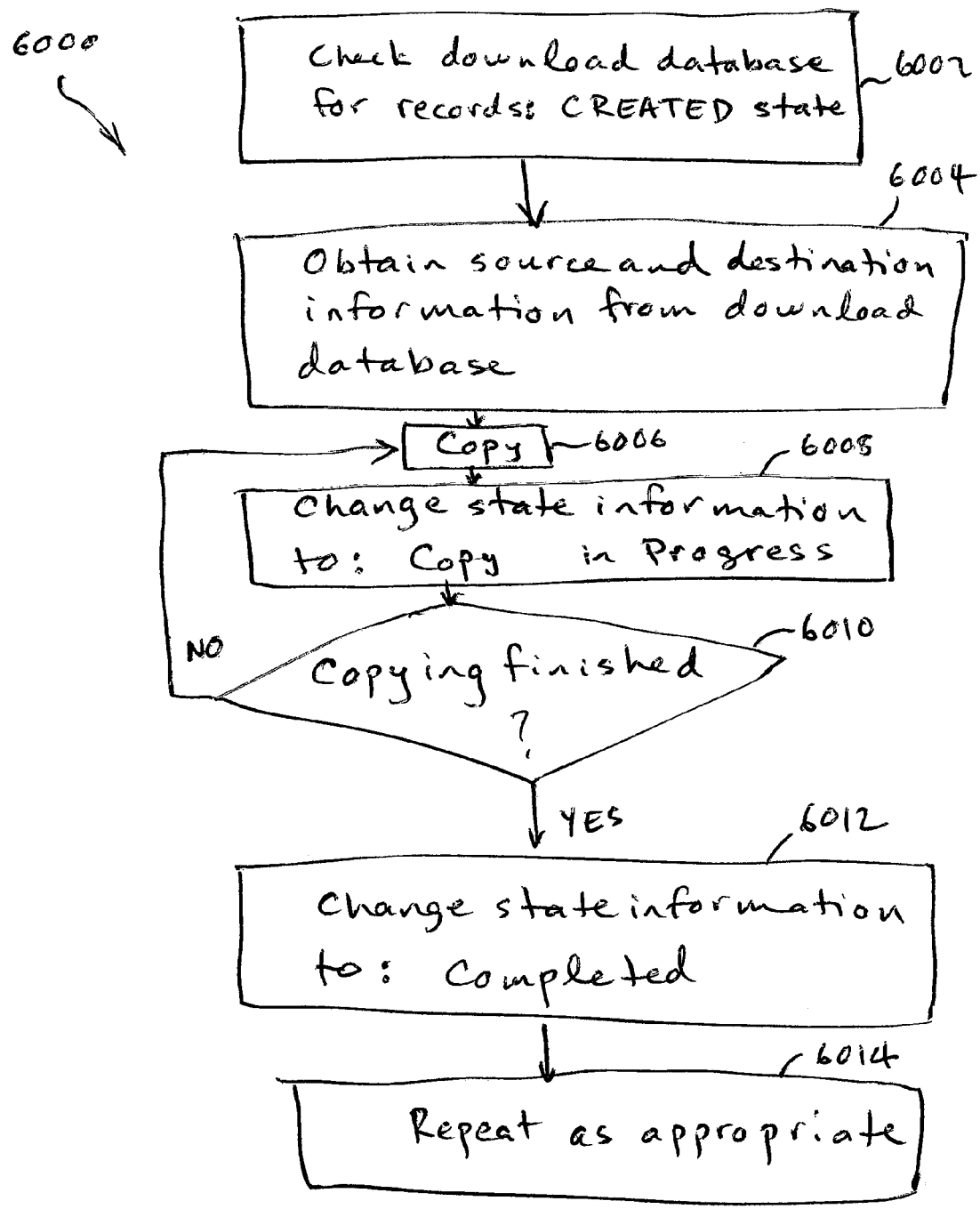
FIG. 60 shows a method to manage installation of packages using the package manager service, according to one embodiment.

In the flowchart of FIG. 60, the various operations depicted can in one embodiment be implemented in software or other computer-readable instructions stored in a computer-readable medium and executable by a processor. For example, one or more operations can be performed by the CopyManager class and/or the PackageMonitor class. The various operations need not necessarily be performed in the exact order shown. Moreover, certain operations can be removed, added, modified, and/or combined.

At a block 6002, the data structure 5900 in the download database 227 is checked by the PackageMonitor class for records of packages that are in the Created state. As previously explained above, this checking/query into the download database 227 (at the block 6002) can be performed as queries issued in time intervals.

If a record of a package in the Created state is identified at the block 6002, then the PackageMonitor class calls the CopyManager class. At a block 6004, the CopyManager class obtains from the download database 227 the source and destination of the package having the Created state. The source can include, for example, the directory path or other location (such as an address) in the network where the package is stored. The destination can include, for example, the directory path or other location (such as an address) in the SDDP 252 where the package is to be copied.

The CopyManager class performs (or instructs another element to perform) the copying of the package from the source to the destination at a block 6006. Concurrently with this copying at the block 6006, the state information for the package is changed to Copy in Progress in the field 5904 in the data structure 5900 at a block 6008. In one embodiment, the PackageMonitor class communicates with the download database 227 (via the download Web service 236) to perform (or to instruct another element to perform) this update of the state information at the block 6008. In another embodiment, the CopyManager class communicates with the download database 227 (via the download Web service 236) to perform (or to instruct another element to perform) this update of the state information at the block 6008.

The CopyManager class checks at a block 6010 whether the copying is finished. If the copying is not yet finished, the copying continues at the block 6006. If at the block 6010, the CopyManager class determines that the copying is completed successfully, then the state information for the package is changed from Copy in Progress to Completed at a block 6012. The PackageMonitor class or the CopyManager class communicates with the download database 227 (via the download Web service 236) to perform (or to instruct another element to perform) this update of the state information at the block 6012.

The process repeats at the block 6014 if there are additional packages to copy.

Further, the process as described above can operate similarly when a package is to be removed from the SDDP 252. For example, the operations at the blocks 6002 and 6004 can involve checking the data structure 5900 to determine whether a particular package desired for removal is present in the SDDP 252 and to determine its location. Thereafter, the package is removed (instead of copied) at the block 6006, accompanied by a state update of Remove in Progress at the block 6008. Successful removal can result in a state change of Completed or Remove Successful or other state information at the block 6012.

With regards to the element 5804 (VerifyPackage class), this element 5804 performs a process to verify that the content of a package in the SDDP 252 is authentic, such as to verify that the package has not been altered and/or tampered with. An embodiment of a method 6100 to control or otherwise perform this verification is shown in the flowchart of FIG. 61.

Figure 61:
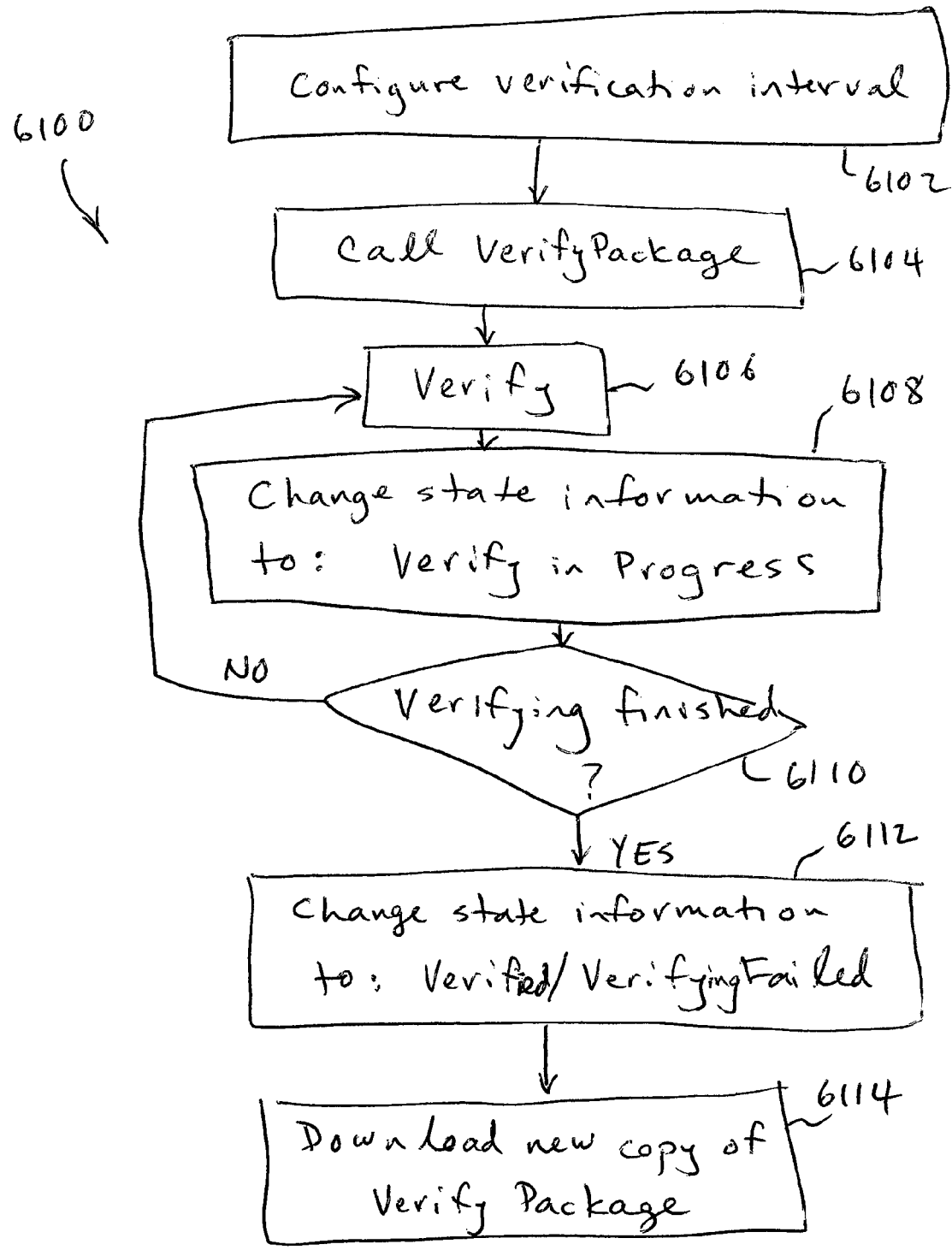
FIG. 61 shows a method to manage verification of packages using the package manager service, according to one embodiment.

In the flowchart of FIG. 61, the various operations depicted can in one embodiment be implemented in software or other computer-readable instructions stored in a computer-readable medium and executable by a processor. For example, one or more operations can be performed by the VerifyPackage class and/or the PackageMonitor class. The various operations need not necessarily be performed in the exact order shown. Moreover, certain operations can be removed, added, modified, and/or combined.

At a block 6102, verification interval is configured, for example, by the user and/or system administrator. The verification interval specifies the interval(s) of time when verification of one or more packages in the SDDP 252 is to be performed. In one example embodiment, the verification interval can be set to n hours, such that the PackageMonitor class calls the VerifyPackage class every n hours to perform verification of packages stored in the SDDP 252. A default setting for the verification interval can be 24 hours, as an illustration.

When it is time to verify a particular package or packages according to the verification interval, the PackageMonitor class calls the VerifyPackage class at a block 6104. The PackageMonitor class may also communicate with the download database 227 at the block 6104 to obtain the location(s) of the package(s) to be verified, and provides the location(s) to the VerifyPackage class. The location can include, for example, the directory path or other location (such as an address) in the SDDP 252 where the package is stored.

The VerifyPackage class then performs (or instructs another element to perform) the verifying of the package at a block 6106. The verifying at the block 6106 of one embodiment can use the hashing technique such as described in U.S. nonprovisional patent application Ser. No. 11/938,190 filed concurrently herewith and entitled "SECURE COMMUNICATIONS IN GAMING SYSTEM," which is incorporated herein by reference in its entirety. A verification technique different than the technique(s) disclosed in this co-pending application can be used by another embodiment at the block 6106.

Concurrently with this verifying at the block 6106, the state information for the package can be changed to Verify in Progress in the data structure 5900 at a block 6108. In one embodiment, the PackageMonitor class communicates with the download database 227 (via the download Web service 236) to perform (or to instruct another element to perform) this update of the state information at the block 6108. In another embodiment, the VerifyPackage class communicates with the download database 227 (via the download Web service 236) to perform (or to instruct another element to perform) this update of the state information at the block 6108.

The VerifyPackage class checks at a block 6110 whether the verification is finished. If the verification is not yet finished, the verification continues at the block 6106. If at the block 6110, the VerifyPackage class determines that the copying is completed, then the state information for the package can be changed from Verify in Progress to Verified (if the verification is successful) or Verifying Failed (if for example tampering is detected) at a block 6112. The PackageMonitor class or the VerifyPackage class communicates with the download database 227 (via the download Web service 236) to perform (or to instruct another element to perform) this update of the state information at the block 6112.

The process repeats if there are additional packages to copy, and also repeats according to the verification interval that was configured at the block 6102.

In one embodiment, a new copy of at least a portion of the VerifyPackage class can be downloaded at a block 6114, to replace the corresponding current portion of the VerifyPackage class that is already present in the installed package manager service 5700. For example, a new copy of an authentication part of the VerifyPackage class can be downloaded from a read-only device (or other source) to the device that hosts the package manager service 5700, so as to replace the existing authentication part of the VerifyPackage class. In other embodiments, a new copy of the entire VerifyPackage class itself may be downloaded to replace the existing copy of the VerifyPackage class.

In one embodiment the CopyManager class can be called by the PackageMonitor class to perform this download and replacement. In other embodiments, other elements of the package manager service 5700 and/or other elements external to the package manager service 5700 can perform this download/replacement.

The download at the block 6114 can be performed, for example, every 24 hours. This download interval may be configured to any suitable download interval by the user and/or system administrator.

The downloading at the block 6114 is performed to ensure that the VerifyPackage class itself maintains its integrity. For example, if all or a portion of the existing installed VerifyPackage class were to be improperly altered and/or tampered with, downloading the new copy at the block 6114 ensures that a legitimate copy is made available to replace the altered/tampered copy. Thus, the downloading/replacing, whether or not the currently/existing installed copy has been altered/tampered, ensures reliability of the VerifyPackage class under all conditions.

The following are features of one or more embodiments of the package manager service 5700:

If for some reason the package manager service 5700 goes down/offline or is otherwise disabled, whenever the package manager service 5700 goes back online, the package manager service 5700 can obtain the created packages' state from the download database 227 and perform its operations (such as copy, verify, etc.);

The package manager service 5700 may be the only element in the system that can add/remove/change anything in the SDDP 252, thereby making it easier for regulators to monitor and approve system functions;

A single software module for managing packages enables an easier and more efficient approval process from regulators;

The package monitor service 5700 has capability to rename a deleted package from the SDDP 252, and copy a new package from a read-only source to the SDDP 252; and Packages that have been determined by the package manager service 5700 to have been altered and/or tampered with can be immediately disabled to prevent further distribution thereof from the SDDP 252.

Example Reports software configuration and download project reports, may provide real-time and historical data. An example embodiment provides for Download and Configuration reports to be run on an inter/intranet browser, such as on SSRS. Windows authentication may be used for security. In other embodiments, the reports may also or alternatively be run from the BCP. The download reports may include reports in the Reports Detail Section. In addition, reports from the Floor System may be imported into the Download and Configuration project in order for the Download and Configuration applications to run independently of the floor system. One or more of the databases from the Floor System may be included as well.

An example Detailed Reports Design may include reports which are generated through and/or based upon the Software Download FRD 2.8 (which is hereby incorporated by reference) and the G2S specifications.

Example User Reports may Include:

User Listing with Roles and Group—This report may be written for the Floor System project and may be imported from that project.

Password to Expire in 15 days—This report may be written for the Floor System project and may be imported from that project.

Role with Capabilities—This report may be written for the Floor System project and may be imported from that project.

User Activity Role—This report may be written for the Floor System project and may be imported from that project.

Assignment Reports—These reports may be provided to show lists of assignments with summary information. Details reports are also available for detailed assignments. They can include the history of the jobs that have been run on behalf of that assignment.

An example Package Assignment by EGM—Summary may include:

Input Parameters: Start Date to End Date range for Package Create Date.

Logo: Tech Logo

Title: Package Assignment by EGM—Summary

Columns:

Group: Site Name

Group: EGM Group

Detail:
  Package ID, Assignment ID, Module ID, Component, Created Date, Created By, Approved Date, Approved By, Total packages assigned, Total EGMs
Group By: Site, EGM Group (Collection)
Sort By: Package ID, Module ID
Sub-Total field: (Example dynamic groupings/collections)
Sub:Total Columns: (Example dynamic groupings/collections)
Group Total field: Site Name
Group Total Columns: Total packages assigned, Total EGMs
Grand Total? Yes
Grand Total Columns: Total packages assigned, Total EGMs

| Example Package Assignment by EGM - Summary  Bally Test Casino  mm/dd/yyyy to mm/dd/yyyy ||||||||||
|---|---|---|---|---|---|---|---|---|---|
| Package ID | Assignment ID | Module ID | Component ID | Create Date | Create By | Approved Date | Approved By | Total Packages | Total EGMs Assigned |
| | | | | Site: North Tahoe Casino  EGM Group: Main Isle | | | | | |
| 12345987 | 1000001 | 200000 | 128981 | 10/08/2006 | 123987 | 10/08/2006 | 123999 | 22 | 20 |
| | | | | | | Site Sub-Totals: | | 22 | 20 |
| | | | | Site: South Tahoe Casino  EGM Group: Entrance One | | | | | |
| 12345999 | 1000002 | 200000 | 128981 | 10/08/2006 | 123987 | 10/08/2006 | 123999 | 5 | 5 |
| | | | | EGM Group: Entrance Two | | | | | |
| 123459600 | 1000003 | 200000 | 128981 | 10/08/2006 | 123987 | 10/08/2006 | 123999 | 2 | 2 |
| | | | | | | Site Sub-Totals: | | 7 | 7 |
| | | | | | | Grand-Totals: | | 29 | 27 |

An example Package Assignment by EGM—Detail may include:
  Input Parameters: [Start Date] to [EndDate] range for Package Create Date
  Logo: Tech Logo
  Title: Package Assignment by EGM—Summary
  Columns
    Group: Site Name
    Group: EGM Group
  Detail:
    EGM ID, Package ID, Assignment ID, Module ID, Component ID, Created Date, Created By, Approved Date, Approved By, Total packages assigned, Total EGMs
  Group By: Site, EGM Group (Collection)
  Sort By: EGM Internal Identifier, Package ID, Module ID
  Sub-Total field: n/a
  Sub:Total Columns: n/a
  Group Total field: Site Name
  Group Total Columns: Total packages assigned, Total EGMs
  Grand Total? Yes
  Grand Total Columns: Total packages assigned, Total EGMs

| Example Package Assignment by EGM - Detail  Bally Test Casino  mm/dd/yyyy to mm/dd/yyyy ||||||||||
|---|---|---|---|---|---|---|---|---|---|
| EMG ID | Package ID | Assignment ID | Module ID | Component ID | Create Date | Create By | Approved Date | Approved By | Total Packages Assigned |
| | | | | Site: North Tahoe Casino  EGM Group: Main Isle | | | | | |
| 11102 | 12345987 | 1000001 | 200000 | 128981 | 10/08/2006 | 123987 | 10/08/2006 | 123999 | 22 |
| | | | | | | | | Site Sub-Totals: | 22 |

Example Package Assignment by EGM - Detail
Bally Test Casino
mm/dd/yyyy to mm/dd/yyyy

| EMG ID | Package ID | Assignment ID | Module ID | Component ID | Create Date | Create By | Approved Date | Approved By | Total Packages Assigned |
|---|---|---|---|---|---|---|---|---|---|
| | | | | Site: South Tahoe Casino | | | | | |
| | | | | EGM Group: Entrance One | | | | | |
| 21071 | 12345999 | 1000002 | 200000 | 128981 | 10/08/2006 | 123987 | 10/08/2006 | 123999 | 5 |
| | | | | EGM Group: Entrance Two | | | | | |
| 31025 | 12345600 | 1000003 | 200000 | 128981 | 10/08/2006 | 123987 | 10/08/2006 | 123999 | 2 |
| | | | | | | | Site Sub-Totals: | | 7 |
| | | | | | | | Grand-Totals: | | 29 |
| | | | | | | | Total EGMs: | | 3 |

Example Module Assignment by EGM—Summary may include:
Input Parameters: [Start Date] to [EndDate] range for Assignment Approved Date
Logo: Tech Logo
Title: Module Assignment by EGM—Summary
Columns
Group: Site Name
Group: EGM Group
Detail: Module ID, Package ID, Assignment ID, Component ID, Created Date, Created By, Approved Date, Approved By, Total packages assigned, Total EGMs
Group By: Site, EGM Group (Collection)
Sort By: Module ID, Package ID
Sub-Total field: n/a
Sub:Total Columns: n/a
Group Total field: Site Name
Group Total Columns: Total packages assigned, Total EGMs
Grand Total? Yes
Grand Total Columns: Total packages assigned, Total EGMs An example Module Assignment by EGM—Detail may include:
Input Parameters: [Start Date] to [EndDate] range for Assignment Approved Date
Logo: Tech Logo
Title: Module Assignment by EGM—Summary
Columns
Group: Site Name
Group: EGM Group
Detail:
EGM ID, Module ID, Package ID, Assignment ID, Component ID, Created Date, Created By, Approved Date, Approved By
Group By: Site, EGM Group (Collection)
Sort By: EGM Internal Identifier, Module ID, Package ID
Sub-Total field: EGM Group
Sub:Total Columns: Total packages assigned, Total EGMs
Group Total field: Site Name
Group Total Columns: Total packages assigned, Total EGM Groups, Total EGMs
Grand Total? Yes
Grand Total Columns: Total packages assigned, Total EGM Groups, Total EGMs Module Assignment by EGM - Summary
Bally Test Casino
mm/dd/yyyy to mm/dd/yyyy

| Module ID | Package ID | Assignment ID | Component ID | Create Date | Create By | Approved Date | Approved By | Total Packages | Total EGMs Assigned |
|---|---|---|---|---|---|---|---|---|---|
| | | | | Site: abc casino | | | | | |
| | | | | EGM Group: Main Isle | | | | | |
| 2000000 | 12345987 | 1000001 | 128981 | 10/08/2006 | 123987 | mm/dd/yyyy | 123999 | 22 | 20 |
| | | | | | | Site Sub-Totals: | | 22 | 20 |
| | | | | Site: def casino | | | | | |
| | | | | EGM Group: Entrance One | | | | | |
| 200000 | 12345999 | 1000002 | 128981 | 10/08/2006 | 123987 | 10/08/2006 | 123999 | 5 | 5 |
| | | | | EGM Group: Entrance Two | | | | | |
| 200000 | 123459600 | 1000003 | 128981 | 10/08/2006 | 123987 | 10/08/2006 | 123999 | 2 | 2 |
| | | | | | | Site Sub-Totals: | | 7 | 7 |
| | | | | | | Grand-Totals: | | 29 | 27 |

Example Module Assignment by EGM - Detail
abc Casino
mm/dd/yyyy to mm/dd/yyyy

| EMG ID | Module ID | Package ID | Assignment ID | Component ID | Create Date | Create By | Approved Date | Approved By | Total Packages Assigned |
|---|---|---|---|---|---|---|---|---|---|
| | | | | Site: abc Casino EGM Group: Main Isle | | | | | |
| 11102 | 2000000 | 12345987 | 1000001 | 128981 | 10/08/2006 | 123987 | mm/dd/yyyy | 123999 | 22 |
| | | | | | | | Site Sub-Totals: | | 22 |
| | | | | Site: def Casino EGM Group: Entrance One | | | | | |
| 21071 | 2000000 | 12345999 | 1000002 | 128981 | 10/08/2006 | 123987 | mm/dd/yyyy | 123999 | 5 |
| | | | | EGM Group: Entrance Two | | | | | |
| 31025 | 2000000 | 12345600 | 1000003 | 128981 | 10/08/2006 | 123987 | mm/dd/yyyy | 123999 | 2 |
| | | | | | | | Site Sub-Totals: | | 7 |
| | | | | | | | Grand-Totals: | | 29 |
| | | | | | | | Total EGMs: | | 3 |

Example User Assignments by Module may Include:
Input Parameters Start Date to End Date range for Assignment Approved Date
Logo: Tech Logo
Title: User Assignments by Module
Columns
Group: Site Name
Group: User
Detail:
User Name, User ID, Module ID, Package ID, Assignment ID, Component ID,
Created Date, Created By, Approved Date, Approved By
Group By: Site, User Name
Sort By: Module ID
Sub-Total field: EGM Group
Sub:Total Columns: Total modules assigned
Group Total field: Site Name
Group Total Columns: Total modules assigned
Grand Total? Yes
Grand Total Columns: Total modules assigned,
An Example Assignment History May Include:
Input Parameters Start Date to End Date range for Assignment Approved Date
Logo: Tech Logo
Title: Assignment History
Columns
Group: Site Name
Detail:
User Name, User ID, Module ID, Package ID, Assignment ID, Component ID,
Created Date, Created By, Approved Date, Approved By
Group By: Site
Sort By: Assignment Date Created, Module ID
Sub-Total field: N/A
Sub:Total Columns: N/A
Group Total field: Site Name
Group Total Columns: Total modules assigned
GrandTotal?Yes
Grand Total Columns: Total modules assigned,
Job Reports
Example Job Status History by Assignment May Include:
Input Parameters Start Date to End Date range for Job Submit Date
Logo: Tech Logo
Title: Job Status History by Assignment
Columns
Group: Site Name
Group: Job ID
Detail:
Assignment, Job ID, Package ID, Component ID, Submit Date, Submitted By,
Complete Date, Status
Group By: Site, Assignment ID
Sort By: Submit Date
Sub-Total field: n/a
Sub:Total Columns: n/a
Group Total field: Site Name
Group Total Columns: Total assignments
Grand Total? Yes
Grand Total Columns: Total packages assigned
An Example Job Status History by EFM may Include:
Input Parameters: [Start Date] to [EndDate] range for Job Submit Date
Logo: Tech Logo
Title: Job Status History by Assignment
Columns
Group: Site Name
Group: EGM
Detail:
Assignment ID, Job ID, Package ID, Component ID, Submit Date, Submitted By,
Complete Date, Status
Group By: Site, EGM
Sort By: Job ID, Submit Date
Sub-Total field: n/a
Sub:Total Columns: n/a
Group Total field: Site Name
Group Total Columns: Total assignments
Grand Total? Yes
Grand Total Columns: Total packages assigned
An Example Failed Job History May Include:
Input Parameters: [Start Date] to [EndDate] range for Job Submit Date
Internal Select: 'Failed ' Job Status
Logo: Tech Logo Title: Job Status History by Assignment
Columns
Group: Site Name
Group: Assignment ID
Detail: Assignment ID, Job ID, Package ID, Component ID (DownLoad) or
OptionItemID(Config), Submit Date, Submitted By, Event, Event Date
Group By: Site, EGM
Sort By: Job ID, Submit Date, event, event date
Sub-Total field: n/a
Sub:Total Columns: n/a
Group Total field: Site Name
Group Total Columns: Total Failed Jobs
Grand Total? YES
Grand Total Columns: Total Failed Jobs
Example Audit Reports May Include
1) User Activity;
2) EGM Activity;
3) Activity Report for Regulators;
4) Module Inventory;
5) List of Revoked/Outdated Packages;
6) Detailed EGM Job;
7) Failed EGM Job and/or
8) List of Revoked/Outdated Packages.
Example EGM Reports May Include:
  EGM Device Inventory Report
  This report may be written for the Floor System project and may be imported from that project.
  EGM Event
  This report may be written for the Floor System project and may be imported from that project.
  EGM Meter
  This report may be written for the Floor System project and may be imported from that project.
  EGM Daily Financial (audited data)
  This report may be written for the Floor System project and may be imported from that project.
  EGM Listing
  This report may be written for the Floor System project and may be imported from that project.
  EGM Media
  This report may be written for the Floor System project and may be imported from that project.
  EGM Game Theme
  This report may be written for the Floor System project and may be imported from that project.
Example EGM Group Reports May Include:
Input Parameters: [Start Date] to [EndDate] range for Group Create Date
Internal Select: n/a
Logo: Tech Logo
Title: EGM Groups
Columns
Group: Site Name
Group: EGM Group
Detail:
$1^{st}$ header line: EGM ID, Manufacturer ID, Install Date, - - - Game
Combinations - - -
$2^{nd}$ header line Game Theme,
PayTable, Denomination
Group By: Site, EGM Group
Sort By: EGM ID, Game Theme, Paytable, Denom
Sub-Total field: n/a
Sub:Total Columns: n/a
Group Total field: n/a
Group Total Columns: n/a
Grand total? n/a
Grand Total Columns: n/a
- - -
Appendix Definitions, Acronyms, and Abbreviations

| Definition, Acronym, Abbreviation | Description |
| --- | --- |
| Control Panel (BCP) | This smart client encapsulates all the functionality to support the command and control portions of the download and configuration features of the project. |
| Live Services | These are the windows services which are responsible for executing the Business Logic of the system. |
| Business Logic Layer Tier | The Business Logic Layer is comprised of the Download and Configuration Windows Services which are responsible for implementing the Business Logic of the system. |
| Database | SQL Server 2005 returns information based on the results of retrieving data from the following databases<br>Core<br>Configuration<br>Download<br>Activity<br>Schedule |
| Database Web Services | These are the Web services that will be able to be re-used by other GUI and Service Applications in slot management system 101. |
| Data Access Layer Tier | The Data Access Layer is comprised of Web Services which expose methods for interacting with the Data Tier. |
| EGM Tier | The Data Tier is comprised of Electronic Game Machines (EGM) and other configurable components like iView and Game Controllers. |
| Electronic Gaming Machine (EGM) | Gaming machines and/or tables which may include electo-mechanical devices and/or video displays. |

| Definition, Acronym, Abbreviation | Description |
| --- | --- |
| G2S (Game to System) | The G2S (Game to System) protocol provides a messaging standard, using XML, for communications between gaming devices (such as game software, meters, and hoppers) and gaming management systems (such as progressives, cashless, and accounting). |
| G2S Engine | This service will receive G2S messages from the EGM 213 and dispatch them to the Live Service based on the message component type. |
| G2S Download Protocol | The G2S download protocol will provide a standardized protocol to manage the downloaded content on all G2S compliant EGM from all G2S compliant host systems. |
| G2S Message | Command messages sent to an EGM, to update or configure the EGM 213. |
| G2S optionConfig Protocol | The G2S optionConfig protocol will download options available from within and EGM. The SDDP server will maintain all down load software packages in a secure library with a required number of secure backups as defined by the jurisdiction |
| G2S Engine Tier | The G2S Engine Tier is comprised of the G2S engine components. Its job is to send and receive G2S protocol messages to and from EGM and other configurable devices. It is also responsible for the packaging and unpacking of the internal system messages and G2S protocol messages. |
| iView | proprietary device for player touch point services. It is used to display marketing and player tracking information. While not currently capable of "gaming", it likely will be downstream, so it is treated herein as an EGM. |
| Module | A manufacturer-defined element that is a uniquely identifiable unit within the EGM. For example: A module can be an operating system, or a game theme, firmware for a printer; etc. A module may be a single WAV sound file that is shared by other modules. |
| Presentation Tier | The Presentation Tier is comprised of the Control Panel application. The Control Panel application is the Graphical Interface through which the Download and Configuration portion of the Live system is managed. |
| SDDP Server | Will maintain all down load software packages in a secure library with a required number of secure backups as defined by the jurisdiction |
| package | A manufacturer-defined element that can be thought of as a single file, which contains: an optional download header that contains information about the package payload and The package payload, with the payload being a ZIP file, TAR file, an XML configuration file, a single BIN file, or any file format that makes sense. The point is that specific format of the payload is of no interest to the command and control of the transfer. |
| Software download | The ability to send packages between a Software Download Distribution Point and one or more EGMs. |

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure. For instance, the foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware are possible in light of this disclosure. It will also be appreciated that many of the methods or processes may omit some acts, include additional acts, and/or may perform the acts in a different order than described herein, so long as the desired end result or functionality is achieved.

In addition, the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. patent publication No. 2007/0082737A1; U.S. patent publication No. 2007/0006329A1; U.S. patent publication No. 2007/0054740A1; U.S. patent publication No. 2007/01111791; U.S. provisional patent application Ser. No. 60/865345, filed Nov. 10, 2006; U.S. provisional patent application Ser. No. 60/865575, filed Nov. 13, 2006; U.S. provisional patent application Ser. No. 60/865332, filed Nov. 10, 2006; U.S. provisional patent application Ser. No. 60/865550, filed Nov. 13, 2006; U.S. nonprovisional patent application Ser. No. 11/938,121 filed Nov. 9, 2007; U.S. nonprovisional patent application Ser. No. 11/938,228, filed Nov. 9, 2007; U.S. nonprovisional patent application Ser. No. 11/938,155, filed U.S. nonprovisional patent application Ser. No 11/938,190, filed Nov. 9, 2007; U.S. nonprovisional patent application Ser. No. 11/938,163, filed Nov. 9, 2007; U.S. nonprovisional patent application Ser. No. 11/938,150, filed Nov. 9, 2007; U.S. nonprovisional patent application Ser. No. 11/938,231; U.S. patent application Ser. No. 11/278,937, filed Apr. 6, 2006; U.S. Provisional Patent Application Ser. No. 60/676,429, filed Apr. 28, 2005; U.S. patent application Ser. No. 11/470,606, filed Sep. 6, 2006; U.S. Provisional Patent Application Ser. No. 60/714,754, filed Sep. 7, 2005; U.S. patent application Ser. No. 11/938,249, filed Nov. 9, 2007; U.S. Provisional Patent Application No. 60/865,332, filed Nov. 10, 2006; and U.S. Provisional Patent Application No. 60/865,396, filed Nov. 10, 2006 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A gaming system, comprising:
a distribution point to store a package of gaming machine instructions for distribution;
a non-transitory storage to store state information pertaining to said package of gaming machine instructions;
at least one processor; and
a number of sets of machine executable instructions to cause the at least one processor to:
provide a package manager, stored in memory, that maintains said state information stored in said non-transitory storage and that manages at least one operation pertaining to copying said package to said distribution point from a read-only device that stores an authenticated version of said package; and
provide a verify package service, stored in memory, comprising at least an authentication portion that authenticates the copy of the package of gaming machine instructions stored at the distribution point by:
obtaining a first hash value associated with the authenticated version stored on the read-only device;
performing an encryption algorithm to generate a second hash value from the copy of the package stored at the distribution point; and
comparing the second hash value to the first hash value to determine that the copy of the package of gaming machine instructions stored at the distribution point has not been altered from the authenticated version stored on the read-only device;
wherein at least the current authentication portion of said verify package service is replaced with a new copy of said authentication portion according to a download interval.

2. The gaming system of claim 1 wherein said distribution point includes at least one server that stores a number of secure backups of the package in a secure library.

3. The gaming system of claim 1 wherein said non-transitory storage includes at least one database to store said state information in fields respectively corresponding to each package.

4. The gaming system of claim 1 wherein said package manager includes:
a package monitor service to monitor and update said state information in said non-transitory storage;
a copying package callable by said package monitor service to perform said copying of said package to or to remove said package from said distribution point, and
the verify package service callable by said package monitor service to verify the authenticity of said package called by said package monitor service.

5. The gaming system of claim 4 wherein said verify package service includes said copying package.

6. The gaming system of claim 1 wherein said machine executable instructions further cause the at least one processor to cause the package manager to query said non-transitory storage for said state information according to a query interval, and to update said state information before, during, and after performing by the package manager at least one of a copying, removing, or verifying said package.

7. An apparatus for a gaming environment, the apparatus comprising:
at least one processor communicably coupled to a nontransitory machine readable media storing a number of machine executable instruction sets to cause the at least one processor to execute a package manager, stored in memory, wherein said package manager:
monitors and updates state information pertaining to a package of gaming machine instructions for distribution;
controls copying of said package of gaming machine instructions to a distribution point from a read-only device that stores an authenticated version of said package responsive at least in part to said monitored and updated state information; and verifies, using an authentication portion of said package manager, an authenticity of said package of gaming machine instructions responsive to said monitored and updated state information by:

obtaining a first hash value associated with the authenticated version stored on the read-only device;

performing an encryption algorithm to generate a second hash value from the copy of the package stored at the distribution point; and comparing the second hash value to the first hash value to determine that the copy of the package of gaming machine instructions stored at the distribution point has not been altered from the authenticated version stored on the read-only device;

wherein at least the authentication portion of said package manager is updated with a new authentication portion according to a defined download interval.

8. The apparatus of claim 7, further comprising a host device in which said package manager unit is stored.

9. The apparatus of claim 8 wherein said host device is a control station computer adapted to operate in a network, said control station computer having a user interface adapted to present at least some of said state information.

10. The apparatus of claim 7 wherein the machine executable instruction sets that cause the package manager to monitor and update state information pertaining to a package of gaming machine instructions for distribution, further cause said package manager to:

generate a query for said state information according to a query interval, and update said state information before, during, and after copy or removal of said package of gaming machine instructions or verification of said package of gaming machine instructions.

11. A method for providing a package management system for managing a package of gaming machine instructions in a gaming environment, the method comprising:

copying, by a package manager service processor, from a read only storage media to a first non-transitory storage medium located at a distribution point communicably coupled to the package manager service processor a package of gaming machine instructions for distribution, the read only storage media storing an authenticated version of said package of gaming machine instructions;

storing, by the package manager service processor, in a second non-transitory storage medium communicably coupled to the package manager service processor state information pertaining to said package of gaming machine instructions copied to the first non-transitory storage medium;

querying and updating, by the package manager service processor, said stored state information responsive to a change in state of said package of gaming machine instructions;

verifying, by an authentication portion of a package verifier stored in a nontransitory storage medium communicably coupled to the package manager service processor, the integrity of said stored package of gaming machine instructions in the first non-transitory storage medium at said distribution point by:

obtaining a first hash value associated with the authenticated version stored on the read only storage media;

performing an encryption algorithm to generate a second hash value from the copy the package stored at the distribution point; and comparing the second hash value to the first hash value to determine that the copy of the package of gaming machine instructions stored at the distribution point has not been altered from the authenticated version stored on the read only storage media; and replacing, by the package manager service processor, at least the current authentication portion of said package verifier with a new authentication portion at a defined download interval.

12. The method of claim 11 wherein querying said stored state information includes issuing by the package manager service processor a query for said stored state information according to a query interval, and wherein updating said stored state information includes updating by the package manager service processor said stored state information before, during, and after copy of said package of gaming machine instructions from the read only storage media to said distribution point or before, during and after removal of said package from said distribution point.

13. An article of manufacture, comprising:

a non-transitory computer-readable medium which stores instructions that are executable by at least one processor to execute a package of gaming machine instructions including a package manager service, stored in memory, in a gaming environment, by:

copying said package of gaming machine instructions from a read-only storage media to a first nontransitory storage media at a distribution point, an authenticated version of said package of gaming machine instructions stored on the read-only storage media;

storing state information pertaining to said package of gaming machine instructions in a second nontransitory storage media according to a query interval;

updating said stored state information in response to performing an operation on the package of gaming machine instructions;

verifying, by the package manager service according to an authentication portion of the instructions stored on the non-transitory computer-readable medium and executed by at least one processor, the authenticity of said stored package of gaming machine instructions stored in the first nontransitory storage media by:

obtaining a first hash value associated with the authenticated version stored on the read-only storage media;

performing an encryption algorithm to generate a second hash value from the copy of the package stored at the distribution point; and comparing the second hash value to the first hash value to determine that the copy of the package of gaming machine instructions stored at the distribution point has not been altered from the authenticated version stored on the read-only storage media; and replacing, responsive to verifying the authenticity of said stored package of gaming machine instructions, the current authentication portion of the instructions stored on the non-transitory computer-readable medium with a new authentication portion according to a defined download interval.

14. The article of manufacture of claim 13 wherein the instructions to update the stored state information include instructions to update the stored state information before, during, and after copy, removal, and verification operations for said package of gaming machine instructions.

15. The article of manufacture of claim 13 wherein the instructions for storing or verifying operations include instructions to have a stored service class adapted to monitor said state information call at least one other stored service class adapted to perform storage-related operations.

16. The article of manufacture of claim 13 wherein the computer-readable medium is further encoded with instructions that are executable by said processor to manage the package, by:
removing said package of gaming machine instructions from said first nontransitory memory at said distribution point if said package of gaming machine instructions fails said verification, so as to prevent distribution of said package of gaming machine instructions to at least one gaming machine from said distribution point.

17. The gaming system of claim 1 wherein the package manager is the only component in the gaming system that can alter packages stored at said distribution point.

18. The gaming system of claim 1 wherein the at least one operation pertaining to copying said package to said distribution point from a read-only device that stores an authenticated version of said package comprises creating, within a secure library of the distribution point, a required number of secure backup copies of the package as defined by a jurisdiction.

19. The method of claim 11, further comprising:
adding, by the package manager service processor, the second hash value to a header of the copy of the package of gaming machine instructions stored at the distribution point; and
using, by the package manager service processor, the second hash included in the header of the copy of the package of gaming machine instructions stored at the distribution point to subsequently verify the copy of the package of gaming machine instructions stored at the distribution point.

20. The method of claim 11, further comprising:
obtaining, by the authentication portion of the package verifier, instructions for performing the encryption algorithm from a second read only storage media, the second read only storage media different from the read only storage media storing the authenticated version of the package of gaming machine instructions.

21. The method of claim 11 wherein obtaining a first hash value associated with the authenticated version stored on the read only storage media comprises performing the encryption algorithm to generate a first hash value from the authenticated version stored on the read only storage media.

22. The method of claim 11 wherein comparing the second hash value to the first hash value to determine that the copy of the package of gaming machine instructions stored at the distribution point has not been altered from the authenticated version stored on the read-only device comprises determining that the second hash value is identical to the first hash value.

23. The method of claim 11, further comprising:
receiving a first package directory path describing a first location of the authenticated version of the package of gaming machine instructions on the read only storage media and a second package directory path describing a second location on the first non-transitory storage medium to which copying of the package of gaming machine instructions is desired; and
in response to the receiving the first package directory path and the second package directory path, updating the stored state information pertaining to the package of gaming machine instructions to a first state indicating that copying should be performed by the package manager service processor.

24. The method of claim 23 wherein copying, by a package manager service processor, from a read only storage media to a first non-transitory storage medium located at a distribution point communicably coupled to the package manager service processor a package of gaming machine instructions for distribution comprises identifying, by the package manager service processor, that the stored state information pertaining to the package of gaming machine instructions comprises the first state indicating that copying should be performed by the package manager service processor, and, in response to identifying that the stored state information pertaining to the package of gaming machine instructions comprises the first state, copying, by the package manager service processor, from the read only storage medium to the first non-transitory storage medium located at the distribution point communicably coupled to the package manager service processor the package of gaming machine instructions for distribution.

25. The method of claim 11 wherein verifying, by an authentication portion of a package verifier stored in a non-transitory storage medium communicably coupled to the package manager service processor, the integrity of said stored package of machine instructions in the first non-transitory storage medium at said distribution point comprises periodically verifying, by an authentication portion of a package verifier stored in a nontransitory storage medium communicably coupled to the package manager service processor, the integrity of said stored package of machine instructions in the first non-transitory storage medium at said distribution point according to a verification interval.

* * * * *